US012675656B2

(12) United States Patent
Bradley et al.

(10) Patent No.: US 12,675,656 B2
(45) Date of Patent: Jul. 7, 2026

(54) GENERATING AND READING OPTICAL CODES WITH VARIABLE DENSITY TO ADAPT FOR VISUAL QUALITY AND RELIABILITY

(71) Applicant: Digimarc Corporation, Beaverton, OR (US)

(72) Inventors: Brett A. Bradley, Portland, OR (US); Vojtech Holub, Portland, OR (US); Hugh L. Brunk, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 18/822,371

(22) Filed: Sep. 2, 2024

(65) Prior Publication Data

US 2025/0103836 A1 Mar. 27, 2025

Related U.S. Application Data

(60) Continuation of application No. 17/372,179, filed on Jul. 9, 2021, now Pat. No. 12,079,684, which is a (Continued)

(51) Int. Cl.
*G06K 7/14* (2006.01)

(52) U.S. Cl.
CPC ......... *G06K 7/1443* (2013.01); *G06K 7/1447* (2013.01); *G06K 7/1465* (2013.01); *G06K 7/1473* (2013.01)

(58) Field of Classification Search
CPC .. G06K 7/1447; G06K 7/1465; G06K 7/1473; G06K 7/1443; G06K 7/1417;
(Continued)

(56) References Cited

U.S. PATENT DOCUMENTS

| | | | |
|---|---|---|---|
| 3,628,271 | A | 12/1971 | Carrell |
| 5,206,490 | A | 4/1993 | Petigrew |

(Continued)

FOREIGN PATENT DOCUMENTS

| | | | |
|---|---|---|---|
| CA | 2677967 | C | 8/2015 |
| EP | 0638614 | A1 | 2/1995 |

(Continued)

OTHER PUBLICATIONS

A highly secure oblivious sparse coding-based watermarking system for ownership verification (Year: 2006).*

(Continued)

*Primary Examiner* — Thien T Mai
(74) *Attorney, Agent, or Firm* — Klarquist Sparkman, LLP

(57) ABSTRACT

The parameters of an optical code are optimized to achieve improved signal robustness, reliability, capacity and/or visual quality. An optimization program can determine spatial density, dot distance, dot size and signal component priority to optimize robustness. An optical code generator employs these parameters to produce an optical code at the desired spatial density and robustness. The optical code is merged into a host image, such as imagery, text and graphics of a package or label, or it may be printed by itself, e.g., on an otherwise blank label or carton. A great number of other features and arrangements are also detailed.

18 Claims, 76 Drawing Sheets

Related U.S. Application Data division of application No. 16/405,621, filed on May 7, 2019, now Pat. No. 11,062,108, which is a continuation-in-part of application No. 16/002,989, filed on Jun. 7, 2018, now Pat. No. 10,896,307.

(60) Provisional application No. 62/834,657, filed on Apr. 16, 2019, provisional application No. 62/751,084, filed on Oct. 26, 2018, provisional application No. 62/730,958, filed on Sep. 13, 2018, provisional application No. 62/673,738, filed on May 18, 2018, provisional application No. 62/670,562, filed on May 11, 2018, provisional application No. 62/659,641, filed on Apr. 18, 2018, provisional application No. 62/634,898, filed on Feb. 25, 2018, provisional application No. 62/582,871, filed on Nov. 7, 2017.

(58) Field of Classification Search
CPC ....... G06K 19/06103; G06K 19/06037; G06K 19/06056
See application file for complete search history.

(56) References Cited

U.S. PATENT DOCUMENTS 5,329,108 A 7/1994 Lamoure
5,383,995 A 1/1995 Phillips
5,396,559 A 3/1995 Mcgrew
5,416,312 A 5/1995 Lamoure
5,444,779 A 8/1995 Daniele
5,453,605 A 9/1995 Hecht
5,481,377 A 1/1996 Udagawa
5,492,222 A 2/1996 Weaver
5,521,372 A 5/1996 Hecht
5,542,971 A 8/1996 Auslander
5,576,532 A 11/1996 Hecht
5,745,604 A 4/1998 Rhoads
5,752,152 A 5/1998 Gasper
5,790,703 A 8/1998 Wang
5,809,139 A 9/1998 Girod
5,843,564 A 12/1998 Gasper
5,859,920 A 1/1999 Daly
5,862,260 A 1/1999 Rhoads
5,919,730 A 7/1999 Gasper
5,998,609 A 12/1999 Aoki
6,011,857 A 1/2000 Sowell
6,060,428 A 5/2000 Chang
6,076,738 A 6/2000 Bloomberg
6,122,392 A 9/2000 Rhoads
6,122,403 A 9/2000 Rhoads
6,149,719 A 11/2000 Houle
6,168,081 B1 1/2001 Urano
6,177,683 B1 1/2001 Kolesar
6,246,778 B1 6/2001 Moore
6,345,104 B1 2/2002 Rhoads
6,361,916 B1 3/2002 Chen
6,373,965 B1 4/2002 Liang
6,441,380 B1 8/2002 Lawandy
6,449,377 B1 9/2002 Rhoads
6,456,729 B1 9/2002 Moore
6,522,767 B1 2/2003 Moskowitz
6,567,532 B1 5/2003 Honsinger
6,567,534 B1 5/2003 Rhoads
6,590,996 B1 7/2003 Reed
6,603,864 B1 8/2003 Matsunoshita
6,614,914 B1 9/2003 Rhoads
6,625,297 B1 9/2003 Bradley
6,683,966 B1 1/2004 Tian
6,692,031 B2 2/2004 Mcgrew
6,694,041 B1 2/2004 Brunk
6,698,860 B2 3/2004 Berns
6,706,460 B1 3/2004 Williams
6,718,046 B2 4/2004 Reed
6,723,121 B1 4/2004 Zhong
6,760,464 B2 7/2004 Brunk
6,775,391 B2 8/2004 Hosaka
6,775,394 B2 8/2004 Yu
6,786,397 B2 9/2004 Silverbrook
6,804,377 B2 10/2004 Reed
6,829,063 B1 12/2004 Allebach
6,839,450 B2 1/2005 Yen
6,912,674 B2 6/2005 Trelewicz
6,914,699 B1 7/2005 Takata
6,940,993 B2 9/2005 Jones
6,947,571 B1 9/2005 Rhoads
6,961,442 B2 11/2005 Hannigan
6,987,861 B2 1/2006 Rhoads
6,993,152 B2 1/2006 Patterson
6,995,859 B1 2/2006 Silverbrook
6,996,252 B2 2/2006 Reed
7,072,490 B2 7/2006 Stach
7,076,082 B2 7/2006 Sharma
7,114,657 B2 10/2006 Auslander
7,127,112 B2 10/2006 Sharma
7,152,021 B2 12/2006 Alattar
7,218,750 B1 5/2007 Hiraishi
7,231,061 B2 6/2007 Bradley
7,280,672 B2 10/2007 Powell
7,321,667 B2 1/2008 Stach
7,340,076 B2 3/2008 Stach
7,352,878 B2 4/2008 Reed
7,412,072 B2 8/2008 Sharma
7,529,385 B2 5/2009 Lawandy
7,532,741 B2 5/2009 Stach
7,536,553 B2 5/2009 Auslander
7,555,139 B2 6/2009 Rhoads
7,559,983 B2 7/2009 Starling
7,684,088 B2 3/2010 Jordan
7,721,879 B2 5/2010 Weaver
7,738,673 B2 6/2010 Reed
7,800,785 B2 9/2010 Bala
7,831,062 B2 11/2010 Stach
7,856,143 B2 12/2010 Abe
7,892,338 B2 2/2011 Degott
7,926,730 B2 4/2011 Auslander
7,965,862 B2 6/2011 Jordan
7,986,807 B2 7/2011 Stach
8,009,893 B2 8/2011 Rhoads
8,064,100 B2 11/2011 Braun
8,144,368 B2 3/2012 Rodriguez
8,157,293 B2 4/2012 Bhatt
8,159,657 B2 4/2012 Degott
8,180,174 B2 5/2012 Di
8,194,919 B2 6/2012 Rodriguez
8,223,380 B2 7/2012 Lapstun
8,227,637 B2 7/2012 Cohen
8,301,893 B2 10/2012 Brundage
8,345,315 B2 1/2013 Sagan
8,360,323 B2 1/2013 Widzinski
8,412,577 B2 4/2013 Rodriguez
8,515,121 B2 8/2013 Stach
8,593,696 B2 11/2013 Picard
8,620,021 B2 12/2013 Knudson
8,675,987 B2 3/2014 Agarwaia
8,687,839 B2 4/2014 Sharma
8,699,089 B2 4/2014 Eschbach
8,730,527 B2 5/2014 Chapman
8,805,110 B2 8/2014 Rodriguez
8,840,029 B2 9/2014 Lawandy
8,867,782 B2 10/2014 Kurtz
8,913,299 B2 12/2014 Picard
8,947,744 B2 2/2015 Kurtz
9,008,315 B2 4/2015 Lord
9,013,501 B2 4/2015 Scheibe
9,055,239 B2 6/2015 Tehranchi
9,064,228 B2 6/2015 Woerz
9,070,132 B1 6/2015 Durst
9,087,376 B2 7/2015 Rodriguez
9,269,022 B2 2/2016 Rhoads
9,275,428 B2 3/2016 Chapman
9,319,557 B2 4/2016 Chapman
9,380,186 B2 6/2016 Reed
9,400,951 B2 7/2016 Yoshida

(56) References Cited

U.S. PATENT DOCUMENTS

| | | | |
|---|---|---|---|
| 9,401,001 | B2 | 7/2016 | Reed |
| 9,449,357 | B1 | 9/2016 | Lyons |
| 9,486,814 | B2 | 11/2016 | Prahlad |
| 9,562,998 | B2 | 2/2017 | Edmonds |
| 9,593,982 | B2 | 3/2017 | Rhoads |
| 9,635,378 | B2 | 4/2017 | Holub |
| 9,658,373 | B2 | 5/2017 | Downing |
| 9,690,967 | B1 | 6/2017 | Brundage |
| 9,747,656 | B2 | 8/2017 | Stach |
| 9,749,607 | B2 | 8/2017 | Boles |
| 9,754,341 | B2 | 9/2017 | Falkenstern |
| 10,204,253 | B1 | 2/2019 | Long |
| 10,223,560 | B2 | 3/2019 | Boles |
| 10,304,151 | B2 | 5/2019 | Falkenstern |
| 10,438,035 | B2 | 10/2019 | D'Ercoli |
| 10,594,689 | B1 | 3/2020 | Weaver |
| 10,872,392 | B2 | 12/2020 | Stach |
| 10,896,307 | B2 | 1/2021 | Sharma |
| 11,048,892 | B2 | 6/2021 | Zur |
| 11,276,133 | B2 | 3/2022 | Kamath |
| 2001/0037455 | A1 | 11/2001 | Lawandy |
| 2002/0054356 | A1 | 5/2002 | Kurita |
| 2002/0080396 | A1 | 6/2002 | Silverbrook |
| 2002/0085736 | A1 | 7/2002 | Kalker |
| 2002/0136429 | A1 | 9/2002 | Stach |
| 2002/0147910 | A1 | 10/2002 | Brundage |
| 2002/0169962 | A1 | 11/2002 | Brundage |
| 2003/0005304 | A1 | 1/2003 | Lawandy |
| 2003/0012548 | A1 | 1/2003 | Levy |
| 2003/0012569 | A1 | 1/2003 | Lowe |
| 2003/0021437 | A1 | 1/2003 | Hersch |
| 2003/0039376 | A1 | 2/2003 | Stach |
| 2003/0053654 | A1 | 3/2003 | Patterson |
| 2003/0063319 | A1 | 4/2003 | Umeda |
| 2003/0083098 | A1 | 5/2003 | Yamazaki |
| 2003/0116747 | A1 | 6/2003 | Lem |
| 2003/0156733 | A1 | 8/2003 | Zeller |
| 2003/0174863 | A1 | 9/2003 | Brundage |
| 2004/0023397 | A1 | 2/2004 | Vig |
| 2004/0032972 | A1* | 2/2004 | Stach .................... G06T 1/0021 382/104 |
| 2004/0037448 | A1 | 2/2004 | Brundage |
| 2004/0046032 | A1 | 3/2004 | Urano |
| 2004/0146177 | A1 | 7/2004 | Kalker |
| 2004/0149830 | A1 | 8/2004 | Allen |
| 2005/0127176 | A1 | 6/2005 | Dickinson |
| 2005/0262351 | A1 | 11/2005 | Levy |
| 2006/0017957 | A1 | 1/2006 | Degott |
| 2006/0022059 | A1 | 2/2006 | Juds |
| 2006/0078159 | A1 | 4/2006 | Hamatake |
| 2006/0115110 | A1 | 6/2006 | Rodriguez |
| 2006/0147082 | A1 | 7/2006 | Jordan |
| 2006/0165311 | A1 | 7/2006 | Watson |
| 2007/0102920 | A1 | 5/2007 | Bi |
| 2007/0152032 | A1 | 7/2007 | Tuschel |
| 2007/0152056 | A1 | 7/2007 | Tuschel |
| 2007/0192872 | A1 | 8/2007 | Rhoads |
| 2007/0210164 | A1 | 9/2007 | Conlon |
| 2007/0221732 | A1 | 9/2007 | Tuschel |
| 2007/0262154 | A1 | 11/2007 | Zazzu |
| 2007/0262579 | A1 | 11/2007 | Bala |
| 2008/0112590 | A1* | 5/2008 | Stach ................. H04N 1/32187 382/100 |
| 2008/0149820 | A1 | 6/2008 | Jordan |
| 2008/0159615 | A1 | 7/2008 | Rudaz |
| 2008/0164689 | A1 | 7/2008 | Jordan |
| 2008/0277626 | A1 | 11/2008 | Yang |
| 2009/0018996 | A1 | 1/2009 | Hunt |
| 2009/0040022 | A1 | 2/2009 | Finkenzeller |
| 2009/0059299 | A1 | 3/2009 | Yoshida |
| 2009/0129592 | A1 | 5/2009 | Swiegers |
| 2009/0158318 | A1 | 6/2009 | Levy |
| 2009/0218401 | A1 | 9/2009 | Moran |
| 2009/0266877 | A1 | 10/2009 | Vonwiller |
| 2010/0025476 | A1 | 2/2010 | Widzinski |
| 2010/0048242 | A1 | 2/2010 | Rhoads |
| 2010/0062194 | A1 | 3/2010 | Sun |
| 2010/0080471 | A1 | 4/2010 | Haas |
| 2010/0119108 | A1 | 5/2010 | Rhoads |
| 2010/0150434 | A1 | 6/2010 | Reed |
| 2010/0317399 | A1 | 12/2010 | Rodriguez |
| 2011/0007092 | A1 | 1/2011 | Ihara |
| 2011/0008606 | A1 | 1/2011 | Sun |
| 2011/0051989 | A1 | 3/2011 | Gao |
| 2011/0085209 | A1 | 4/2011 | Man |
| 2011/0091066 | A1 | 4/2011 | Alattar |
| 2011/0110555 | A1 | 5/2011 | Stach |
| 2011/0111210 | A1 | 5/2011 | Matsunami |
| 2011/0127331 | A1 | 6/2011 | Zhao |
| 2011/0214044 | A1 | 9/2011 | Davis |
| 2011/0249051 | A1 | 10/2011 | Chretien |
| 2011/0249332 | A1 | 10/2011 | Merrill |
| 2011/0255163 | A1 | 10/2011 | Merrill |
| 2012/0014557 | A1 | 1/2012 | Reed |
| 2012/0065313 | A1 | 3/2012 | Demartin |
| 2012/0074220 | A1 | 3/2012 | Rodriguez |
| 2012/0078989 | A1 | 3/2012 | Sharma |
| 2012/0133954 | A1 | 5/2012 | Takabayashi |
| 2012/0205435 | A1 | 8/2012 | Woerz |
| 2012/0214515 | A1 | 8/2012 | Davis |
| 2012/0218608 | A1 | 8/2012 | Maltz |
| 2012/0224743 | A1 | 9/2012 | Rodriguez |
| 2012/0229467 | A1 | 9/2012 | Czerwinski |
| 2012/0243797 | A1 | 9/2012 | Di |
| 2012/0275642 | A1 | 11/2012 | Aller |
| 2012/0311623 | A1 | 12/2012 | Davis |
| 2013/0001313 | A1 | 1/2013 | Denniston, Jr. |
| 2013/0114876 | A1 | 5/2013 | Rudaz |
| 2013/0223673 | A1 | 8/2013 | Davis |
| 2013/0259297 | A1 | 10/2013 | Knudson |
| 2013/0260727 | A1 | 10/2013 | Knudson |
| 2013/0286443 | A1 | 10/2013 | Massicot |
| 2013/0292303 | A1 | 11/2013 | Prahlad |
| 2013/0329006 | A1 | 12/2013 | Boles |
| 2013/0335783 | A1 | 12/2013 | Kurtz |
| 2014/0022603 | A1 | 1/2014 | Eschbach |
| 2014/0052555 | A1 | 2/2014 | Macintosh |
| 2014/0084069 | A1 | 3/2014 | Mizukoshi |
| 2014/0108020 | A1 | 4/2014 | Sharma |
| 2014/0245463 | A1 | 8/2014 | Suryanarayanan |
| 2014/0293091 | A1 | 10/2014 | Rhoads |
| 2014/0325656 | A1 | 10/2014 | Sallam |
| 2014/0339296 | A1 | 11/2014 | Mcadams |
| 2015/0071485 | A1 | 3/2015 | Rhoads |
| 2015/0156369 | A1 | 6/2015 | Reed |
| 2015/0187039 | A1 | 7/2015 | Reed |
| 2015/0269617 | A1 | 9/2015 | Mikurak |
| 2015/0286873 | A1 | 10/2015 | Davis |
| 2015/0317923 | A1 | 11/2015 | Edmonds |
| 2016/0000141 | A1 | 1/2016 | Nappi |
| 2016/0026853 | A1 | 1/2016 | Wexler |
| 2016/0180207 | A1 | 6/2016 | Rodriguez |
| 2016/0196630 | A1 | 7/2016 | Blesser |
| 2016/0217546 | A1 | 7/2016 | Ryu |
| 2016/0217547 | A1 | 7/2016 | Stach |
| 2016/0225116 | A1 | 8/2016 | Tehranchi |
| 2016/0267620 | A1 | 9/2016 | Calhoon |
| 2016/0275639 | A1 | 9/2016 | Holub |
| 2017/0024840 | A1 | 1/2017 | Holub |
| 2017/0024845 | A1 | 1/2017 | Filler |
| 2017/0230533 | A1 | 8/2017 | Holub |
| 2018/0068463 | A1 | 3/2018 | Risser |
| 2018/0082407 | A1 | 3/2018 | Rymkowski |
| 2018/0082715 | A1 | 3/2018 | Rymkowski |
| 2018/0150947 | A1 | 5/2018 | Lu |
| 2018/0158224 | A1 | 6/2018 | Bethge |
| 2018/0189619 | A1 | 7/2018 | Garak |
| 2018/0211157 | A1 | 7/2018 | Liu |
| 2018/0285611 | A1 | 10/2018 | D'Ercoli |
| 2018/0285679 | A1 | 10/2018 | Amitay |
| 2018/0339323 | A1 | 11/2018 | Bullock |
| 2018/0357800 | A1 | 12/2018 | Oxholm |
| 2018/0373999 | A1 | 12/2018 | Xu |
| 2019/0139176 | A1 | 5/2019 | Stach |

(56) References Cited

U.S. PATENT DOCUMENTS

| | | | |
|---|---|---|---|
| 2019/0188431 | A1 | 6/2019 | Zur |
| 2019/0213705 | A1 | 7/2019 | Kamath |
| 2019/0266369 | A1 | 8/2019 | Boles |
| 2019/0266692 | A1 | 8/2019 | Stach |
| 2019/0378235 | A1 | 12/2019 | Kamath |
| 2020/0226709 | A1 | 7/2020 | Holub |

FOREIGN PATENT DOCUMENTS

| | | | | |
|---|---|---|---|---|
| EP | 1367810 | A2 | 12/2003 | |
| EP | 1370062 | A1 | 12/2003 | |
| EP | 1723576 | B1 * | 9/2011 | ......... G06K 7/10732 |
| EP | 3016062 | A1 | 5/2016 | |
| JP | 2010147676 | A | 7/2010 | |
| JP | 2017073696 | A | 4/2017 | |
| WO | 0193267 | A1 | 12/2001 | |
| WO | 2006048368 | | 5/2006 | |
| WO | 2010075363 | | 7/2010 | |
| WO | 2011029845 | A2 | 3/2011 | |
| WO | 2015077493 | A1 | 5/2015 | |
| WO | 2016153936 | | 9/2016 | |
| WO | WO-2016153911 | A1 * | 9/2016 | ........... G06T 1/0028 |
| WO | 2018111786 | | 6/2018 | |
| WO | 2019165364 | | 8/2019 | |
| WO | 2019237045 | A1 | 12/2019 | |

OTHER PUBLICATIONS

Watermarking schemes evaluation (Year: 2000).*

Ulyanov, et al, Improved texture networks: Maximizing quality and diversity in feed-forward stylization and texture synthesis, Proc. 2017 IEEE Conference on Computer Vision and Pattern Recognition, pp. 6924-6932.

Written opinion by IPEA in PCT/US2019/019410 (published as WO2019165364), dated Feb. 11, 2020. (7 pages).

Wu, "Data Hiding in Image and Video: Part—Designs and Applications" (Year: 2003).

Yang, et al, ARTcode: Preserve art and code in any image, Proc. 2016 ACM International Joint Conference on Pervasive and Ubiquitous Computing, pp. 904-915.

Yousaf et al.; Formulation of an Invisible Infrared Printing Ink, Dyes and Pigments, vol. 27, No. 4, 1995, pp. 297-303. (7 pgs.).

Zhu et al., "Unpaired Image to Image Translation using Cycle-Consistent Adversarial Networks", 2017 IEEE International Conference on Computer Vision, Mar. 2017, pp. 2242-2251.

A. Secord, "Weighted Voronoi Stippling," Proc. 2nd Ann. Symp. Non-Photorealistic Animation and Rendering (NPAR 2002), ACM Press, 2002, pp. 27-43.

Ando, et al, Image Recognition Based Digital Watermarking Technology for Item Retrieval in Convenience Stores, NTT Technical Review, vol. 15, No. 8, Aug. 2017. (2 pages).

Aug. 22, 2016 International Search Report and Written Opinion, including search strategy, from PCT/US2016/022836 (published as WO 2016/153911) (23 pages).

Caldelli et al., "Geometric-Invariant Robust Watermarking Through Constellation Matching in the Frequency Domain," IEEE Proc. Int. Conf. on Image Processing, vol. 2, Sep. 2000, pp. 65-68.

Chapter II demand in PCT/US2019/019410 (published as WO2019165364), dated Sep. 23, 2019, including earlier Article 19 amendments. (24 pages).

Cheng, et al., "Colloidal silicon quantum dots: from preparation to the modification of self-assembled monolayers (SAMs) for bio-applications," Chem. Soc. Rev., 2014, 43, 2680-2700. (21 pgs.).

Chu, et al, Halftone QR codes, ACM Transactions on Graphics, vol. 32, No. 6, Nov. 1, 2013, p. 217. (8 pages).

Contrast (vision) article, Wikipedia, 2023.

Davis B, Signal rich art: enabling the vision of ubiquitous computing. In Media Watermarking, Security, and Forensics III Feb. 8, 2011 (vol. 7880, p. 788002). International Society for Optics and Photonics. (11 pages).

European Patent Office Communication pursuant to Article 94(3) EPC for Application No. 16769366.2, which is the regional phase of PCT/US2016/022836 (published as WO 2016/153911), dated May 24, 2019, 7 pages.

European Patent Office Communication pursuant to Article 94(3) EPC issued in App. No. EP21184609, dated Jan. 4, 2023, 6 pages.

Feb. 26, 2018 Response and Claim amendments in European patent application No. 16769366.2, which is the regional phase of PCT/US2016/022836 (published as WO 2016/153911) (8 pages).

Foldiak, "Sparse coding" (Year: 2008).

Gatys, et al, A Neural Algorithm of Artistic Style. arXiv preprint arXiv:1508.06576, Aug. 26, 2015. 16 pages.

Hayes et al., "Generating Steganographic Images Via Adversarial Training", Proceedings of the 31st annual conference on advances in Neural Information Processing Systems, Mar. 2017, pp. 1951-1960, XP055573249.

International Preliminary Report on Patentability for PCT/US2019/036126, dated May 22, 2020. (8 pages).

International Search Report and Written Opinion for Application No. PCT/US19/36126, date of mailing Oct. 9, 2019, 12 pages.

International Search Report and Written Opinion for Application No. PCT/US2018/050677, date of mailing May 10, 2019, 14 pages.

International Search Report and Written Opinion for Application No. PCT/US2019/019410, date of mailing Aug. 12, 2019, 19 pages. (published as WO2019/165364).

International Search Report and Written Opinion in PCT/US2016/22967 dated Jul. 11, 2016. (17 pgs.) (published as WO2016/153936).

Invitation to Pay Additional Fees including Communication Relating to the Results of the Partial International Search in PCT/US2018/064516, mailed Apr. 5, 2019. 17 pages.

J. Collins et al., "Intelligent Material Solutions, Covert Tagging and Serialization Systems", Proc. IS&T's NIP 29 International Conference on Digital Printing Technologies, pp. 153-157 (2013). (5 pgs.).

Japanese Patent Application JP2017022489, with machine translation, Jan. 26, 2017. (51 pages).

Japanese Patent Application JP2017183948, with machine translation, Oct. 5, 2017. (36 pages).

Johnson, et al, "Perceptual losses for real-time style transfer and super-resolution", European Conference on Computer Vision, Oct. 8, 2016, pp. 694-711.

Johnson, excerpts from github web site "Fast-neural-style," Nov. 19, 2017. 19 pages.

JP2010147676A, with machine translation, 2010.

Katayama, et al, New High-speed Frame Detection Method: Side Trace Algorithm (STA) for i-appli on Cellular Phones to Detect Watermarks, Proceedings of the ACM 3rd International Conference on Mobile and Ubiquitous Multimedia, pp. 109-116, 2004.

Ke et al., "Kernel Target Alignment for Feature Kernel Selection in Universal Steganographic Detection based on Multiple Kernel SVM", International Symposium on Instrumentation & Measurement, Sensor Network and Automation, Aug. 2012, pp. 222-227.

Kiyoto et al, Development of a Near-Infrared Reflective Film Using Disk-Shaped Nanoparticles, Fujifilm Research and Development Report No. 58-2013, 2013. (4 pgs.).

Konstantinos A Raftopoulos et al., "Region-Based Watermarking for Images," Mar. 15, 2017, Operations Research, Engineering, and Cyber Security, Springer, pp. 331-343, XP009512871, ISBN: 978-3-319-51498-7.

Lengstrom, excerpts from github web site, "Fast Style Transfer in TensorFlow," Oct. 3, 2017. 24 pages.

Lin, et al., Artistic QR code embellishment. Computer Graphics Forum, Oct. 1, 2013, vol. 32, No. 7, pp. 137-146.

Lin, et al, Efficient QR code beautification with high quality visual content, IEEE Transactions on Multimedia, vol. 17, No. 9, Sep. 2015, pp. 1515-1524.

Liu, et al, Line-based cubism-like image—A new type of art image and its application to lossless data hiding, IEEE Transactions on Information Forensics and Security, vol. 7, No. 5, Oct. 2012, pp. 1448-1458.

Machine Translation of JP2017-073696A, generated Aug. 28, 2018. (54 pages).

(56) References Cited

OTHER PUBLICATIONS

Nakamura, et al, Fast Watermark Detection Scheme for Camera-Equipped Cellular Phone, Proceedings of the ACM 3rd International Conference on Mobile and Ubiquitous Multimedia, pp. 101-108, 2004.
Nikulin, Exploring the neural algorithm of artistic style, arXiv preprint arXiv:1602.07188, Feb. 23, 2016. 15 pages.
Park et al.; Invisible Marker Based Augmented Reality System, SPIE Proc., vol. 5960, 2005, pp. 501-508. (9 pgs.).
Petersen et al., "Upconverting Nanoparticle Security Inks Based on Hansen Solubility Parameters", Proc. IS&T's NIP 29 International Conference on Digital Printing Technologies, pp. 383-385 (2014). (3 pgs.).
Photoshop Elements Help—Patterns, Web Archive, Mar. 13, 2014. 2 pages.
Preston, et al, Enabling hand-crafted visual markers at scale, Proceedings of the 2017 ACM Conference on Designing Interactive Systems, Jun. 10, 2017, pp. 1227-1237.
Puyang, et al, Style Transferring Based Data Hiding for Color Images, International Conference on Cloud Computing and Security, Jun. 8, 2018, pp. 440-449.
R. Steiger et al., "Photochemical Studies on the Lightfastness of Ink-Jet Systems," Proc. IS&T's NIP 14 conference, pp. 114-117 (1998). (4 pgs.).
Raval, excerpts from github web site, Style Transfer Using VGG-16 Model, Mar. 8, 2017. 15 pages.
Reply to written opinion of IPEA in PCT/US2019/019410 (published as WO2019165364), dated Apr. 7, 2020. (17 pages).
Rongen et al., 'Digital Image Watermarking by Salient Point Modification Practical Results,' Proc. SPIE vol. 3657: Security and Watermarking of Multimedia Contents, Jan. 1999, pp. 273-282.
Rosebrock, excerpts from web page Neural Style Transfer with OpenCV, Aug. 27, 2018. 23 pages.
Secord, Weighted Voronoi Stippling, Proceedings of ACM 2nd International Symposium on Non-Photorealistic Animation and Rendering, pp. 37-43, 2002.
Simonyan et al, Very Deep Convolutional Networks for Large-Scale Image Recognition, arXiv preprint 1409.1556v6, Apr. 10, 2015. 14 pages.

* cited by examiner

70

76

78 velit esse cillum dolore eu fugiat
adipiscing elit, sed do eiusmod te
aute irure dolor in reprehenderit i
rum. Lorem ipsum dolor sit amet,
nisi ut aliquip ex ea commodo con
lpa qui officia deserunt mollit anir
m, quis nostrud exercitation ullam
occaecat cupidatat non proident,
dolore magna aliqua. Ut enim ad r
dolore eu fugiat nulla pariatur. E
sed do eiusmod tempor incididun
in reprehenderit in voluptate velit
m dolor sit amet, consectetur adip
ea commodo consequat. Duis au
serunt mollit anim id est laborum.
exercitation ullamco laboris nisi u
atat non proident, sunt in culpa qu
qua. Ut enim ad minim veniam, qu

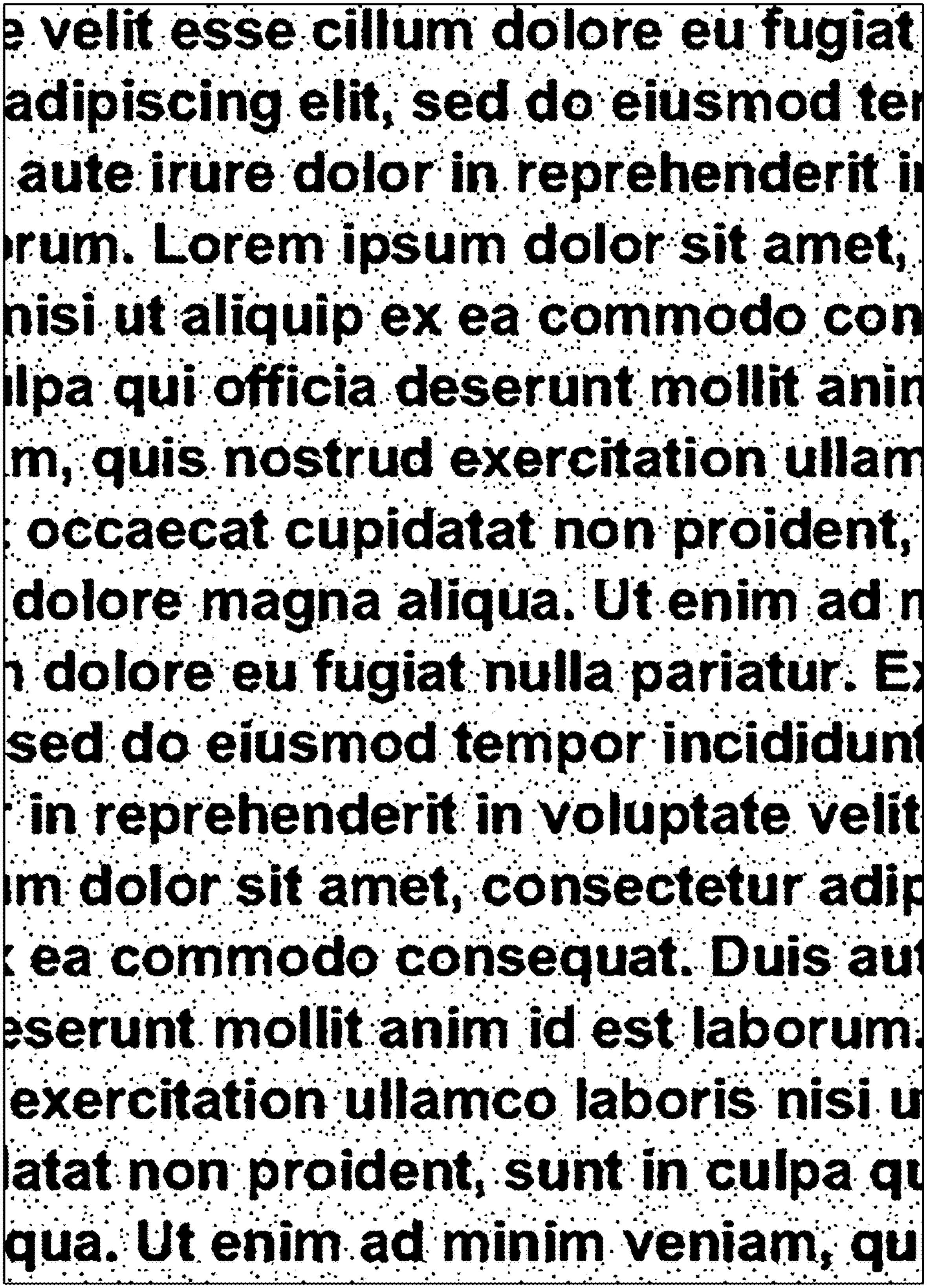

FIG. 25

| 64 | ★ | 32 | 64 | 192 | 255 | 192 | 32 |
| 128 | 64 | 128 | 64 | 64 | 128 | 128 | 192 |
| 64 | 64 | 64 | 128 | 64 | | 192 | 255 |
| 64 | 128 | 64 | 255 | 192 | 32 | 64 | 128 |
| 128 | 192 | 32 | 128 | 64 | 32 | 64 | 64 |
| 192 | 255 | 192 | 128 | ★ | 128 | 255 | 192 |
| 128 | 192 | 128 | 64 | 64 | 128 | 192 | 32 |
| 64 | 64 | 128 | 128 | 128 | 192 | 192 | 255 |

REFERENCE SIGNAL BLOCK, N x N,
MULTI-VALUED ELEMENTS

PAYLOAD SIGNAL BLOCK,
M x M, TWO ELEMENT VALUES

COMBINE BLOCKS AND
SELECT ELEMENTS FOR
MARKING IN AN N x N
SPARSE BLOCK

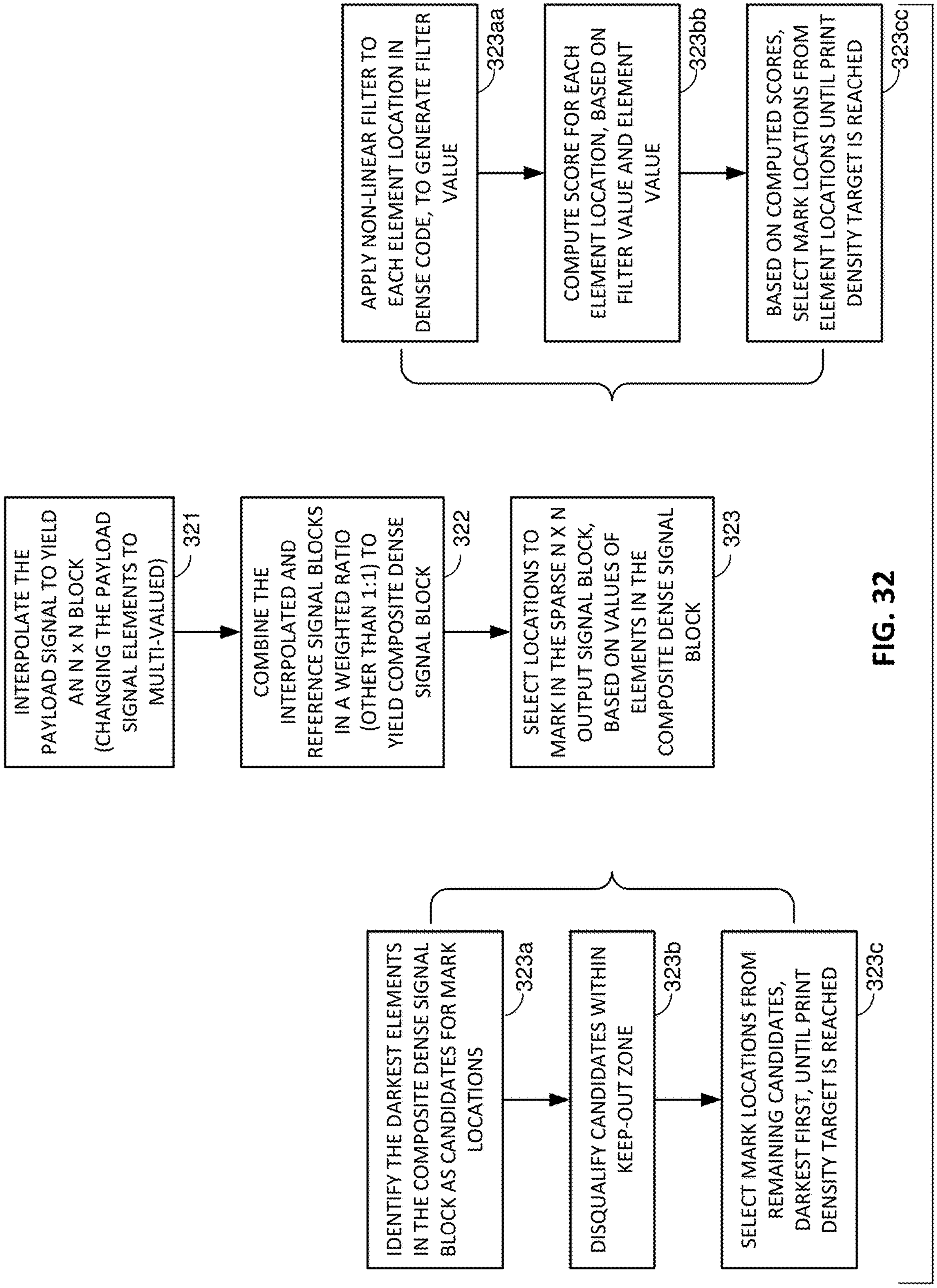

FIG. 32

INTERPOLATE THE PAYLOAD SIGNAL TO YIELD AN N x N BLOCK (CHANGING THE PAYLOAD SIGNAL ELEMENTS TO MULTI-VALUED) — 321

COMBINE THE INTERPOLATED AND REFERENCE SIGNAL BLOCKS IN A WEIGHTED RATIO (OTHER THAN 1:1) TO YIELD COMPOSITE DENSE SIGNAL BLOCK — 322

SELECT LOCATIONS TO MARK IN THE SPARSE N x N OUTPUT SIGNAL BLOCK, BASED ON VALUES OF ELEMENTS IN THE COMPOSITE DENSE SIGNAL BLOCK — 323

APPLY NON-LINEAR FILTER TO EACH ELEMENT LOCATION IN DENSE CODE, TO GENERATE FILTER VALUE — 323aa

COMPUTE SCORE FOR EACH ELEMENT LOCATION, BASED ON FILTER VALUE AND ELEMENT VALUE — 323bb

BASED ON COMPUTED SCORES, SELECT MARK LOCATIONS FROM ELEMENT LOCATIONS UNTIL PRINT DENSITY TARGET IS REACHED — 323cc

IDENTIFY THE DARKEST ELEMENTS IN THE COMPOSITE DENSE SIGNAL BLOCK AS CANDIDATES FOR MARK LOCATIONS — 323a

DISQUALIFY CANDIDATES WITHIN KEEP-OUT ZONE — 323b

SELECT MARK LOCATIONS FROM REMAINING CANDIDATES, DARKEST FIRST, UNTIL PRINT DENSITY TARGET IS REACHED — 323c

OBTAIN DATA DEFINING 2D OPTICAL CODE BLOCK COMPRISED OF PLURAL ELEMENTS, EACH HAVING A LOCATION AND BEING ASSOCIATED WITH ONE BIT OF A PLURAL-BIT PAYLOAD, EACH BIT OF THE PAYLOAD BEING ASSOCIATED WITH PLURAL ELEMENTS OF THE BLOCK
331

SELECT CERTAIN OF THE ELEMENT LOCATIONS FOR FORMING CORRESPONDING MARKS IN A SPARSE OUTPUT SIGNAL BLOCK, SO AS TO REPRESENT EACH OF THE PAYLOAD BITS WITH SUBSTANTIALLY EQUAL STRENGTH IN THE SPARSE OUTPUT SIGNAL BLOCK
332

SELECT A FIRST ELEMENT FROM THE OPTICAL CODE ELEMENT
332a

IDENTIFY A PAYLOAD BIT REPRESENTED BY THE FIRST ELEMENT
332b

FORM A MARK IN A SPARSE OUTPUT SIGNAL BLOCK AT A LOCATION CORRESPONDING TO THE SELECTED FIRST ELEMENT
332c

INCREASE, IN A DATA STRUCTURE, A DATUM INDICATING A STRENGTH WITH WHICH THE PAYLOAD BIT IS EXPRESSED
332d

SELECT A NEXT ELEMENT FROM THE OPTICAL CODE ELEMENT
332e

IDENTIFY A NEXT PAYLOAD BIT REPRESENTED BY THE NEXT ELEMENT
332f

CHECK A DATUM, IN THE DATA STRUCTURE, CORRESPONDING TO THE NEXT PAYLOAD BIT, TO DETERMINE WHETHER INCREASING STRENGTH OF THE NEXT PAYLOAD BIT IN THE SPARSE OUTPUT SIGNAL BLOCK IS PERMITTED
332g

EITHER FORM A MARK IN THE SPARSE OUTPUT SIGNAL BLOCK AT A LOCATION CORRESPONDING TO THE NEXT ELEMENT, OR NOT, DEPENDING ON WHETHER INCREASING STRENGTH OF THE NEXT PAYLOAD BIT IS DETERMINED TO BE PERMITTED OR NOT, AND IF A MARK IS FORMED, INCREASING A DATUM, IN THE DATA STRUCTURE, INDICATING A STRENGTH WITH WHICH THE NEXT PAYLOAD BIT IS EXPRESSED
332h

HAS DESIRED PRINT DENSITY BEEN REACHED?
332i

NO

YES

QUIT

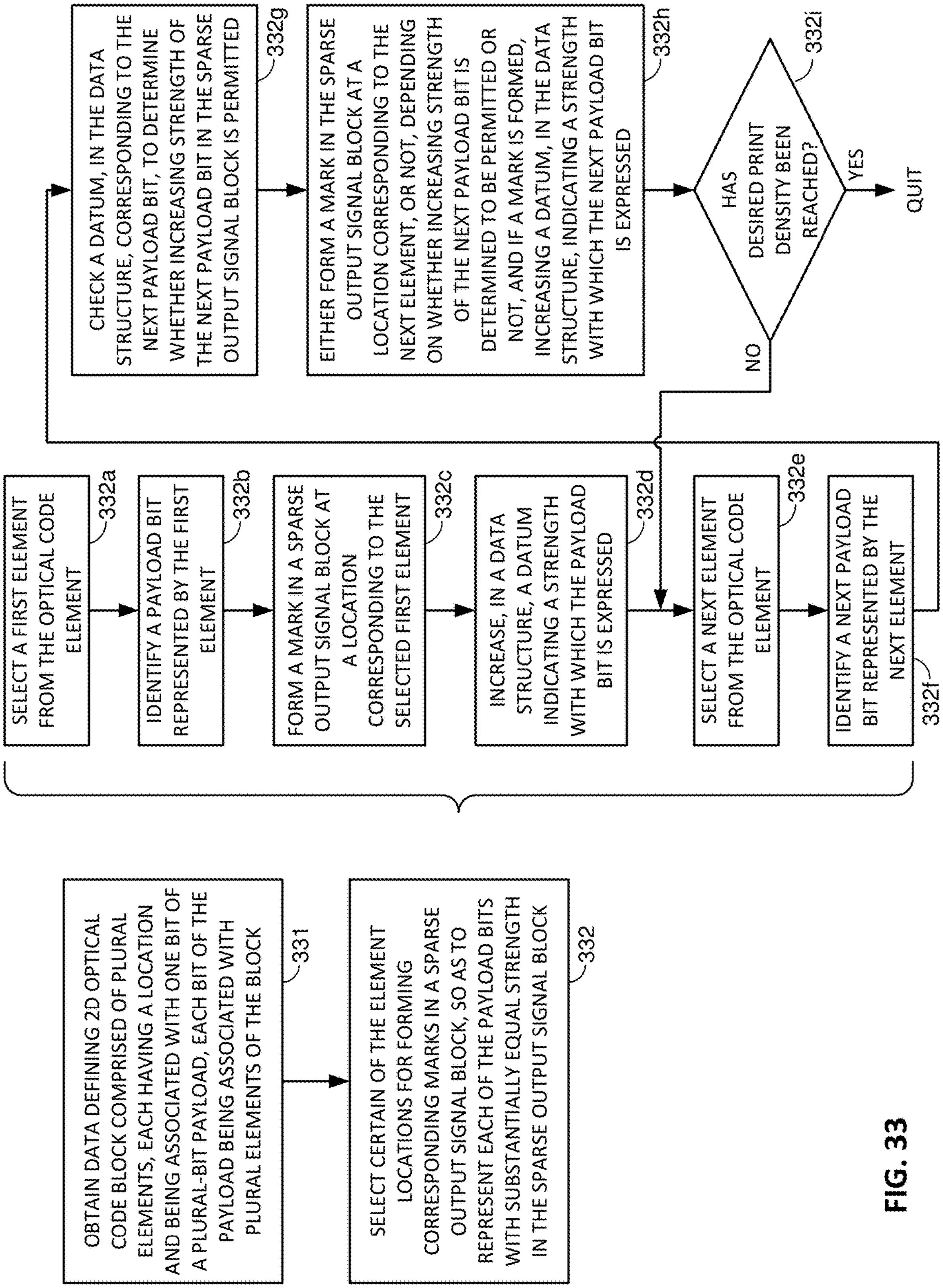

FIG. 33

DEFINE FOUR OR MORE SPATIAL FREQUENCY WAVEFORMS

CONTROL AN AMPLITUDE OF ONE OR MORE WAVEFORMS, SO THEY DON'T ALL HAVE EQUAL AMPLITUDES

COMBINE THE WAVEFORMS TO FORM A SPATIAL DOMAIN PATTERN, DEFINING VALUES AT MORE THAN 1000 SPATIAL POINTS

INCORPORATE THE SPATIAL DOMAIN PATTERN IN A 2D CODE AS A REFERENCE PATTERN, TO ENABLE GEOMETRIC REGISTRATION

```
function logicalSparseTile = GetSparse_V3_Prime(grid,message,wpi,dpi)
    % grid comes in at 'dim' dimension:  e.g. 292 with wpi=89 and dpi=203
    % message comes in at 128x128 after encoding of 1 and -1
    dim = round(dpi*128/wpi);
    waxel_step = dpi/wpi;
    logicalSparseTile = ones(dim);  % create tile as all-white to start

    for y=1:128
        yy=1+(y-1)*waxel_step;
        flyy = floor(yy);
        for x = 1:128
            xx=1+(x-1)*waxel_step;
            flxx=floor(xx);
            if message(y,x)== -1
                buffer = grid( flyy:(flyy+1), flxx:(flxx+1));
                [~,idx] = sort(buffer(:), 'ascend');
                tmpx= flxx + floor(idx(1)/3);
                tmpy = flyy +1 - mod(idx(1),2);
                logicalSparseTile(tmpy,tmpx)=0; % picks the lowest of the nearest four neighbors to place the dot
            end
        end
    end
```

FIG. 46

FIG. 50A
FIG. 50B

KEEP-OUT = 1.2 PIXELS

KEEP-OUT = 1.5 PIXELS

KEEP-OUT = 1.8 PIXELS

KEEP-OUT = 2.2 PIXELS

KEEP-OUT = 2.4 PIXELS

MAJOR AXIS = 1.9 PIXELS

MAJOR AXIS = 2.2 PIXELS

= “0”

= “1”

= “0”

= “1”

GENERATE LIST OF DARKEST WAXEL LOCATIONS IN REFERENCE SIGNAL TILE

RECEIVE N BITS OF PAYLOAD DATA

CONVERT TO M BITS OF MESSAGE DATA, WHERE M > N

FOR EACH OF M DARK WAXELS, DETERMINE DARKEST ADJOINING WAXEL, TO ESTABLISH M PAIRS OF ADJOINING DARK WAXELS

ASSIGN EACH BIT OF M-BIT MESSAGE DATA TO A WAXEL PAIR

COMPOSE TILE OF OUTPUT CODE BY DARKENING FIRST WAXEL LOCATION OF EACH PAIR IF PAIR'S ASSIGNED MESSAGE BIT IS "1," ELSE DARKEN SECOND WAXEL LOCATION

OPTIONAL: DARKEN ADDITIONAL WAXEL LOCATIONS FROM LIST TO REINFORCE REFERENCE SIGNAL

TILE OUTPUT CODE ACROSS BLANK AREAS OF LABEL, AND PRINT

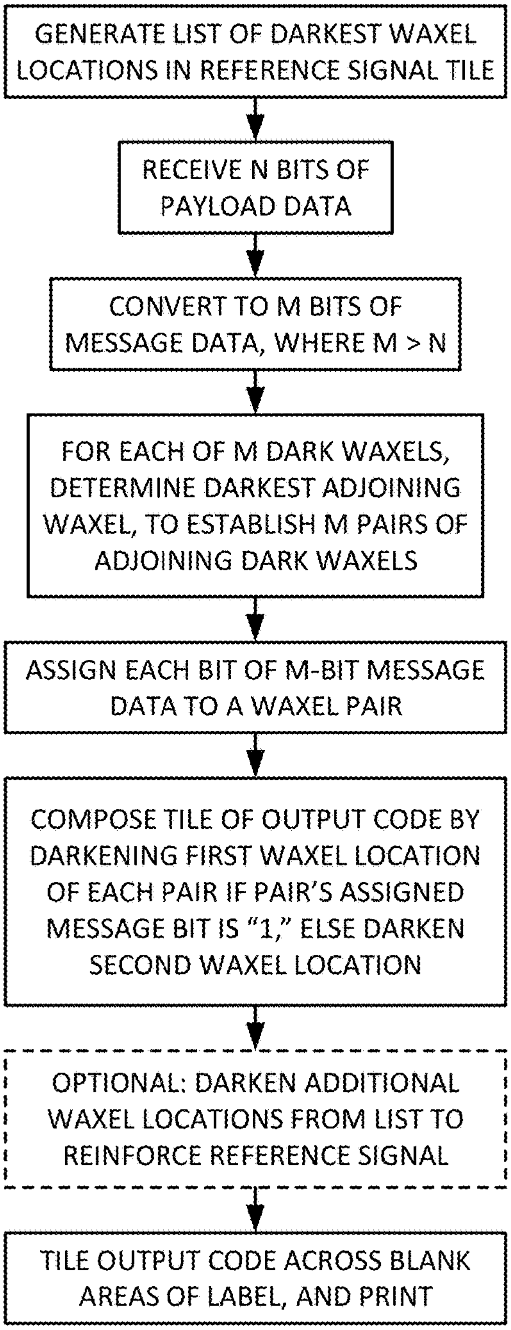

FIG. 71A

CAPTURE IMAGE OF CODE ON PRINTED LABEL , AND PRODUCE IMAGE DATA

GEOMETRICALLY REGISTER IMAGE DATA BASED ON REFERENCE SIGNAL

IN REGISTERED IMAGE DATA, DETERMINE LOCATIONS OF M PAIRS OF DARK WAXELS, E.G., BASED ON STORED LIST

DETERMINE ASSIGNMENTS OF MESSAGE BIT POSITIONS TO WAXEL PAIRS, E.G., BASED ON STORED LIST

AT EACH DETERMINED LOCATION IN REGISTERED IMAGE DATA, DETERMINE WHETHER FIRST OR SECOND WAXEL IS DARK, AND ASSIGN "1" OR "0" TO ASSIGNED MESSAGE BIT POSITION BASED ON DETERMINATION, TO THEREBY ASSEMBLE M-BIT MESSAGE

OPTIONAL: DETERMINE CONFIDENCE OF EACH BIT IN ASSEMBLED MESSAGE

PROVIDE ASSEMBLED MESSAGE BITS TO DECODER (OPTIONAL: WITH CONFIDENCE VALUES, TO SOFT VITERBI DECODER), TO RECOVER N-BIT PAYLOAD

OUTPUT RECOVERED N-BIT PAYLOAD, E.G., TO RETAIL POINT-OF-SALE TERMINAL

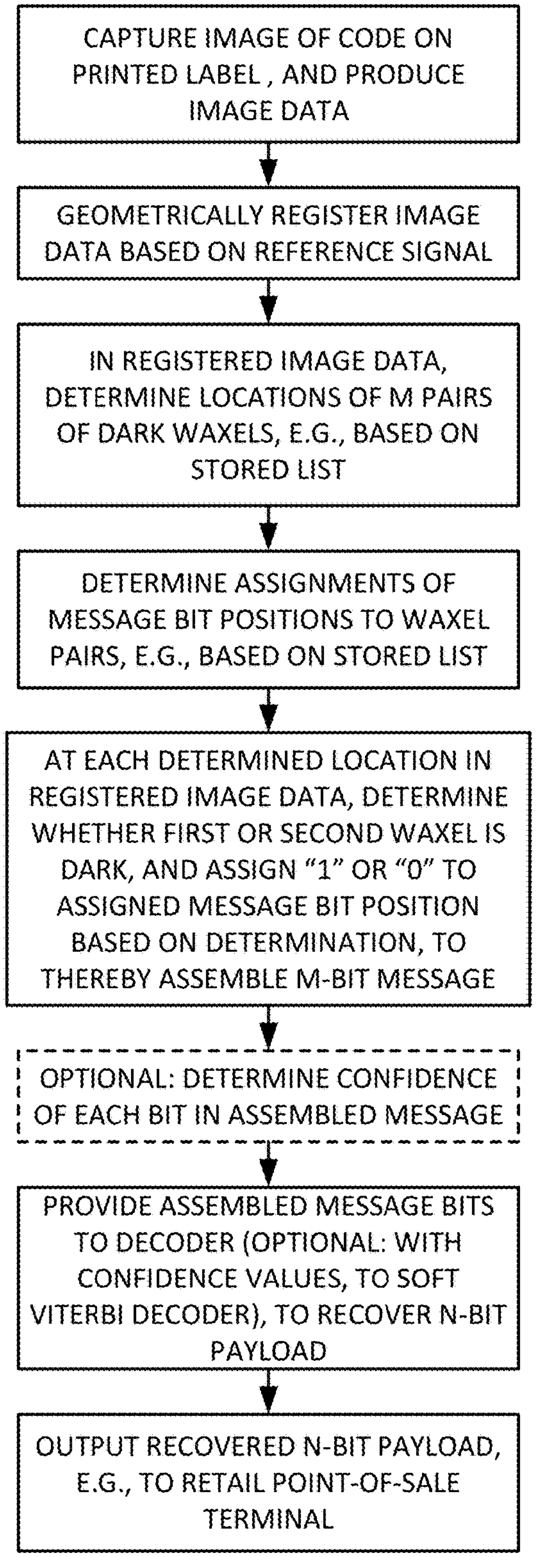

FIG. 71B

| | | | | | | | | | | | | | |
|---|---|---|---|---|---|---|---|---|---|---|---|---|---|
| a | e | i | m | b | f | j | n | c | g | k | o | d | h |
| b | f | j | n | c | g | k | o | d | h | l | a | e | i |
| c | g | k | o | d | h | l | a | e | i | m | b | f | j |
| d | h | l | a | e | i | m | b | f | j | n | c | g | k |
| e | i | m | b | f | j | n | c | g | k | o | d | h | l |
| f | j | n | c | g | k | o | d | h | l | a | e | i | m |
| g | k | o | d | h | l | a | e | i | m | b | f | j | n |
| h | l | a | e | i | m | b | f | j | n | c | g | k | o |
| i | m | b | f | j | n | c | g | k | o | d | h | l | a |
| j | n | c | g | k | o | d | h | l | a | e | i | m | b |
| k | o | d | h | l | a | e | i | m | b | f | j | n | c |
| l | a | e | i | m | b | f | j | n | c | g | k | o | d |
| m | b | f | j | n | c | g | k | o | d | h | l | a | e |
| n | c | g | k | o | d | h | l | a | e | i | m | b | f |
| o | d | h | l | a | e | i | m | b | f | j | n | c | g |
| a | e | i | m | b | f | j | g | c | g | k | o | d | h |

FIG. 84

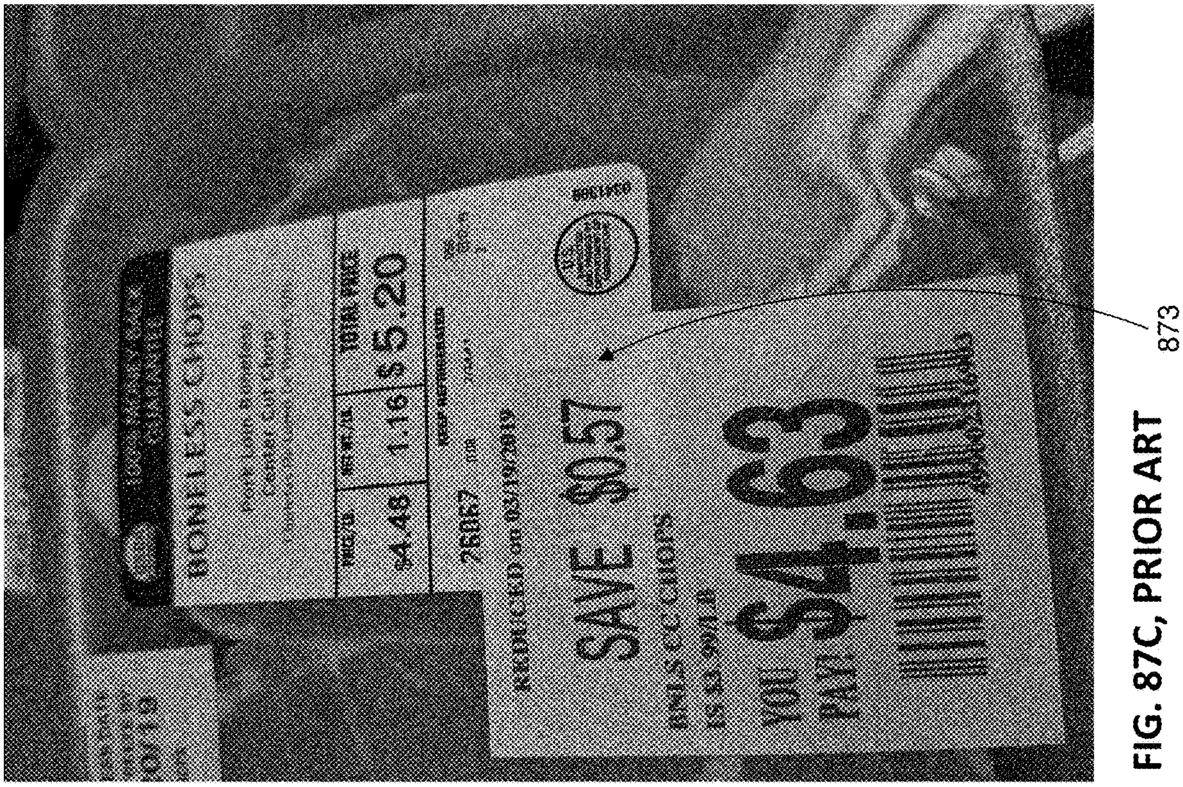
873
FIG. 87C, PRIOR ART
FIG. 87B, PRIOR ART

GENERATING AND READING OPTICAL CODES WITH VARIABLE DENSITY TO ADAPT FOR VISUAL QUALITY AND RELIABILITY

RELATED APPLICATION DATA

This application is a continuation of U.S. patent application Ser. No. 17/372,179, filed Jul. 9, 2021 (U.S. Pat. No. 12,079,684), which is a divisional of application Ser. No. 16/405,621, filed May 7, 2019 (now U.S. Pat. No. 11,062,108), which claims priority to provisional applications 62/834,657, filed Apr. 16, 2019; 62/751,084, filed Oct. 26, 2018; 62/730,958, filed Sep. 13, 2018; 62/673,738, filed May 18, 2018; and 62/670,562, filed May 11, 2018. Application Ser. No. 16/405,621 is also a continuation-in-part of application Ser. No. 16/002,989, filed Jun. 7, 2018 (now U.S. Pat. No. 10,896,307), which claims priority to provisional applications 62/659,641, filed Apr. 18, 2018; 62/634,898, filed Feb. 25, 2018; and 62/582,871, filed Nov. 7, 2017. These patent documents are incorporated herein by reference.

TECHNICAL FIELD

The present technology relates, generally, to image processing to generate machine-readable optical codes for printing (optionally after merging with host image content), complementary robustness measurements for optimizing the optical codes, and optical code readers for reliably and efficiently reading such codes from objects.

In part, this application concerns enhancements and improvements to the sparse signaling technologies detailed in applicant's U.S. Pat. No. 9,635,378 and publication 20170024840, which are incorporated herein by reference.

BACKGROUND AND SUMMARY

Optical codes, such as well-known one and two dimensional barcodes, are ubiquitous and critical in a wide variety of automatic data capture applications. Indeed, barcodes are so widespread, it is now common to see a variety of barcode types on a single object to carry different types of data, or to improve readability by redundantly encoding the same data on different parts of the object.

This growing use of barcodes poses a number of challenges for package and label designs. First, each barcode must occupy a distinct space to ensure that it can be read reliably. This takes up valuable space that could be used for more important information, such as product information and artistic design elements that enhance the value and attractiveness of the object to users. Second, it creates a potential for confusion and complexity in image processing for image-based scanners, which are rapidly replacing laser scanners. While laser scanners can be directed at particular barcodes, one at a time, image based scanners capture image frames that may contain part or all of one or more of the optical codes. Third, in an effort to reduce the visual impact of these codes, they are often reduced in size and confined to difficult to find locations on the objects. This makes them less reliable, and harder for users and machine vision equipment to locate and read reliably.

Other types of optical codes, such as robust digital watermarks, provide alternatives to conventional barcodes that address these challenges in various ways. Digital watermarks may be hidden within other images on the object, and thus not occupy valuable, dedicated space. They also may be redundantly encoded over the object surface to improve the case of locating and reliably reading the digital data codes they carry (referred to as the payload, or message). This simplifies the task of imaging the object to obtain image frames from which the digital watermark payload can reliably be decoded. The watermark technology also improves computational efficiency and reliability of automatic data capture in a variety of usage scenarios. It does so because it facilitates reliable data capture from arbitrary and partial views of the object or label, even if ripped, smudged or crinkled.

While digital watermarks provide these enhancements, there are important applications where there is a need for improved optical data carrying capability that meets aesthetic, robustness, and data capacity requirements.

One challenge is the formation of minimally invasive optical codes for host image areas lacking image content that can mask the optical code or even act as a carrier of it. In these areas, it is possible to generate a subtle tint that carries machine-readable data. Additionally, in some cases, it is possible to select ink colors, or a combination of inks, to reduce visibility of the optical code to humans while retaining reliability for standard visual light scanning. For visual quality reasons, it is generally preferable to generate an optical code at a higher spatial resolution and also space the graphical elements (e.g., dots) of the code at a distance from each other so that they are less noticeable.

However, there are often limits to color selection and resolution that preclude these options. Many objects are printed or marked with technology that does not allow for color selection, and that does not reliably mark dots below a minimum dot size. The use of low resolution thermal printers to print optical codes on small labels, sometimes at high print speeds, is one example. Other examples include commercial printing of small packages that use techniques like dry offset or flexographic printing, which are incapable of rendering with high quality and consistency at high resolution and small dot sizes. Moreover, there are often restrictions based on design and cost constraints of using additional inks. Finally, even if rendering equipment is capable of leveraging higher resolution and smaller dot marking, and various color inks, the image capture infrastructure or mode of image capture may be incapable of capturing higher resolution or color information.

Another persistent challenge is the need to reliably read data from increasingly smaller spatial areas. The demand for increasing data capacity is fundamentally at odds with reliable recovery of that data from a limited area.

As detailed in this specification, we have developed several inventive optical code technologies that address these and other challenges for various applications. One inventive technology is a method for generating an optical code that optimizes parameters for visual quality and robustness (reliability) constraints. These parameters include spatial density, dot placement (e.g., spacing to avoid clumping), dot size and priority of optical code components. In the latter case, the priority of code components, such as reference (aka registration) signal and payload components, is optimized to achieve improved robustness and visual quality.

One aspect of the present technology is a method for generating an optical code. The method optimizes robustness by forming elements of the optical code according to signal priority and spatial constraints, including dot spacing, dot size and dot density. The elements are formed by dots or inverted dots. The dot is a marking surrounding by no or lighter markings, and an inverted dot (hole) is the absence of a mark or lighter marking surrounded by a region of darker marking. To achieve a desired visual quality, the method forms dots (or inverted dots) in order of the priority of the code components, while adhering to the constraints of dot size, dot density and dot spacing.

Another inventive technology is a method of optimizing the parameters based on a training set of test images. This method optimizes the noted parameters by generating and merging optical codes in the test images with varying optical code parameters, measuring robustness for the test images, and finding a combination of parameters that achieve optimal robustness across the test images.

Additional inventive technologies include optical code insertion and decoding methods. The optical code insertion methods merge the optical codes into host image content, such as a package or label design. Certain embodiments of the insertion method take into account and leverage attributes of a host image to improve visual quality and robustness. Embodiments of the decoding methods efficiently and reliably decode the payload from degraded images captured of marked objects.

These inventive methods are implemented in optical code generators, inserters, optimizers and decoder components. These components are implemented in software modules executed by processors of various kinds, such as those used in thermal label printers, pre-press workstations, mobile devices, and image-based barcode scanners of various kinds. The software instructions may also be converted to logic circuitry, such as application specific integrated circuits, programmable gate arrays, or combinations of them.

Additional inventive features will become apparent in the follow detailed description and accompanying drawings.

BRIEF DESCRIPTION OF THE DRAWINGS

FIG. 25 is yet another example in which tiles of the optical code have been merged with text.

FIGS. 29, 30, 31, 32, 33 and 33*a* are flow charts illustrating aspects of the technology.

FIG. 46 shows Matlab code related to the embodiments of FIGS. 43, 44A and 44B.

FIGS. 50A and 50B show excerpts of an image rendered with sparse signals of different bump sizes.

FIGS. 71A and 71B illustrate exemplary methods for producing, and reading, a label with an optical code.

FIG. 84 illustrates tiled toroidal patterns expressing a 15 symbol sequence.

FIGS. 87A, 87B and 87C illustrate prior art approaches to relabeling an item to mark down the item price.

DETAILED DESCRIPTION

Due to the range and variety of subject matter detailed in this disclosure, an orderly presentation is difficult to achieve. As will be evident, many of the topical sections presented below are both founded on, and foundational to, other sections. Necessarily, then, the various sections are presented in a somewhat arbitrary order. It should be recognized that both the general principles and the particular details from each section find application in other sections as well. To prevent the length of this disclosure from expanding still further, the various permutations and combinations of the features of the different sections are not exhaustively detailed. Applicant intends to explicitly teach such combinations/permutations, but practicality requires that the detailed synthesis be left to those who ultimately implement systems in accordance with such teachings.

It should also be noted that the presently-detailed technology builds on, and extends, technology disclosed in patent documents cited herein. The reader is thus directed to those documents, which detail arrangements in which applicant intends the present technology to be applied, and that technically supplement the present disclosure.

This specification details embodiments of the technology with reference to flow diagrams and narrative descriptions. The diagrams and descriptions are implemented with processing modules that are most commonly realized by software instructions for configuring programmable hardware devices. In some embodiments, such software instructions are converted to firmware for integration into printers and scanners, or converted into digital logic circuitry.

Figure 1:
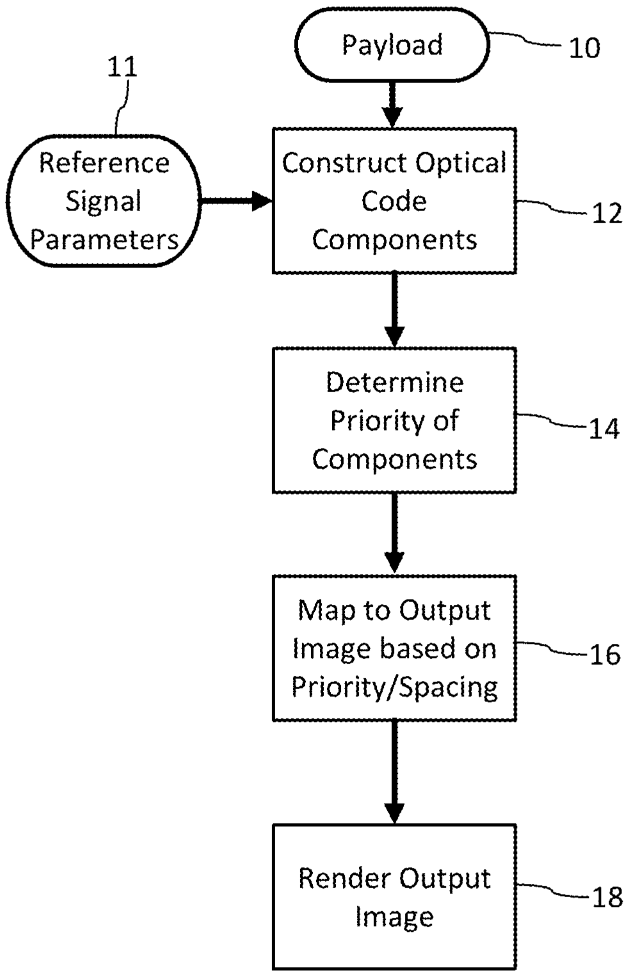
FIG. 1 is a diagram of a method of generating an optical code with variable spatial density to adapt for visual quality and reliability constraints.

FIG. 1 is a diagram of a method of generating an optical code with variable spatial density to adapt the code for visual quality and reliability constraints. An objective is to generate an optical code for insertion into an image or other carrier such that the parameters of the optical code are optimized. These parameters include robustness and visual quality. The method achieves improved robustness by determining a priority of optical message components that attains or surpasses robustness metrics while also providing desired spatial density and spacing of optical code elements. The density and spacing (to avoid dot clumping) constraints enable the method to optimize the optical code reliability while satisfying visual quality constraints.

The method begins with inputs of a variable payload sequence 10 and reference (registration) signal parameters 11. From these inputs, the method constructs components of the optical code (12). These components are comprised of payload and reference signal components. As detailed further below, these components are not necessarily distinct, yet need to be optimized to provide the robustness, signal capacity and visual quality per unit area in which they are applied to rendered output. This rendered output is an object marked with the optical code, such as by printing an image carrying the code ("output image"), including marking the output image onto a substrate by other means such as etching, engraving, burning, embossing, etc.

The method determines the priority to be applied to the components (14). This priority is derived by determining the parameters of the optical code that optimize robustness within constraints, such as dot size, spatial density and spacing of elements (e.g., dots or holes).

With the priorities, the method proceeds to map the optical code into an output image within the visual quality constraints (16). The output image is then rendered to a physical form, such as a paper or plastic substrate of a packaging or label material (18).

Figure 2:
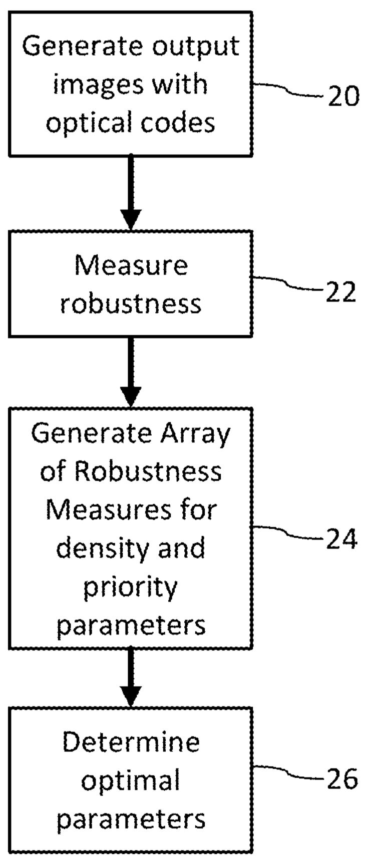
FIG. 2 is a diagram of a method for optimizing parameters of an optical code.

FIG. 2 is a diagram of a method for optimizing parameters of an optical code. This method optimizes the dot density, dot spacing and relative priority of optical code components. To optimize the optical code for a particular application, the method operates on a set of test images that are representative of the types of images of that application. For example, for optical codes used on labels, such as those typically printed by thermal printers for adhering to fresh food items (bakery items, meats and deli items, prepared foods, etc.), the test images are a set of label images. These label images are comprised of visual elements such as text, graphics, and conventional 1 or 2 dimensional barcodes. The test images are comprised of a mix of text, graphics and conventional, visible barcodes that are expected to be found on most of the label images in normal use.

Likewise, for packaging, the test images are a set of images that conform to a product manufacturer's style guides and are comprised of text in particular fonts, sizes and spacing, images, logos, color schema (including inks and spot colors), substrate types, including metal, plastic and paper based packaging materials, and preferred print technologies (offset, dry offset, digital offset, ink jet, thermal, flexographic, and gravure). In this case, the test images may be a set of training images of a particular package design, which simulate various forms of degradation incurred in the image due to rendering, use and scanning.

For each of the test images, the method generates an output image with an inserted optical code (20). The optical code is constructed from the payload and reference signal components using techniques detailed further below. The output of constructing a code for a test image is the test image bearing an array of optical code elements at spatial locations. For ease of description, we refer to these elements as "dots," and the particular geometric structure of a dot may take various shapes. The form of the image is binary in that its pixels correspond to a binary value, mark or no mark signal. For printing with inks, mark or no mark refers to ink or no ink at the pixel location for a particular color separation (e.g., process color CMY or K, or spot color). The pixels of the output image may correspond to test image elements, optical code elements or a mix of both. However, in some implementations, it is preferred to maintain a spacing of optical code elements at a minimum distance from image elements (including text) on the label, or to otherwise specify locations at which elements are not to appear.

For each output image, a set of parameters is selected by sampling each parameter value from an allowable range of values for that parameter. In one implementation, the parameters are dot density of the optical code, minimum inter-spacing of optical code elements, and priority of optical code components. In one implementation, the priority value is applied as a relative priority of optical code elements, namely a relative weighting of reference and encoded digital payload components.

After generating an output image, the method measures the robustness of the optical code in the output image (22). The robustness is measured by a robustness prediction program that computes detection metrics from the output image, simulating degradation due to rendering, use and scanning. These detection metrics are computed using the techniques detailed in U.S. Pat. No. 9,690,967, which is incorporated by reference. See also published patent application No. 20180352111 and U.S. Pat. No. 10,217,182, the disclosures of which are also incorporated herein by reference.

The detection metrics include a metric that measures the reference signal of the optical code, and a metric from the digital payload (e.g., correspondence with an expected payload). The optical code is repeated in contiguous tiles of the output image. Additionally, there is spatial redundancy within a tile. Thus, the detection metrics may be computed per unit area, where the unit of area ranges from the smallest area from which the code may be detected to the area of a few contiguous tiles in horizontal and vertical dimensions.

The process of measuring robustness preferably takes into account the expected degradation of the optical code in its rendering, use and scanning. To do so, the degradation is simulated on the output image prior to measuring robustness. The scanning mode is also simulated, as the optical code may be read by a swiping motion, or by a presentment mode. In the presentment mode, the object is expected to be presented to an imager, such that the imager and object are substantially static. The mode of scanning has implications on the robustness of the optical code. One implication of swiping is that the scanning may introduce blur. Another is that the optical code may be read from plural tiles in the path of the swipe. An implication of presentment mode is that the imager may only capture a portion of the object, e.g., part of one side. Thus, the reliability at several different potential object views needs to be considered in the overall robustness score. In the case of a swipe mode, the robustness measure may be summed from detection metrics along one or more paths of a swipe scan.

The processes of generating optical codes and measuring robustness is executed for each test image and for each parameter being optimized (e.g., minimal optical code element spacing at an optical code density for a tile, and optical code component priority). The method then generates an array of robustness measurements, with a robustness measure per parameter space sampling (24). The parameter space refers to a multi-dimensional space in which the coordinates are parameter candidates, e.g., priority value, dot spacing, dot size, dot density, or some sub-combinations of these candidates.

Next the method determines the optimal parameters from the robustness measurements. To do so, the method analyzes the array of robustness measurements in the parameter space to find the region in the parameter space where the robustness measurements exceed a desired robustness constraint (26). This region defines the set of parameters for the optical code element spacing and priority that are expected to provide the desired robustness. In one approach, the method finds the location in the parameter space that minimizes the distance to a maxima in robustness score for each test image.

Having described the process of optimizing parameters for an optical code, we now describe embodiments of optical codes with variable density that are useful for integrating the codes on labels or packaging with text and graphics.

Figure 3:
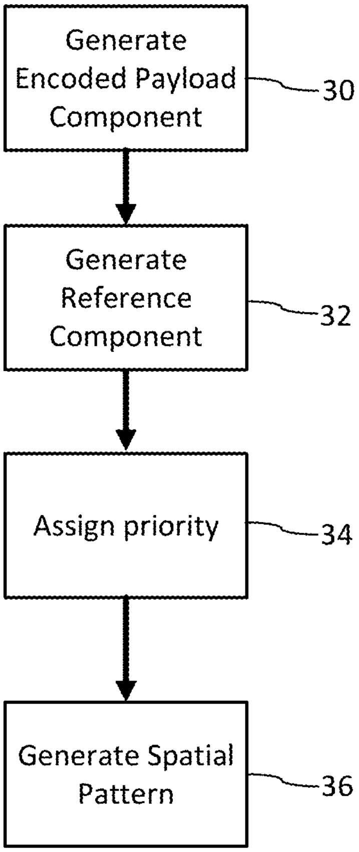
FIG. 3 is a diagram illustrating a process for constructing an optical code.

FIG. 3 illustrates a process for constructing an optical code. This is an embodiment of an optical code generator. In this embodiment, separate variable payload and reference signal components are generated and then combined. The payload is a sequence of data symbols, which each represent two or more (binary or M-ary) message symbol values. The integer value, M, in the term, M-ary, is the number of possible symbol values per symbol element. For example, in the case of M=3, the symbol values have one of three states, such as 1, 0 and −1, or correspond to signal feature values of three different quantization bins. The latter refers to a modulation scheme where a feature value of the host image is quantized to one of the quantization bins corresponding to the symbol value. To make the payload more robust, it is encoded redundantly using a combination of error correction, error detection, repetition and carrier signals. The processing in block 30 transforms the payload into a robust encoded payload component in which symbols of the payload are conveyed in plural elements of the encoded payload component. These elements form a payload signal waveform with a spatial arrangement and amplitude.

The reference signal component is a signal used to detect the optical code within the output image and perform geometric synchronization. The processing in block 32 generates the reference signal component by specifying its signal waveform properties, such its spatial arrangement and amplitude. An example of this type of optical code, with encoded payload and reference signal, is described in U.S. Pat. No. 6,590,996, which is incorporated by reference.

An exemplary reference signal is composed of several dozen spatial sinusoids that each spans a 2D spatial block with between 1 and 64 cycles (light-dark alterations) in horizontal and vertical directions, typically with different phases. Integer frequencies assure that the composite signal is continuous at edges of the block. The continuous signal is sampled at uniformly-spaced 2D points to obtain, e.g., a 64×64 or 128×128 reference signal. (A particular reference signal, including frequencies and phases of its component sinusoids, is detailed in patent application 62/611,404, filed Dec. 28, 2017, the disclosure of which is incorporated herein by reference.)

In block 34, the embodiment assigns a priority to elements of the encoded payload and reference signal components. This is implemented by applying a weighting to the elements according to the assigned priority. For example, the method multiplies amplitude values of signal elements by a weighting factor proportional to the priority of the optical code component of those elements.

The embodiment of FIG. 3 then constructs the optical code into a two-dimensional spatial image representation in block 36.

Figure 4:
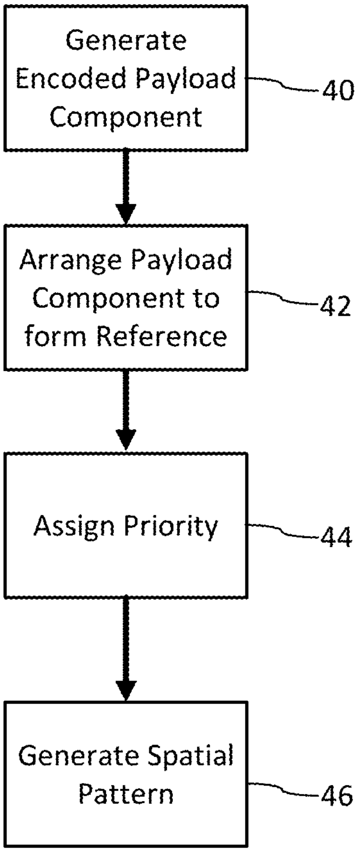
FIG. 4 is a diagram illustrating another process for constructing an optical code.

FIG. 4 illustrates another process for constructing an optical code. This is a variant of FIG. 3 in which the reference signal component is formed in the arrangement of encoded payload component. In block 40, this embodiment generates an encoded payload component. This approach may use similar error correction coding and modulating onto a carrier signal as the embodiment of FIG. 3. Then, in block 42, this embodiment arranges the encoded payload elements into a pattern that forms a reference signal component. An example of this approach is described in U.S. Pat. No. 9,747,656, which is incorporated by reference. In a variant of this approach, encoded payload elements are spatially interleaved with fixed reference signal elements. The fixed elements form a pattern of the reference signal component.

To assign priority to the components in block 44, the embodiment weights signal elements of the encoded payload and fixed elements. This approach produces a spatial pattern of weighted elements, arranged so as to form a reference signal (46).

Figure 5:
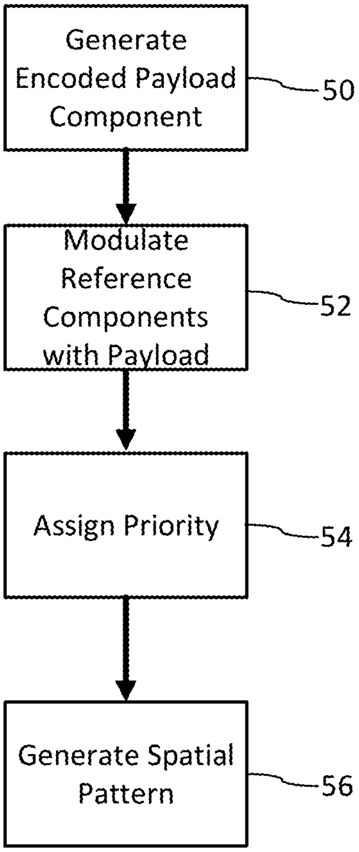
FIG. 5 is a diagram illustrating another process for constructing an optical code.

FIG. 5 is a diagram illustrating another process for constructing an optical code. This is another variant of FIG. 3 in which the reference signal component serves as a carrier for encoded payload signal elements. In block 50, this embodiment generates an encoded payload component. For example, the sequence of payload components is error correction-encoded by converting the sequence of payload symbols into a longer sequence of encoded symbols using error correcting codes such as block and/or convolution error correcting codes. Some examples of block codes include, e.g., Bose-Chaudhuri-Hocquenghem (BCH), and Reed-Solomon codes.

In block 52, the embodiment modulates components of a reference signal with elements of the encoded payload signal. In one implementation, the reference signal comprises a collection of spatial sine waves, each with a phase value. The payload is encoded by shifting the phase of a sine wave according to the value of an encoded payload signal element. In one protocol, the encoded payload elements are binary, meaning that they have one of two different values per element. One binary value is represented with zero phase shift and the other by a phase shift of $\pi$ (180 degrees) of the corresponding sine wave. In other protocol variants, the encoded payload signal is M-ary, with $M>2$. The value of M is limited by robustness constraints, as the higher it is, the more difficult it is to distinguish among different symbol values encoded in an image feature. The encoded payload is modulated onto the reference signal carrier component by shifting the phase into one of M corresponding phase shift states (e.g., 0, $\pi/2$, $\pi$, or $3\pi/2$ radians). This may be implemented as form of quantization-based modulation, where the phase of the reference signal component is quantized to fall within the phase shift bin corresponding to the encoded payload symbol.

Not all components of the reference signal need to be modulated with payload signal. Instead, some subset of the reference signal may remain un-modulated, and this un-modulated component serves as a reliable signal for a first stage of detection. For example, the reference signal may be comprised of 200 sine waves, with a subset (e.g., 40-60) remaining fixed, and the others available for modulation by a corresponding payload signal element.

Another approach to modulating a reference signal is on-off keying of reference signal components. In this approach, a subset of reference signal sine waves are fixed, and the remainder are modulated to convey data using on-off keying. In this on-off keying, encoded payload symbols are encoded by including, or not, a sine wave at predetermined frequency location. Each encoded payload element is mapped to a frequency location within an image tile. Where the payload element is a first binary value (e.g., 0 or −1), the sine wave for that element is not included. Conversely, where the payload element has a second binary value (e.g., 1), the sine wave for that element is included.

In block 54, the embodiment assigns priority to the optical signal components. This is implemented for example, by applying a scale factor to selected sine wave components according to priority. Higher priority signal components are given greater weight by multiplying by a larger scale factor. Additionally, different scale factors may be applied to the fixed vs. modulated reference signal components to provide a greater relative priority to parts of the reference signal that are modulated or fixed.

In block 56, the embodiment generates a spatial pattern of the optical code with its modulated reference signal components. In the case of the sine wave embodiment, there are alternative methods to generate the spatial pattern. One alternative is to apply an inverse frequency domain transform on the complex components in the frequency domain, such as an inverse Fast Fourier Transform (FFT). Another alternative starts with spatial domain waveforms of each sine wave component, and adds them together to form the spatial pattern. As an alternative to sine waves, other carrier signals, such as orthogonal arrays, which have good auto-correlation but low cross correlation, may be used. These orthogonal arrays map to locations in a two-dimensional image tile.

The output of each of the optical code generators in FIGS. 3-5 is a spatial domain image block. The pixel values of the block are multi-valued, e.g., eight bits per pixel. This image block may be used as signal tile, which is repeated and merged with host image content of a host image to form an output image. The output image is a label or package design, which is rendered onto a substrate by a printer or other marking equipment (embosser, engraver, etcher, or the like). The signal components are prioritized according to the assigned priority. This priority enables the optical code to be filled into spatial areas of the host image design according to a signal priority and dot density and spacing that optimizes robustness and visual quality constraints.

(For the avoidance of doubt, "multi-valued" as used in this document refers to elements/pixels that have more than two possible states. For example, they may be greyscale elements (e.g., an 8-bit representation), or they may have floating point values.)

We now detail sub-components of the optical code generators of FIGS. 3-5.

Figure 6:
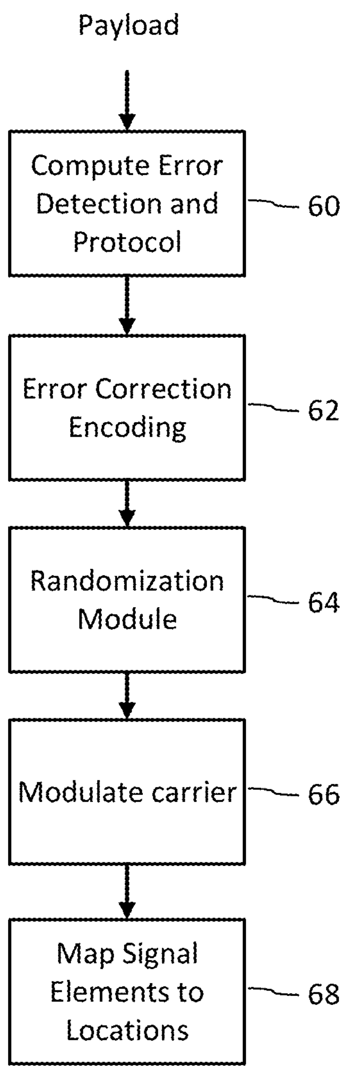
FIG. 6 is a diagram illustrating a method of encoding a variable digital payload to be conveyed in an optical code.

FIG. 6 is a diagram illustrating a method of encoding a variable digital payload to be conveyed in an optical code. This section explains additional examples of how to generate encoded payload components in the embodiments discussed previously.

In processing module 60, the data payload is processed to compute error detection bits, e.g., such as a Cyclic Redundancy Check, Parity, check sum or like error detection message symbols. Additional fixed and variable messages used in identifying the payload format and facilitating detection, such as synchronization signals may be added at this stage or subsequent stages.

Error correction encoding module 62 transforms the message symbols into an array of encoded message elements (e.g., binary or M-ary elements) from which the message symbols can be recovered despite certain transmission errors. Various techniques can be used. In an exemplary embodiment, a string of message elements is first applied to a forward error correction encoder, such as one using block codes, BCH, Reed Solomon, convolutional codes, turbo codes, etc. The output is then applied to a repetition encoder, which repeats data to improve robustness. (In some embodiments, repetition encoding is removed and replaced entirely with error correction coding. For example, rather than applying convolutional encoding (e.g., at 1/3 rate) followed by repetition (e.g., repeat three times), these two can be replaced by convolution encoding to produce a coded payload with approximately the same length.) The output of the module 62 may be termed a "signature."

The signature may be further randomized by a randomization module 64. One particular randomization module performs an XOR operation between each element of the signature, and a corresponding element of a "scrambling key."

Next, carrier modulation module 66 takes message elements of the previous stage and modulates them onto corresponding carrier signals. For example, a carrier might be an array of pseudorandom signal elements, with equal number of positive and negative elements (e.g., 16, 32, 64 elements), or other waveform, such as sine wave or orthogonal array. In the case of positive and negative elements, the payload signal is a form of binary antipodal signal. It also may be formed into a ternary (of 3 levels, −1, 0, 1) or M-ary signal (of M levels). These carrier signals may be mapped to spatial domain locations or spatial frequency domain locations. Another example of carrier signals are the above-described sine waves, which are modulated using a modulation scheme like phase shifting, phase quantization, and/or on/off keying.

A particular carrier modulation module 66 XORs each bit of a scrambled signature with a string of 16 binary elements (a "spreading key"), yielding 16 "chips" having "0" and "1" values. If the error correction encoding module 62 yields a signature of 1024 bits (which are then randomized by randomization module 64), then the carrier modulation module 66 produces 16,384 output chips.

The carrier signal (spreading key) provides additional robustness, as it spreads the encoded message symbol over the carrier. As such, the use of longer carrier signals reduces the redundancy needed in error correction and/or the need for repetition code. Thus, the error correction codes (including repetition codes) and carrier signals may be used in various combinations to produce an encoded payload signal for a tile that achieves the desired robustness and signal carrying capacity per tile.

Mapping module 68 maps signal elements of the encoded payload signal to locations within an image block. These may be spatial locations within an image tile. They may also be spatial frequency locations. In this case, the signal elements are used to modulate frequency domain values (such as magnitude or phase). The resulting frequency domain values are inverse transformed into the spatial domain to create a spatial domain signal tile.

An illustrative mapping module 68 includes a scatter table data structure that identifies, for each of the 16,384 output chips referenced above, particular x- and y-coordinate locations—within a 128×128 message signal tile—to which that chip should be mapped. In such arrangement, each chip can serve to increase or decrease the luminance or chrominance at its location in the image, depending on its value.

Mapping module 68 can also map a reference signal to locations in the image block. These locations may overlap, or not, the locations to which the payload data are mapped. The encoded payload and reference signals are signal components. These components are weighted and together form an optical code signal.

To accurately recover the payload, an optical code reader must be able to extract estimates of the encoded data payload signal elements (e.g., chips) at their locations within an image. This requires the reader to synchronize the image under analysis to determine the tile locations, and data element locations within the tiles. The locations are arranged in two dimensional blocks forming each tile. The synchronizer determines rotation, scale and translation (origin) of each tile.

The optical code signal can include an explicit and/or implicit reference (registration) signal. An explicit reference signal is a signal component separate from the encoded payload that is included with the encoded payload, e.g., within the same tile. An implicit reference signal is a signal formed with the encoded payload, giving it structure that facilitates geometric synchronization. Because of its role in geometric synchronization, we sometimes refer to the reference signal as a synchronization, calibration, grid, or registration signal. These are synonyms. Examples of explicit and implicit synchronization signals are provided in our U.S. Pat. Nos. 6,614,914, and 5,862,260, which are incorporated herein by reference.

In particular, one example of an explicit synchronization signal is a signal comprised of a set of sine waves, with pseudo-random phase, which appear as peaks in the Fourier domain of the suspect signal. See, e.g., U.S. Pat. Nos. 6,590,996 and 6,614,914, and 5,862,260, which describe use of a synchronization signal in conjunction with a robust data signal. Also see U.S. Pat. No. 7,986,807, which is incorporated by reference.

Our US Publications 20120078989 and 20170193628, which are also incorporated by reference, provide additional methods for detecting a reference signal with this type of structure, and determining rotation, scale and translation. US20170193628 provides additional teaching of synchronizing an optical code reader and extracting a digital payload with detection filters, even where there is perspective distortion.

Examples of implicit synchronization signals, and their use, are provided in U.S. Pat. Nos. 6,614,914, 5,862,260, 6,625,297, 7,072,490, and 9,747,656, which are incorporated by reference.

(In other embodiments, synchronization is achieved with structures distinct from the tile, such as visible graticules.)

Figure 7:
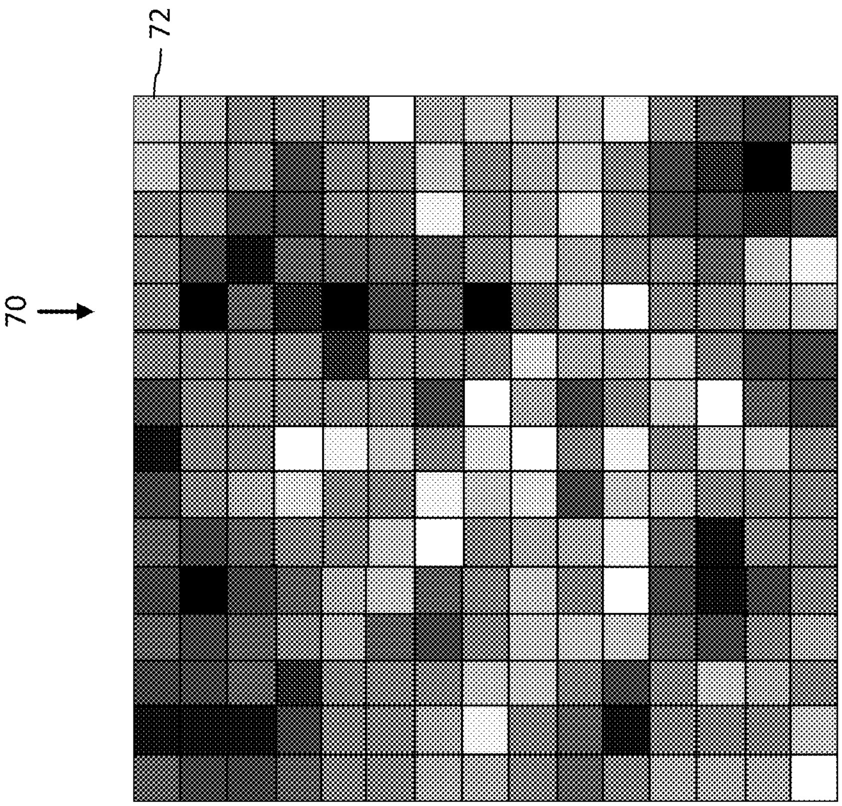
FIG. 7 is a diagram illustrating a tile of an optical code component. This may be used as a reference signal component, an encoded payload component, or a reference signal encoded with a payload. It may also be used as an encoded payload signal that is arranged into a reference signal structure.

FIG. 7 is a diagram illustrating part 70 of an image tile of an optical code component. This part is comprised of an array of pixels (e.g., 72), each having a value, depicted here as a gray scale value. This part of a tile has 15 by 15 pixels. We provide additional examples of tile size and dimensions used for optical codes below.

This component may be used as a reference signal component, an encoded payload component, or a reference signal encoded with a payload. It may also be used as an encoded payload signal that is arranged into a reference signal structure.

For the sake of illustration, we provide an example in which this part 70 is a reference signal component. Through this example, illustrated in the ensuing diagrams, we explain how reference and payload components are formed, prioritized, and combined to form a dense optical code signal tile. We refer to this state of the optical code as "dense," as the intent is to use it to produce a transformed version at a variable spatial density, which is more sparse (a sparse code signal at a desired dot density). To achieve the desired dot density, this dense optical code signal tile is then mapped into a spatial pattern based on priority of the code signal elements. In this example, the reference signal comprises sine waves which are converted to a spatial domain image, as depicted in FIG. 7. These sine waves form peaks in the spatial frequency domain. A similar effect may be achieved by using a spatial pattern of fixed or encoded payload elements with redundancy that also forms peaks in the spatial frequency domain.

Figure 8:
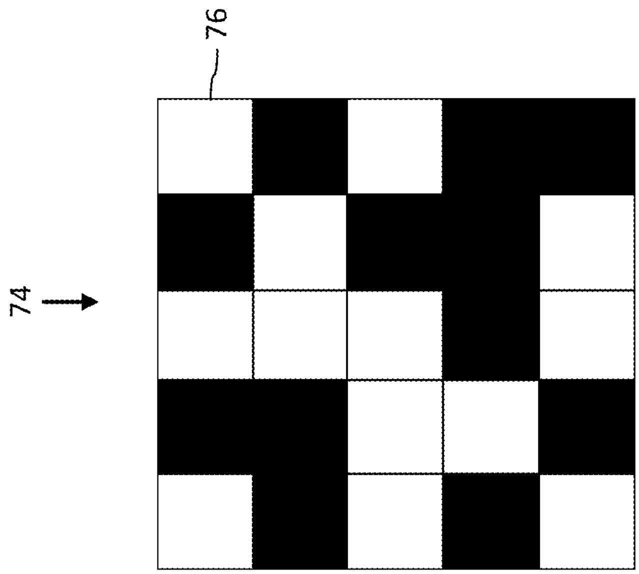
FIG. 8 is a diagram of a tile of an encoded payload signal.

FIG. 8 is a diagram illustrating part 74 of a tile of an encoded payload signal. This part 74 is an array of pixels (76) in which the pixel values are binary, either black or white. These values correspond to the encoded payload signal conveyed by modulating each of the binary values of an error correction coded payload onto a carrier (e.g., a PN sequence), and mapping the resulting modulated carrier signal elements to pixel locations. The result is an encoded payload signal, a part of which is depicted in FIG. 8.

Figure 9:
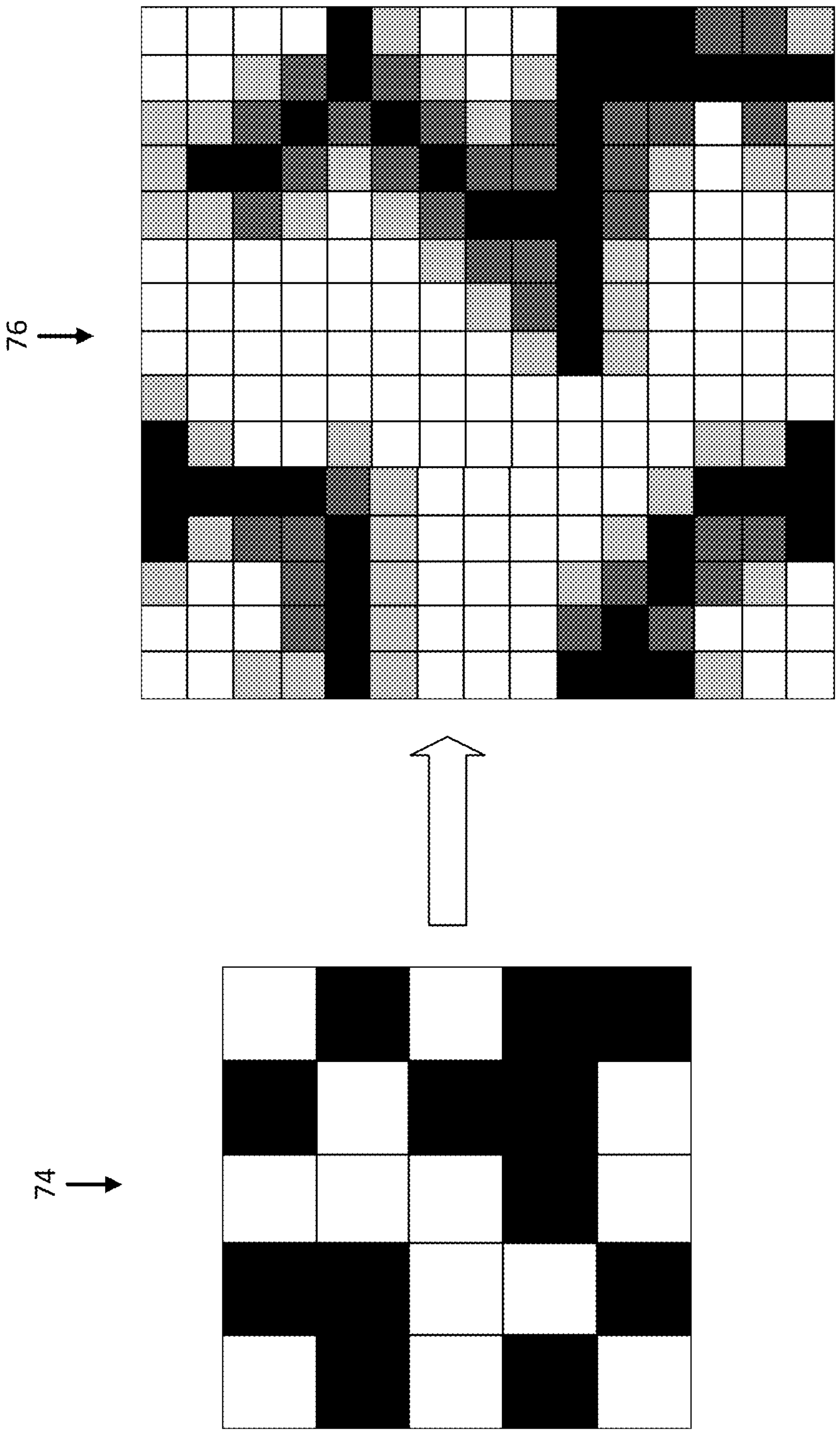
FIG. 9 is a diagram of the encoded payload signal of FIG. 8, transformed to the spatial resolution of the optical code component of FIG. 7.

FIG. 9 is a diagram of the encoded payload signal 74 of FIG. 8, transformed to the spatial resolution of the optical code component of FIG. 7. Prior to combining with the reference signal, the encoded payload component 74 is spatially scaled to a target resolution at which the optical code is inserted into a host image. This target resolution may also be the resolution at which the host image is rendered onto an object. In this example, the reference signal is generated at the target resolution for insertion into a host image, and the encoded payload signal is scaled to the same target resolution. This resolution is, for example, 203 dots per inch for many thermal label printers, or 300 dots per inch or higher for other commercial printing machines. These are just examples and the target resolution varies with application and printing technology employed. There are a variety of techniques that may be used for the resizing, such as bi-linear or cubic interpolation, Lanczos resampling, or the like. This spatial scaling of the encoded payload signal produces an image 76 such as the one shown on the right of FIG. 9 with pixels at the target elements per inch resolution. The gray scale depiction of the pixels in the 15 by 15 pixel array of image 76 reflects that the pixels are no longer binary valued.

Figure 10:
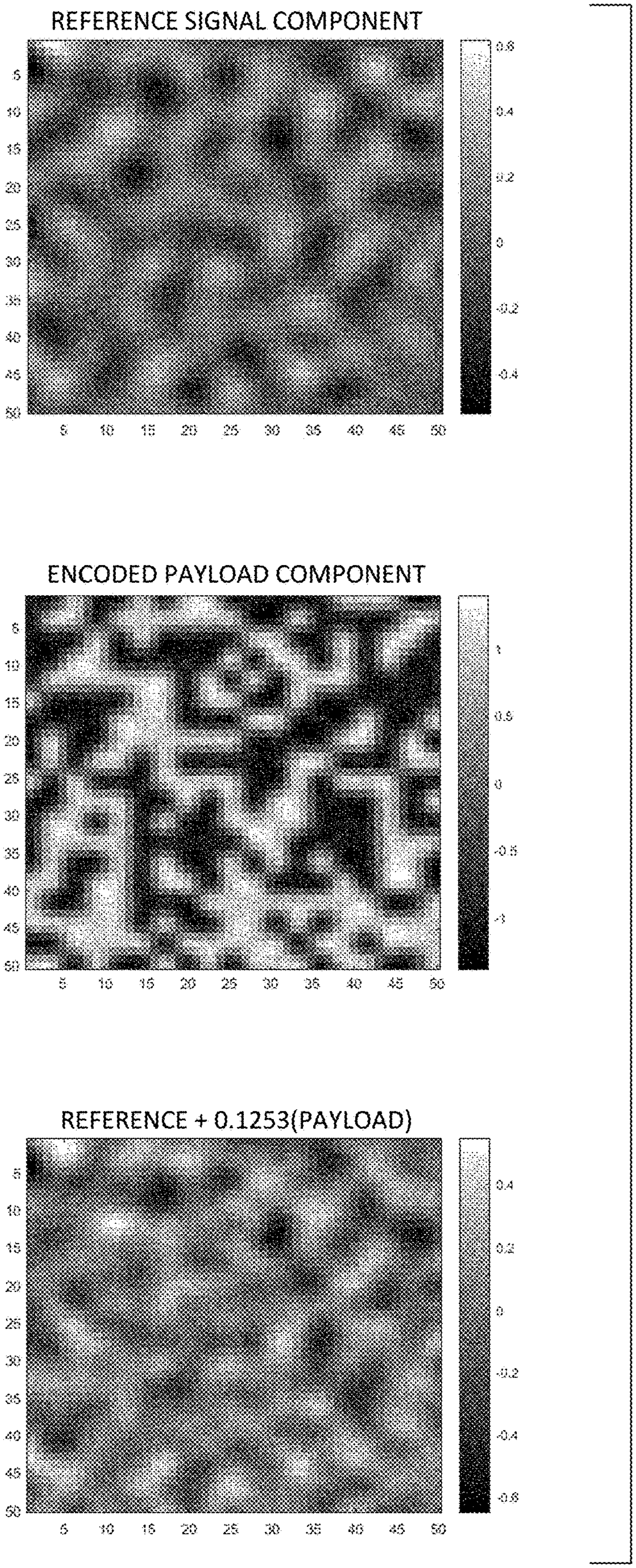
FIG. 10 is a diagram illustrating a combination of optical code elements, including an encoded payload and a reference component, to form a dense composite optical code.

FIG. 10 is a diagram illustrating a combination of a reference signal component 70 and an encoded payload (message) component 76 to yield a dense composite code signal 78.

In this example, the reference signal elements 70 are added to corresponding encoded payload signal elements 76 at the target resolution of the rendering system. This requires up-sampling the payload component, which produces some pixel elements of intermediate values, i.e., grey, rather than black or white. (Similarly, the upsampling, here done by a bicubic interpolation algorithm, yields some overshoot of signal values, resulting in some values above +1 and below −1.) To prioritize the elements, one of the reference or payload components is multiplied by a weighting factor representing a relative weighting of the reference signal to the encoded payload signal. In this example, the payload component 76 is weighted by a factor of 0.1253, and summed with the reference component 70 to form the dense, composite optical code signal 78. The magnitude of the resulting values establish the priority of the individual elements of the optical code signal 78.

FIG. 10 shows the component and composite signal values in floating point format. To the right of each of blocks 70, 76 and 78 is a graphical scale indicating the corresponding element values.

Figure 11:
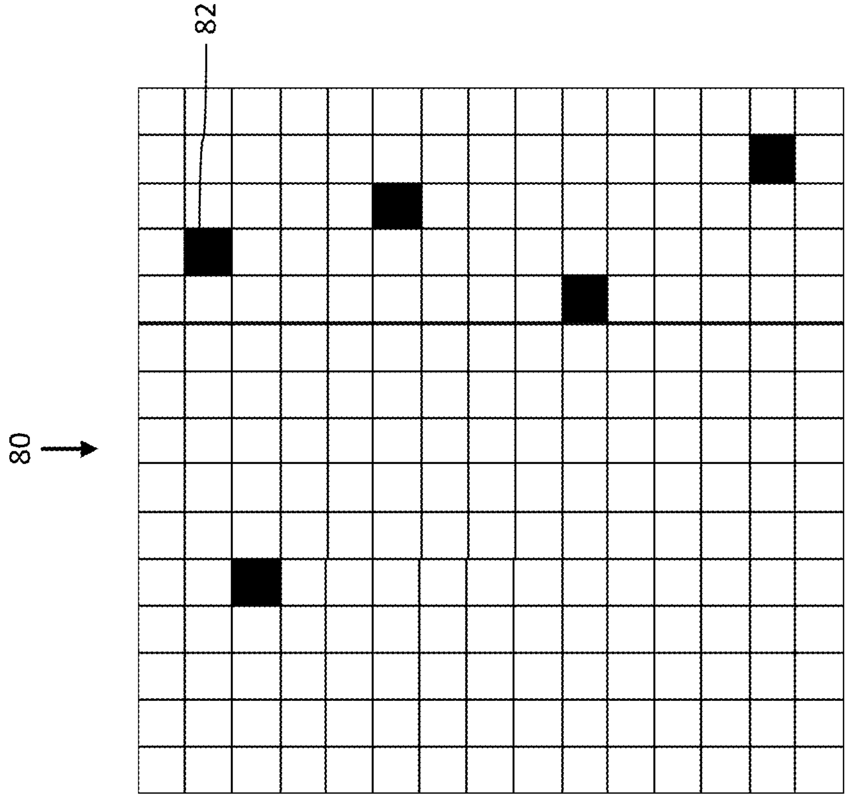
FIG. 11 is a diagram of a mapping of a dense composite optical code (like FIG. 10) to an output image according to priority of its optical code elements and spatial constraints (e.g., element spacing and signal density).

FIG. 11 is a diagram of a mapping of a dense composite optical code signal to an output image 80 according to priority of its optical code elements and spatial constraints (e.g., element spacing and signal density). In this mapping, the mapping method fills the pixel locations of the output image 80 according to the priority of the elements, with highest priority elements being filled first, followed by filling elements of next highest priority. Additionally, the filling process adheres to a spacing (placement) constraint, such as a minimum distance between dots. Both the priority of the components and the placements are optimized for a particular dot density using the method described above with reference to FIG. 2. The output of the mapping is a spatial pattern of the optical code, comprised of binary valued pixels at the target resolution. The binary valued pixels correspond to dots, which are marked on a substrate to apply the optical code to the substrate. Within the redundantly encoded signal of the dense optical code, we have found that the peaks of the dense signal are the most important to retain in a sparse signal to achieve robustness and reliability. There are positive and negative peaks. When these are conveyed in the luminance of an image, these positive and negative peaks correspond to high and low luminance values. The same is true for cases where the optical code is conveyed in color channels, such as color or chroma components (e.g., CMY) of a color image or spot colors. In one approach, the mapping retains the peaks corresponding to dark pixel (low luminance) on a relatively higher luminance substrate. This approach is reflected in FIG. 11, where dark pixels (e.g., 82) correspond to negative peaks.

This approach may be enhanced further by encoding positive peaks as a "hole" formed by an arrangement of dark pixels around a relatively higher luminance area. On a higher luminance substrate, the hole is formed by marking dark pixels around a blank pixel located at the positive peak. This blank pixel allows a lighter substrate or ink layer to be exposed, so that when imaged, it reflects a peak relative to its neighboring pixel values.

Figure 12:
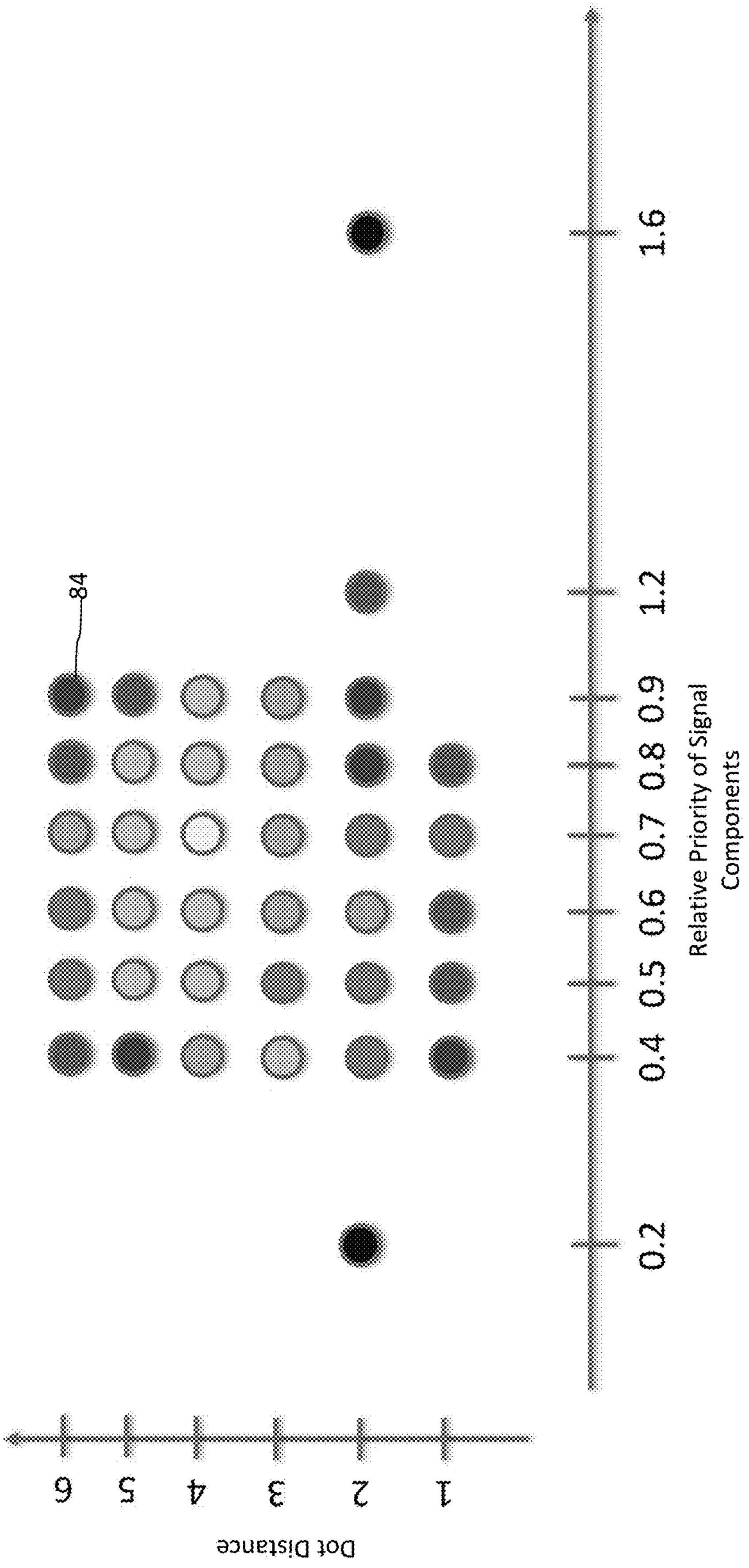
FIG. 12 is a diagram illustrating an example of a process for optimizing dot spacing and signal component strength ratios. These parameters are derived in a training process that generates and inserts optical codes at each of several combinations of these parameters into each test image in a set of test images.

We now elaborate further on the process of FIG. 2 for optimizing the optical code parameters. FIG. 12 is a diagram illustrating an example of a process for optimizing dot spacing and signal component priority for an optical code at a particular dot density. An additional parameter that may be optimized for a desired dot density is dot size. In this example, the dot spacing is represented as dot distance. The priority is represented as a relative priority of signal components. An example of this priority is the relative weighting of components explained in connection with FIG. 10. These priority and spacing parameters are derived in a training process that generates and inserts optical codes at each of several parameter space coordinates of priority and spacing parameters into each test image in a set of test images.

FIG. 12 illustrates a plot of robustness measurements for these test images. The vertical axis is the dot distance, which is a minimum distance between dots of the optical code. The horizontal axis is the relative priority of signal components, namely the reference and encoded payload signal components. The robustness measurements for the test images are shown as circles (e.g., 84), where the robustness measurements range from low (black) to high (white) values depicted in gray scale values.

As noted in connection with FIG. 2, a robustness prediction program is used to predict the robustness of the test image for a given rendering and scan process. Please see U.S. Pat. No. 9,690,967 for additional details on predicted code detection per unit area. In addition, published application 20180352111 provides additional teaching on robustness measurements for packaging and labels, referred to as scores. Also see application Ser. No. 15/154,529, filed May 13, 2016 (now U.S. Pat. No. 10,217,182), and Ser. No. 15/918,924, filed Mar. 12, 2018 (now published as 20180352111), which are incorporated by reference. These documents detail additional methods of computing detection metrics and using these metrics to predict robustness in response to simulated degradation and scanning modes.

The robustness prediction program produces a robustness measure for the test image, which is a composite of detection measurements it makes within the test image. The insertion process replicates tiles of the optical code in the test image. This replication of signal and the signal redundancy within a tile enables the robustness program to compute detection metrics within image block regions that are smaller than a signal tile. These detection metrics, including reference signal correlation and payload recovery metrics, are computed per spatial region and aggregated into a robustness score according to a function that takes into account the image capture (e.g., a swipe motion or static presentment of a marked object to a camera). Here the optical code is compatible with the digital watermark signal technology referenced in U.S. Pat. No. 9,690,967 and Appendix 1 to application 62/634,898. It is compatible in the sense that the signal detection for watermark signals described in these documents also applies to the optical codes described in this specification. The optical code conveys a compatible signal in the form of sparse dots on lighter areas and/or holes in blank or solid areas of a package or label design. The process for applying this optical code to a package or label design fills areas in the design with optical code elements at the desired dot density.

Figure 13:
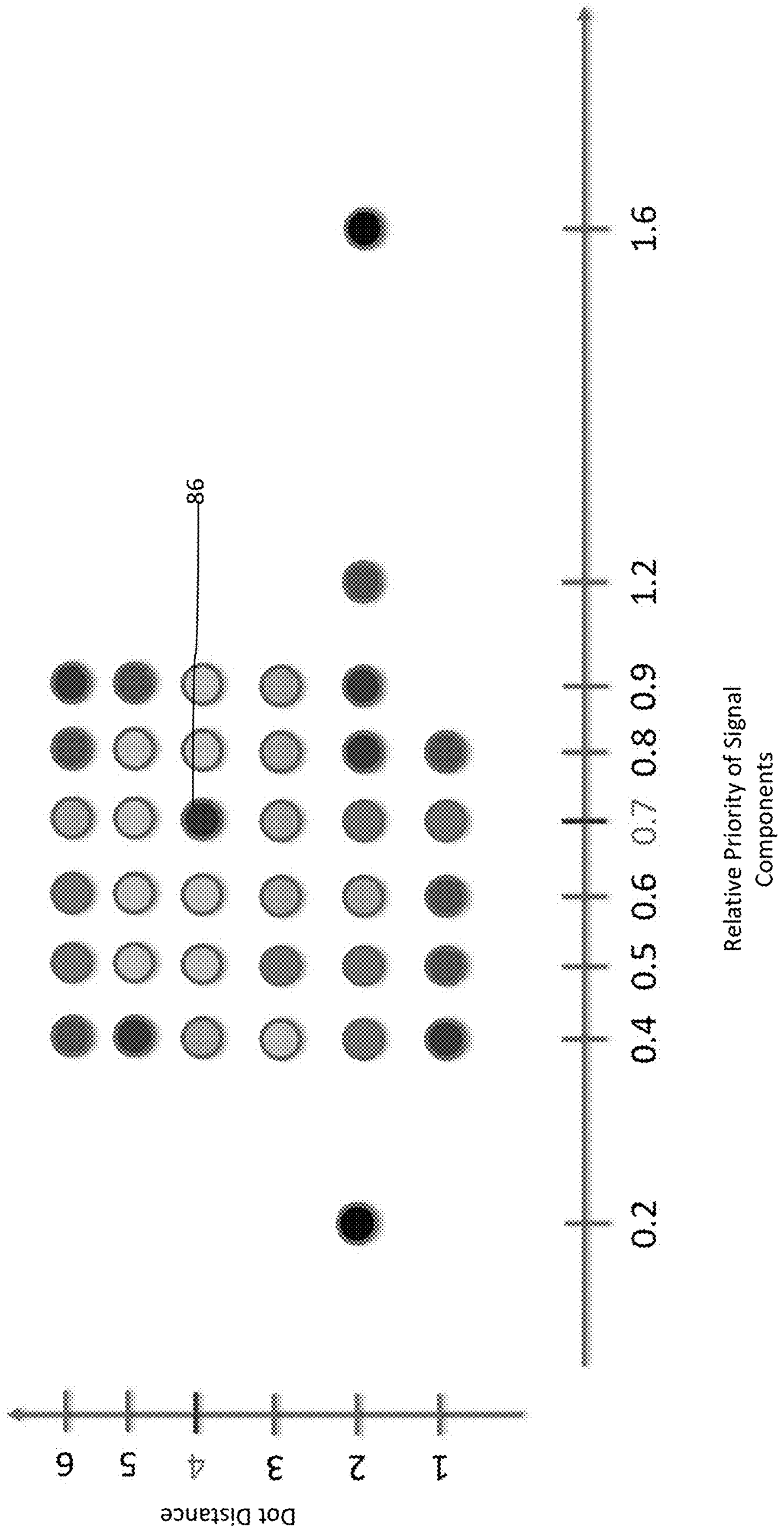
FIG. 13 is a diagram illustrating selection of optimal parameters in the example of FIG. 12 based on robustness metrics measured from the test images.

FIG. 13 is a diagram illustrating selection of optimal parameters in the example of FIG. 12 based on robustness metrics measured from the test images. In this example, the optimization method selects the location (86) in parameter space, at coordinates of dot distance=4, relative priority of 0.7, as this location has a robustness measure that exceeds a threshold value of reliability. In particular, in this example, this location provides a maxima in the measured robustness scores for the parameter ranges used in the training process.

One implementation searches for a location in parameter space that provides optimal robustness. It does so by computing the location in parameter space that provides a maximum robustness for each image in the training set of test images. The parameter space is defined as a space where the coordinates are values of the parameters being varied for the image, such as dot distance, dot size, dot density, and relative priority of signal component. Then, the optimization method finds the location in parameter space that minimizes the distance to the location of maximum robustness for each of the test images.

Figure 14:
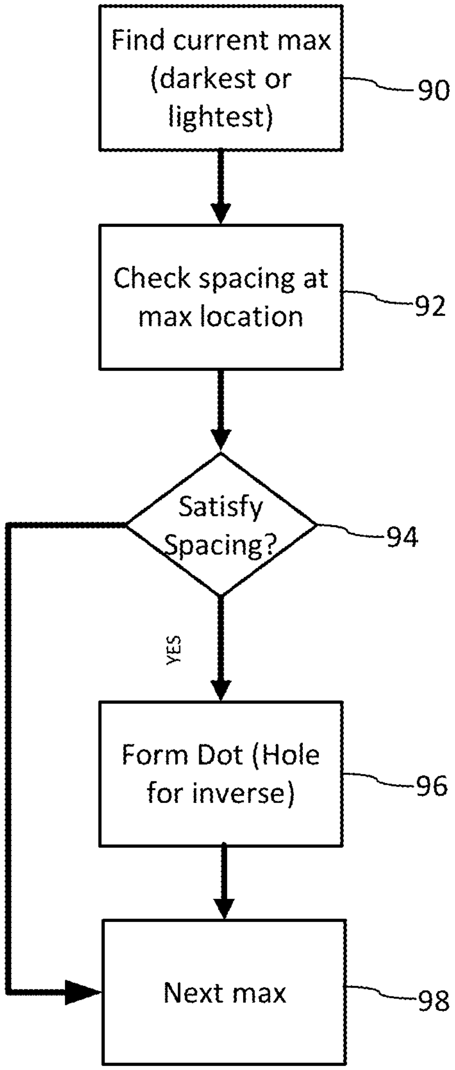
FIG. 14 is a flow diagram illustrating a method of forming elements of an optical code in a spatial area to achieve a desired dot density.

FIG. 14 is a flow diagram illustrating a method of forming elements of an optical code in a spatial area to achieve a desired dot density. This method begins with a dense, composite optical code, such as the one depicted in FIG. 10 (e.g., 78), having prioritized components. In this example, the priority is specified by amplitude of the element values in the optical code. It proceeds to map elements of the optical code to spatial locations of an output image to achieve a target spatial density. The mapping process prioritizes forming of the elements of the optical code in the output image based on amplitude. In the case of placing dark dots in a lighter area, the process proceeds in order of darkest to lightest element values in the optical code. Conversely, in the case of forming holes in a darker neighboring area, the process proceeds in order of lightest to darkest elements. Thus, to generalize, we use the term max in this description to cover both cases, with the perspective that the maxima (abbreviated as max) may refer to the darkest or lightest remaining element value as the process steps through element values in priority order determined based on amplitude.

In block 90, the mapping method begins by finding the max value among the multi-level pixel values in the dense optical code. An efficient way to implement the finding of the priority order is to sort the pixel values of the optical code by amplitude, and then step through in the order of the amplitude. The value being visited within an iteration of the process is referred to in FIG. 14 as the current max. For the current max, the process checks spacing of the location of the current max with the nearest element that has been formed previously in the output image (92).

If the location satisfies the minimum inter-spacing distance (94), it forms a dot at the location in the output image (96). The dot is placed according to the dot size and shape parameters set for the optical code at the target spatial resolution of the output image. When the location of the current max does not satisfy the minimum spacing requirement (94), the method proceeds to the next max among the remaining elements in the dense optical code (98), and a dot is not formed at the location of the current max. The placement process continues placing dots in this manner until the target spatial density is met.

The process of forming lighter "holes" amidst darker surrounding elements proceeds in a similar way, except that the max corresponds to the lightest element values of the optical code. Holes are formed by setting the pixel value at the output image location so that no ink, or a lighter ink relative to darker ink at neighboring locations, is applied at the location. In some variants, both dots and the inverse (holes) are formed at spaced apart locations satisfying the minimum spacing requirement. This has the advantage of increasing signal carrying capacity and signal robustness, as more signal of the optical code is retained in the output image.

FIGS. 15-22 illustrate this process graphically with a waveform 100 that represents the dense optical code in one dimension. In a discrete, digital form, the dense optical code signal is quantized into levels (e.g., 0-255 for 8 bit values) for a two dimensional array of pixel locations, sampled at a target spatial resolution. The waveform 100 has minima 102, 104 and maxima 106, 108, 110. Depending on the signaling scheme, the minima to maxima values range from darkest to lightest, or vice versa. For the sake of illustration, we describe an example where the minimum to maximum values range from darkest to lightest.

Figure 16:
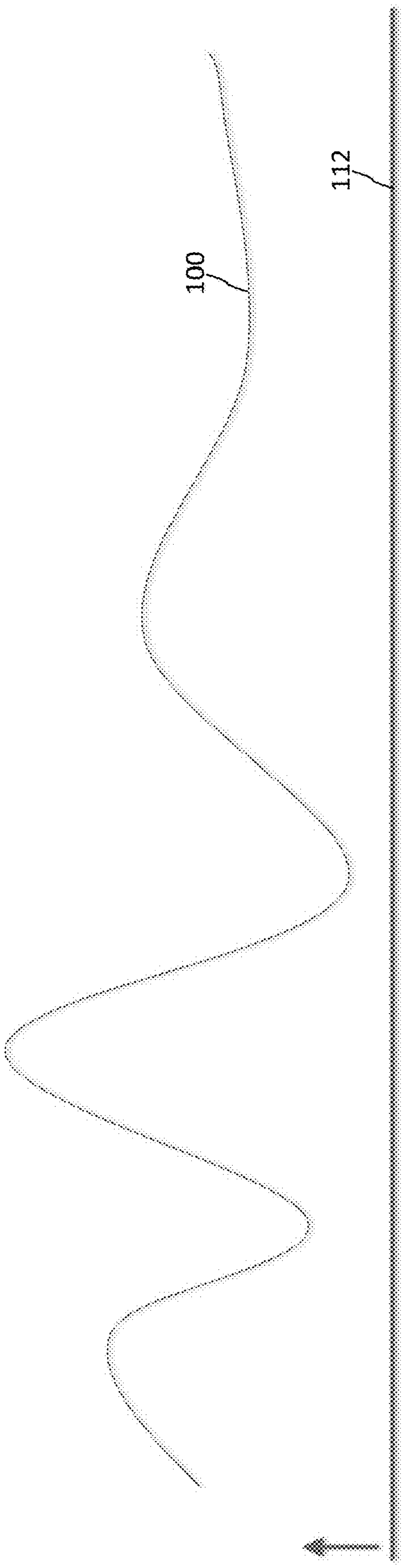

FIG. 16 depicts the start of the process forming optical elements in an output image. As noted, the method of FIG. 14 forms elements in order of priority, and the priority is conveyed in the amplitude. The line 112 moving toward the waveform 100 depicts the approach of visiting elements of the optical code in order of amplitude, starting from the minima and progressing upward. Though FIG. 16 shows the waveform of the optical code in its original spatial arrangement, its discrete amplitude values are preferably sorted by amplitude so that the method advances efficiently by stepping through a sorted list.

Figure 17:
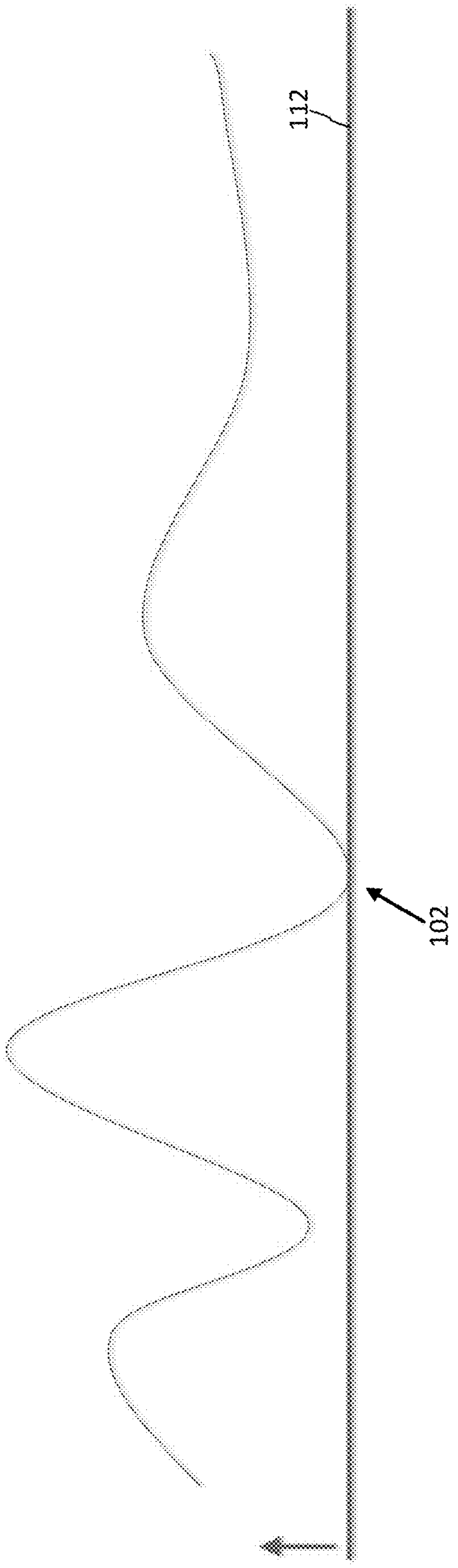
Figure 18:
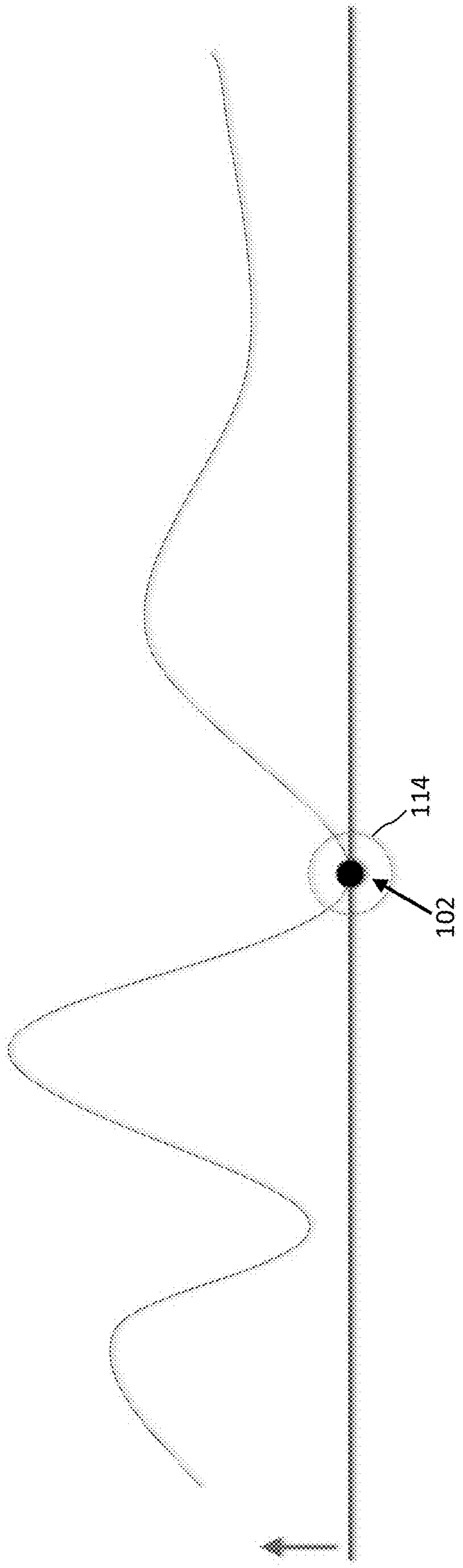

In FIG. 17, the process finds the darkest element (102). As shown in FIG. 18, an optical code element is formed at this location (102) and a minimum spacing depicted in ring 114 is enforced when the method forms additional elements of the optical code in the output image. The minimum distance refers to the minimum distance between outer edge of dot element 102 and nearest neighboring dot elements formed from the optical code signal.

Figure 15:
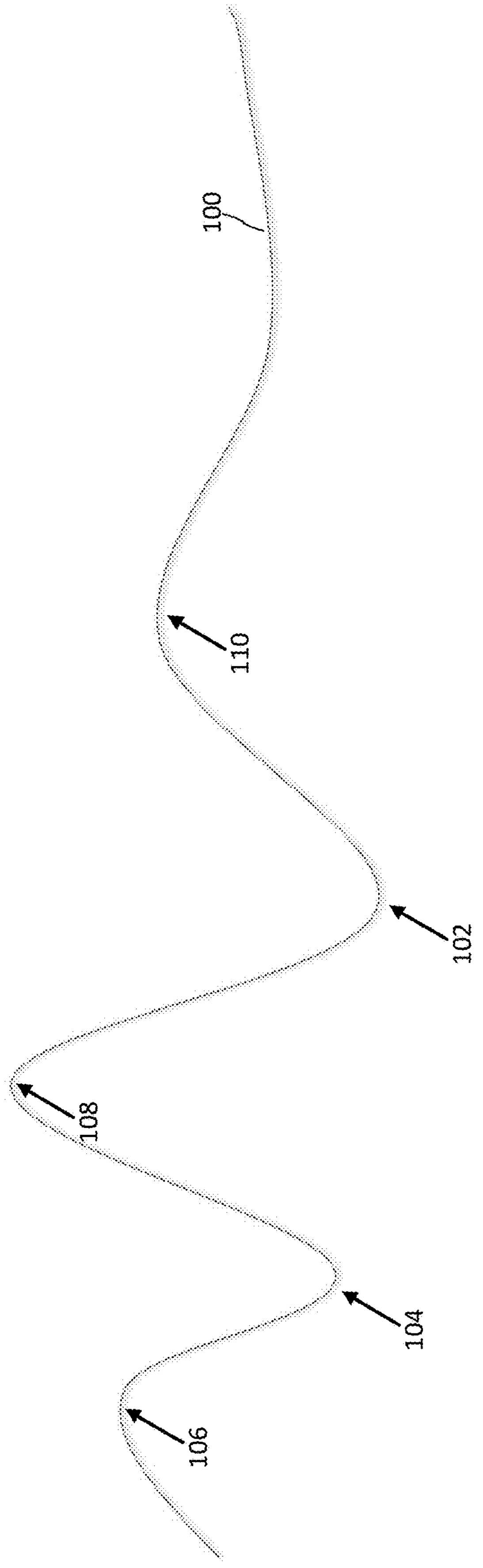
FIGS. 15-22 illustrate the process of FIG. 14 graphically with a waveform that represents a dense optical code.
Figure 19:
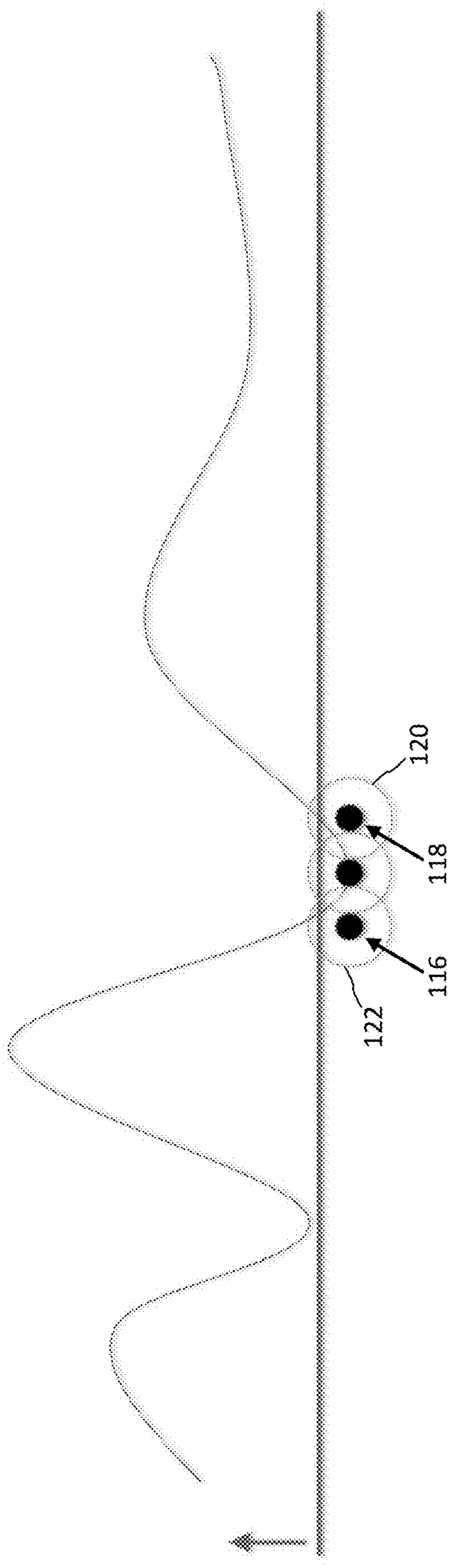
Figure 20:
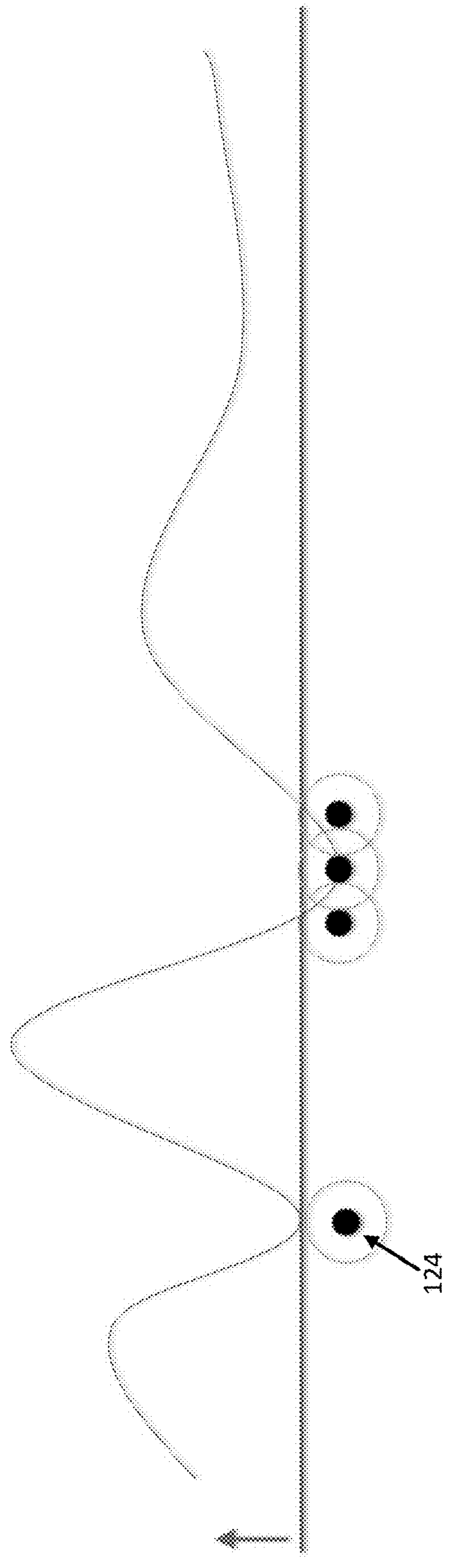
Figure 21:
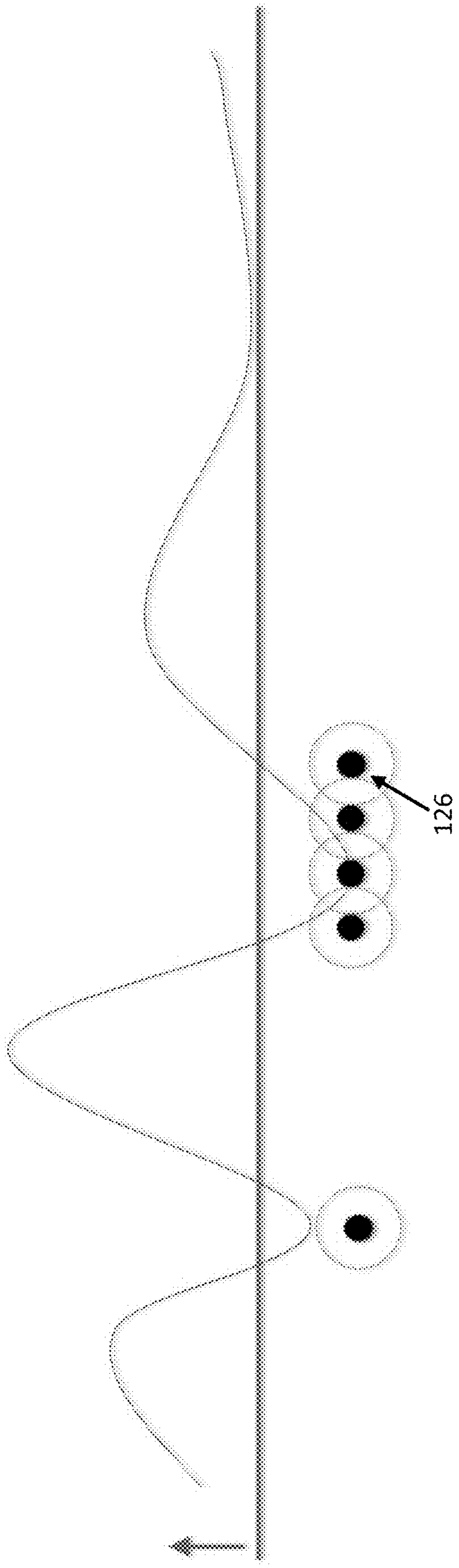
Figure 22:
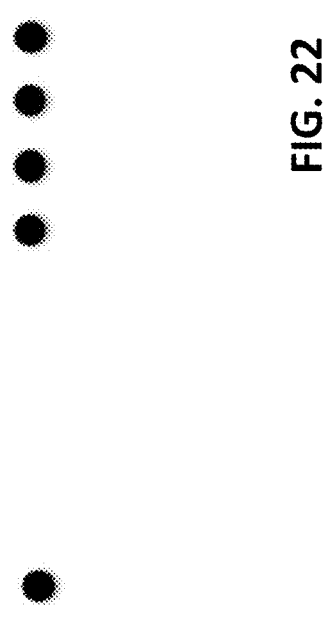

FIG. 19 depicts placement of two additional elements (116, 118) at locations in the optical code that have the next highest priority and also satisfy the minimum spacing constraint (illustrated by rings 120, 122). As the method progresses, it visits and forms a dot in the output image at the location of another local minima at location 124 as shown in FIG. 20. This example illustrates how the method prioritizes placement of elements of the optical code signal elements in the output image around signal peaks, as these peaks convey signal components that are most important in the robustness and reliability of the optical code. Further depicting this point, FIG. 21 shows the forming of another dot 126 at the next highest priority, which is another dot around the minima 102 (FIG. 15). The process culminates when the dot density from forming the optical code elements in the output image reaches the desired dot density. FIG. 22 shows the placement of dots in one dimension, though the process applies to placing of dots in a two dimensional output image tile.

As a practical matter, this procedure will typically place dots in the optical code at locations corresponding to the very darkest locations in the reference signal, regardless of the payload. That is, these darkest reference signal values are dark enough that, even after weighted summing with a light excerpt of the encoded payload component, such locations still have a priority high enough to be selected for marking (i.e., the location in the combined, dense optical code of FIG. 10 is still dark enough to be a selected location). As a consequence, some locations in the optical codes produced by the detailed procedures are always marked-regardless of payload.

Such always-dark locations, in this embodiment and in others discussed below, provide various advantages. For example, they provide the detector a benchmark by which ambiguous samples in captured imagery can be resolved as dark marks, or not. The fixed dark marks also serve as guideposts by which geometrical synchronization can be refined, e.g., adjusting the translation offset so these dark marks are found in their expected locations.

Figure 24:
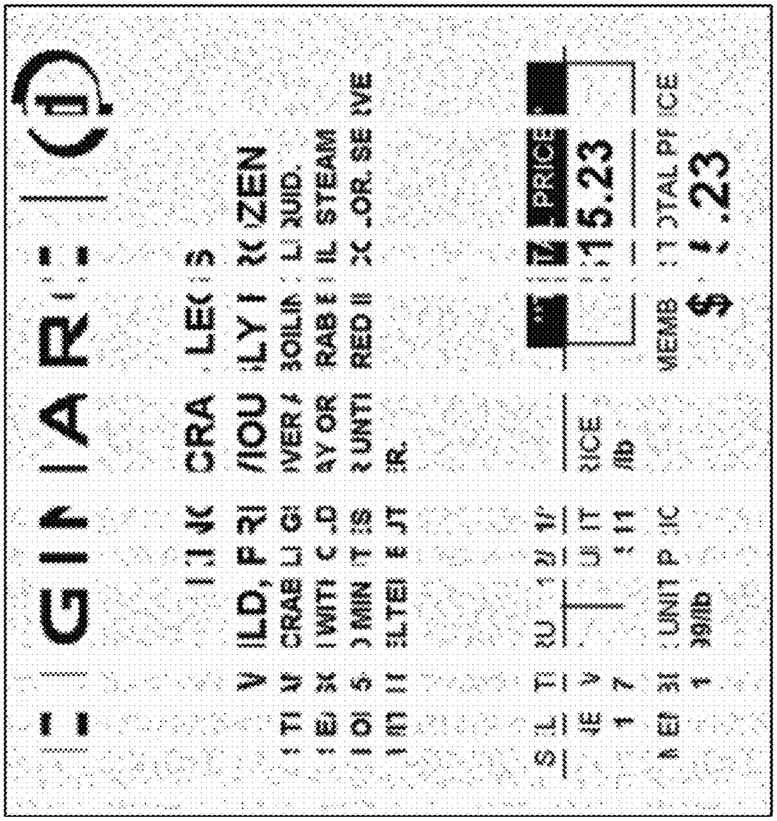
FIG. 24 illustrates another example of the label design merged with the optical code, with additional degradation to illustrate robustness of the optical code.
Figure 23:
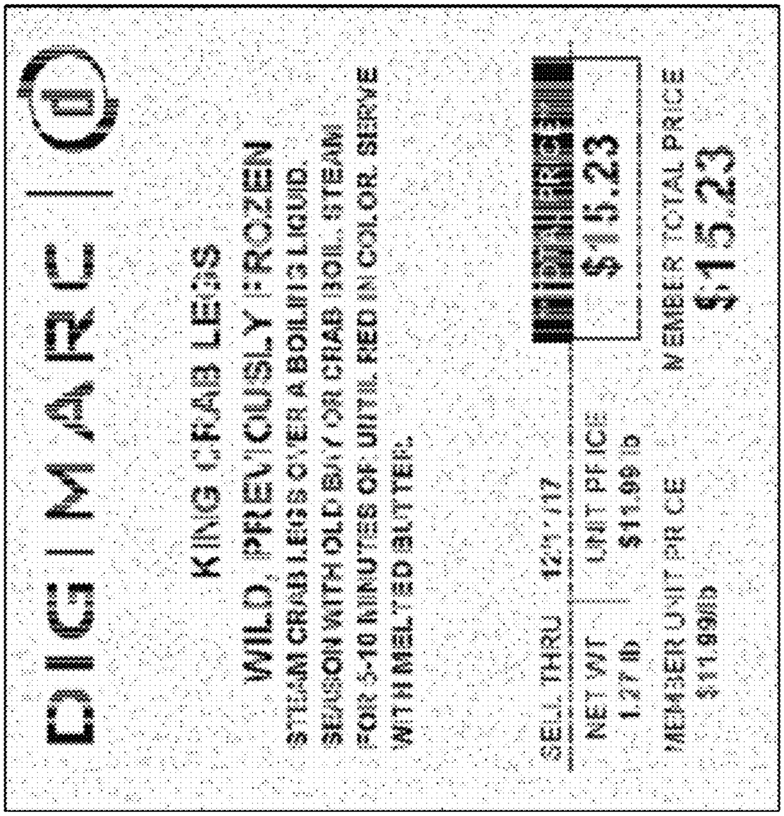
FIG. 23 illustrates an example of a label in which the output image of an optical code has been tiled and then merged.

For many applications, the output image comprising the mapped optical code elements is merged with a host image, which is then printed or otherwise marked on a substrate. FIGS. 23-24 illustrated examples where this output image is merged with a label design generated from a label template. The label design includes programmable elements such as a brand identifier and logo at the top and text providing product information. It also includes dynamically generated information within a scale, such as weight and price.

There are several strategies for merging the output image of the optical code (e.g., its "sparse" form at the target spatial density) with a host image, such as a label or package design image. In each, a tile of the optical code at the target spatial resolution is replicated in contiguous blocks over the entire host image and then merged with the host image. One method for merging is to overlay the optical code image with the host image. For example, the dot elements are placed within the host image. Both the host and optical code tile are binary, so where either the host or optical code has a dot, the printer prints a dot. Another method is to do an intelligent overlay, in which elements of the optical code are formed in the host image, while adhering to keep out distances from the boundary of characters of critical text content (such as price and weight). More specifically, dot elements are placed at all locations of the optical code, except where it is within a predefined keep out distance from the outer boundary of a critical host image character or graphic (such as conventional barcode line). (Such a keep out guard band around critical text and other graphics is detailed in publication 20170024840, referenced earlier.)

Yet another approach is to modulate the host image at the locations of the optical code elements so that the optical code is prioritized over non-critical host image information. The optical code, for example, is formed by modulating the host image with a dot or hole corresponding to the output image of the optical code signal. Dots are placed to encode dark elements of the optical code and holes are formed to encode light elements of the optical code.

FIG. 23 illustrates an example of a label in which the output image of an optical code has been tiled and then merged. This is a depiction of a thermally printed label in which some of the columns have been set to zero, corresponding to failure of a print element of the thermal printer that produced the printed label. When a thermal print element fails, it no longer marks a label along the column of the label stock that passes that print element. Our tests reveal that our methods for optimizing the optical code for a desired spatial density achieve improved robustness to the loss of information due to failure of print elements.

FIG. 24 illustrates an example of the label design merged with the optical code where even thicker columns of elements have been set to zero (meaning no dot elements printed). Again, in this case, our methods provide improved robustness, enabling the payload to be successfully decoded despite the image degradation.

FIG. 25 is yet another example in which tiles of the optical code have been merged with text. We tested the optical code merged with text as shown with varying font size and found increased robustness across a range of font sizes. The font size and text density is yet another feature that may be included in the test images used to optimize the parameters of the optical code at different spatial densities of the optical code.

Prioritizing of Data Signal Components

The transformation of a pristine, dense optical code into artwork of a host image results in loss of data signal of the optical code. This occurs because the transformations remove or distort portions of a dense data signal tile when it is converted to a more sparse spatial density (lower dot density per tile). Additionally, text, graphics and other image content of a host image into which the output image is inserted may interfere with the optical code. As sparsity of graphical elements increases, data signal elements are removed or altered, which reduces robustness. This reduces the capacity of the data channel in a given tile region of the output.

Incorporating the data signal into artwork also impacts the prioritization of signal components in the data channel of the artwork. This occurs because the artwork can interfere differently with the signal components. In addition, the amount of signal capacity dedicated to reference signal (e.g., synchronization signal) and payload signal to achieve reliable detection varies with the artwork design. Thus, the ratio of the signal components should be adapted for the artwork.

Figure 26:
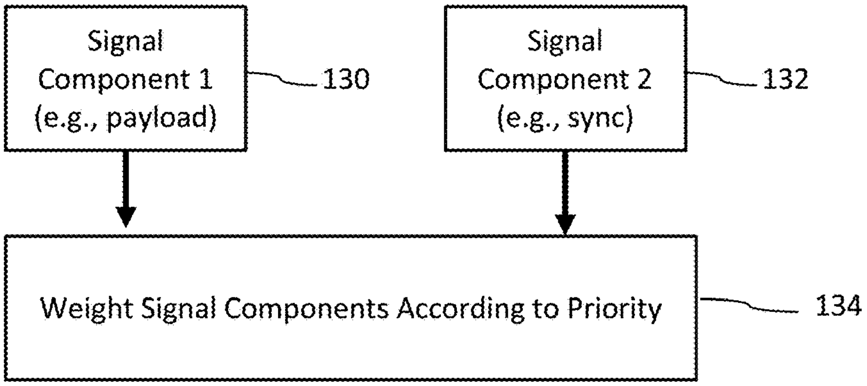
FIG. 26 is a diagram illustrating a method of weighting elements of a data signal prior to use in generating artwork that optimally carries the data signal.

Here we discuss strategies for prioritizing signal components to counteract loss of robustness. FIG. 26 is a diagram illustrating a method of weighting elements of a data signal prior to use in generating artwork that optimally carries the data signal. The optical code signal generator produces signal components. These include components that carry a subset of the payload bits (130) and components that provide a reference signal (e.g., synchronization signal) (132). In block 134, the optical code signal generator weights the components according to their priority. This priority is then used in the artwork generation to control which of the data signal elements are retained.

In one approach for adapting host images to carry tiles of the optical code signal, the process for inserting the optical code signal in a host image is executed with different weightings for the payload and reference components for a candidate artwork design and insertion strategy. This yields several variants of the artwork carrying the data signal. Additional permutations of each variant are then generated by distorting the artwork according to image shifts, rotation angles, reducing and enlarging spatial scale, noise addition, blur, and simulations of print element failure. Robustness measures based on both correlation with a reference signal for synchronization and correlation with the message signal are computed and stored for each artwork variant. Additionally, the optical code reader is executed on each variant to determine whether it successfully decodes the payload. The component weighting and robustness metric thresholds are then derived by analyzing the distribution ratio of components that lead to successful payload decoding. The distribution illustrates which ratios and robustness metric values are required to lead to reliable detection. These ratios and robustness metrics are then used for the candidate artwork design and signal encoding method in an automated data encoding program.

Another approach optimizes the data signal in sparse artwork. To be compatible with sparse artwork, the data signal is also sparse, and is structured to be consistent with the sparse artwork. Sparse data signals can be binary (0,1), trinary (−1,0,1), or other coarse quantization. Sparse signals are typically low density, i.e., less than 50% ink or less than 50% space. Such a signal has maximum robustness at 50%, so any optimal sparse algorithm should increase in robustness as the ink/space density tends toward 50%

Sparse signals maintain robustness by using thresholds to create binary or trinary signals. These binary or trinary signals ensure that the detection filter will return a maximum value at desired signal locations. Between the sparse locations in the artwork, the detection filter will output a Gaussian distribution between maximum negative and positive outputs due to random noise introduced by the image capture (namely, scanner or camera noise). The Gaussian width depends on factors such as the amount of blur included in the image capture processing.

During optimization of sparse signals, a small amount of filtered noise is added to account for the fact that the detection filter will create non-zero values everywhere due to noise of the image capture device. The optimization parameters for sparse signals include weighting of reference signal to payload signal, element placement rules (e.g., minimum element spacing), and thresholds. There is a single threshold for binary signals. It is a negative threshold for low ink density, <50%, and a positive threshold for high ink density, >50%. There is a dual positive and negative threshold for trinary signals. The robustness objective is the same for dense and sparse signals. Namely, it is a detection robustness over the targeted workflow environment, which is modeled with distortions to the encoded artwork.

Selection of Data Signal Components: Filtering Considerations

Prior to decoding, imagery captured from a marked object may be processed by a predictive non-linear multi-axis filter. U.S. Pat. No. 7,076,082, which is incorporated by reference, details such a filter, termed an "oct-axis" filter. An exemplary form of oct-axis filtering compares a subject image sample with its eight surrounding neighbors to provide eight compare values (e.g., +1 for positive difference, −1 for negative difference, and 0 if equal), which are then summed. The filter output thus indicates how much the subject pixel varies from its neighbors. Different arrangements of neighbors and weights may be applied to shape the filter according to different functions. (Another filter variant is a criss-cross filter, in which a sample of interest is compared with an average of horizontal neighbors and vertical neighbors, which are then similarly summed.) Such filtering tends to accentuate the added code signal by attenuating the underlying artwork imagery to which the code signal is added.

In accordance with a further aspect of the present technology, when selecting data signal components to be included in a printed sparse mark, this anticipated filtering operation is taken into account.

Figure 27:
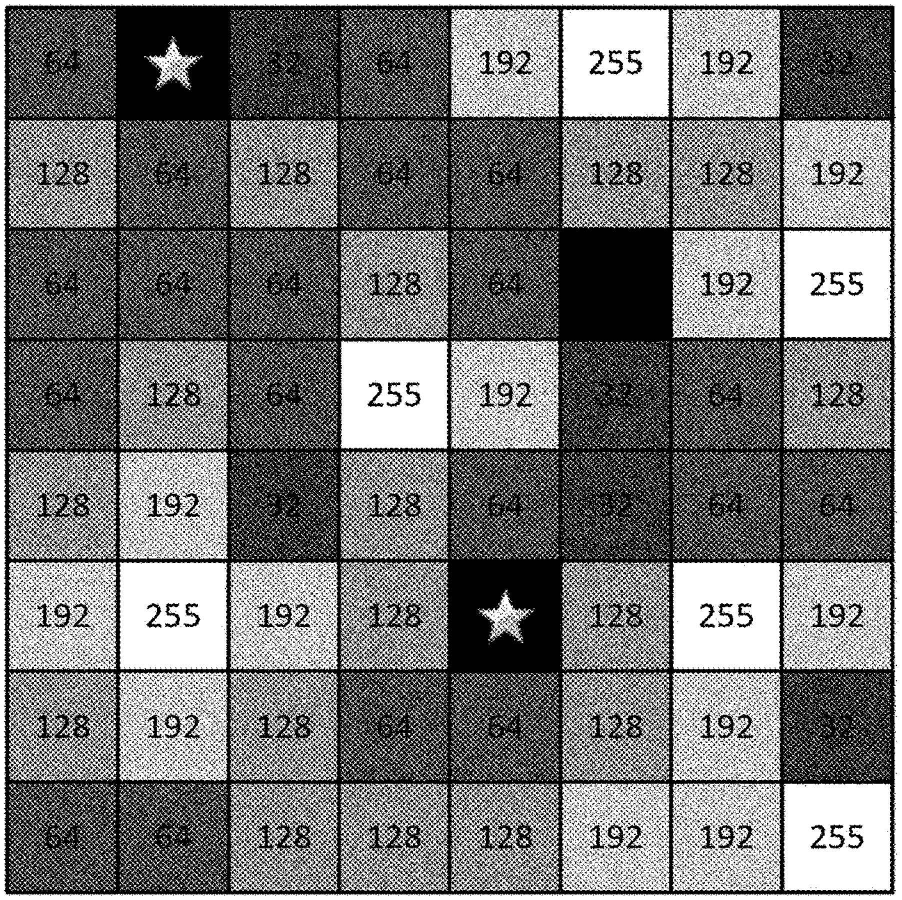
FIG. 27 shows an excerpt from a composite code, with the darkest elements marked for copying to an output tile as black dots.

FIG. 27 shows an excerpt of a composite signal resulting from combining a reference signal at the target resolution, with an up-sampled payload signal, in a desired ratio, as described earlier in connection with FIG. 10. The numbers indicate pixel values, ranging from 0 at pure black, to 255 at pure white. To produce a sparse signal, an illustrative embodiment sorts this signal by pixel magnitude and identifies the starred pixels as locations to place a black dot in the output frame, because they are the darkest locations while meeting a placement (e.g., spacing) constraint.

However, such approach ignores the signaling potential of light pixels. The light pixels contribute nothing to decoding of a sparse mark, unless they are proximate to a printed, dark pixel. For the oct-axis, crisscross, or other non-linear filter to discern their light shade, they must be in the presence of darker pixels, so that the filter indicates their relative lightness. Else, the filter yields ambiguous output (e.g., values having a Gaussian distribution centered near zero).

To give the lighter pixels a role in conveying the code signal components, it is better to pick dark pixels for copying to the output frame that cause adjoining light pixels to be credited for their information as well. Picking one dark pixel may thus effect 2-, 3- or more-pixels' worth of information.

Figure 28:
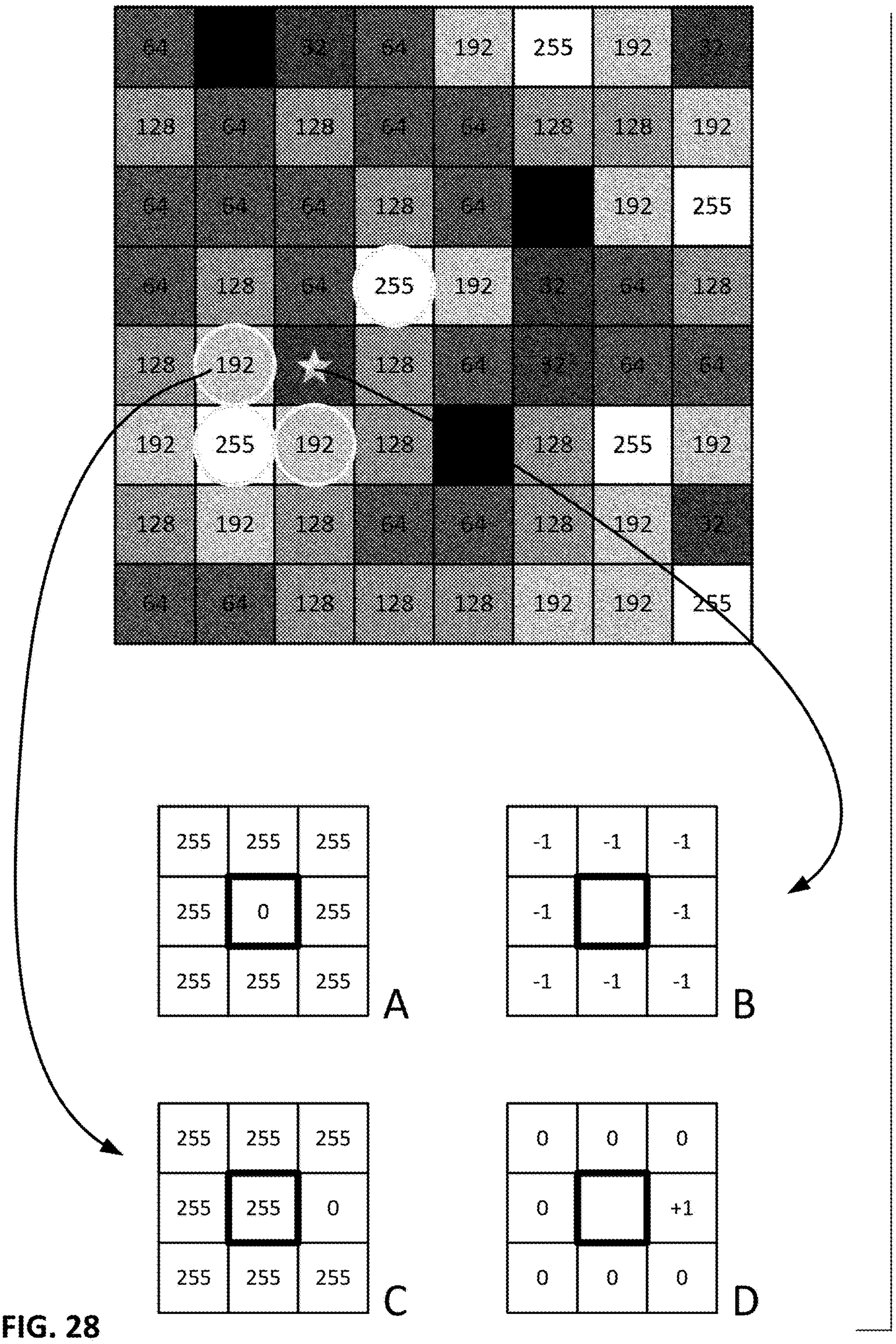
FIG. 28 considers what happens if the starred pixel in the composite code excerpt of FIG. 27 is copied to an output tile as a black dot, and how a non-linear filter kernel can be applied to such black dot and a neighboring white pixel.
Figure 29:
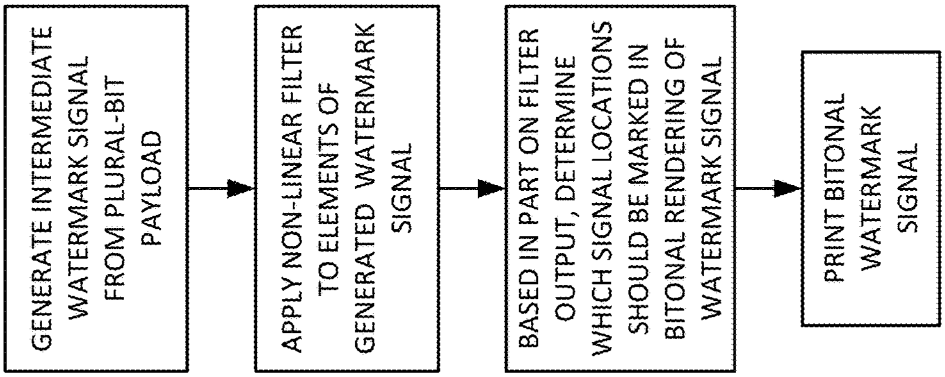
Figure 30:
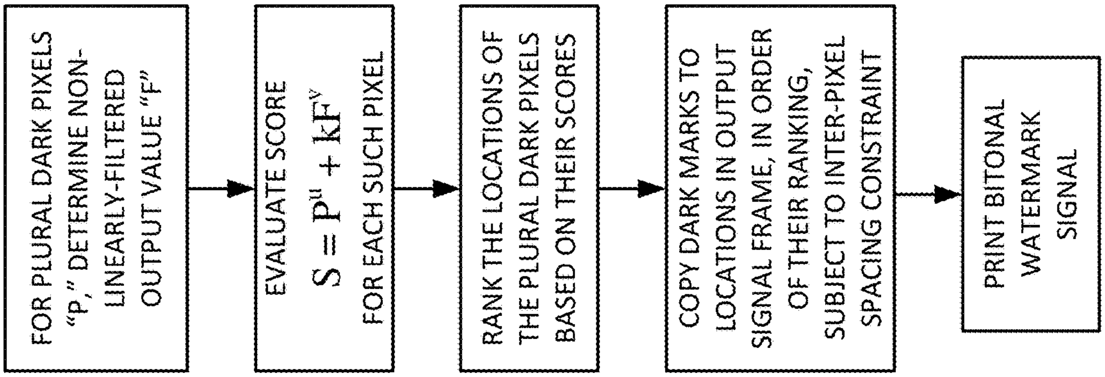
Figure 31:
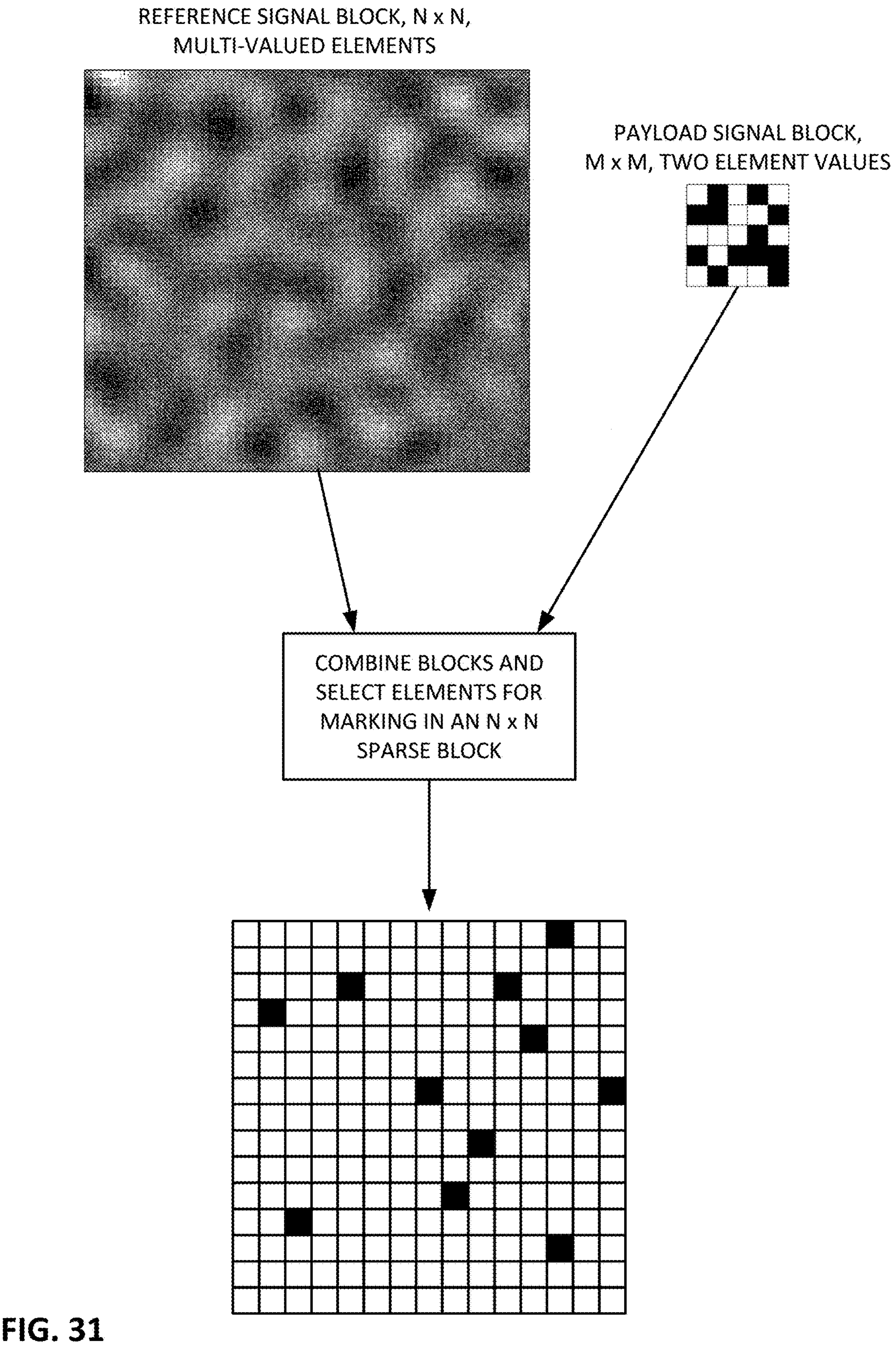

To illustrate, consider the starred dark pixel in FIG. 28. If the starred pixel is copied as a dark dot to the output frame, the circled, lighter pixels, all also contribute to decoded information in the detector. Data is contributed from five pixels, by copying only one dark pixel to the output frame.

That is, the starred mark copied to the output frame has a value of 0 (i.e., black). Each of the surrounding eight pixels is unprinted, and so thus has a very high pixel value in captured imagery-near 255. This is shown by inset A. Since the center pixel has a lower value than each of its eight neighbors, it produces a strong output from the oct-axis filter: −8, as shown in inset B.

Next consider, from FIG. 28, the leftmost of the light "192" circled pixels. It, and all its neighboring pixels—except the starred one—are unprinted. (Recall that only the starred dark pixel produces a dark dot in the output print.) The neighborhood centered on this light "192" pixel—as depicted in captured imagery—is thus as shown at inset C. Oct-axis processing produces an output for this "192" pixel, as shown at inset D, due to the presence of the adjoining dark pixel. (The oct-axis signal is weak, +1, but it is a signal nonetheless, and over the thousands of such pixels in the captured imagery, makes an important decoding difference.)

Similarly, each of the circled pixels in FIG. 28—none of which is printed—contributes some information to the decoder, since the adjoining starred dark pixel causes the predictive filter to produce non-zero output signals. And, of course, the dark pixel contributes information too.

The naïve selection of simply the darkest pixels sometimes results in picking dark pixels having this effect-enabling signal from adjoining light pixels to contribute information to the decoder. But that's just happenstance, not strategy.

In fact, naively picking simply the darkest pixels often results in surrounding pixels being misunderstood—by the decoder—as all being light in color. (They are, after all, unprinted.) This can mislead the decoder into understanding that, at such points, the message signal, plus weighted reference signal, at such points, has a high pixel value. If, in fact, the surrounding pixels are dark (e.g., with pixel values below 128), then this is exactly the wrong information.

To illustrate, consider the lower starred dark pixel in FIG. 27. If copied to the output frame, printed, and then imaged, it would cause the predictive filter to believe that all 8 of its surrounding pixels are relatively light. While true in a relative sense, this misleads the detector as to these surrounding pixels' import. Four are mid-grey, and the other four are various shades of dark. These latter four pixels, when predictive-filtered, would lead the detector astray-conveying information associated with light pixels, when they are actually dark pixels.

Thus, in picking dark pixels from FIG. 27 (or FIG. 10) for copying as dark dots to an output frame, it is best to pick pixels that are dark AND that are surrounded by a large number of truly light-colored pixels. That way, the unprinted pixels surrounding the dark point in the output frame will be properly understood by the decoder-contributing correct information, rather than misleading information.

Such strategy can be implemented by applying the predictive non-linear filter that will likely be used for decoding, to the composite weighted-grid plus message signal. Dark pixels with the highest oct-axis filter scores are those that are surrounded by the lightest set of adjoining pixels. Picking these dark pixels for the output frame will help provide the most correct message and reference signal information per copied dark pixel.

Experimentation can determine a relative prioritization between these two criteria for selecting dark pixels for copying to the output frame: (a) the darkness of the candidate pixel, and (b) the value resulting from application of the filter function to the candidate pixel within the composite dense code signal. Such experimentation can reveal, for example, whether it is better to copy a dark pixel with a value of 10 and an oct-axis filtered value of −7, or a dark pixel with a value of 30 and an oct-axis filtered value of −8, etc. A factor "k" can be found that relates the two factors-optionally in conjunction with two exponents "u" and "v," such that a score can be evaluated for different {pixel value/filter value} pairs.

That is, a score (priority) S can be computed for a pixel value P and its corresponding filtered value F, as follows:

$$S = P^u + kF^v$$

Such a score can be determined for each dark pixel in the weighted-grid plus message signal (i.e., for each pixel having a value less than 128), and the results ranked. In this particular function the smallest scores are the best. Pixels can then be selected based on their position within the ranked list, subject to inter-pixel placement (spacing) constraints.

By such approach, dark pixel selection is based not just on inter-pixel spacing, but also on information efficiency considerations.

The flow charts of FIGS. 29, 30, 31 and 32 illustrate aspects of arrangements described above. In FIG. 32, blocks 323*a*-323*c* define particular algorithmic acts by which the function of block 323 can be achieved. Blocks 323*aa*-323*cc* define another algorithm by which the function of block 323 can be performed.

Selection of Data Signal Components: Payload Considerations

Codes of the sort detailed herein typically convey a plural bit payload (e.g., 20-100 bits). Each pixel in the composite signal frame of FIG. 10 (and FIG. 27) helps signal the value of one of the payload bits. The payload bits are encoded redundantly, so that across an output signal tile, each payload bit is typically expressed by between 4 and 60 dark dots in the output frame. These redundant bits are desirably spatially-spread, so that the complete payload can be recovered from imagery depicting just a fraction of the output signal tile (e.g., a quarter of the tile).

The light pixels of the output signal frame also can help signal the value of payload bit—provided that such light pixels are adjacent a dark pixel, and are correctly interpreted by the decoder—as discussed in the previous section.

In accordance with a further aspect of the present technology, understanding of which dark pixels in the composite frame correspond to which bits of the payload is considered, when picking dark pixels for copying to the output frame. Similarly, understanding of which adjoining light pixels in the composite frame correspond to which bits of the payload is likewise considered. Both considerations aim to have each of the payload bits expressed with approximately the same degree of strength in the output signal frame, desirably on a sub-tile basis.

In particular, the output signal tile can be divided into four square sub-tiles. A tally is then maintained of how many times each message bit is expressed by dark pixels, and by light pixels, in each sub-tile—yielding an aggregate strength per bit for each payload bit in each sub-tile.

Since light pixels produce only modest oct-axis output signals, their encoding of a bit may be weighted as contributing just a fraction (e.g., one-eighth) of the output signal strength contributed by a dark pixel encoding that same bit. That is, a dark dot may be regarded as representing a payload bit with a strength of “1,” while adjoining light pixels represent their respective payload bits with strengths of 0.125. (However, not all eight adjoining light pixels may correctly represent payload bits, for reasons discussed above.)

In one particular embodiment, a target per-bit signal strength is determined, e.g., as follows: If the output tile is to have, say, 840 dark dots, and each dark dot represents one bit with a strength of “1” and, say, five other bits (due to surrounding white pixels that correctly encode bits) with a strength of 0.125, then the 840 dark dots can represent 840 payload bits at strength 1, and 4200 payload bits with strength 0.125. If there are 40 payload bits, then each can be represented by 21 dark dots, and by 105 light dots. Each bit is thus represented with an aggregate “strength” of 21+(105*0.125), or about 34. Each sub-tile may thus represent each payload bit with an aggregate strength of about 8. This is a target value that governs copying of dark pixels to the output frame.

In particular, a ranked list of dark pixel candidates for copying to the output tile is produced, as detailed in the previous section. These dark pixel candidates are copied, in ranked order, to the output tile—subject to the dot placement (e.g., spacing) constraint. The tally of strength for each payload bit, in each sub-tile, is concurrently tracked (considering both dark pixels and adjoining light pixels). When the aggregate strength of any bit, in any sub-tile, first hits the target value of 8, then copying of candidate dark pixels to that sub-tile proceeds more judiciously.

In particular, if the next candidate dark pixel in the ranked list would yield aggregate strength for a particular bit, within that sub-tile, of more than 110% of the target strength (i.e., to 8.8 in the present example), then it is skipped. Consideration moves to the next candidate dark pixel in the ranked list.

By such approach, dark pixel selection is based not just on dot placement and information efficiency considerations; it is also based on approximately uniform distribution of signal energy across the different bits of the code payload, across the different sub-tiles.

(The just-detailed arrangement can naturally be applied to ranked lists of candidate dark pixels that are identified otherwise, e.g., by the naïve approach of ranking simply by pixel value, subject to a placement constraint.)

Figure 33A:
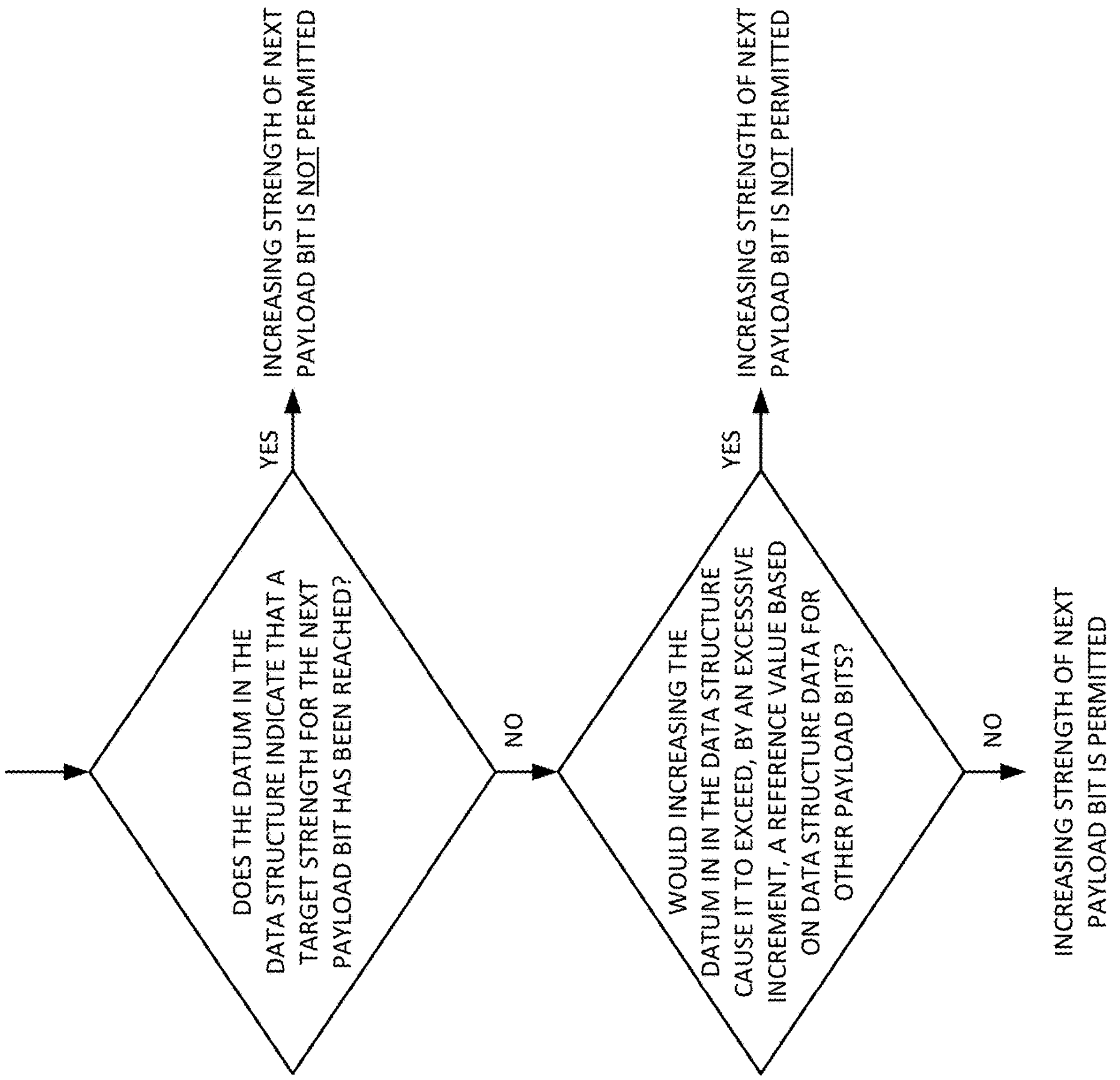

The flow charts of FIGS. 33 and 33A illustrate certain aspects of the foregoing. Blocks 331 and 332 define a method at a high level. Block 331 can be performed by creating a dense code as detailed elsewhere herein, or simply by reading a code from a memory, where it was previously stored. It should be noted that this code may be a payload code, alone; it needn’t include a reference signal component.

Elements 332*a*-332*i* define particular algorithmic acts by which the function of block 332 can be achieved. FIG. 33*a* further defines algorithmic acts associated with block 332*g*.

In sum, this aspect of the present technology seeks to represent each payload bit substantially equally, in terms of strength, in the sparse output code. Substantially, as used in such method, here means within 10%, 20% or 50% of the average strength value for all payload bits.

Varying Amplitudes of Reference Signal Components to Aid Signal Robustness

This specification teaches various ways to increase the information efficiency and reliability of sparse signal encoding. Underlying all is the notion that black marks in the output signal frame are precious, and each should be utilized in a manner optimizing some aspect of signaling.

A limit to the amount of information that can be conveyed by sparse marking (or the robustness with which it can be conveyed) is the density of dots that are acceptable to customers, e.g., in blank areas and backgrounds of labels. Such labels are commonly applied to food items, and a customer perception that a label is “dirty” is antithetical to food marketing. This aesthetic consideration serves as a persistent constraint in sparse marking of such labels.

Applicant has found that, if the aesthetics of the marking are improved, then customers will accept a greater density of dots on the label. If dots can have a structured, rather than a random, pattern appearance, then the dots are regarded less as "dirtiness" and more as "artiness," and more of them can be printed.

In the prior art, the reference signal has been composed of multiple sine waves, of different spatial frequencies and (optionally) different phases, but of uniform amplitudes. Applicant has found that, surprisingly, individual spectral components of the reference signal can be varied in amplitude, without a significant impairment on detectability. By varying amplitudes of different components of the reference signal, different visual patterns can be produced in the sparse pattern.

Figure 34:
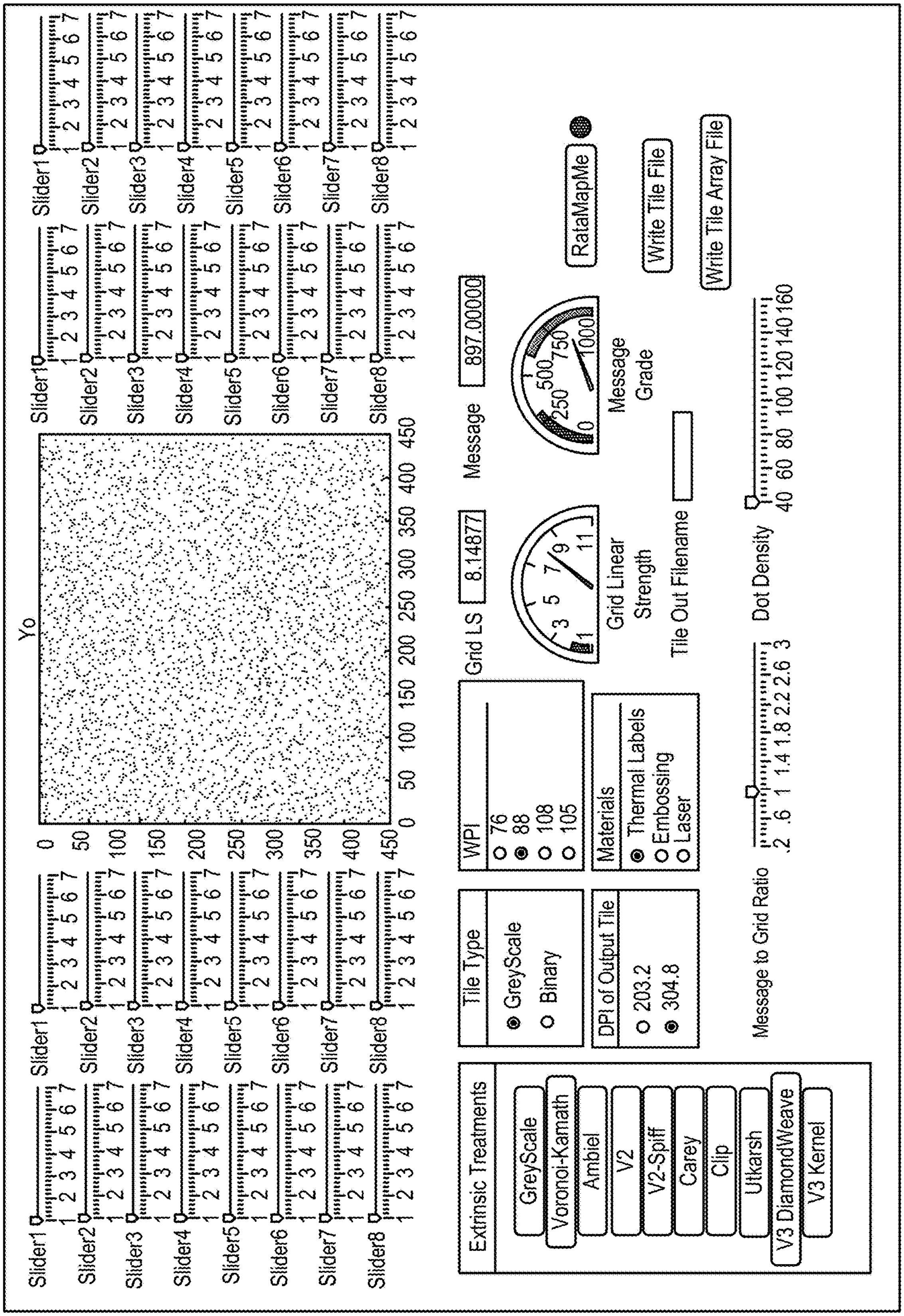
FIG. 34 shows a user interface of a software tool enabling the reference signal component of a composite mark to be tailored, resulting in a sparse mark that can include a visually-pleasing structure.

FIG. 34 shows the user interface (UI) of a software tool by which the visual appearance of sparse markings can be tailored. At the center of FIG. 34 is a rendering of the sparse mark presently being designed. The depicted sparse mark has a random aspect, because all the sliders (at upper right and left) are at their left-most positions.

To tailor the visual appearance of the sparse mark, a user operates these slider bars. Each slider bar controls the amplitude of a different one (or more) of the sinusoids that, collectively, define the reference signal.

At a slider's left-most position, a corresponding sinusoid signal is combined into the reference signal with weight (amplitude) of one. As the slider is moved to the right, the weight of that component signal is increased, providing a range that varies from 1 to 50. (In a different embodiment, a range that extends down to zero can be employed, but applicant prefers that all reference signal components have non-zero amplitudes.) As the sliders are moved, the rendering of the sparse mark at the center of FIG. 34 changes, correspondingly.

The buttons on the lower left enable the designer to select from between different extrinsic treatments. These buttons apply, e.g., different of the strategies detailed in this specification for combining the reference and payload signal components, and for selecting pixel locations from a composite mark for use in the output signal tile.

The gauges in the lower center of the UI indicate the strength of the reference signal and the message signal, as same are produced by models of the scanning and decoding process. (Same are detailed, e.g., in pending patent application Ser. No. 15/918,924, filed Mar. 12, 2018, now published as 20180352111, the disclosure of which is incorporated herein by reference.)

To implement the illustrated GUI, applicant employed the GUI Development Environment (GUIDE) of the popular Matlab software suite.

Some reference signals include sinusoid components of spatial frequencies that are too high to be perceptible to humans under normal viewing conditions (e.g., a distance of 18 inches, with illumination of 85 foot-candles), due to the human contrast sensitivity function. No sliders are usually provided for such higher frequency components, as their amplitudes do not noticeably affect the visible pattern. Instead, controls are provided only for the lower frequency reference signal components-those whose spatial frequencies are humanly perceptible. (The median amplitude value of the lower frequency sinusoids may be determined, and the amplitudes of these higher frequency sinusoids may be set to this median value.)

Figure 35:
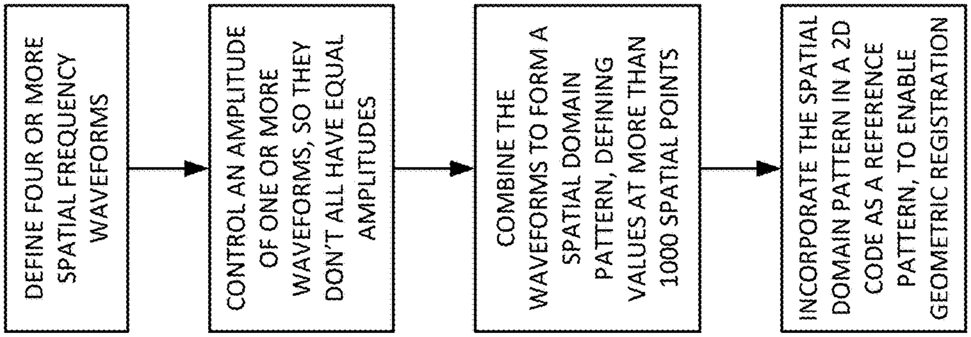
FIG. 35 is a flow chart associated with the technology of FIG. 34.

FIG. 35 shows a flow chart detailing aspects of this part of the technology.

Figure 36:
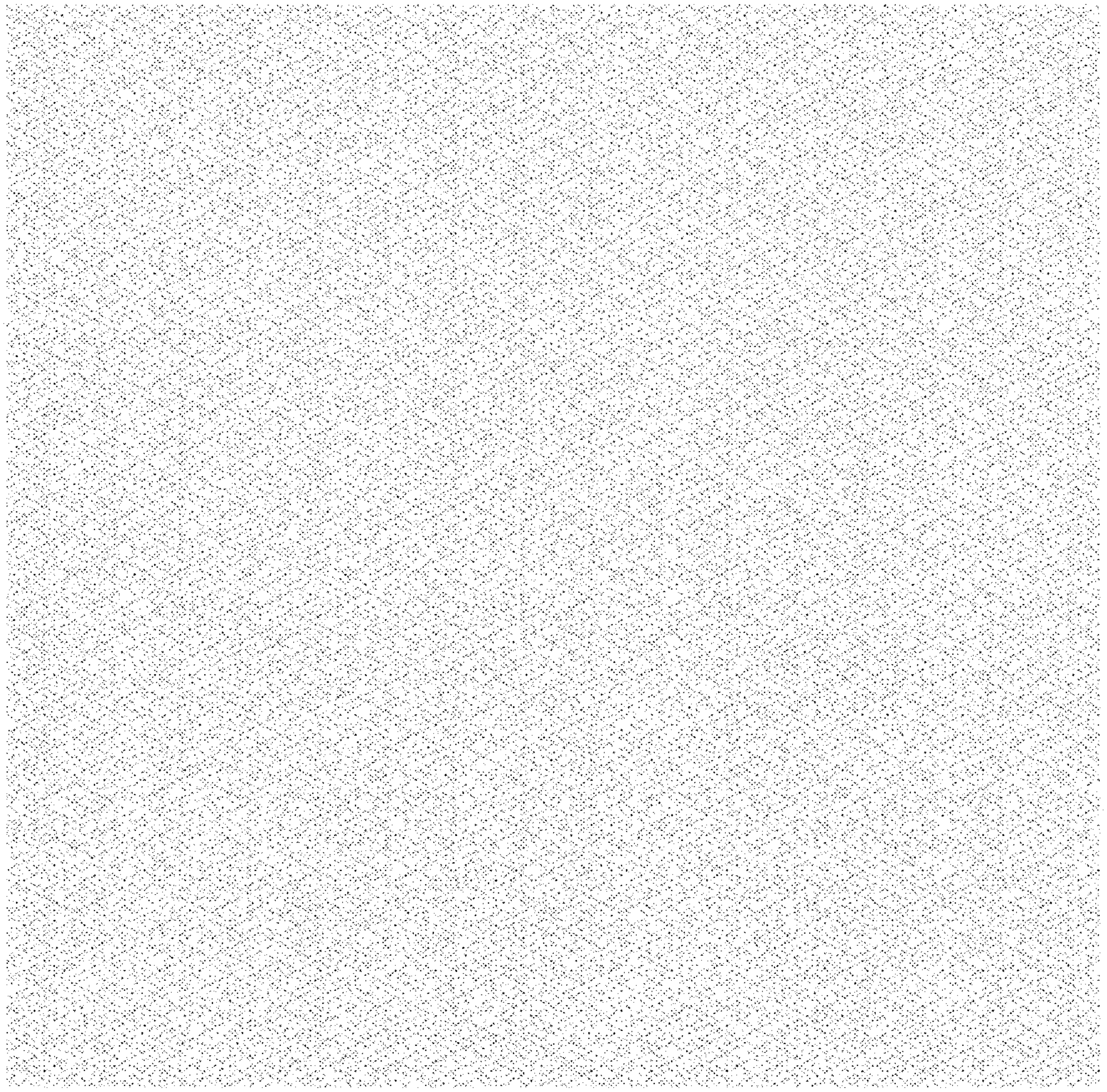
FIG. 36 shows a sparse mark produced by the software tool of FIG. 34.
Figure 36A:
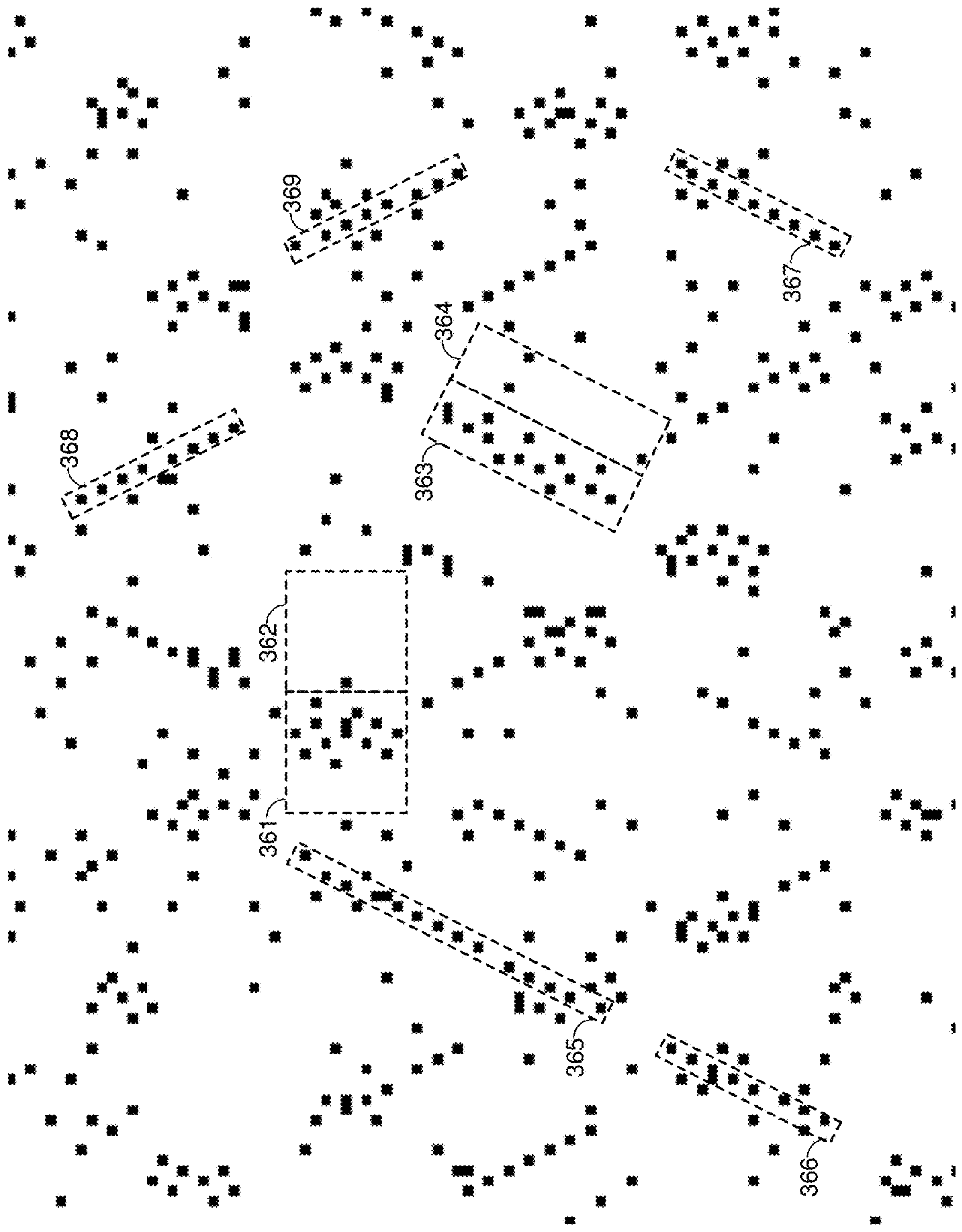
FIG. 36A is an enlargement taken from the upper left corner of FIG. 36.

FIG. 36, and FIG. 36A (which shows an enlarged excerpt from the upper left corner of FIG. 36), show an exemplary sparse mark resulting from unequal sinusoid amplitudes. As can be seen, the pattern is no longer purely random, but has diagonal patterning-akin to a herringbone weave. Instead of being perceived as "dirty," such an array of dots is often perceived as a textured background pattern that serves to contribute, more than detract, from a label's aesthetics.

The non-randomness of the markings in FIG. 36 can be quantified by counting the number of dots within adjoining areas of equal size. For example, square area 361 in FIG. 36A encompasses 13 dots. The adjoining square area 362 encompasses only one.

Likewise with the rectangular area 363 in FIG. 36A. It encompasses 15 dots, whereas the adjoining area 364 of same size encompasses only three.

Generally, a sparse pattern can be regarded as avoiding an appearance of randomness if a first rectangular area within the pattern encompasses a number, A, of dots and a second, adjoining rectangular area encompasses a number, B, of dots, where A is at least ten, and A is at least 200% of B. (Often A is 400% or 800% of more of B; in some cases B is zero.) These rectangular areas can be square, or one side can be longer than the other (e.g., at least three times as long—as in areas 363 and 364).

In many instances, the resulting sparse structure exhibits a diagonal effect. That is, the long sides of plural rectangles, 365, 366 and 367, that are sized and positioned to encompass the greatest number of dots in the smallest area, are parallel to each other, and are not parallel to any edge of the substrate to which the marking is applied. Often the diagonal effect is mirror-imaged about a central axis, leading to similarly dense groupings of marks aligned in rectangles of mirror-imaged orientation, as exemplified by rectangles 368 and 369 in FIG. 36A.

By a histogram function in Adobe Photoshop, the mean pixel value of an area of imagery can be found. For the FIG. 36A excerpt, it is 243.49, indicating that an aggregate 4.5% of the area is printed with black.

Figure 37:
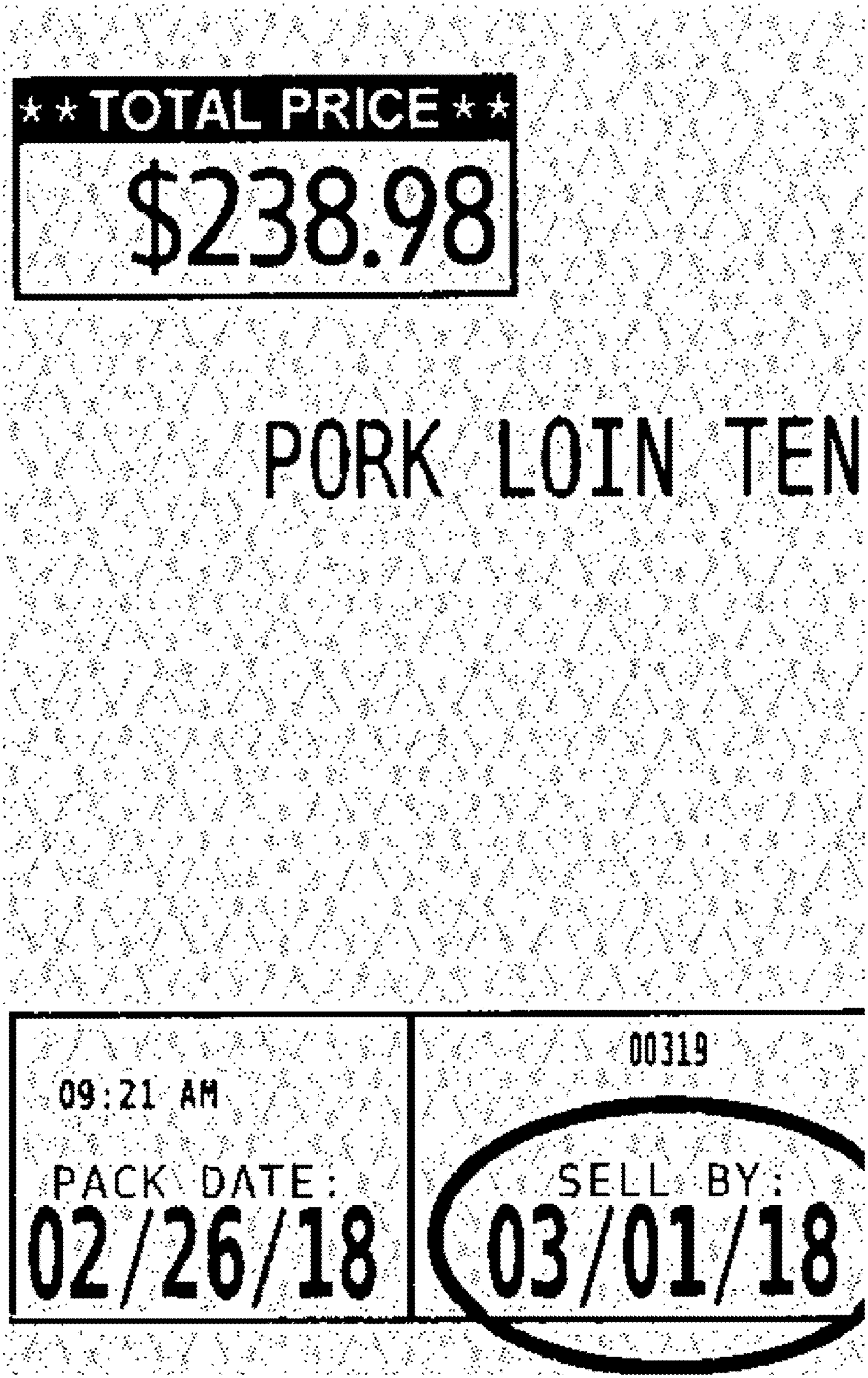
FIG. 37 is an enlarged excerpt of an adhesive label printed with a pattern produced by the software tool of FIG. 34.

FIG. 37 depicts an excerpt of a thermally-printed adhesive label including such a background marking. As can be appreciated, the marking is more decorative than dirty. Yet it conveys—redundantly and robustly—a payload that represents not only the item's GTIN identifier, but also its weight, its price, and its sell-by date (more information, by about twice, than the UPC-A barcode with which food items are commonly marked). If part of the label is damaged, the full information can nonetheless be recovered.

The FIG. 37 label includes clear borders ("keep-out zones" or "guard bands"), of several unprinted dots in width, around each of the text character strokes. By this strategy, the patterning does not impair readability of the text.

For a random pattern (like that shown in FIG. 34) to be as un-objectionable to shoppers as the pattern shown in FIG. 37, it would need to be much lighter in tint—often twice as light (half as dark). Even then, the preference of most consumers is for the structured pattern.

It will be recognized the signals illustrated in FIGS. 34, 36, 36A and 37 include both payload and reference signal components. The two components can be combined in any of the manners detailed in this specification. The tuning of the structured appearance is achieved by tailoring the reference signal component.

By using a reference signal comprised of sinusoids of not just different spatial frequencies but also of different amplitudes, information can be conveyed with a greater signal to noise ratio (i.e., a greater ink density) than would otherwise be commercially practical. Structured patterns with more than 10% ink coverage can be employed on text-bearing labels, with good consumer acceptance.

Data Signal Mapping

Figure 38:
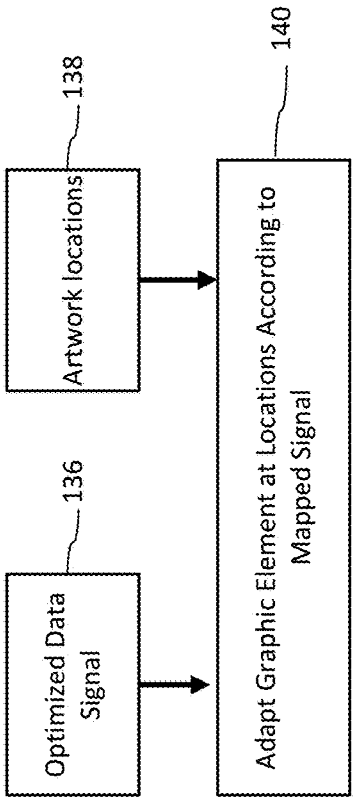
FIG. 38 is a diagram illustrating a method of mapping data signal elements to locations within host image artwork.

FIG. 38 is a diagram illustrating a method of mapping data signal elements to locations within host image artwork. In this embodiment, the optimized data signal components 136 from the earlier-discussed signal generation are mapped to host image artwork locations 138. In processing module 140, graphic elements are generated and/or adapted at the artwork locations.

Applying the method of FIG. 6, the payload is formatted into a binary sequence, which is encoded and mapped to the locations of a tile. For illustration, we describe an implementation of an N by M array of bit cells. The parameters, N and M are integers, and the tile is comprised of an N by M array of bit cells. The size of the tile is configurable and depends on application requirements, such as payload capacity per unit area, robustness, and visibility. Payload capacity increases per unit area with the increase in bit cells per unit area. This additional capacity may be used to improve robustness by redundantly encoding the payload in plural bit cells. Visibility tends to decrease with higher spatial resolution (higher spatial density of bit cells), as the HVS is less sensitive to changes at higher spatial frequencies. Examples of bit cell array sizes include 64 by 64, 128 by 128, 256 by 256 and 512 by 512. While each of these is square and has a dimension that is power of 2, the tile need not be so limited. The bit cells correspond to spatial locations within a tile. In particular, the spatial locations correspond to pixel samples at a configurable spatial resolution, such as 75-600 DPI. The payload is repeated in contiguous tiles of host image artwork. An instance of the payload is encoded in each tile, occupying a block of artwork having a size that depends on the number of bit cells per tile and the spatial resolution. The tile is redundantly encoded in several contiguous tiles, providing added robustness, as the detector accumulates signal estimates for a payload across tiles. Additionally, the entire payload may be extracted from a portion of a tile in configurations where it is redundantly encoded in sub-tile regions.

A few examples will help illustrate these parameters of a tile. The spatial resolution of the bit cells in a tile may be expressed in terms of cells per inch (CPI). This notation provides a convenient way to relate the bit cells spatially to pixels in an image, which are typically expressed in terms of dots per inch (DPI). Take for example a bit cell resolution of 75 CPI. When a tile is encoded into an image with a pixel resolution of 300 DPI, each bit cell corresponds to a 4 by 4 array of pixels in the 300 DPI image. As another example, each bit cell at 150 CPI corresponds to a region of 2 by 2 pixels within a 300 DPI image and a region of 4 by 4 pixels within a 600 DPI image. Now, considering tile size in terms of N by M bit cells and setting the size of a bit cell, we can express the tile size by multiplying the bit cell dimension by the number of bit cells per horizontal and vertical dimension of the tile. Below is a table of examples of tile sizes in inches for different CPI and number of bit cells, N in one dimension. In this case, the tiles are square arrays of N by N bit cells.

TABLE 1

| | Examples of Tile Size for Different Cells Per Inch (CPI) | | | | | |
|---|---|---|---|---|---|---|
| Tile Size (N) | 75 | 100 | 120 | 150 | 300 | 600 |
| 32 | 0.43 | 0.32 | 0.27 | 0.21 | 0.11 | 0.05 |
| 64 | 0.85 | 0.64 | 0.53 | 0.43 | 0.21 | 0.11 |
| 128 | 1.71 | 1.28 | 1.07 | 0.85 | 0.43 | 0.21 |

TABLE 1-continued

| | Examples of Tile Size for Different Cells Per Inch (CPI) | | | | | |
|---|---|---|---|---|---|---|
| Tile Size (N) | 75 | 100 | 120 | 150 | 300 | 600 |
| 256 | 3.41 | 2.56 | 2.13 | 1.71 | 0.85 | 0.43 |
| 512 | 6.83 | 5.12 | 4.27 | 3.41 | 1.71 | 0.85 |

These examples illustrate that the tile size varies with bit cells per tile and the spatial resolution of the bit cells. These are not intended to be limiting, as the developer may select the parameters for the tile based on the needs of the application, in terms of data capacity, robustness and visibility.

There are several alternatives for mapping functions to map the encoded payload to bit cell locations in the tile. In one approach, prioritized signal components from the above optimization process are mapped to locations within a tile. In another, they are mapped to bit cell patterns of differentially encoded bit cells as described in U.S. Pat. No. 9,747,656, incorporated above. In the latter, the tile size may be increased to accommodate the differential encoding of each encoded bit in a pattern of differential encoded bit cells, where the bit cells corresponding to embedding locations at a target resolution (e.g., 300 DPI).

For explicit synchronization signal components, the mapping function maps a discrete digital image of the synchronization signal to the host image block. For example, where the synchronization signal comprises a set of Fourier magnitude peaks or sinusoids with pseudorandom phase, the synchronization signal is generated in the spatial domain in a block size coextensive with the tile. This signal component is weighted according to the priority relative to the payload component in the above-described optimization process.

In some cases, there is a need to accommodate the differences between the spatial resolution of the optical code elements and the spatial resolution of the print or other rendering process. One approach is to generate the optical code signal at a target output resolution of the rendering process, as illustrated previously.

Figure 39:
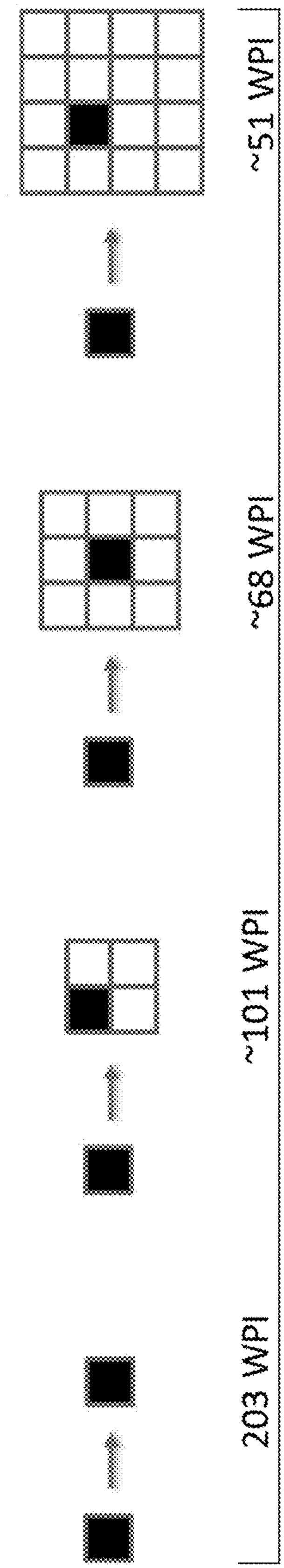
FIG. 39 shows examples of how to accommodate different optical code resolutions for a target output resolution, such as an image resolution for code insertion or for rendering a host image in which the code is inserted.

Another is to adapt or shape sparse optical code signal elements to transform the optical code resolution to the output resolution. Consider a case where the rendering device is a thermal printer with a spatial resolution of 203 DPI for label printing. FIG. 39 shows examples of how to accommodate different optical code resolutions for an output resolution of 203 DPI. In this example, the general term introduced above, CPI, is expressed as waxels per inch (WPI), where the bit cell is referred as a "waxel." On the far left, an optical code resolution of 203 WPI is a one-to-one mapping to the output resolution of the thermal printer at 203 DPI. In next case, an optical code resolution of approximately 101 WPI is obtained by mapping a dot in a bit cell of the optical code to one of the two by two pixel locations at the corresponding location in the output image at 203 DPI. In the next example, an optical code resolution of about 68 WPI is achieved by mapping a dot in a bit cell of the optical code to the center of the corresponding three by three pixel region in the output image at 203 DPI. The far right example shows a case of approximating a 51 WPI optical code resolution in the output image at 203 DPI.

The dot size of an optical code element is another variable that may be optimized in the above process. In implementations, we vary the dot size by building a dot in the output image from one, two by two or larger cluster of dots. For example, in this case the dot size is expressed as the width of a dot in the output image at the output image DPI.

Figure 40:
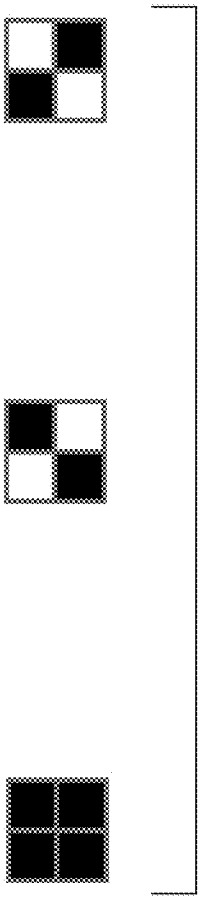
FIG. 40 illustrates dot pattern variation to achieve improved visual quality and robustness.
Figure 41:
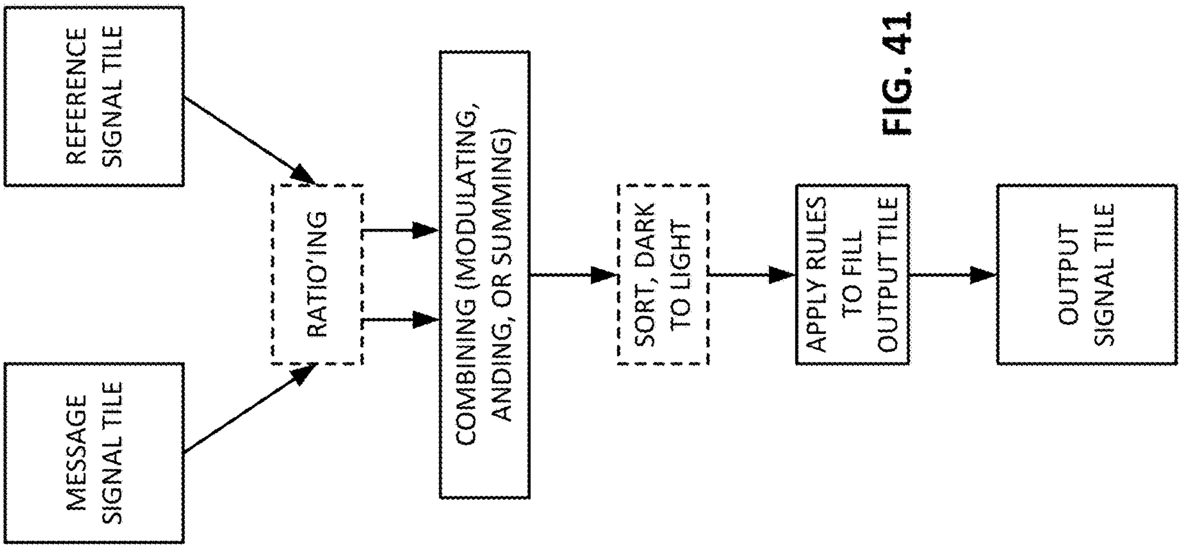
FIGS. 41 and 42 illustrate methods incorporating certain aspects of the present technology.
Figure 42:
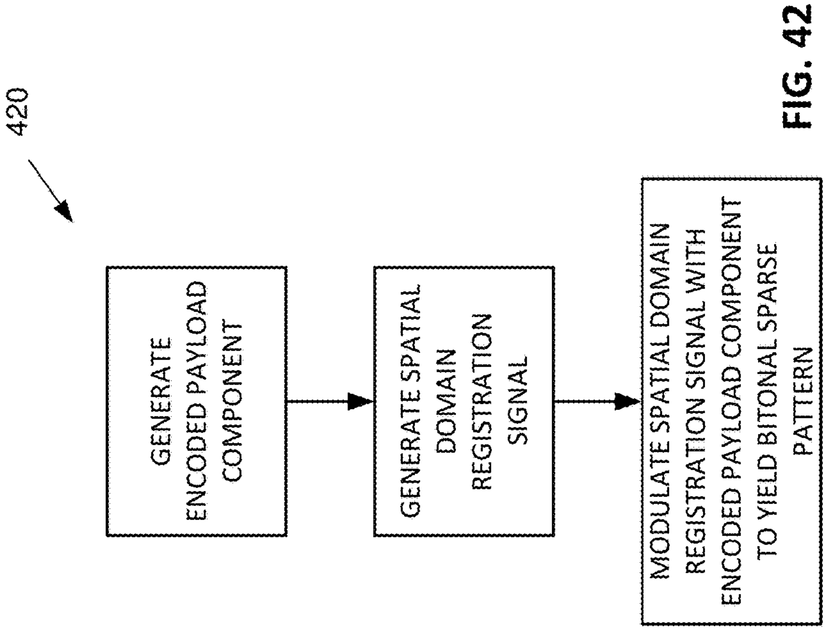

FIG. 40 illustrates dot pattern variation to achieve improved visual quality and robustness. In addition to varying dot size, the configuration of a dot may be altered to improve visual quality or robustness. The dot size of the dot configuration on the left is a size 2, meaning that it is comprised of a cluster of two-by two dots at the output resolution of the optical code. The desired spatial resolution may be obtained with better visual quality by varying the configuration as a function of spatial position in the tile. For example, the middle and right dot clusters of FIG. 40 encode the same optical code element as the two by two cluster on the left, yet do so with a different dot cluster configuration that provides a higher visual quality. Additionally, this variation achieves similar robustness, even as thermal print elements fail, because at least a portion of the dot cluster will remain in the event of failure of a print element that prints one of the columns of dots passing through this dot cluster.

ADDITIONAL DISCLOSURE

Referring to FIGS. 41, 42, 32, 44A, 44B, 45 and 46, the following discussion further elaborates on one particular embodiment 420 of the arrangements described earlier.

As in the arrangement of FIG. 5, two signal components—payload and reference—are first determined. One is used to modulate the other. However, rather than modulate phases of reference signal components (or on/off-keying of such components), embodiment 420 identifies positions of local extrema in the spatial domain reference signal, and forms marks (dots) in an output signal block at such positions—depending on a value of a spatially-corresponding element of the payload signal.

Figure 43:
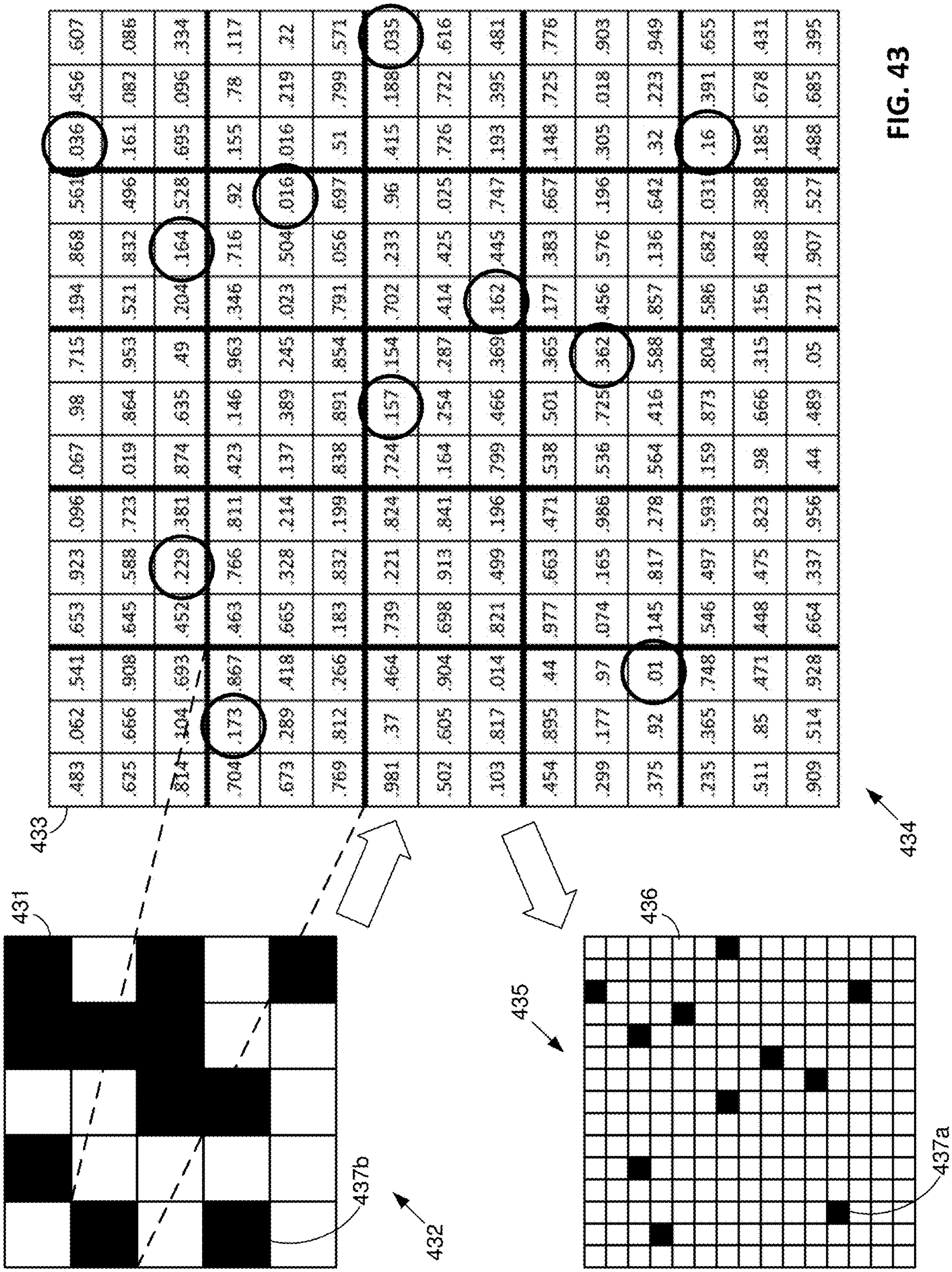
FIG. 43 illustrates modulation of a reference signal component with a payload signal component, according to one aspect of the technology.

FIG. 43 illustrates an excerpt 431 of an encoded payload component block 432 (which may also be termed a message data array). This part is comprised of an array of signal elements, each drawn from a set of two possible values (e.g., {0,1}, {−1,1} or {black, white}). The depicted excerpt spans an area of just 5×5 elements, but the full payload component block is typically much larger, e.g., having 16, 32, 64 128 or 256 elements (e.g., pixels) on a side. The payload component block is commonly square, but need not be. More generally, it may be regarded as having dimensions of I×J signal elements.

FIG. 43 also shows an excerpt 433 of a reference signal block 434 (sometimes termed a spatial registration data array). This block comprises a 2D array of real numbers, here ranging from 0 to 1. As earlier noted, the reference signal can comprise the summation of multiple sine wave components of different frequencies, which may have different phases. The illustrated numbers are determined by summing these spatial sine wave components at regularly-spaced points across the reference signal block 434. Where the waves destructively interfere (yielding a trough), the sum is smaller-nearer zero. Where these sine waves constructively interfere (yielding a peak), the sum is larger-nearer one.

(It will be recognized that excerpt 433 of the reference signal block is similar to excerpt 72 shown in FIG. 7. However, in FIG. 7, the reference signal is composed of values ranging from 0 to 255, and are quantized to integer values, yielding the depicted greyscale representation. Dark pixels in FIG. 7 would be represented by real numbers nearer zero in FIG. 43; light pixels would be represented by real numbers nearer one.)

Again, the reference signal block 434 is typically square, but need not be so. More generally, it may be regarded as having dimensions of M×N elements. M is typically larger than the I dimension of the payload component block 432, and N is typically larger than the J dimension of the payload component block.

Since the reference signal block here employs non-integer data, its element values may be stored as floating point data in the memory of a computer system performing the detailed method.

Ultimately, corresponding spatial portions of the payload component block 432 and the reference signal block 434 are processed together to produce a spatial portion of an output signal block 435. The spatial correspondence between portions of the payload component block and the reference signal block can be regarded as a mapping, in which each element of the payload component block maps to a location in the reference signal block. In the FIG. 43 example, each element of the payload component block maps to nine elements in the reference signal block, as shown by the dashed lines linking excerpt 431 and 433 (and by the bold lines in excerpt 433—demarking 3×3 regions of elements). In the detailed embodiment, the output signal block is of the same dimensions as the reference signal block, i.e., M×N elements.

In an exemplary embodiment, the payload component block may be 128×128 elements (i.e., I=J=128), and the reference signal block (and the output signal block) may be 384×384 elements (i.e., M=N=384).

In accordance with a particular embodiment, each dark element in the output signal block 435 is due to a corresponding dark element in the payload component block 432. For example, dark signal element 437*a* in the output signal block is due to dark signal element 437*b* in the payload component block.

More particularly, for each of plural dark signal elements 437*b* in the payload component block, this particular method performs the following acts:

(a) determining the location in the M×N registration data array to which the dark signal element in the payload component block spatially corresponds;

(b) identifying K neighboring elements in the M×N registration data array nearest this determined location, where K≥4 (e.g., K=9);

(c) identifying which of these K elements in the reference signal block has an extremum value (e.g., a minimum value);

(d) identifying among these K (9) neighboring positions in the 384×384 element reference signal block, a first position at which the extreme value is located (and conversely, identifying the other eight positions as locations where this extreme value is not located); and (e) in the 384×384 element output block, setting to one value (e.g., dark) an element at the identified first position, and setting to a different value (e.g., light) elements at the eight other, second positions.

In a preferred embodiment, these acts are performed for every dark element in the payload component block. Thus, the number of dark elements in the 128×128 payload component block 432 is the same as the number of dark elements in the 384×384 element output block 435. In other embodiments, however, a subset of the dark elements in the payload component block can be so-processed, yielding fewer dark elements in the output block than in the payload component block.

The just-detailed process forms a 2D output code that represents both the message data and the reference signal data. These two components are represented in a proportion that favors the message data. This makes the resulting output code particularly suited for printing on items that have other structures that can aid in establishing spatial registration, e.g., physical edges or printed borders that are parallel to edges of the output signal blocks that can serve as references to help establish the rotation and translation of the output signal blocks, and overt patterns (e.g., logos or text) whose scale in captured imagery can be used to help estimate the scale of the output signal blocks.

In a particularly preferred embodiment, the I×J (e.g., 128×128) message data (payload) array comprises equal numbers of elements having the first and second values. For example, there may be 8192 dark elements and 8192 light elements. In such embodiment, the above-detailed acts (a)-(e) are performed for each of the 8192 dark elements.

Since half of the elements of the message array are light, half of the 3×3 neighborhoods of elements in the output code are also light. Of the other 3×3 neighborhoods in the output code, each has one dark element out of nine. Overall, then, one-eighteenth of the elements in the output code are dark (and 17/18ths are light).

In other embodiments, essentially equal—or approximately equal—numbers of elements in the message data array are light and dark. ("Essentially" equal, as used herein, means within 5%; "approximately" equal means within 20%).

In FIG. 43, there is an integer relationship between dimensions of the message data array 432, the reference signal tile 434, and the output signal tile. In particular, each element in the message data array corresponds to nine elements in both the reference signal tile and the output signal tile.

Of course, other integer relationships can be employed. For example, each element in the message data array can correspond to four elements, or 25 elements, in both the reference signal tile and the output signal tile, etc.

In still other embodiments, non-integer relationships can be used. That is, M need not be an integer multiple of I (nor N be an integer multiple of J).

Figure 44A:
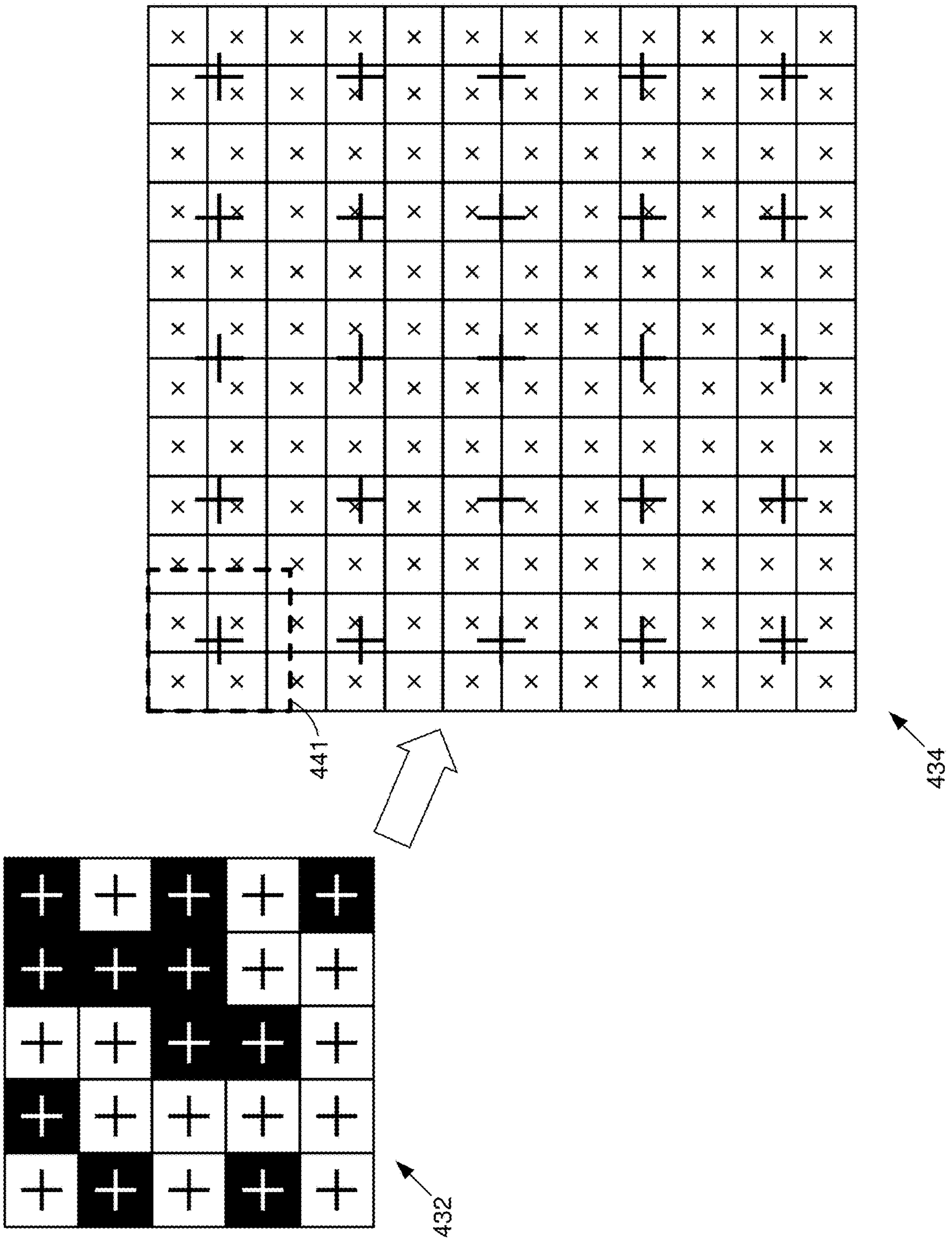
FIGS. 44A and 44B illustrate a variant of the FIG. 43 arrangement.
Figure 44B:
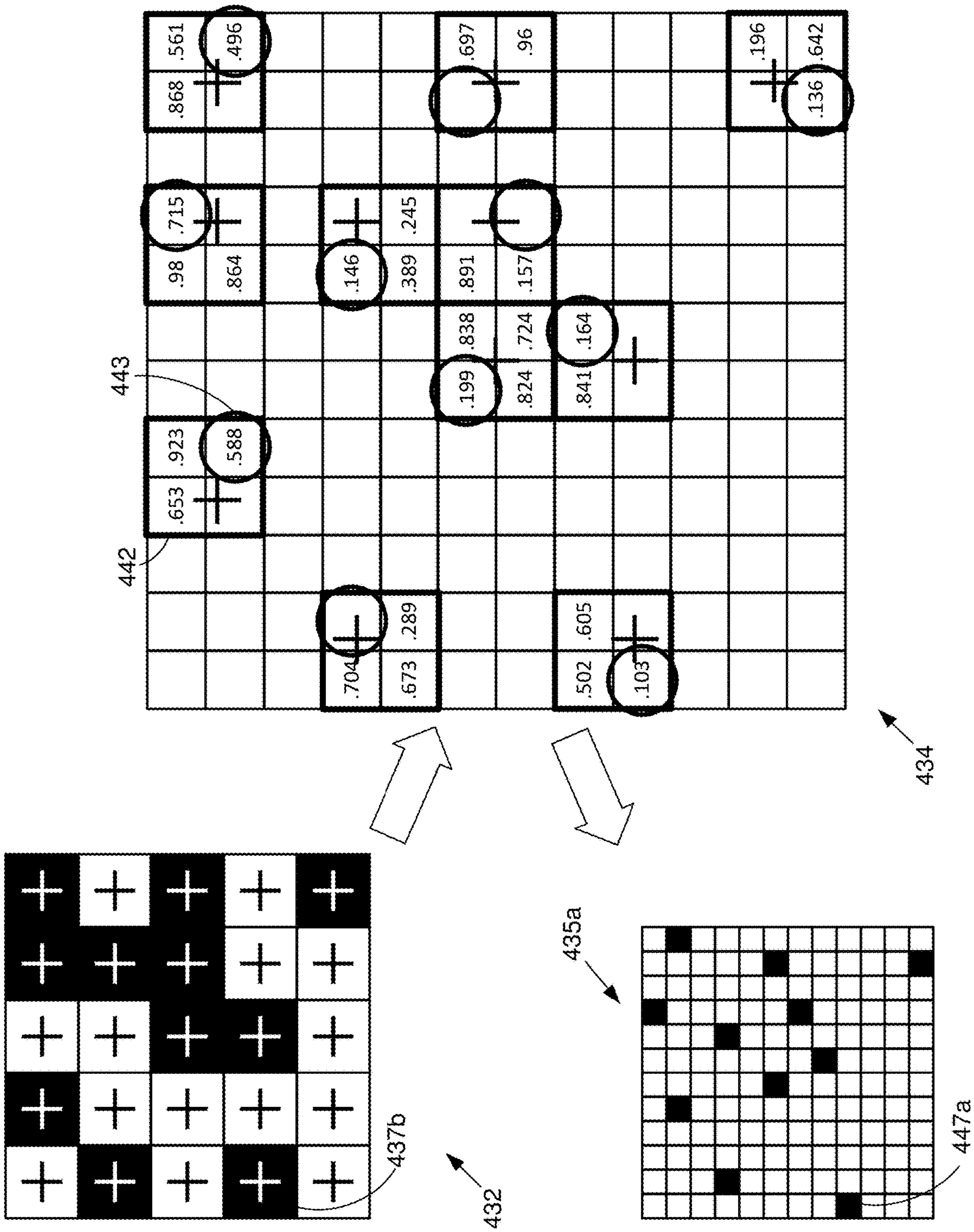

FIGS. 44A and 44B show such an embodiment. M is 2.4 times I (and N is 2.4 times J). Each element of the message signal array thus spatially corresponds to 5.76 elements in both the reference signal tile and the output signal tile. This spatial correspondence is shown by "+" markings in the center of each element in the message signal array 432, and its mapping onto a corresponding location in the reference signal tile 434. A dashed box 441 surrounds an element area in the reference signal tile that corresponds to a single element in the message signal array.

In such embodiment, the extremum value (per act (b) above) is taken from a 2×2 set of neighboring element values in the reference signal tile. One of these four elements is the element in which the mapped "+" sign falls. The others are the three elements nearest the "+" signs. One set of four elements 442, and the extremum (minimum 443) from such set, are labeled in FIG. 44B. (The values of the reference signal elements in FIG. 44B are taken from the upper left portion of the corresponding reference signal elements in FIG. 43.)

Applying acts (a)-(c) for each of the dark elements in the message signal array 432 of FIG. 44B, yields the output signal tile 435*a*. As before, each dark element in output signal tile 435*a* (e.g., 447*a*) has a counterpart dark element in the message tile array 432 (e.g., 437*b*).

Figure 45:
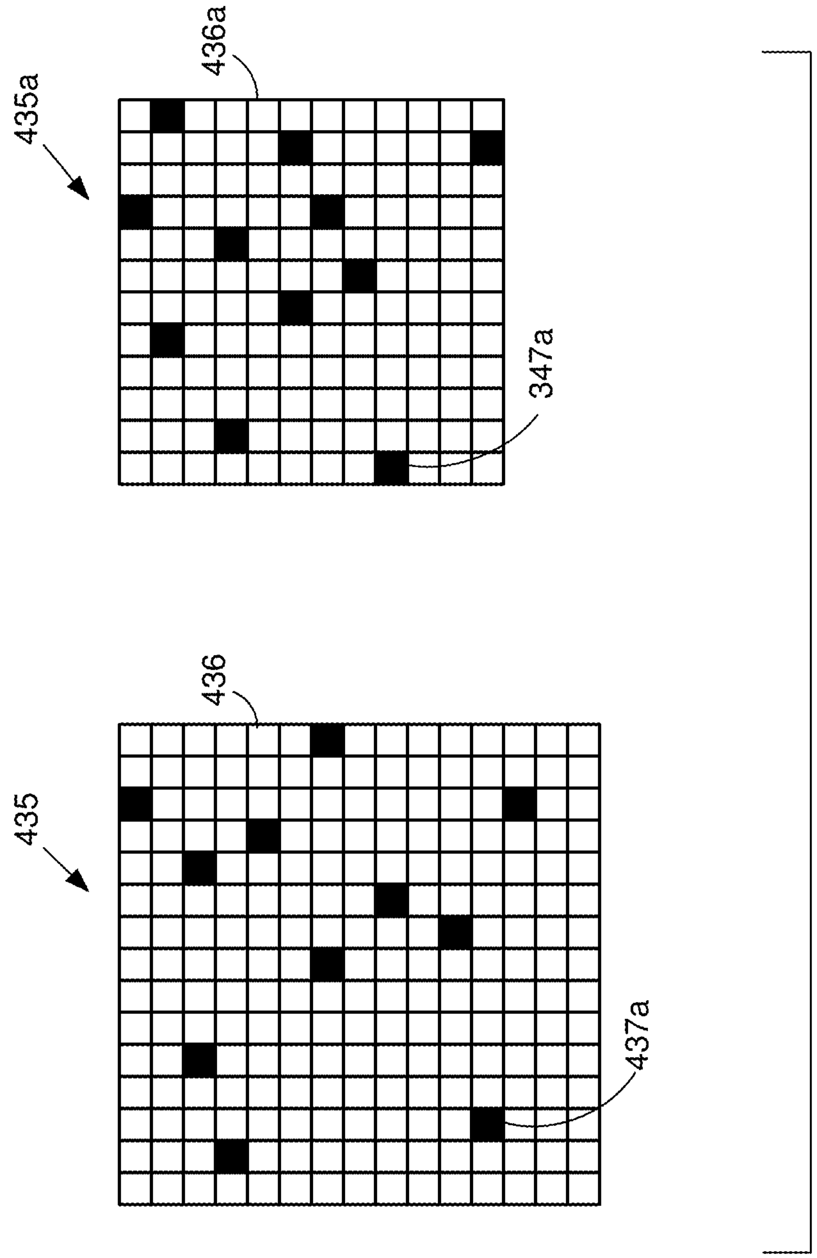
FIG. 45 compares excerpted outputs from the arrangement of FIG. 43, versus the arrangement of FIGS. 44A/44B.

FIG. 45 compares the portion (436) of the output signal tile 435 produced from the FIG. 43 arrangement (mapping each message signal element to 9 elements from the reference signal array), with the corresponding portion (436*a*) of the output signal tile 435*a* produced from the FIG. 44B arrangement (mapping each message signal element to 5.76 elements from the reference signal array). Each dark element in one portion has a counterpart in the other. But there are more elements in portion 436, so it is printed with a lighter density (1/18th, or 5.55%) than portion 436*a* (which is printed with a density of 1/(2*5.76) or 8.68%).

The density of dots in the printed output can thus be varied by changing the ratio between the number of elements in the message signal array, and in the reference signal array. In usual practice, the message signal array is of a fixed size (e.g., 64×64 elements, or 128×128 elements). The reference signal tile, in contrast, can be set to any size, simply by adjusting the interval with which the continuous functions of which it is composed (e.g., sine waves) are sampled. If all the arrays are square (I=J and M=N), then the print density (tint) can be determined by the equation:

$$PrintDensity = 1/\left(2*\left(M/I\right)^\wedge 2\right)$$

If the M/I ratio can be set arbitrarily, then the print density can be tailored to any desired value by the equation:

$$M/I = SQRT\left(1/(2*\text{Print Density})\right)$$

Thus, if the message signal array is 128×128 elements, and a print density of 5% is desired, then the continuous reference signal should be sampled to produce an array of 405×405 elements. If a print density of 10% is desired, then the reference signal should be sampled to produce an array of 202×202 elements. Etc.

There is, additionally, the issue of mapping the signal tile to the print environment, which can place certain constraints on the implementation. As noted, a printer for adhesive labels may employ a linear array of thermal elements spaced at a density of 203 per inch (dpi). One approach picks a desired number W of code elements (waxels) per inch for the message array. The full message tile then measures, e.g., 128/W inches on a side (if the message tile is 128×128 waxels). A prime number can be used for W, such as 89. In this case, the full message tile measures 128/89, or 1.438 inches on a side. At 203 dpi, this requires (1.438 inch*203 dots/inch)=292 dots on a side for the output tile. The reference signal can be sampled to produce a 292×292 array, to which the 128×128 message array is mapped. The center of each element in the message array is then mapped to a point in the reference signal array as shown in FIG. 44B. Values of the four nearest elements in the reference signal array are examined to identify a minima, and a corresponding position in the output signal tile is then marked, as described above and shown in FIG. 44B.

In the example just-given, M/I=292/128, so the print density is 9.6%

Comparing the two output signal excerpts in FIG. 45, it will be seen that positions of the dark elements are relatively shifted in output signal portion 436*a* vs. output signal portion 436. For example, dark elements 437*a* and 447*a* both correspond to the same element in the message signal array. But one is on the border of the output signal excerpt, and the other is not. This is because this element of the message signal array is mapped to different regions of the reference signal array, due to the different scale of the mappings.

Exemplary Matlab code to perform the above-detailed algorithm is detailed in FIG. 46.

As indicated, the present technology can be used in printing adhesive labels for application to supermarket items (e.g., bakery, deli, butcher, etc.). Such labels are characterized by straight, perpendicular edges. They often commonly include printed straight lines-either as borders or as graphical features separating different of the printed information. They also typically include one or more lines of printed text. All of these printed features are composed of closely-spaced black dots, printed in regularly-spaced rows and columns (e.g., spaced 203 rows/columns to the inch). Due to their regular arrangement, such printing exhibits characteristic features in the spatial frequency domain, which are evident if an image is captured depicting the printed label (a "query image"), and such image data is transformed by a fast Fourier transform.

The spatial frequency data resulting from such an FFT applied to a query image ("query FFT data") can be compared to a template of reference FFT data for labels of that sort. This template can comprise spatial frequency data resulting when a label image of known orientation (edges parallel to image frame), and of known scale, is transformed by an FFT. By comparing the query FFT data with the reference FFT data, the affine distortion of the query FFT data can be estimated, which in turn indicates the affine distortion of the query image. A compensating counter-distortion can be applied to the query image, to place the image squarely in the frame at a known scale. This counter-distorted query image can then be submitted to a decoding algorithm for further refinement of the image pose (using the reference signal component), and for decoding of the plural-bit payload. (Refinement of pose can employ the least squares techniques detailed in our patent publication 20170193628, or the AllPose techniques detailed in our published patent application Ser. No. 20180005343 and our pending patent application Ser. No. 16/141,587, filed Sep. 25, 2018, now U.S. Pat. No. 10,853,968. These documents are incorporated herein by reference.)

Figure 47:
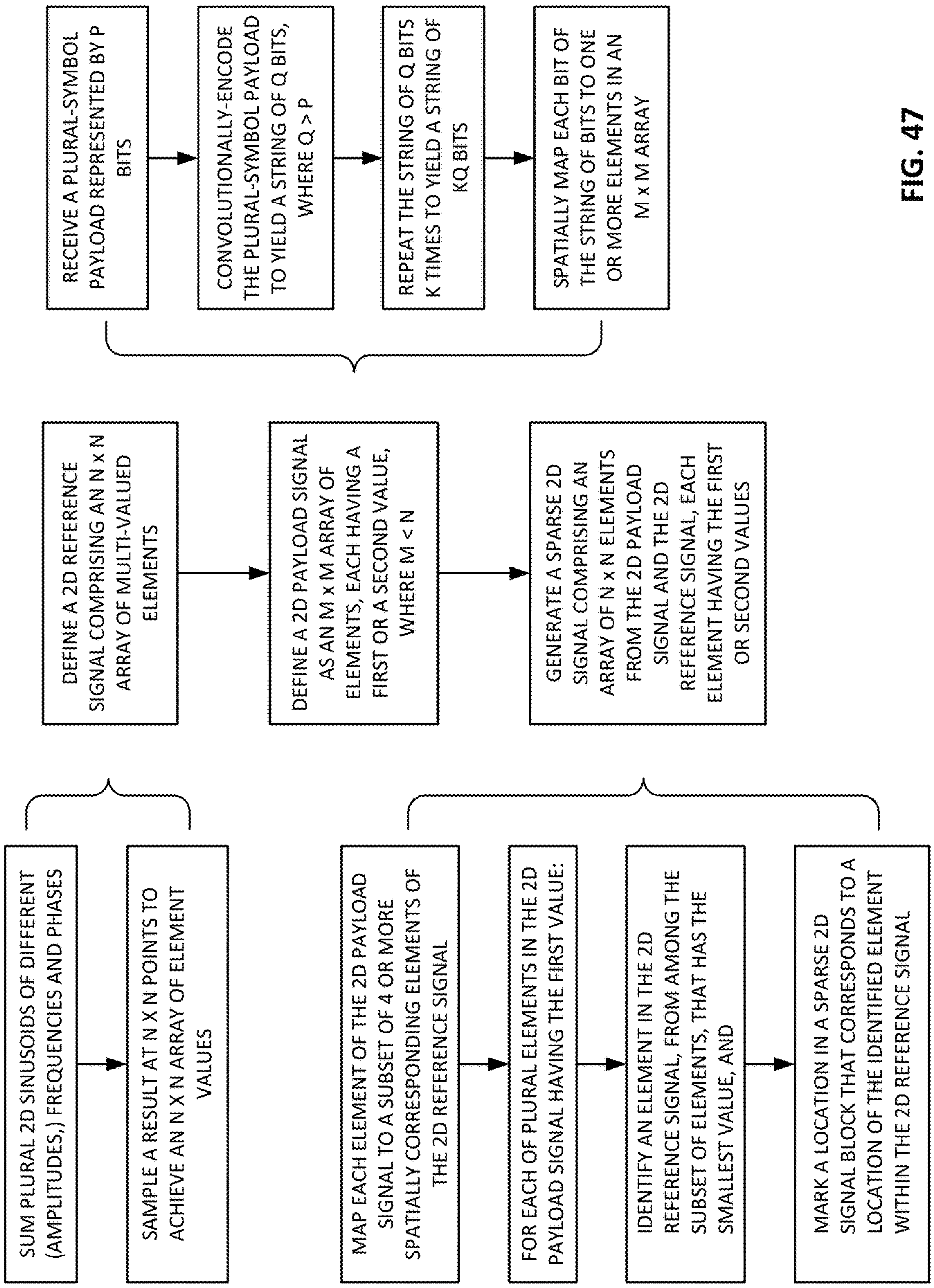
FIG. 47 is a flow chart illustrating aspects of the technology.

FIG. 47 includes flowcharts illustrating aspects of the foregoing. The central three blocks identify high level steps. The bracketed flow charts to the sides detail particular algorithmic acts that can be used to perform the corresponding steps.

For brevity's sake, the foregoing discussion has not repeated details provided elsewhere in the specification, e.g., concerning formation of the encoded payload component, formation of the reference (registration) signal component (optionally with a structured appearance), controlling dot density and placement constraints, resizing signal arrays, inverting the signal using holes in a darker surround, etc., etc., which artisans will recognize are equally applicable in the just-detailed arrangements.

Use of Sparse Marks in Approximating Greyscale Imagery

As is familiar, greyscale newspaper photographs can be represented in bitonal fashion using black dots on a white background, or vice versa. This is often termed half-toning. So, too, can greyscale photographs be rendered with sparse marks.

This section builds on work earlier detailed in our U.S. Pat. No. 6,760,464. That patent teaches that a digital watermark may be embedded into a halftone image by using the digital watermark signal as a halftone screen. In one particular embodiment, watermark blocks are created at different darkness levels by applying different thresholds to a dense watermark block having a mid-grey average value (i.e., 128 in an 8-bit system). At each pixel in the host image, the gray level corresponds to a threshold, which in turn, is applied to the dense watermark signal at that location to determine whether to place a dot, or not, at that location.

In one embodiment of the present technology, various sparse blocks of different dot densities (ink coverages) are pre-computed and stored in look up tables. At each pixel in the host image, a corresponding block is accessed from the lookup tables, and a pixel—indexed by pixel location within the block—is copied to an output image. That is, dot density of a sparse code is locally varied in accordance with greyscale image data.

Figure 48A:
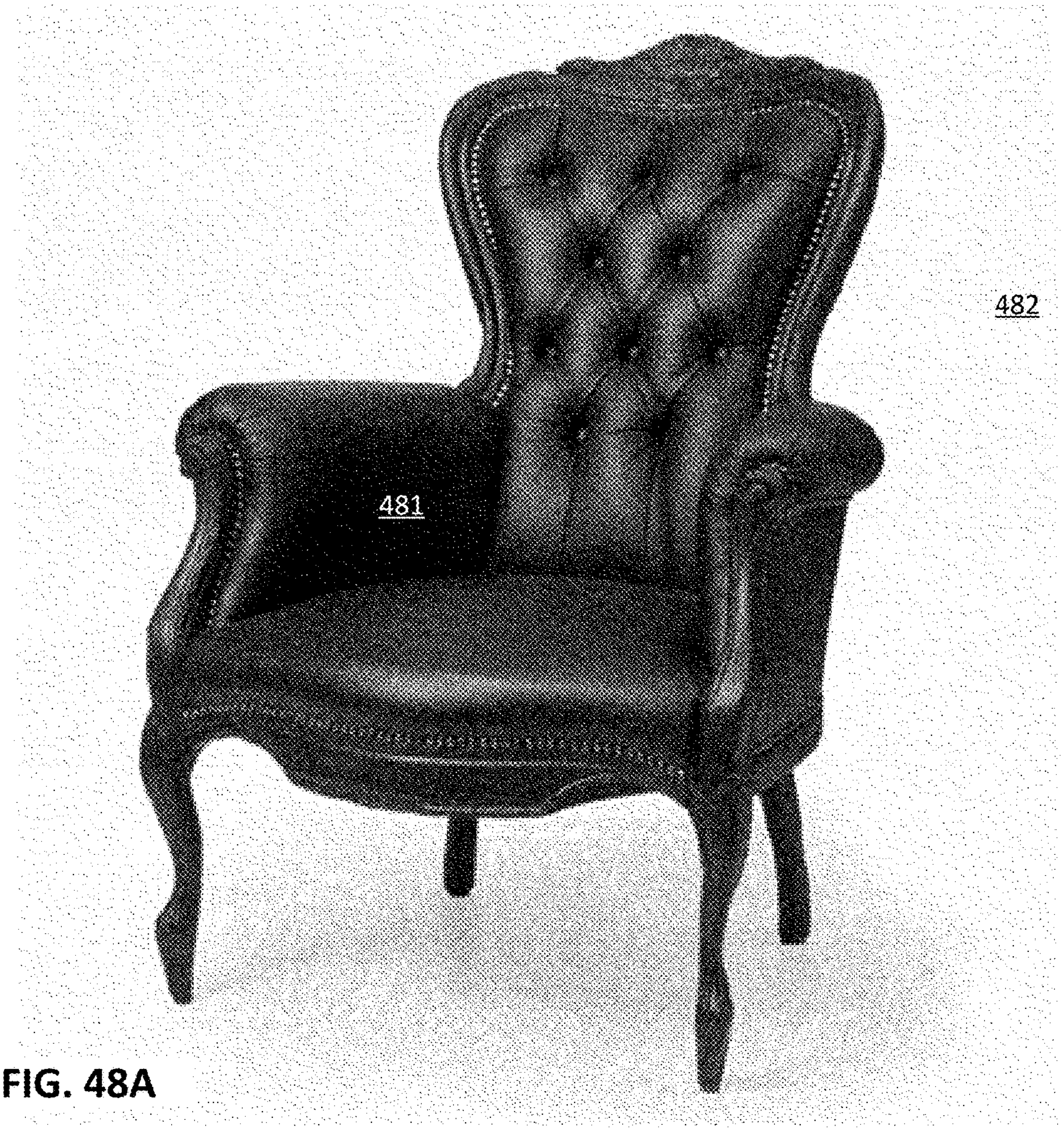
FIG. 48A shows a greyscale image of a chair.
Figure 48B:
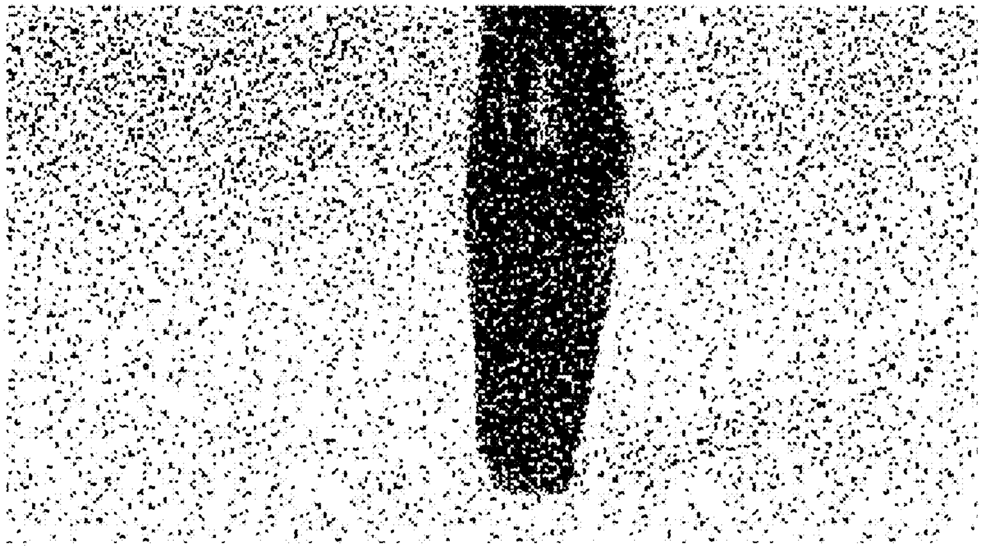
FIG. 48B shows an excerpt of this image as rendered with sparse code signals.

FIG. 48A shows an exemplary grey scale image of a chair. (Due to limitations of patent drawing reproduction, this is actually not a greyscale image, but the effect is similar.) FIG. 48B shows an enlarged excerpt showing the chair's leg, rendered by the present method from sparse blocks. Each greyscale pixel in the original image is associated with a position within a tiled array of sparse blocks. A dot, or not, is written to an output frame by examining that position within a sparse mark in the lookup table having a dot density corresponding to that pixel (greyscale) level.

Figure 49:
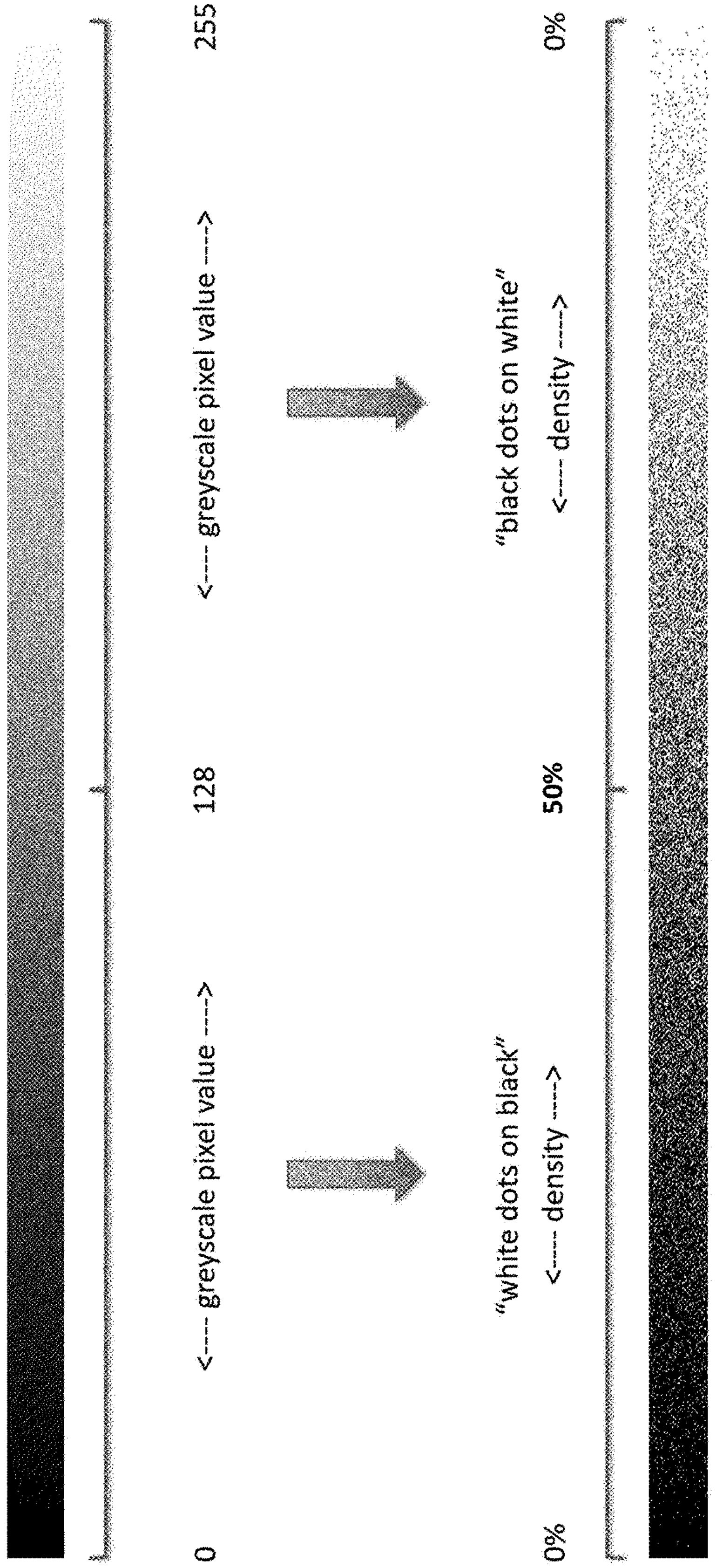
FIG. 49 shows how greyscale values relate to different sparse patterns.

FIG. 49 shows the correspondence between grey scale levels and sparse markings. Greyscale levels between 0 and 127 are formed by white dots on a black background (ranging from 0% to 50% dot coverage). Greyscale levels between 128 and 255 are formed by black dots on a white background (ranging from 50% to 0% dot coverage). There may be a different sparse pattern for each of the 254 greyscale values between 1 and 254. Or plural greyscale values may map to a single sparse pattern. For example, greyscale values of 0-15 may map to the darkest sparse pattern (e.g., with an average ink coverage of 97%); values 16-31 may map to the next-darkest sparse pattern (e.g., with an average ink coverage of 91%), and so forth, up til values of 240-255, which map to the lightest sparse pattern (e.g., with an average ink coverage of 3%).

Returning to FIG. 48A, it will be recognized that at very dark tones, and at very light tones, there is not much signal. Thus, if a camera is zoomed-in to capture an image comprising just the dark area around reference numeral 481, decoding may be difficult or impossible. Likewise the light area around reference numeral 482. However, if the camera captures an area that includes other regions, then the payload can be readily recovered.

The fidelity of reproduction by this method depends, in part, on the elemental size of the sparse mark dot. FIG. 50A shows an excerpt of a greyscale lion photograph, converted to sparse form, with each dot being a single pixel. FIG. 50B shows the same excerpt, but with each dot being a 4×4 cell of pixels. (The former is sometimes termed "bump size 1" and the latter is sometimes termed "bump size 4.") Although, aesthetically, the smallest bump size may be desired, it packs the block into the physically-smallest spatial extent. As such, it requires that the camera be placed relatively close to the printed subject for signal detection/decoding. Often human factors of, e.g., smartphone, interaction with printed objects, indicate a greater reading distance should be used, leading to common use of bump sizes 2 and 3.

More on Use of Sparse Marks in Approximating Greyscale Imagery

In a further embodiment, a reference signal and a message signal are combined in a desired weighting, as discussed above in connection with FIGS. 10-22, to yield a dense greyscale signal. N different levels of print density can be defined. For example, N can be 19, corresponding to ink coverages of 5%, 10%, 15%, . . . 95%. The 5% print density is achieved by selecting the lowest value pixels, subject to a keep-out distance constraint, until 5% of the pixels have marks. Similarly for 10%, 15%, etc.

The 95% coverage is achieved by selecting the highest value pixels (the whitest) for marking on a black background, subject to the keep-out distance constraint, until 5% of the pixels are white-marked. Similarly for 90%, 85%, etc.

In a particular embodiment, different print densities are achieved by setting different keep-out distances. At a 5% print density, a keep-out distance D1 is maintained. At a 10% density, a keep-out distance D2 is maintained, where D2≤D1. At a 15% density, a keep-out distance D3 is maintained, where D3≤D2. Etc.

Things are reciprocal at the other end of the print density spectrum, where white marks are formed on a dark background. At a 95% print density, a keep-out distance D19 is maintained. At a 90% print density, a keep-out distance D18 is maintained, where D18≤D19. And so forth.

In some but not all embodiments, D1=D19; D2=D18; etc.

To implement such arrangement, the pixel values in the dense greyscale signal are sorted by value, and are associated with their respective locations. A 5% print density region may be achieved by setting the keep-out distance to the value D1. The lowest-valued greyscale pixel in the dense signal is copied, as a dark mark, to a corresponding position in the output frame. The next-lowest valued pixel in the dense signal is examined to determine whether it is at least D1 pixels away from the previous pixel. If so, it is copied, as a dark mark, to a corresponding position in the output frame; else it is skipped. The next-lowest valued pixel in the dense signal is next examined to determine whether it is at least D1 pixels away from the previously-copied pixel(s). If so, it is copied, as a dark mark, to a corresponding position in the output frame; else it is skipped. This process continues until 5% of the pixel locations in the output frame have been marked.

A 10% print density region is achieved by setting the keep-out distance to D2 pixels. A similar process follows, to generate a print density region marked with 10% ink coverage. A 15% print density region may be similarly achieved by setting the keep-out distance to D3 pixels, and repeating the process.

The keep-out distance constraint becomes difficult for 50% print density, and nearby values. A 50% density requires equal numbers of dark and white marks; some must adjoin—if only diagonally. The most-sparse 50% pattern is a checkerboard, or its inverse.

In converting mid-grey values to sparse, the designer can go different routes. One is to simply adopt a conventional dither pattern (e.g., a uniform 50% checkerboard), and encode no information in such regions. Another is to put dark marks at the darkest 50% of the locations in the dense signal block, without regard to adjacencies. This can result in a splotchy effect, but provides a strong encoded signal. In other arrangements, the two methods can be used in combinations—with some areas using a dither pattern selected for its regular-looking appearance, and other areas marked based on the darkest 50% of the dense signal—without regard for spatial uniformity.

In the former case, the signal strength, as a function of print density, has an M-shaped curve, with little signal strength at print densities of 1-3% and 97-99%; none at 50%; and peaks between these two values. In the latter case the signal strength is single-lobed, with a maximum at 50%, and tapering to 0 at 0% and 100%.

While keep-out regions are commonly conceived as circular in extent, they need not be so. Applicant has found that other keep-out regions often offer better control of simulated grey tones. FIGS. 51, 52A, 52B, 53 and 54 illustrate why.

Figure 51:
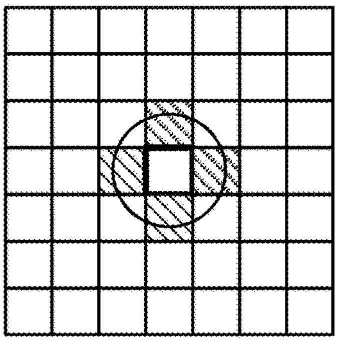
FIGS. 51, 52A, 52B, 53 and 54 illustrate the number of pixel locations excluded from marking by different keep-out distances.

FIG. 51 shows, in cross-hatching, four pixels excluded from marking by a keep-out distance of 1.2 pixels. (In this discussion, a pixel is excluded if its center falls less than the threshold distance from the center of the to-be-marked pixel, shown in bold.)

Figure 52A:
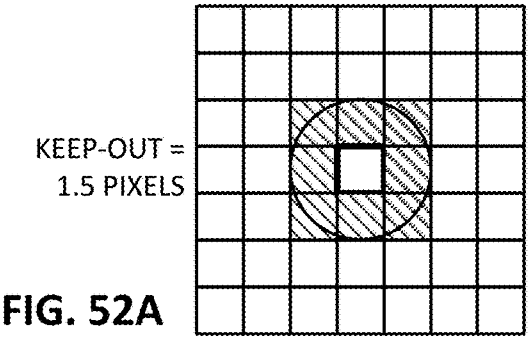
Figure 52B:
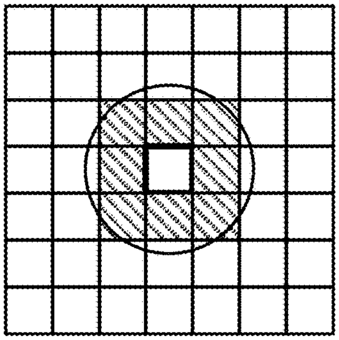

As shown in FIGS. 52A and 52B, if the keep-out distance is increased slightly, to 1.5 pixels, then the number of excluded pixels jumps by four, to eight. And if the keep-out distance is further increased, to 1.8 pixels, the number of excluded pixels is unchanged (still eight).

Figure 53:
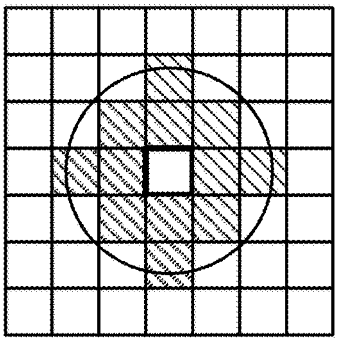
Figure 54:
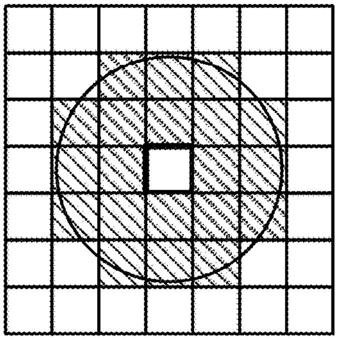

A further increase of the keep-out distance, to 2.2 pixels, causes the number of excluded pixels to rise to 12—a further jump of 4, as shown in FIG. 53. Another small increase of the keep-out distance, to 2.4 pixels, causes the number of excluded pixels to rise to 20—a jump of 8.

Thus, it can be seen that circular keep-out regions offer a very coarse control of the number of pixel locations excluded from marking. No change in the number occurs with some increases in keep-out distance, and then a further increase causes the number of excluded pixels to jump by four or eight—symmetrically around the center pixel.

Figure 55:
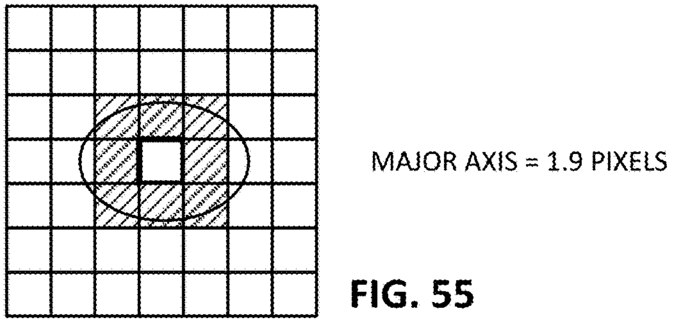
FIGS. 55 and 56 illustrate the number of pixel locations excluded from marking by different elliptical keep-out zones.
Figure 56:
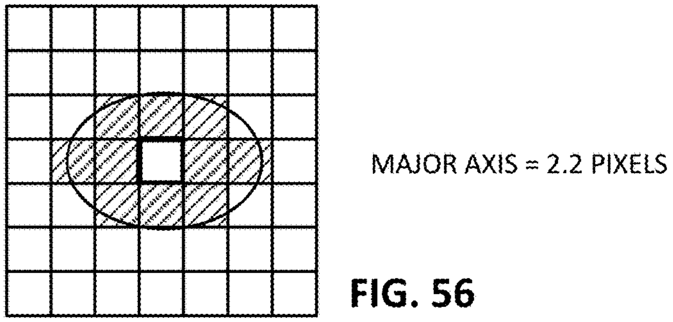

If an elliptical keep-out region is employed, then finer control granularity can be achieved. FIG. 55 shows an ellipse with a ratio of 0.7 between its minor and major axes. With a major axis length of 1.9, this ellipse excludes 8 pixels from marking. As its size increases to have a major axis length of 2.2 (FIG. 56), it excludes 10 pixels from marking. As the size expands, it variously encompasses additional pairs of pixels to the top and bottom, additional pairs of pixels to the left and right, and additional quartets of pixels. It will be recognized that such elliptical shape provides a control granularity that is twice that of a circular keep-out region. (In some embodiments, the ratio of major to minor axes is fixed; in others it is varied as the area of the ellipse is changed.)

To achieve still further control granularity, patterns tailored to exclude specific numbers of nearby pixels from marking can be employed.

FIGS. 57A, 57B, 57C and 57D show keep-out patterns tailored to exclude 1, 2, 3 and 4 pixels, respectively. These are just a small assortment of suitable patterns. Rotations of these patterns (by 90, 180, and 270 degrees) can also be employed, as can mirror-images of all rotations. Most such patterns have no axis of symmetry passing vertically or horizontally through the center pixel. (Although not shown, other such patterns can be formed to exclude additional numbers of nearby pixels, e.g., 5-25.)

As before, when a pixel is selected for marking in an output frame, one or more pixels near it are excluded from marking, based on the pattern chosen.

This arrangement of FIGS. 57A-D, etc., provides a fine-grained mechanism to achieve different print densities by excluding certain pixels from marking. Still finer control can be achieved by randomly selecting among two or more of the keep-out patterns, e.g., excluding different numbers of pixels from marking. For example, the first and second pixel locations selected (e.g., from a sorted list) for marking in an output frame can use the top keep-out pattern of FIG. 57B, and the third-selected location can use the top keep-out pattern of FIG. 57C. This sequence can be repeated, with the fourth and fifth-selected pixel locations employing the keep-out pattern of FIG. 57B, with the sixth-selected location using the pattern of FIG. 57C, and so on. By such arrangement, each mark may be associated—on average—with a non-integer number of nearby pixel locations that will be excluded from marking (i.e., 2.33 in the just-given example). Very fine simulation of grey scale image tones may thereby be achieved.

Figure 57A:
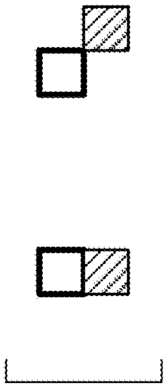
FIGS. 57A, 57B, 57C and 57D show different patterns by which 1, 2, 3 or 4 nearby pixel locations can be excluded from marking, respectively.
Figure 57B:
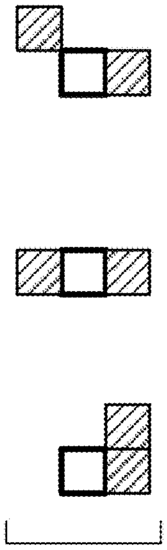
Figure 57C:
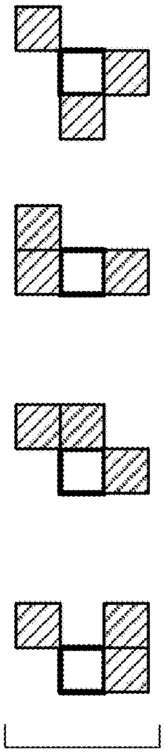
Figure 57D:
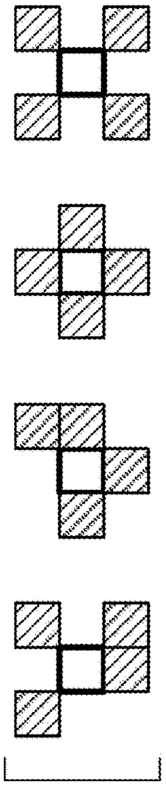

(Even if a desired print density can be achieved by use of a single keep-out pattern, such as one of those in FIG. 57C, there can be aesthetic advantages from randomly varying between two or more different patterns, such as from FIGS. 57B and 57D, excluding less and more nearby marks, to achieve the same average print density effect.)

In contrast to the earlier discussion, in the just-discussed arrangement, different print densities are not achieved by setting different keep-out distances (e.g., a keep-out distance D1 for a 5% print density), but rather by setting different keep-out location exclusion counts. For a 5% print density, a pattern that excludes 9 nearby locations can be employed. For a 10% print density, a pattern that excludes 5 nearby locations can be employed. For a 15% print density, a pattern that excludes 3 nearby locations can be employed (e.g., as shown in FIG. 57C). For a 20% print density, a combination of patterns that excludes, on average, 2.5 nearby locations can be employed. Etc. Different renderings of greyscale images can be achieved by varying the mapping by which different print densities (greyscale levels) correspond to different numbers of nearby excluded pixel locations.

Reading a Payload from Captured Images

Figure 58:
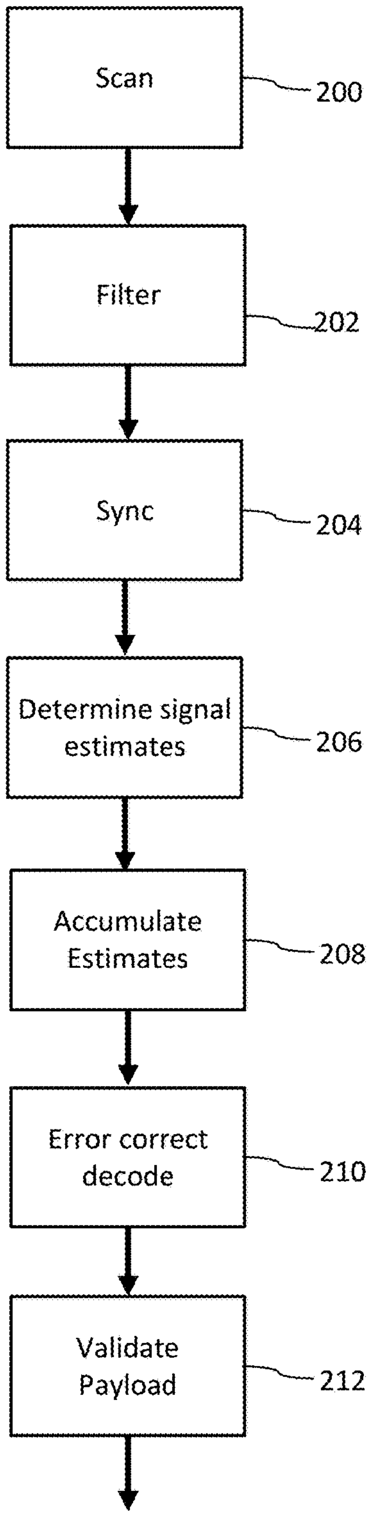
FIG. 58 is a flow diagram illustrating a method for decoding an optical code from an image signal captured from an object.

FIG. 58 is a flow diagram illustrating a method for decoding an optical code from an image signal captured from an object.

In an image capture process (e.g., scan 200 of FIG. 58), the image is captured at a resolution preferably near the resolution at which the encoded payload signal has been encoded within the original image (e.g., 300 DPI, 100 DPI, etc.). An image up-sampling or down-sampling operation may be performed to convert the image supplied by the digital camera or scanner to a target resolution for further decoding.

At least part of one or more blocks of encoded data signal are captured within the scan.

In the initial processing of the decoding method, it is advantageous to select frames and blocks within frames that have image content that are most likely to contain the encoded payload. The block size is desirably selected to be large enough to span substantially all of a complete tile of encoded payload signal, and preferably a cluster of neighboring tiles. However, because the distance from the camera or scanner may vary, the spatial scale of the encoded payload signal is likely to vary from its scale at the time of encoding. This spatial scale distortion is further addressed in the synchronization process.

The first stage of the decoding process filters the incoming image signal to prepare it for detection and synchronization of the encoded payload signal (202). The decoding process sub-divides the image into blocks and selects blocks for further decoding operations. A first filtering stage converts the input color image signal (e.g., RGB values) to a color channel or channels where the auxiliary signal has been encoded by applying appropriate color weights. Sec, e.g., patent publication 20100150434 for more on color channel encoding and decoding. The input image may also be a single channel image (one pixel value per pixel) corresponding to capture by a monochrome sensor in the presence of ambient or artificial illumination, such as a typical red LED with a wavelength around the center of its spectral band around 660 nm.

A second filtering operation isolates the data signal from the host image. Pre-filtering is adapted for the data payload signal encoding format, including the type of synchronization employed. For example, where an explicit synchronization signal is used, pre-filtering is adapted to isolate the explicit synchronization signal for the synchronization process.

As noted, in some embodiments, the synchronization signal is a collection of peaks in the Fourier domain. Prior to conversion to the Fourier domain, the image blocks are pre-filtered. See, e.g., the Laplacian pre-filter detailed in U.S. Pat. No. 6,614,914, incorporated above. A window function is applied to the blocks, followed by a transform to the Fourier domain-employing an FFT. Another filtering operation is performed in the Fourier domain. See, e.g., pre-filtering options detailed in U.S. Pat. Nos. 6,988,202 and 6,614,914, and US Publication 20120078989, which are incorporated by reference.

The input imagery is typically filtered with a predictive "oct-axis" filter, as noted previously. This filter acts to suppress the underlying host image (which typically shows relatively high local correlation), and thereby accentuate the noise signal that conveys the code signal components.

Next, synchronization process (204) is executed on a filtered block to recover the rotation, spatial scale, and translation of the encoded signal tiles. This process may employ a log polar method as detailed in U.S. Pat. No. 6,614,914, or a least squares or AllPose approach, as detailed earlier, to recover rotation and scale of a synchronization signal comprised of peaks in the Fourier domain. To recover translation, the phase correlation method of U.S. Pat. No. 6,614,914 is used, or phase estimation and phase deviation methods of 20120078989 are used.

Alternative methods perform synchronization on an implicit synchronization signal, e.g., as detailed in U.S. Pat. No. 9,747,656.

Next, the decoder steps through the bit cell locations in a tile, extracting bit estimates from each location (206). This process applies, for each location, the rotation, scale and translation parameters, to extract a bit estimate from each bit cell location (206). In particle, as it visits each bit cell location in a tile, it transforms it to a location in the received image based on the affine transform parameters derived in the synchronization, and then samples around each location. It does this process for the bit cell location and its neighbors to feed inputs to a detection filter (e.g., oct axis or cross shaped), to compare a sample at embedding locations with neighbors. The output (e.g., 1,−1) of each compare operation is summed to provide an estimate for a bit cell location. Each bit estimate at a bit cell location corresponds to an element of a modulated carrier signal.

The signal decoder estimates a value of each error correction encoded bit by accumulating the bit estimates from the bit cell locations of the carrier signal for that bit (208). For instance, in the encoder embodiment above, error correction encoded bits are modulated over a corresponding carrier signal with 16 or 32 elements (e.g., multiplied by, or XOR'd with, a binary antipodal signal). A bit value is demodulated from the estimates extracted from the corresponding bit cell locations of these elements. This demodulation operation multiplies the estimate by the carrier signal sign and adds the result. This demodulation provides a soft estimate for each error correction encoded bit.

These soft estimates are input to an error correction decoder to produce the payload signal (210). For a convolutional encoded payload, a Viterbi decoder is used to produce the payload signal, including the checksum or CRC. For other forms of error correction, a compatible decoder is applied to reconstruct the payload. Examples include block codes, BCH, Reed Solomon, Turbo codes.

Next, the payload is validated by computing the check sum and comparing with the decoded checksum bits (212). The check sum matches the one in the encoder, of course. For the example above, the reader computes a CRC for a portion of the payload and compares it with the CRC portion in the payload.

At this stage, the payload is now passed to other requesting processes, e.g., application programs or software routines that use its contents in subsequent processing.

In an embodiment where the encoded payload is conveyed in the phase of sine waves, the decoder executes a similar first stage synchronization on reference signal components, such as a subset of the sine waves. This sub-set of sine waves form peaks in the spatial frequency domain. After synchronization, the decoder extracts an estimate of an encoded payload element at each reference signal that carries the payload. The phase shift is directly measured relative to an un-modulated state using phase estimation and deviation methods of US Publication 20120078989. The decoder applies the geometric transform coordinates of a sine wave component in the spatial frequency domain. It then estimates phase of this component in the image by weighting the neighboring complex components at neighboring integer coordinates base on weights derived from a point spread function. This estimate of phase is then compared to the expected phase (e.g., phase that would represent a 1, 0 or −1, or 1 or 0, in ternary or binary encoding schemes). The bit value extracted at this component is the one that corresponds to the estimated phase. This process repeats for each sine wave component that carries payload signal. The resulting sequence of symbols are then error correction decoded and processing proceeds error detection as described above.

Pre-Marked Media

In another aspect of the present technology, a roll of thermal adhesive labels is pre-marked—typically with ink (rather than thermal discoloration)—to convey a signal component. This pre-marking commonly occurs before the roll of labels is delivered to the user (e.g., grocery store), and before it is installed in the thermal printer.

In one illustrative embodiment, each label on the roll is pre-marked with a reference signal component comprising a printed pattern, e.g., of dots. The dots, however, are not black. Rather, they are of a color to which the human eye is relatively less sensitive when printed on white media (as compared to black), yet a color that provides a discernible contrast when imaged with red light illumination (e.g., 660 or 690 nanometers) from a point of sale scanner. One such ink color is Pantone 9520 C. (For more information about marking with Pantone 9520 C and related issues, see our patent application Ser. No. 15/851,143, filed Dec. 21, 2017 (now U.S. Pat. No. 10,580,103), which is incorporated herein by reference.)

The pattern of dots can be created from the multi-valued reference signal (e.g., 70 in FIG. 10), by placing dots in an output signal block at positions that first correspond to the darkest lowest-valued) pixels in signal 70, and continuing to select successively less dark pixels, until a reference pattern of sufficient detection robustness is achieved. In one particular embodiment, a dot density of 5% is used; in another a dot density of 20% is employed. In some embodiments, a placement constraint is employed, as described elsewhere, to limit clumping of dots together. This reference signal block can then be tiled and printed across the full extent of the label, or only across particular regions.

In one particular embodiment, such a pattern of reference signal dots is printed on the roll of adhesive labels by an offset printing press that also applies other pre-printed markings, e.g., a store logo. (Such other markings are typically applied using a different ink color.) In another embodiment, ink jet printing is used. (Of course, such printing can be applied to the label substrate before it is formed into rolls, and before adhesive is applied and/or before the label is adhered to its release backing.)

In a different embodiment, the reference signal is printed with a visible ink, but in a patterned fashion depicting, or reminiscent of, an overt pattern—such as a corporate logo.

Figure 59:
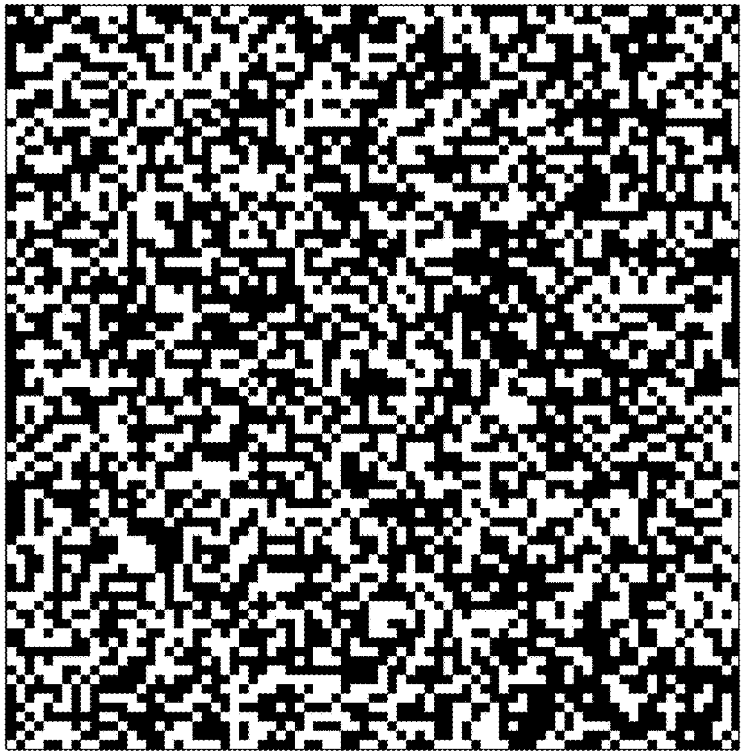
FIG. 59 shows an excerpt of a bi-tonal message signal block.
Figure 60:
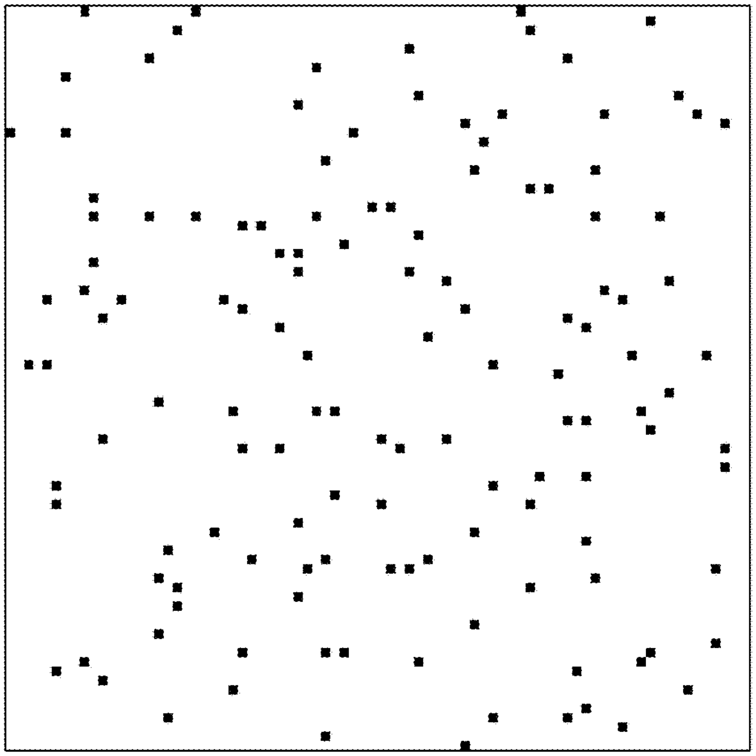
FIG. 60 shows a sparse selection of marks copied from the FIG. 59 message signal block.

With the reference signal pre-printed on the adhesive label stock, the printer need thermally print only the message signal. In the illustrative system, the message signal is a bi-modal signal, e.g., a block of 128×128 elements, with half (8,192) having one value (e.g., black) and half having the other value (e.g., white). FIG. 59 shows an 80×80 excerpt of such a pure bi-modal message signal. As with the other embodiments, a subset of the black marks can be employed (e.g., on the order of 500 of the 8192 black marks), while still assuring reliable signal recovery. In one particular embodiment, black marks are randomly selected from the pure message signal block of FIG. 59, subject to a placement constraint, until a desired percentage of the black marks have been selected. These are then copied from the pure message signal block to corresponding locations an output block. Such a resulting array is shown in FIG. 60. If 10% of the marks are selected for copying to the output block (i.e., 819 marks), this reduces the print density from 50% to 5%. A greater or lesser percentage of marks can be so-selected, to yield different sparseness.

In other embodiment, the marks aren't selected randomly from the pure message signal of FIG. 59. Instead, they are selected preferentially from certain areas, so as to give a patterned appearance to the resulting array of marks in the output block. For example, blocks from most of the block can be selected at one rate (e.g., 5%), but within an outline corresponding to a corporate logo, a denser selection of marks can be picked (e.g., 10%), to yield a logo-patterned sparse block.

Figure 61:
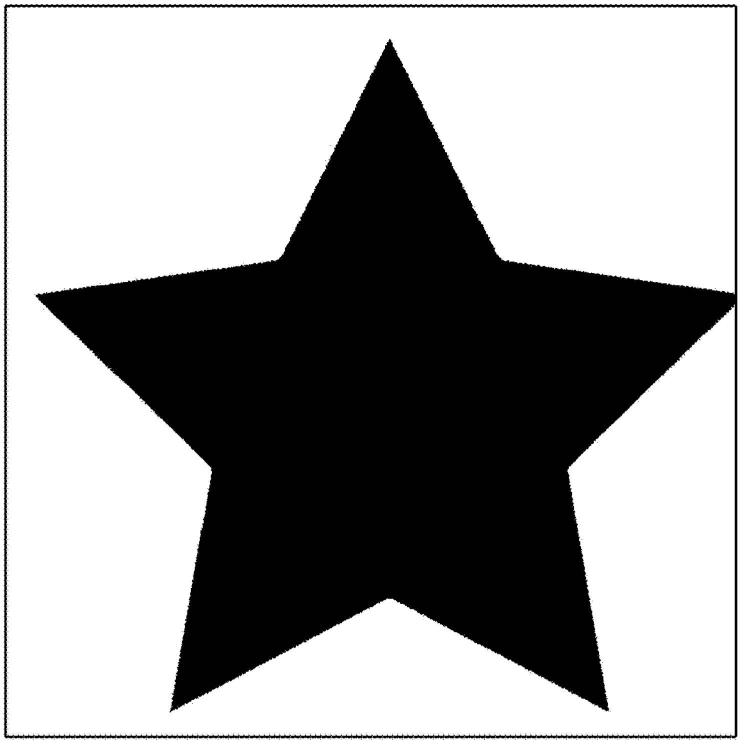
FIG. 61 shows a corporate logo serving as a mask.
Figure 62:
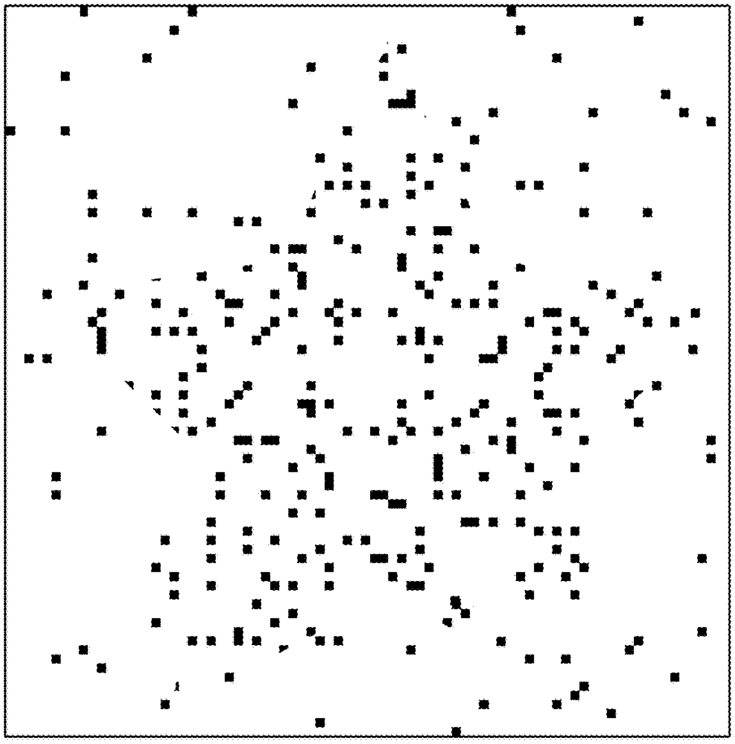
FIG. 62 shows a sparse selection of marks, copied from the FIG. 59 message signal block at different densities, in accordance with the mask of FIG. 61.
Figure 63:
FIG. 63 shows the FIG. 62 sparse mark in a tiled array at a more usual scale.

FIGS. 61 and 62 show such an arrangement. A corporate logo, illustrated by the star in FIG. 61, serves as a selection mask. Within black regions of this mask, marks are selected at a greater density than within white regions of this mask. A sparse pattern echoing the corporate logo is thereby produced, as shown in FIG. 62, and can be tiled across the label. An array of such blocks, depicted at a scale at which they may appear on an actual label, is shown in FIG. 63. Naturally, with greater or lesser print densities inside the mask region, patterns of greater or lesser overtness can be formed.

(A dot placement constraint may be employed within the darker density excerpts, or not. In FIGS. 62 and 63, no such constraint is employed.)

While described in the context of a message signal-only marking, it will be recognized that selection of dots at different densities, in different regions, can achieve results like that shown in FIGS. 62 and 63 in other marking arrangements, e.g., in embodiments in which both reference and message signal components are formed by thermal black marks.

To read the message from the imagery captured by a point of scale scanner, the affine distortion of the captured image relative to the printed original (due to the pose at which the object is presented to the scanner) must be determined. The reference signal, detected from the pre-printed dots, enables the scale and rotation of the imaged pattern, relative to the original pattern, to be established. The translation, however, also needs to be determined.

One way of establishing translation (e.g., finding the upper left corner of the message signal block in the captured image) is to thermally print an indicium, such as a fiducial marking, at a known location relative to the message signal block, as part of the message signal. The fiducial can be a known pattern, such as a bulls-eye marking, a diamond, a plus symbol, or a logo. Alternatively, the indicium can be a distinctive 2D pattern of sparse dots, on which the signal decoder can sync-such as by spatially correlating the known 2D pattern with excerpts of imagery until a match is found. In some embodiments, the distinctive pattern is achieved by setting certain of the payload bits to fixed values, and printing some or all of the dots corresponding to such pattern. The location of the known pattern relative to the reference signal defines the translation of the message signal, enabling decoding to proceed.

Such arrangement, employing a fiducial printed by the label printer, permits the message signal to be applied in any spatial relationship to the pre-printed reference signal, with the detector thereafter determining the unknown translation offset based on the position of the detected fiducial relative to the detected reference signal. In another embodiment, tolerances of the printing mechanism are sufficiently precise that the thermally-printed message signal reliably appears at a known spatial position on the label, e.g., with an upper right corner of a message signal block coincident with the upper right corner of the label (or where such label corner would be if its corners were not rounded). Since the reference signal can be pre-printed on the label with high precision (e.g., as is commonly required in offset presses to achieve alignment of different plates and screens), the reference signal and message signal can be printed in a spatial alignment rivaling that of arrangements in which both signal components are printed in a common operation. At worst, a small brute force 2D correlation search, e.g., based on fixed bits of the encoded message, can correct for any small offset. Decoding of the message from the captured imagery can then proceed in the usual manner.

In still another arrangement, the thermal printer is equipped with an optical sensor that captures image data from the pre-printed label before thermal printing, and determines—from the sensed data—the location of the upper left corner of a block of the reference signal. This enables the printer to print the message signal in registered alignment with the reference signal, so that no sleuthing of translation is required.

In one such embodiment, the optical sensor includes a 2D camera that captures an image including the reference signal. The image reveals the pattern's position, enabling the printer to apply the message signal in registered alignment. In a simpler embodiment, the optical sensor is simply a photodiode and photodetector arrangement, positioned to sense a tic mark that was pre-printed on the margin of the label, in the same pre-printing operation as the reference pattern. Again, by locating the position of the tic mark, the printer can print the message signal in registered alignment with the reference signal.

In a variant arrangement, a synchronization mark or pattern for sensing by the optical sensor in the printer is not pre-printed on the label area itself, but rather is formed on an adjoining medium—such as a trim piece to the side of the label (a piece that is left behind when the label is peeled from its backing), or a backing or trim piece that is between labels.

Message Signaling by Reference Signal Dot Selection

The signaling arrangements described below are advantageous in that they more closely approach the Shannon limit for information transfer (at a given reliability), than prior art sparse code arrangements.

Applicant discovered that prior art watermark detectors, which were generally optimized to discern optical codes hidden in continuous-tone host artwork (e.g., as detailed in U.S. Pat. Nos. 9,747,656, 9,959,587 and application Ser. No. 15/628,400, filed Jun. 20, 2017 (now U.S. Pat. No. 10,242,434), and references cited therein—sometimes also collectively referenced herein as "conventional" or "continuous tone" watermark decoders) are sub-optimal when applied to sparse codes, because most of the artwork in sparse codes is blank (or uniformly-toned). Although blank, the captured imagery in such areas is not uniformly-valued (e.g., not all such pixels have value of full-white: 255). Instead, there is typically slight variation among the pixel values, e.g., ranging between 230-255 for a white background. This variation leads prior art detectors to discern signals where, really, there is none. Such "phantom" signals act as noise that interferes with correct decoding of the true signal.

To avoid this problem, applicant devised various arrangements that limit, or avoid, recovery of phantom signals from areas that are expected to be devoid of signal (e.g., blank). In particular, such embodiments identify a subset of image locations (e.g., less than 50% of the image locations, and more typically 15%, 10%, or less, of the image locations) where the sparse dots are expected to be located. The decoder discerns message signal only from this small subset of locations. Noise is reduced commensurately. In a preferred embodiment, these locations correspond to extrema of the multi-valued 2D reference (registration) signal.

By arrangements such as those detailed below, Applicant has demonstrated that the number of dots used to represent a message can be reduced substantially compared to previous sparse code arrangements—such as taught in U.S. Pat. No. 9,635,378—by 30%, 50%, 70%, or more, without noticeably impairing robustness. (Robustness can be assessed by adding increasing levels of Gaussian white noise to an encoded image, and noting the noise level at which the detection rate falls from 100 to some threshold value, such as 98%, over a large number of sample images.)

In a first such embodiment, only 1024 dark marks are employed among the 16,384 areas within a 128×128 signal tile. The marks all represent the reference signal (by its extrema), but their selection represents the message signal.

The method starts with a reference signal tile-such as the one depicted as signal 70 in FIG. 10. At the center of each square element (e.g., waxel) in the reference signal tile (e.g., in a 128×128 element tile), the reference signal has a corresponding real signal value, e.g., ranging from 0 (black) to 255 (white). (In other systems, such as shown in FIG. 10, the values are real-valued, e.g., varying from about −0.6 (black) to 0.6 (white).) The 16,384 elements are sorted by value to generate a ranked list, including the 2048 darkest elements. Each entry in the list is associated with an ordinal position (1, 2, 3 . . . ), and {X, Y} data specifying the element's position within the tile, by column and row. Table 2 shows an excerpt of such a list:

TABLE 2

| Rank | Value | {X,Y} |
|---|---|---|
| 1 | 7.1 | {18, 22} |
| 2 | 7.33 | {72, 32} |
| 3 | 9.6 | {1, 33} |
| 4 | 10.21 | {26, 82} |
| 5 | 10.55 | {14, 7} |
| 6 | 12.2 | {33, 73} |
| 7 | 13.7 | {19, 83} |
| 8 | 13.8 | {1, 123} |
| 9 | 14.2 | {78, 23} |
| 10 | 14.8 | {26, 121} |
| 11 | 16.2 | {100, 15} |
| 12 | 16.3 | {119, 99} |
| 13 | 17 | {70, 34} |
| 14 | 19.5 | {87, 65} |
| 15 | 19.6 | {34, 108} |
| 16 | 21.4 | {98, 73} |
| . . . | . . . | . . . |
| 2048 | 101.3 | {79, 89} |

(The value of the reference signal is computed as a real number, rather than an integer value, at the center of each element, to assure an unambiguous order to the points.)

The payload, e.g., of 47 bits, is processed by convolutional encoding and, optionally, repetition and CRC-coding, to yield a message that is 1024 bits in length. Each bit in the message is associated with a successive pair of reference signal elements in the ranked list. One pair consists of the locations ranked 1 and 2. The next pair consists of the locations ranked 3 and 4. Etc.

If the first bit of the message signal is even-valued (i.e., 0), then the even-ranked location (i.e., #2) from the first pair in Table 2 determines a location in the output signal tile that is darkened. If that first bit is odd-valued (i.e., 1), then the odd-ranked location (i.e., #1) from that first pair determines the location in the output tile that is darkened. Similarly for the second bit of the message signal: choosing between locations ranked 3 and 4. Etc. Thus, 1024 of the reference signal elements are selected, from the 2048 elements identified in Table 2, based on the bit values of the 1024 message bits, and define 1024 locations in the output signal tile that are darkened.

To illustrate, consider a message that starts 01001110 . . . . In such case, the elements in the output signal tile identified in Table 3 are darkened:

TABLE 3

| |
|---|
| {72, 32} |
| {1, 33} |
| {33, 73} |
| {1, 123} |
| {78, 23} |
| {100, 15} |
| {119, 99} |
| {87, 65} |
| {34, 108} |
| . . . |

Each of the 1024 dots in the output signal tile corresponds to one of the darkest values in the original reference signal tile. Each such dot also represents a corresponding bit of the 1024 message bits.

Figure 64A:
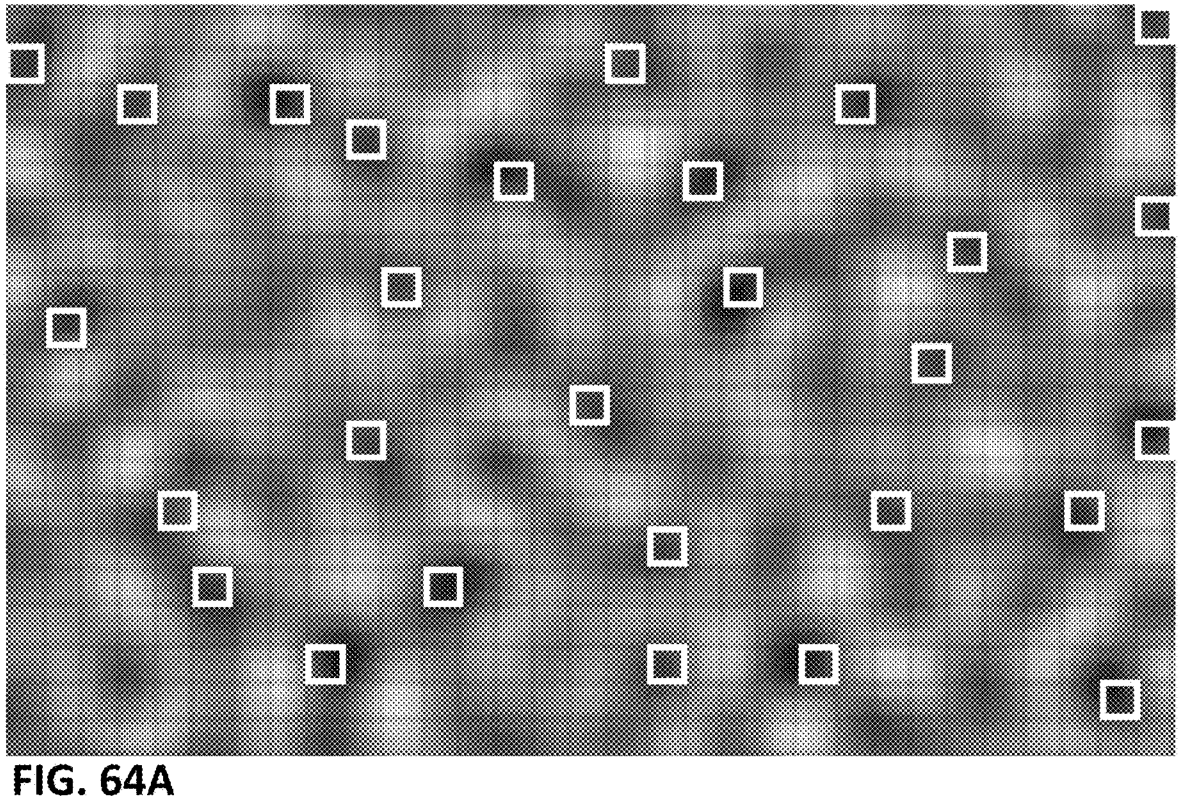
FIG. 64A shows an excerpt from a reference signal tile, with a set of 2N dark waxels identified.
Figure 64B:
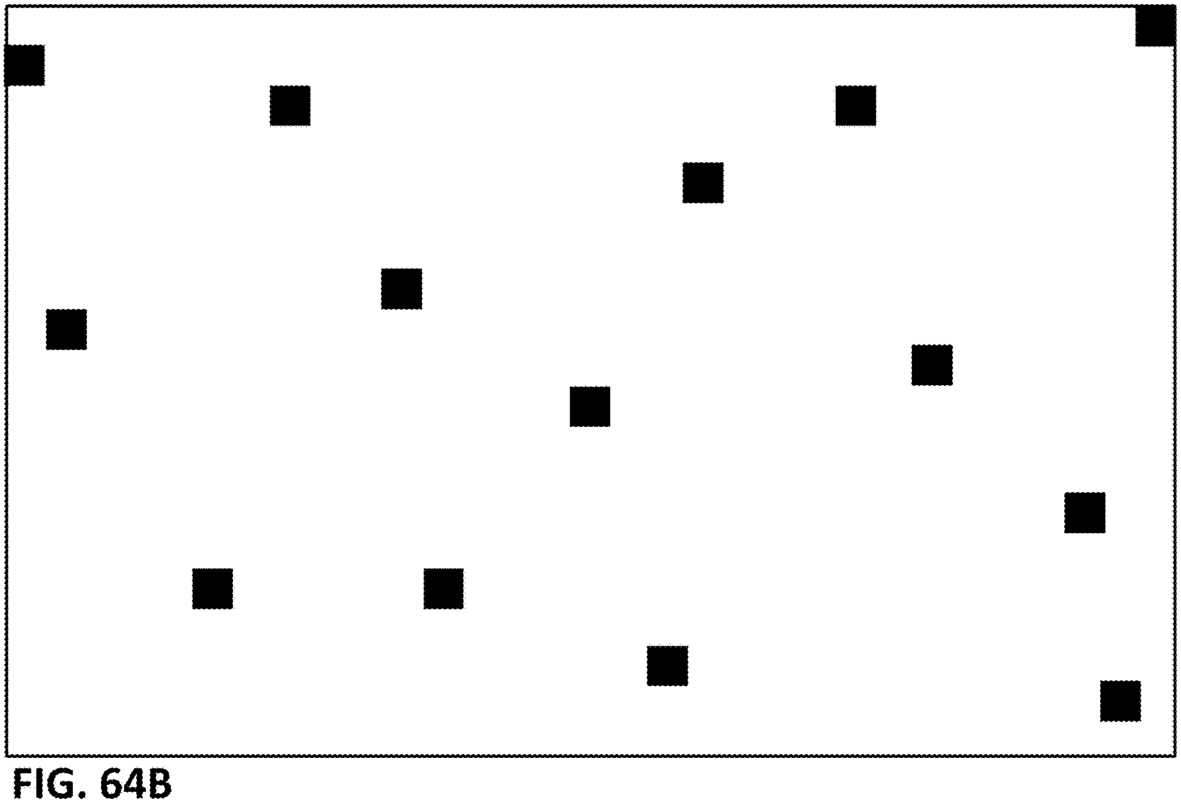
FIG. 64B shows an optical code produced using N of the dark waxels identified in FIG. 64A, to encode an N-bit message.

FIGS. 64A and 64B depict such an arrangement. FIG. 64A shows an excerpt of a reference signal, with certain waxels having extrema values (i.e., the darkest waxels) highlighted by white boxes. In the discussed embodiment, 2048 such extrema would be identified in a full reference signal tile. (The indicated waxels have been selected so that no two are immediately adjacent, enforcing a simple keep-out constraint.)

The extrema are paired (not shown), and one location of each pair is marked in accordance with a respective bit of the message signal, yielding a sparse code excerpt like that shown in FIG. 64B. 1024 locations are marked in the complete 128×128 waxel tile-half of the 2048 candidate locations.

In decoding a captured image depicting a sparse pattern like that shown in FIG. 64B, the affine transformation of the image is first determined by reference to the reference signal. (Although the dot markings of FIG. 64B are sparse, they are sufficient, across a larger excerpt of the tile, to characterize the affine transformation of the captured image, since the dots correspond to extrema—the most significant portions of the reference signal.) The image is then typically counter-distorted to restore the pattern to its original presentment. (More precisely, the received image is re-sampled in accordance with a coordinate system that is defined from the determined affine transformation.) These operations are more particularly detailed in the earlier-cited prior art documents.

To extract the message, the detector uses its own copy of data from Table 2. (This table is consistent for all marks employing the particular reference signal, and occupies negligible memory in the detector code.) The detector examines the counter-distorted imagery to determine the pixel values at the two locations specified by the first pair of entries in the table (i.e., ranks 1 and 2). Ideally, one is dark and one is light. The dark one indicates the value of the first message bit. The detector then examines the imagery to determine the pixel values at the third and fourth entries in the table (i.e., ranks 3 and 4). Again, ideally one is dark and the other is light. The dark one indicates the value of the second message bit. And so on.

In actual practice, the two locations examined by the detector—in considering each possible bit of the message—may be far apart in value (indicating high confidence in the bit determination) or may be closer together in value (indicating less confidence). To quantify the confidence associated with each message bit determination, a score is computed based on the values of the pixels at the locations indicated by the odd- and even-numbered entries of the pair in the table. One suitable score is:

$$\text{Score} = \text{Log}_2\left(\text{value of pixel at even location}/\text{value of pixel at odd location}\right)$$

In the above example, if the value of the pixel at the even location {72,32} is 30 and the value of the pixel at the odd location {18,22} is 240, the score is a negative 3, indicating that the first bit of the message has value "0." (Any negative value indicates the bit value is "0.")

Considering the next bit, the detector may find the value of the pixel at the even location {26,82} to be 130, and the value of the pixel at the odd location {1,33} to be 101. In this case the score is 0.364. The positive score indicates the corresponding bit value is "1." The absolute magnitude of the score, however, is low (e.g., relative to the absolute value of the first bit score: 3). This indicates less confidence in this determination.

The string of message bits obtained by this procedure (after considering all 2048 candidate locations in the counter-distorted imagery), together with the confidence score for each, is applied to a soft decoder, such as a Viterbi, Reed-Solomon, or Turbo decoder. From these raw bit determinations and confidence scores, the decoder returns the original 47-bit payload.

It will be recognized that the just-described decoder examines just 2048 locations in the 16,384-waxel reference signal tile. The other 14,336 waxels are disregarded, so that any phantom signal present in those other waxels does not interfere with decoding.

The just-described arrangement pairs extrema points in the reference signal based on adjacency in a sort order. This is a reasoned choice, because the alternate locations for each payload bit representation are of similar reference signal strength. But this is not essential. Pairing can be done in any fashion, e.g., randomly within a subset of reference signal elements having values below a threshold value.

To review, in this first particular embodiment, the message consists of plural bits, each having a first or a second value (e.g., 0 or 1) at a respective position in the binary message string. A list of M (e.g., 2048) 2D reference signal elements is ranked by value, so that each has an ordinal position in the list, and each is associated with a location in the 2D reference signal. The list thus defines plural pairs of elements, having ordinal positions of 2N−1 and 2N, for N=1, 2, . . . (M/2). Each pair of elements includes an element with an even ordinal position and an element with an odd ordinal position. Each position in the message signal is associated with a pair of elements in the ranked list. A mark is provided in the output signal tile at a location corresponding to the location of the even element in a pair, when the associated position in the message signal has a first value (e.g., "0"). Similarly, a mark is provided in the output signal tile at a location corresponding to the location of the odd element in a pair, when the associated position in the message signal has a second value (e.g., "1").

In the just-described first particular embodiment, a message signal of 1024 bits is represented by 1024 marks (dots), located among 2048 candidate locations. That is, a mark is formed for each message bit, regardless of whether the bit has a value of "0" or "1." In a second particular embodiment, this is not so.

In the second particular embodiment, each respective bit position in the message string is associated with a single extrema location in the reference signal (not a pair of locations, as in the first embodiment). Each successive bit of the message signal can be mapped to a successive location in the Table 2 ranking, i.e., the first message bit corresponds to the darkest extrema (rank #1); the second message bit corresponds to the second-darkest extrema (rank #2), etc.

In this second embodiment, a message bit of "1" is signaled by a mark, but a message bit of "0" is signaled by absence of a mark. (Or vice versa.) Instead of drawing from 2048 candidate locations and marking only half, this second embodiment draws from 1024 locations. Some of these 1024 locations are marked and some are not-depending on whether a "1" or "0" bit is being represented at that location.

Figure 65A:
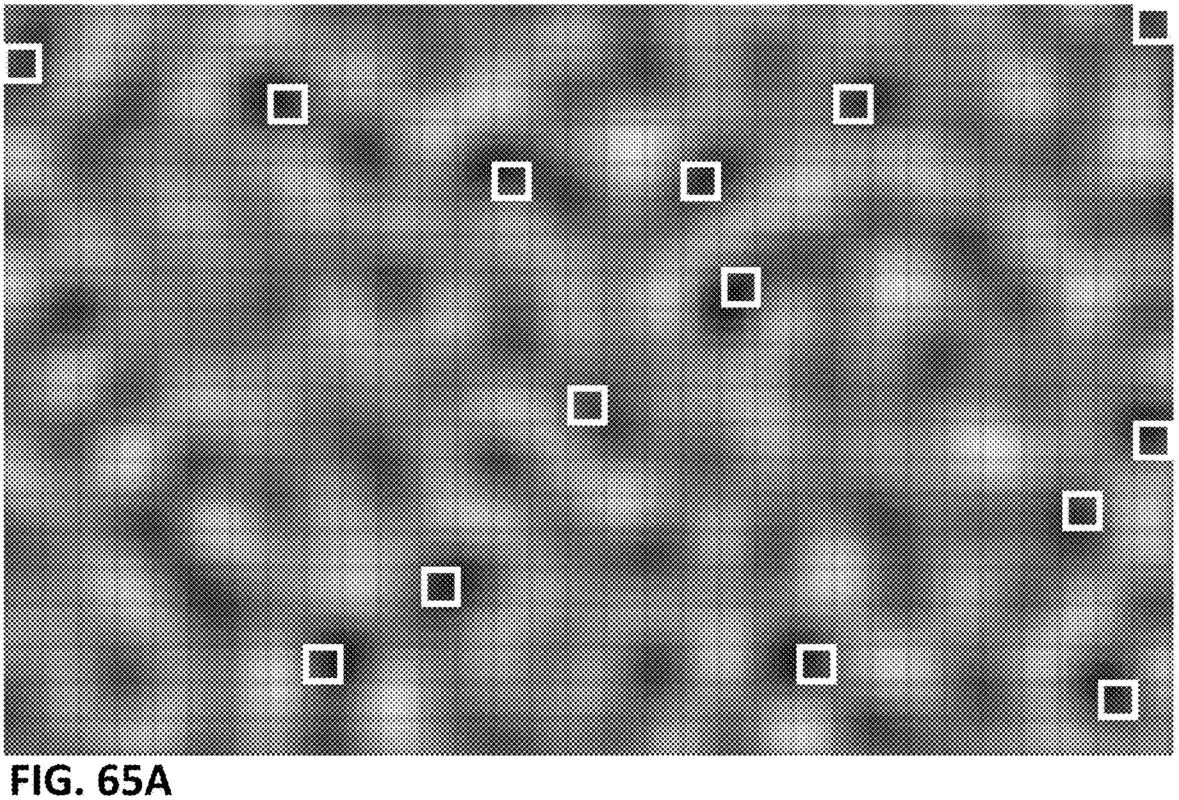
FIG. 65A shows an excerpt from a reference signal tile, with a set of N dark waxels identified.
Figure 65B:
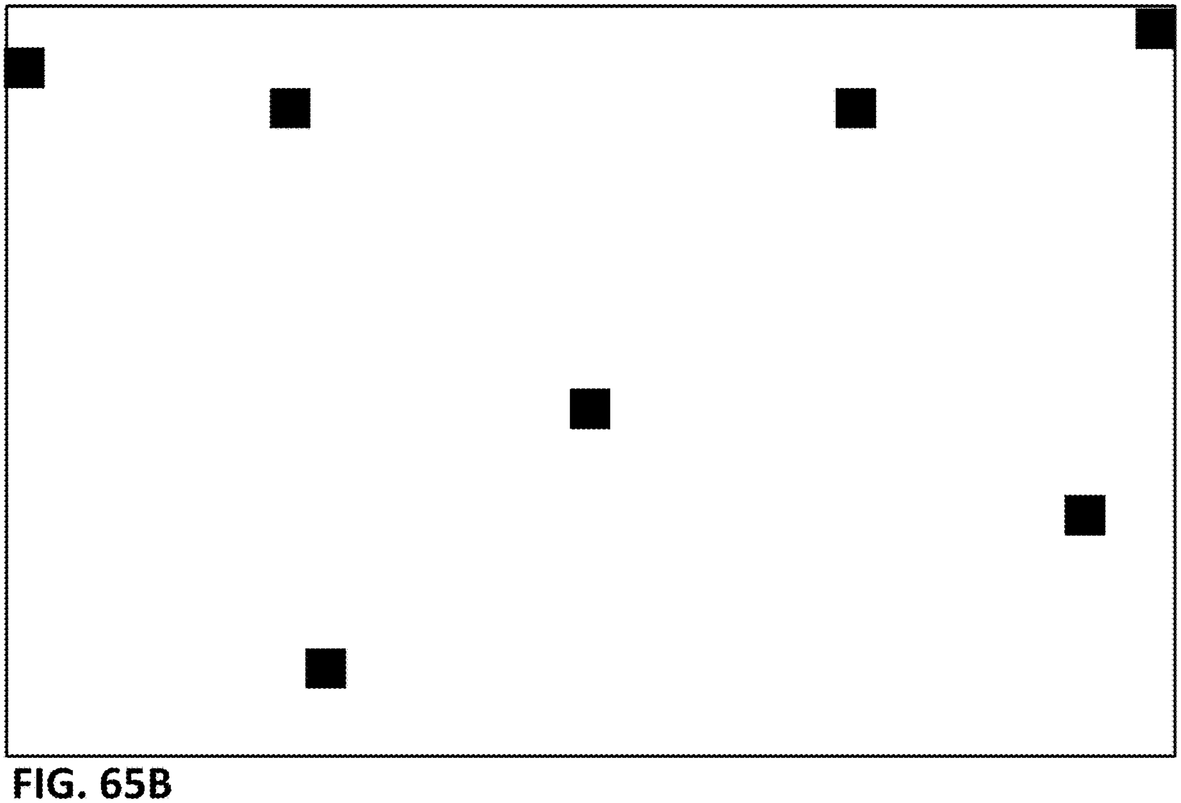
FIG. 65B shows an optical code produced using N/2 of the dark waxels identified in FIG. 65A, to encode an N-bit message.

This second arrangement is illustrated in FIGS. 65A and 65B. In comparison with FIGS. 64A and 64B, it will be seen that only half as many candidate locations are identified. (These, are, however, the darkest of the dark waxels. The lighter ones highlighted in FIG. 64A are no longer selected in FIG. 65A.) Of these candidate locations, about half are marked. (The number of "1" bits in the message signal, meriting a mark, is commonly between 400 and 600 bits; the number of marked locations is rarely exactly half of the 1024 candidate locations.)

As in the first embodiment, the detector in this second embodiment is coded with a list of the 1024 candidate locations, and the association of each location to a respective bit position in the 1024-bit message string.

It will be recognized that this second particular embodiment of FIGS. 65A and 65B involves many fewer marks, and is thus much less conspicuous than the earlier, first embodiment. The decoder examines only 1024 locations for data, rather than the 2048 in the first embodiment. 15,360 of the 16,384 locations in the reference signal tile are disregarded-further cutting down on the influence of phantom signals. However, the information conveyed by the dots (the message signal and the reference signal) is conveyed with correspondingly less robustness, since roughly half as much ink is used to convey the same amount of information.

Due to the redundant, e.g., convolutional, coding of the payload to produce the string of message signal bits, robustness of the message signal is not usually an issue. The correct payload can typically be recovered even from the smaller number of dots employed in the second particular embodiment. However, this reduction in the number of dots also reduces the robustness of the reference signal-sometimes to an unacceptable level (which depends on the particular application).

To increase the robustness of the reference signal, extra dots (fixed marks) can be added to the FIG. 65B pattern—serving only to further express the reference signal; not indicating any message bits.

To illustrate, in this second particular embodiment, the 1024 bit message signal may comprise 505 "0" bits and 519 "1" bits. 519 marks are thus formed in each output signal tile to represent the message signal. To increase the robustness of the reference signal, an extra 300 fixed marks may be added, signaling just the reference signal.

In one such embodiment, an ordered list of the 1324 most extreme values in the reference signal is produced (e.g., by sorting)—each with an associated spatial location (as in Table 2 above). The first 1024 locations are allocated for expression of bit values. (In the example just-given, 519 of these 1024 locations are marked.) The final 300 locations from the ordered list (i.e., locations ranked as #1025-#1324) are employed as fixed marks-solely to boost the reference signal. By using 300 extra locations to express the reference signal, the number of dots from which a decoding system can discern the reference signal (and the affine transformation of the captured image) increases from 519 to 819—an increase of 58%.

The gain in reference signal robustness actually falls short of this just-quoted 58% figure because the fixed mark locations correspond to less-extreme values of the reference signal. In a variant embodiment, however, the extrema locations dedicated to expressing solely the reference signal may instead be taken from the top of the ranked list. In the foregoing example, of the 1324 locations in the ordered list, locations #1 through #300 can be used for fixed marks—solely to express the reference signal—while locations #301 through #1324 can be used to express the bits of the message signal (as well as to express the reference signal). In such variant, the strength of the reference signal increases by more than the 58% indicated by the simple ratio of 819/519, since the 300 fixed marks correspond to the most extreme values of the reference signal.

In other embodiments, fixed marks devoted solely to expression of the reference signal can be drawn from the middle of the ranked list, or drawn from scattered positions within the list. For example, every sixth location in the ranked list can be dedicated to expression of the reference signal, and not represent any message signal bit.

In yet other embodiments, the payload is not expressed as a 1024 bit string with, e.g., 519 dark marks. Instead, the convolutional coding rate is adjusted to reduce the length of the resultant message bit string, e.g., to 600 or 800 bits, for which commensurately fewer locations are marked. The payload can still be recovered, due to its redundant, convolutional coding. The extrema locations that are thereby freed from message transmission can be used, instead, as fixed marks, to represent the reference signal.

Combinations of the foregoing arrangements can also naturally be used.

(While 300 fixed marks were referenced in the foregoing discussion, it will be recognized that the reference signal can be supplemented by marks at any number of extra locations—as best fits the application. In some applications, 100 or less such extra locations can be employed. In others, 500 or more such extra locations can be employed. Similarly, while the use of fixed marks is described in the context of the second particular embodiment, such arrangement can be employed in all of the embodiments detailed herein.)

In a third particular embodiment, 1024 message bits are again represented by 1024 marks. However, rather than being drawn from 2048 possible locations, these 1024 marks are found in 1024 twin-waxel areas. The bit encoded by each mark depends on which of the two waxels is marked in its respective area.

In particular, the marks in this third embodiment are 2×1, or 1×2, element features, termed "dyads." Each dyad comprises a marked element adjacent an unmarked element.

Figure 66A:
FIGS. 66A-66D show 4 different dyads, for signaling "0" and "1" bits using horizontally- and vertically-oriented waxel pairs.
Figure 66B:
Figure 66C:
Figure 66D:
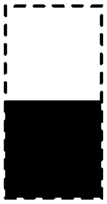

Four possible dyads are shown in FIGS. 66A-66D. FIGS. 66A and 66B show horizontal dyads. FIGS. 66C and 66D show vertical dyads. FIG. 66A represents a "0" message bit. FIG. 66B represents a "1" bit. FIG. 66C represents a "0" bit. FIG. 66D represents a "1" bit. Each is comprised of a dark (marked) element adjacent to a white (unmarked) element.

In this third embodiment, instead of ranking candidate single elements in the reference signal tile by value (e.g., as in Table 2), 2×1 and 1×2 areas across the tile are ranked by their average (or total) value. The darkest 1024 areas are selected. Each is associated with one bit position in the 1024 bit message. Each area is marked with a dyad. If a selected area is horizontally-oriented, one of the two horizontal dyads, FIG. 66A or 66B, is used—depending on whether the message bit to be encoded at that location is a "0" or a "1." Similarly, if a dark region is vertically-oriented, one of the two vertical dyads, FIG. 66C or 66D, is used—depending on whether the message bit to be encoded at that location is a "0" or a "1."

Figure 67A:
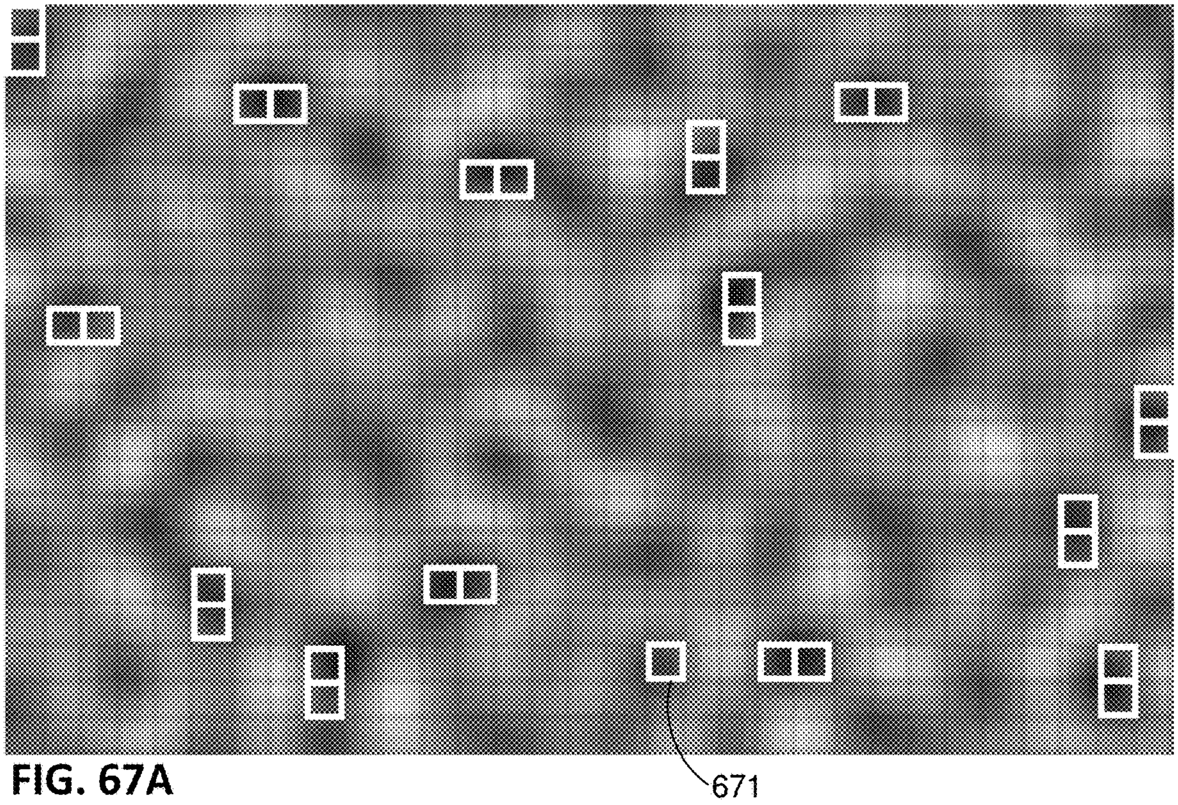
FIG. 67A shows an excerpt from a reference signal tile, with a set of N dark waxel pairs identified.
Figure 67B:
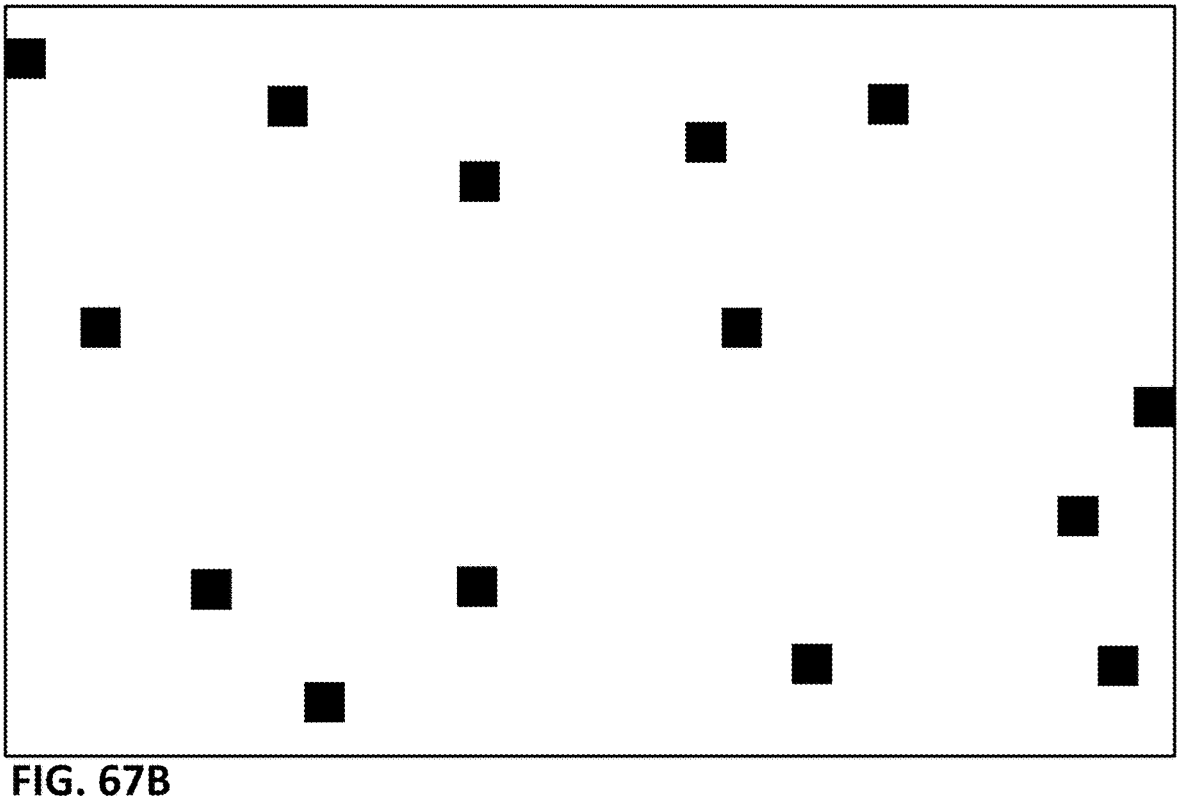
FIG. 67B shows an optical code produced by marking one waxel from each waxel pair identified in FIG. 67.

This is made clearer by the example depicted in FIGS. 67A and 67B. FIG. 67A shows the 1×2 and 2×1 waxel regions of the reference signal that are found to have the lowest signal values (i.e., darkest—in sum or average). In FIG. 67B, one waxel of each dyad is marked, depending on whether the message signal bit represented by that dyad has a "1" or "0" bit-using the arrangements shown in FIGS. 66A-66D. The number of marks, across the entire reference signal tile, is the same as in the first embodiment (FIGS. 64A, FIG. 64B), although the positions of the dots are different due to the different selection criteria employed (i.e., darkest pairs of adjoining waxels).

Each dot in this third embodiment is always approximately at the same location-regardless of the message being encoded-shifting only a single waxel element one way or the other depending on its bit value. This contrasts with the first embodiment, in which each dot can be placed at either of two potentially-widely-spaced locations. The generally-consistent placement of dots in this third embodiment, around 1024 locations, can be advantageous, e.g., in sparse markings of small physical areas, where the 2048 possible locations required by the first embodiment may sometimes force two dots to be in objectionable proximity, or may place a dot too close to adjoining text.

A variant of this third embodiment does not rank candidate areas based on the average (or total) value of two adjoining elements of the reference signal. Instead, a ranking is obtained based on individual element values—as in the first and second embodiments. 1024 of these extreme locations are selected, and each anchors a two-waxel area that is associated with a bit position in the message. Each is analyzed to determine the structure of the reference signal pattern at that location: does it evidence a horizontal aspect or a vertical aspect? In one particular implementation, the four edge-adjoining waxel elements, i.e., to the north, south, east and west of a selected element, are examined to determine which has a value closest to the (extreme) value of the selected element. The one closest in value is selected as the second element that is paired with the selected element for placement of a dyad. As before, different dyads are placed at different locations, to signify different bit values.

Sometimes a single element of the reference signal may have an extreme (dark) value, but be surrounded by much lighter elements, so that no two-element area including the extreme element is selected for placement of a dyad. (Such an isolated element is shown at 671 in FIG. 67A.) These single dark elements are candidates for marking to reinforce the reference signal—if needed. In some implementations, a list is generated of the 100, 300 or 750 darkest elements that were not selected for placement of a message bit-indicating dyad, and these elements are marked instead to express the reference signal.

As in the above-described embodiments, the detector is coded with information indicating the locations where dots will be placed (here, 1×2 and 2×1 waxel areas), and the association of a message bit position to each such area. As before, the detector examines only those locations in the captured imagery that are expected to carry a dot (2048 in this embodiment—2 locations for each dyad); the other locations are excluded from demodulation.

(In variations of the foregoing embodiments, this information about locations where dots will/may be placed, and the message bit-significance of each location, is not hard-coded into the detector. Instead, the detector computes it on the fly, based on its knowledge of the reference signal—from which it can identify and rank extrema, and construct a message bit mapping.)

While reference was made to assignment of successive bits of the message signal to elements of the reference signal in order of successive reference signal values, this is not essential. For example, in another arrangement, the assignment can be made based on spatial arrangement of the reference signal extrema. For example, in the second embodiment, 1024 extrema can be identified, and assignment can start in the upper left of a reference signal tile, with the leftmost extrema in the topmost row assigned to the first bit of the message, and subsequent extrema assigned to subsequent message bits in order of a raster scan across and down the tile. These and other such mappings may be regarded as rational, i.e., based on logical rules. Such rational mappings are in contrast to prior art methods, in which successive message bits were assigned to locations in a 128×128 message tile on a deliberately random (or more accurately pseudo-random) basis.

Figure 68A:
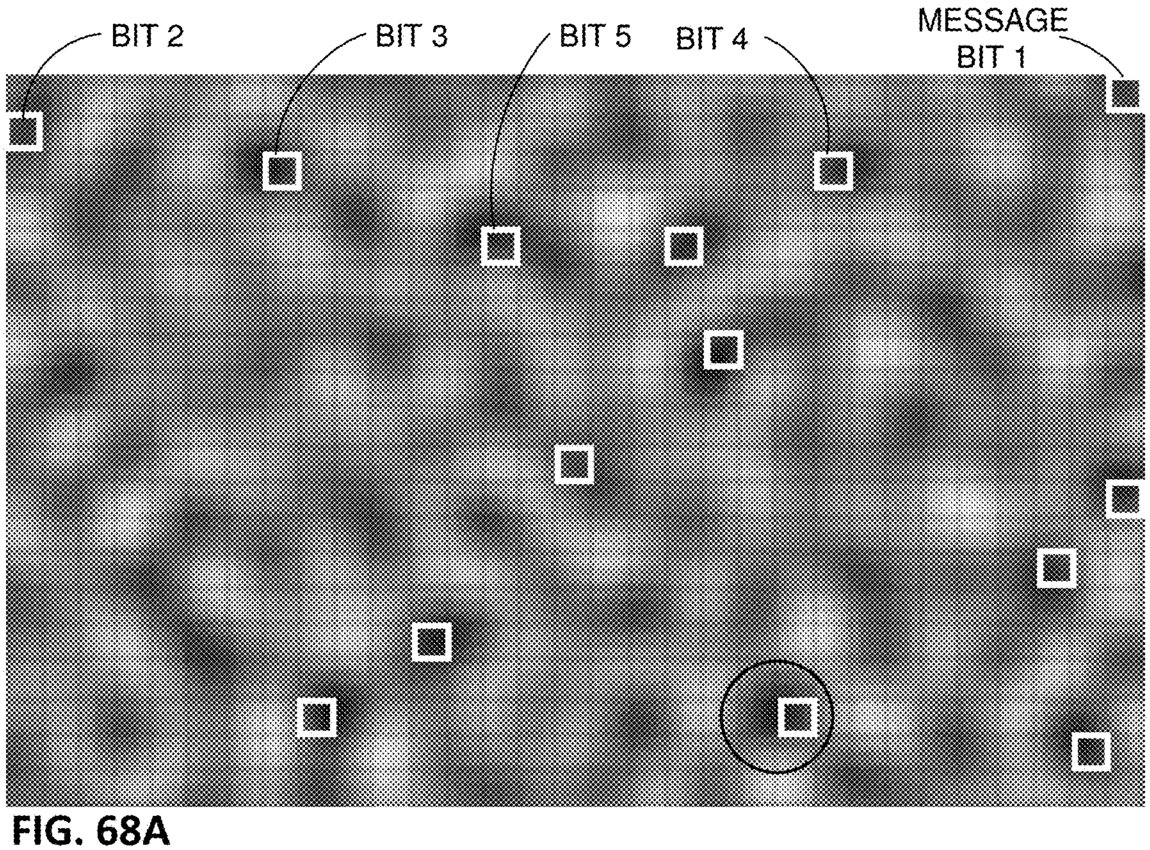
FIG. 68A shows an excerpt from a reference signal tile, with a set of dark waxels identified—each of which is associated with a message bit in accordance with the waxel's spatial location.
Figure 68B:
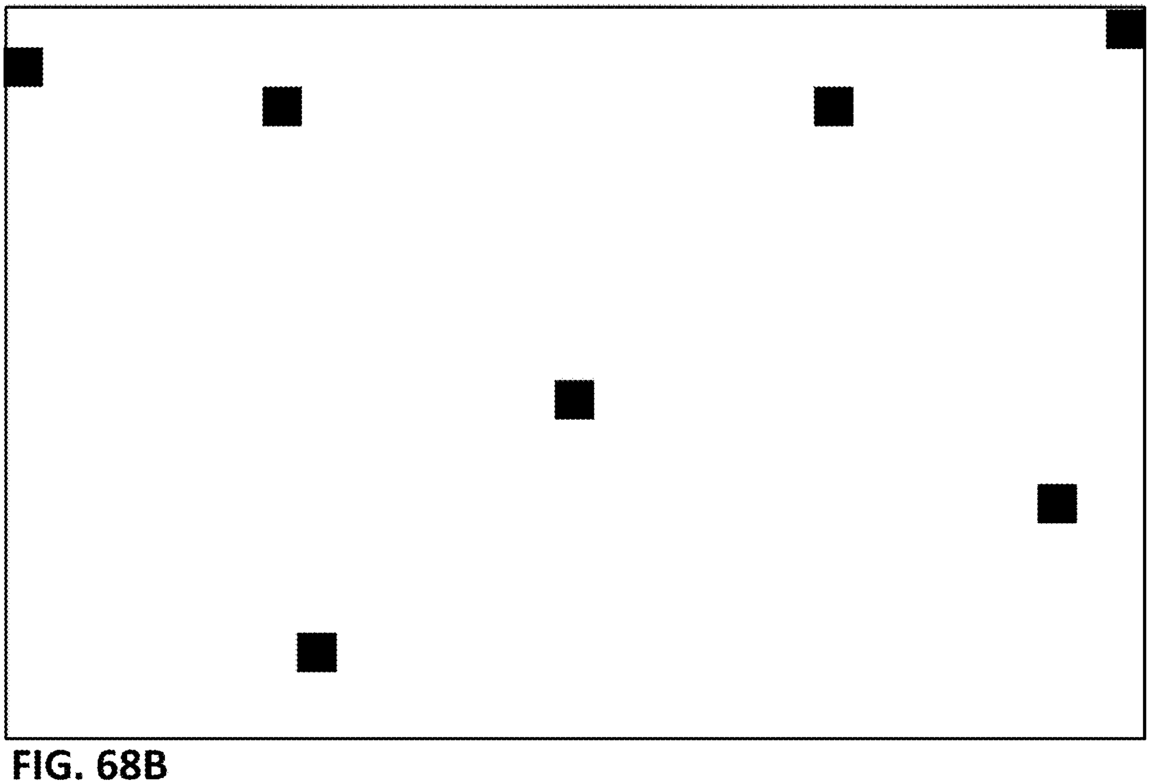
FIG. 68B shows an optical code, starting with 11110, produced by marking certain of the waxels identified in FIG. 68A.

Such a bit assignment arrangement is shown in FIGS. 68A and 68B, in which message bits 1-5 (of a 1024 bit message) are identified based on their spatial location. Since in this second embodiment, the presence of a mark indicates a "1" bit, and the absence of a mark indicates a "0" bit, it will be understood that the marks shown in FIG. 68B indicate a message string starting with the five bits 11110.

A fourth particular embodiment starts with a binary message signal tile of the sort previously shown (in excerpted form) in FIG. 8. The 1024 message signal bits are redundantly spread across the 16,384 waxel locations in a tile, with approximately 8,192 dark elements (i.e., signaling a message value "0") and a like number of light elements (i.e., signaling a message value "1").

This fourth embodiment enables the number N of dark elements in the final sparse output tile to be roughly-settable by the user, as an input parameter. Say we want about 750 dots. Twice this number of darkest elements in the reference signal tile (e.g., the darkest 2N locations in the reference signal tile of FIG. 7) are identified—here 1500 waxel locations. Dots are formed in the output sparse code where one of the ~8,192 dark elements in the binary message code pattern (i.e., representing a "0") is found at one of these 1500 identified waxel locations. Put another way, the 1500 identified waxels start out dark, but are turned off wherever the message tile wants to encode a "1" datum.

An advantage to this fourth embodiment (in addition to the user-settable number of dark elements) is that it can be decoded with the prior art watermark decoders identified above. That is, bits of the message are located in their conventional, randomly-spread spatial locations—although many such locations are left blank.

As with the other embodiments, the decoder begins by compensating the captured imagery for affine distortion, using the reference signal in the conventional manner (i.e., as described in the above-cited references). In decoding the message signal, only data from the 2N identified locations (of reference signal dark elements) are considered by the decoder. A value of 255 (white) can be substituted for all other elements-overwriting any phantom signal that may otherwise be present at those locations. This improves the robustness of the message decoding, compared to prior art watermark decoding.

In this fourth embodiment, as in others, the procedure to create a sparse optical code can be executed at a resolution that matches the resolution with which the code will be printed. In other implementations the procedures are executed at a lower resolution. In these latter cases, the resulting sparse patterns can be up-sampled to a higher, print, resolution—typically while maintaining the same number of dots. (For each dot, the nearest integer neighbor to each fractional up-sampled coordinate at the print resolution is chosen to carry the dot.)

Up-sampling of a signal from a native tile resolution (e.g., 128×128) to a print resolution (e.g., 203 DPI) may result in a dot being placed at a location not coincident with a local extrema of the reference signal in the up-sampled signal space. Steps can be taken to mitigate this issue.

Figure 69A:
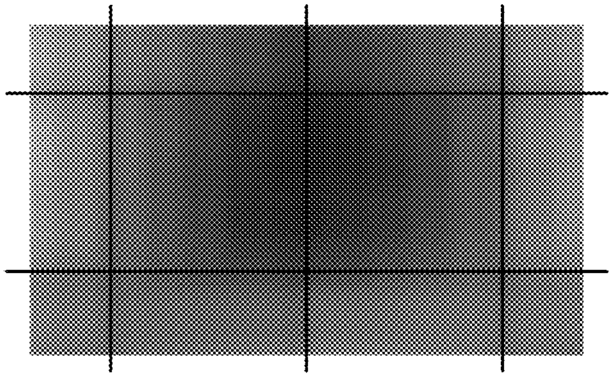
FIGS. 69A-69D illustrate how a reference signal can have an extrema near a boundary between two waxels at one resolution, leading to mis-identification of the extrema at a higher resolution, and a solution thereto.
Figure 69B:
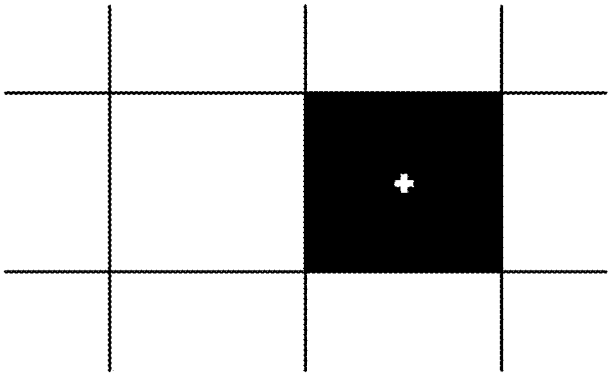

Consider, for example, the excerpt of the reference signal denoted by the circled area at the bottom of FIG. 68A. This area is shown greatly enlarged in FIG. 69A, with waxel boundaries more clearly indicated. The local extrema of the reference signal in this area is near the boundary between two waxels. The right waxel is the darker, and is darkened in the output code if the value of the message signal element mapped to this location is a "0." A corresponding excerpt of the resultant sparse output code is as shown in FIG. 69B.

Figure 69C:
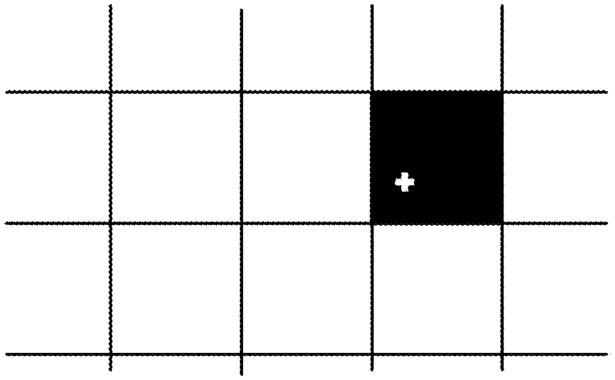
Figure 69D:
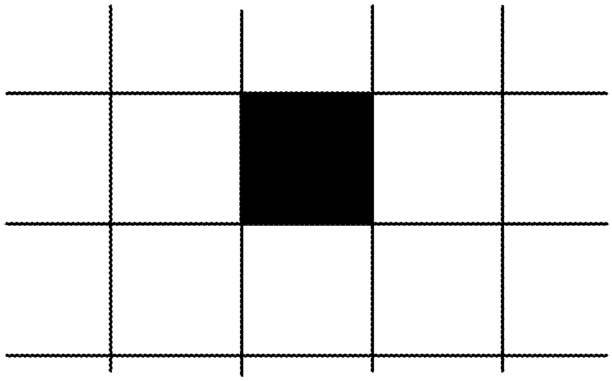

If the original sparse output code is up-sampled by a factor of 3/2, and the single dot from the original code is maintained in the up-sampled code at the element corresponding to the center of the original dot (shown by the white plus signs), then an output code such as shown at FIG. 69C results. However, a more faithful reproduction of the true reference signal extrema (per FIG. 69A) is obtained by nudging the dot one element to the left, as shown in FIG. 69D.

In a particular implementation of the fourth embodiment encoder, the up-sampled sparse code is processed to identify which dots are no longer at sample points that best correspond to extrema points of the reference signal. These dots are nudged (tweaked) left or right, or up or down, to reposition them to better-coincide with true reference signal extrema locations, prior to printing. This aids in obtaining accurate geometric registration of captured images of the code, which, in turn, improves recovery of the message bits.

However, such nudging can impair decoding of the message bits if the decoder is not alert to it, since dots are generally placed away from their ideal message-signaling locations. Fortunately, such issues can be recognized by the decoder, because artifacts due to up-sampling of the reference signal extrema points are predictable, and such data can be stored in a table included with the decoder. For example, after geometric registration (and optional down-sampling), a decoder can consult a stored data table identifying dots which, if present, should be nudged in a particular direction prior to demodulation, and by how much. (In other embodiments, instead of consulting a table to obtain such information, the decoder can model up-sampling of a sparse code and identify which dots—like the dot in FIG. 69D—were nudged to better coincide with reference signal extrema. The decoder then applies a corrective-nudge of each such dot prior to extracting the encoded message.) In some embodiments the nudges are fractional parts of a waxel, or of printed dot rows/columns, as needed to decode with greatest fidelity.

Decoding can also be aided by transforming the captured imagery back to the print resolution for decoding, rather than transforming back to the native tile resolution.

As in other embodiments, with very sparse signals, the reference signal may become difficult to detect due to a paucity of ink. As before, this can be redressed by adding further dots at locations corresponding to additional extrema of the reference signal. The detector is configured to ignore dots at these additional locations when extracting the message signal; they serve only as reference signal data. (Or, if a prior art detector is used, and does not ignore such further dots, the convolutional coding of the message bit will generally permit correct recovery of the payload, notwithstanding the further dots.)

In this fourth embodiment, experiments suggest that, if a dot is detected at a location, this pretty reliably signifies that the probability of "1" message bit being represented at that location is nil. However, if a dot is not detected, things are less certain, with the probability that a "0" bit is represented depending on the value of the reference signal at that location.

As the value of the reference signal approaches zero (dark), the probability that a "0" bit is represented diminishes accordingly (and the probability that a "1" bit is represented increases accordingly). But as the reference signal increases in value (e.g., to 128 and beyond), not-detecting a mark is associated with lower probability determinations. A "1" may be represented—or maybe a "0." It's a coin-flip at values above about 128. Such conditional probability assessments can be provided to a soft-decoder, together with the respective waxel values, for enhanced decoding.

Although the four just-discussed embodiments employ a reference signal with a random appearance, in other implementations a reference signal with a structured appearance (e.g., as in FIGS. 36 and 36A) can be used instead.

In certain implementations of the foregoing embodiments, the candidate extrema of the reference signal are filtered to enforce a distance constraint (keep-out region), e.g., so that no two extrema (whether individual elements, or dyads) are closer than a threshold distance from each other. In some such embodiments, the keep-out region may be non-symmetric around a vertical and/or horizontal axis (e.g., as shown in FIGS. 55-57D).

While reference was made to sorting the values of image elements to identify extrema, techniques other than sorting, per se, can be used. For example, a thresholding operation can be applied to identify reference signal waxels having values below, e.g., 30. If that operation does not yield enough locations, the threshold can be raised to 40, and applied to the locations that did not pass the earlier thresholding test, etc. The threshold can be raised until the needed number of points is identified. (If required for a particular implementation, this smaller set of points can then be sorted.)

Although important decoding advantages are achieved by ignoring predictably-blank areas in the captured imagery, it will be understood that identifying such areas first typically requires geometric registration of the captured imagery, e.g., correcting for affine distortion. Determining affine distortion is performed by considering the complete set of captured imagery; no area is disregarded at this stage of operation. Disregarding blank areas is used after registration—to enhance decoding of the message bits.

It will be recognized that in such arrangements, all the marks are positioned at points in a regular 2D lattice of point locations (i.e., corresponding to rows and columns of printed pixels, or rows and columns of waxel locations). Yet the marks are irregularly-spaced within this lattice. The distribution of printed marks commonly appears pseudo-random.

It will be understood that the sparse patterns resulting from the above-described first through third embodiments cannot be decoded using the cited prior art watermark decoders. Although geometric registration of imagery depicting such patterns (e.g., determining their affine transforms) can proceed in the previous manner, the representation of the message signal itself is unconventional, and must be performed by a decoder designed for this purpose.

The sparse pattern resulting from the fourth embodiment may be, but desirably should not be, decoded using the cited prior art watermark decoders, because such decoders do not know to ignore predictably-blank areas of the sparse code.

In a preferred implementation, a decoder is multi-functional-able to apply different decoding procedures to different marks. Such a decoder makes an initial determination of the type of encoding used to represent the message signal, and applies a corresponding decoding method.

In one such arrangement, the type of encoding is signaled by the presence or absence of certain spatial frequencies in the reference signal. As noted, this reference signal typically comprises several dozen different spatial frequencies (and phases). A few more spatial frequencies (e.g., 1-10) can be added (or omitted) to serve as a flag, to a compliant detector, indicating that a particular one of the just-detailed encoding procedures is being used, and that a corresponding decoding method should likewise be used. That is, such a detector examines the reference signal to determine whether certain flag spatial frequencies are present (or absent) in the reference signal, and applies a decoding method corresponding to the output of such determination. The presence or absence of such frequencies does not interfere with the reference signal's purpose of enabling synchronization of the decoder to the message signal, since that synchronization process is robust to various distortions of the reference signal.

In another embodiment, the decoder begins by compensating the captured imagery for affine distortion, using the reference signal in the conventional manner. It then examines locations that are used for marking in the embodiments detailed above, and locations that should be blank. The decoder determines which are marked, and which are unmarked. If some threshold number K of marks are found at locations where a particular embodiment should have no mark, then that embodiment is ruled-out. Similarly, if some threshold number M of unmarked regions are found at locations where a particular embodiment should have a mark, then that embodiment is ruled-out. By a process of elimination, the decoder narrows down the possibilities to hopefully one, or in some instances two, particular embodiments that may be in use. It then applies a decoding algorithm for the one embodiment and, if that does not yield valid data (e.g., as indicated by checksum information), it applies a decoding algorithm for the second embodiment (if still a candidate).

One particular implementation identifies tile locations that should not have any marking, by identifying extrema of the reference signal that are light, i.e., of values greater than 128. This can be done by sorting the reference signal samples for the 16,384 tile locations to identify, e.g., the 1024 highest-valued extrema. A like number of lowest-valued (darkest) extrema of the reference signal are conversely determined. If the number of dots in the locations associated with the lowest-valued extrema is J times the number of dots in the locations associated with the highest-valued extrema (where J is, e.g., 2 or 3 or more), then the input signal is apparently a sparse mark, and a sparse decoding procedure can be applied. Else, a conventional watermark decoding procedure can be applied.

A related arrangement computes two correlation metrics from the input signal after oct-axis filtering (e.g., producing output values in the range of −8 to 8) and geometric registration. A first metric is based on signal values at the set of, e.g., 1024, locations at which the reference signal has the lowest (darkest) values—termed "sparseLocs." A second metric is based on signals values at the set of, e.g., 1024, locations at which the reference signal has the highest (lightest) values-termed "compLocs."

The first metric, "sparseMet," is computed as follows:

$$sparseMet = -\mathrm{sum}(x(sparseLocs))/sqrt(x(sparseLocs)' * x(sparseLocs))$$

The second metric, "compMet," is computed as follows:

$$compMet = \mathrm{sum}(x(compLocs))/sqrt(x(compLocs)' * x(compLocs))$$

where x (sparseLocs) is a vector (e.g., a row vector) of the tile values at the 1024 sparseLocs locations; and X (sparseLocs)' is its transpose. Similarly for x (compLocs).

When applied to imagery marked with a continuous-tone watermark, both metrics have approximately the same value. When applied to imagery marked with sparse codes, however, the metrics diverge, with sparseMet having a value that is typically 4 to 10 or more times that of compMet.

These metrics can naturally be based on more or less points. In one alternative, sparseMet is based on a set of fixed marks (representing only the reference signal), while compMet is based on a like number of the lightest values in the reference signal tile.

Yet another approach to distinguishing a sparse input signal from a conventional, continuous-tone watermark signal is by reference to the spatial frequency composition of the reference signal. The representation of the reference signal by a sparse selection of extrema points somewhat distorts its spatial frequency content. For example, the higher frequency components are higher in amplitude than the lower frequency components, when represented by sparse extrema dots. Extrema that are always marked to reinforce the reference signal contribute stronger signal components, on average, than extrema that may be present or absent depending on message bit values. Etc.

The conventional watermark decoding process involves correlating the Fourier transform of the captured image signal with a template of the reference signal (i.e., a matched filter operation). A decoder can apply two such matched-filtering operations to the transformed image signal: one determining correlation with the traditional, continuous-tone reference signal, and the other determining correlation with a distorted counterpart associated with a sparse selection of reference signal extrema (e.g., with certain of the extrema at half-strength, due to bit modulation). If the captured imagery is found to better correspond to the latter signal, then this indicates that a sparse mark is being decoded, and a corresponding decoding process can then be applied-instead of a conventional decoding process.

Still another approach to sensing whether the input signal is sparse or not is to try different input filtering operations. Conventional watermark detectors typically employ an oct-axis filter, as described in various patent publications, including 20180005343. Alternate filtering operations may be more suitable for sparse codes, such as a 5×5 pixel MinMax filter kernel, or a donut filter. (A MinMax filter produces an output equal to the center element value divided by the difference between the largest and smallest values of the 5×5 element area centered on the center element. A donut filter determines correlation of an, e.g., 5×5 element patch, with a reference pattern consisting of a black element surrounded by white elements). By running both an oct-axis filter on the input data, and one of the alternate filters, and examining the results, the type of input data may be discerned as either being a conventional watermark or a sparse watermark.

Just as the presence or absence of certain spatial frequencies in the reference signal can be used to signal different encoding schemes, the same approach can additionally, or alternatively, serve to signal different print resolutions. For example, a sparse code printed with a 300 dpi printer may be composed with a reference signal that includes spatial frequencies of 11 and 21 cycles per block. A sparse code printed with a 203 dpi printer may be composed with a reference signal that includes spatial frequencies of 13 and 19 cycles per block. The decoder can discern such frequencies, and convert the captured image to the corresponding resolution prior to extracting the message bits.

(While the foregoing discussion referred to a message string of 1024 bits, a payload of 47 bits, a tile of 128×128 waxels, etc., it will be recognized that these numbers are for purposes of illustration only, and can be varied as fits particular applications.)

In a particular implementation, a message string of 1024 bits is formed as the concatenation of (a) a 100 bit string indicating the encoding protocol used in the code, followed by (b) a 924 bit string based on 47 bits of payload data. These latter bits are formed by concatenating the 47 bits of payload data with 24 corresponding CRC bits. These 71 bits are then convolutionally-encoded with a 1/13 rate to yield the 924 bits.

Reference was earlier made to soft-decision decoding—in which the 1024 message bits, and corresponding confidence values, are input, e.g., to a Viterbi decoder. In some embodiments, confidence in a dark mark (signaling a "0" bit) is based on its darkness (e.g., 8-bit waxel value).

In one implementation, candidate mark locations are each examined, and those having values below 128 are regarded as dots, and others are regarded as blank. An average value of waxels with dots is then computed. The average value may be, e.g., 48. This can be regarded as a nominal dot value. The confidence of each dot is then determined based on its value's variance from this nominal value. A dot of value 40 is treated as more confident. A dot of value 30 is treated as still more confident. Conversely, dots of value 60 and 70 are treated as progressively less confident. Dots of the average value may be assigned a first confidence (e.g., 85%), with dots of lower and higher values being assigned higher or lower confidence values, respectively.

In another implementation, the nominal dot value is based on fixed marks, signaling the reference signal. Message dots are then confidence-valued in relation to the average value of the fixed marks.

Figure 70:
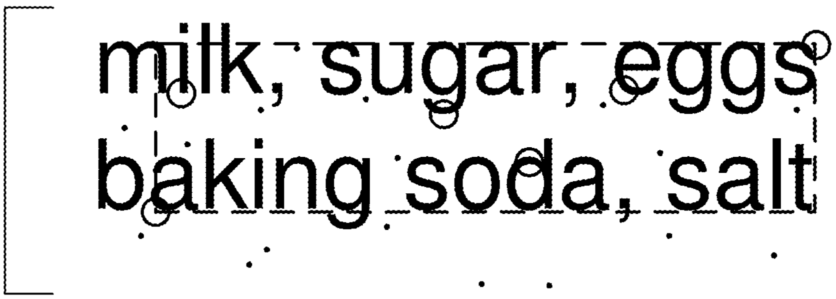
FIG. 70 shows an excerpt from a printed label that includes an optical code, in which certain fixed marks are suppressed due to proximity with text, signaling that nearby variable marks should be discounted in extracting a message.

Sometimes fixed marks, and message marks, are not printed, e.g., if dots in a portion of a code tile are suppressed due to their positioning within a text-based keep-out zone. FIG. 70 gives an example—showing a fractional part of a label. The circles indicate the positions where fixed marks would normally go but, due to the presence of text, are suppressed. (Message marks close to the text are similarly suppressed, but their absence is not marked.)

In accordance with another aspect of the technology, these absent fixed marks serve to bound a region of the label (shown by the dashed rectangle, and aligned with the waxel rows) where all data is untrustworthy. A dot at a candidate message location may not reliably signal a "0." A missing dot at a candidate location (if the encoding scheme is one in which certain blank areas signal "1" message bits-such as the second embodiment, above) may not reliably signal a "1." Data extracted from such region, whether signaling "1" or "0" bit values, are all assigned very low confidence values (e.g., zero).

FIG. 71A shows an illustrative method according to the foregoing, which may be practiced by a printer, e.g., in a deli or bakery department of a retail store. FIG. 71B shows a corresponding method that may be practiced by a point-of-sale retail scanner.

From the foregoing, it will be recognized that improved sparse messaging, with dot densities much less than the prior art, can be achieved by providing the decoder a priori knowledge of candidate dot locations, enabling the decoder to disregard predictably-blank areas of the captured imagery, and the phantom signals that such areas might represent.

Particular Implementations

The following discussion provides additional details concerning particular implementations based on the fourth embodiment, above. Except as noted, features discussed above can be used with these detailed implementations.

In this arrangement, the reference signal consists of 32 or less spatial sinusoids, e.g., 16. These reference frequencies are a subset of the (more than 32) frequencies that form the reference signal in the continuous-tone watermark. This permits the synchronization algorithm for the continuous-tone watermark to be adapted to perform synchronization for this sparse watermark, as detailed in a following section.

The reference signal is expressed in a tile of size 128×128 waxels. The 1500 darkest local extrema in this reference signal are determined. This may be done by computing the reference signal value at each point in a finely spaced grid across the tile (e.g., at a million uniformly-spaced points), and sorting the results. The darkest point is chosen, and points near it (e.g., within a keep-out distance of a waxel or two) are disqualified. The next-darkest point is then chosen, and points near it are disqualified. This process continues until 1500 points have been identified. (Although laborious, this process needs to be performed only once.) This results in a table listing the X- and Y-coordinates, in floating point, of 1500 local extrema within the reference signal tile. These darkest 1500 locations are termed “printable locations.”

Of the 1500 printable locations, the very darkest 300 locations are always marked (black) in the output signal (optical code), so as to strongly express extrema of the reference signal (the “always-dark” locations). The remaining 1200 candidate locations (“variable data locations”) are marked, or not, depending on whether the corresponding element of the message signal tile conveys a “0” or a “1.” (Hereafter we use the equivalent −1/1 notation for the two states of a binary signal.)

Lists of the floating point X- and Y-coordinate values for the 300 always-dark locations, and for the 1200 variable data locations, are stored in a data table of exemplary decoders as side information.

In this particular implementation, tiles are printed at a scale of about 150 waxels per inch (WPI). At 150 WPI, each tile spans 128/150, or about 0.85 inches.

While the extrema locations are known with floating point resolution, actual printing hardware can produce marks only at discretely spaced locations. Popular printers have printheads that produce output markings at resolutions of 203 dots per inch (DPI) and 300 DPI. These resolutions require interpolation of the 128×128 message tile (e.g., by bilinear or bicubic interpolation).

For DPI-agnostic encoding, the encoder examines the −1 or +1 value in the interpolated message array at the location that is closest to each of the printable, variable data locations. If the interpolated message has a “−1” value at that location, the variable data location in the output code is marked. If the interpolated message has a “1” value at that location, the variable data location in the output code is left unmarked.

In a decoder, after a marked image has been geometrically registered, decoding can proceed by interpolating among the registered image data to determine the signal values at the variable data locations defined by stored floating point X- and Y-coordinate values.

It will be recognized that the decoder, in such arrangement, is looking at exact extrema locations during decoding, whereas the encoder was unable to put marks at those precise positions. This is a compromise, but it works regardless of the DPI of the printing hardware. That is, the decoder needn’t know the DPI of the printer.

If the DPI of the printing hardware is known (or is determinable) by the decoder, a variant arrangement can be employed. In such case, instead of identifying extrema in the high resolution reference signal (i.e., yielding floating point coordinates), the reference signal value is sampled at the center of each of the locations that the printer can mark, e.g., at 203 DPI, within the reference signal tile. The 1500 darkest extrema are identified from this smaller sampled set.

A tile that is 128 waxels across, at 150 WPI, when printed at 203 dpi, works out to be 173.23 dots across. That’s an awkward number to work with. Better is for each tile to have a dimension, in dots, that is an integer, and preferably one that is divisible by two. In this illustrative implementation, 174 is chosen as the dot dimension for the tile—a value that is divisible by four. This yields a WPI value of (203*128)/174=149.33 WPI—an inconsequential difference from a nominal 150 WPI value.

The reference signal is computed at sample points (quantization points) across the tile of 174×174 dot locations (i.e., 30,276 dots). The 1500 sample points having the smallest (darkest) values are identified as printable locations. (Again, a keep-out zone can be employed, if desired.) As before, the very darkest 300 locations serve as always-dark locations, while the 1200 others serve as variable data locations.

Again, a listing of these locations is provided as side information to decoders. However, instead of being expressed as floating point coordinates, the printable locations can be identified simply by their row/column numbers within a 174×174 dot tile.

In this variant arrangement, it will be recognized that the decoder is looking for marks at dot locations (and marks are printed at these same dot locations), in contrast to the earlier arrangement in which the decoder is looking for marks at floating point locations (and marks are printed at slightly different, albeit not exactly known, dot locations).

One particular decoder employs a hybrid of the foregoing arrangements. Such a decoder is equipped with stored side information that expresses the coordinates of printable locations in both forms-both as floating point coordinates, and as row/column coordinates based on 203 DPI. To decide which to apply, after performing geometric registration of an input tile, the decoder does a trial examination of, e.g., 100 of the always-dark locations, using both the floating point coordinates, and the 203 DPI row/column coordinates. If the latter set of coordinates yields darker image samples, on average, than the former set of coordinates, then the decoder knows the code was printed at 203 DPI, and uses the row/column data to examine all of the printable locations. Else, it uses the floating point coordinates.

Such arrangement can be extended to include other DPI as well, e.g., with the decoder having printable locations defined by floating point coordinates, row/column coordinates in a 203 DPI tile, and row/column coordinates in a 300 DPI tile. Each can be trialed. If row/column coordinates at 203 or 300 DPI yields darker samples, it is used; else the floating point coordinates can be used.

In applications where such alternate trials are too time consuming, a different approach can be employed. Applicant conducted tests of sparse watermarks printed at 203 DPI, and read with two detectors—one having reading coordinates based on 203 DPI, and another having reading coordinates based on 300 DPI. The detector with 300 DPI had a slightly impaired reading rate (−0.6%) compared with the detector using the correct, 203 DPI, reading coordinates.

The tests were repeated with sparse watermarks printed at 300 DPI. In this case, the detector using reading coordinates based on 203 DPI had a significantly impaired reading rate (−4.8%) compared with the detector using the correct reading coordinates based on 300 DPI.

These data led to the hypothesis that, if a sparse mark is printed with a printer of unknown spatial resolution, it is better to err on the side of assuming to too-high printer DPI than a too-low printer DPI. This was confirmed in further tests. For example, a sparse watermark printed at 300 DPI resolution was read with a detector having reading coordinates based on 450 DPI. This affected reading rate by only-0.1%.

Accordingly, in application scenarios in which the printer resolution is unknown, applicant prefers to assume a printer resolution equal to, or above, the resolution of the finest-resolution printer that may have printed the watermark. However, there are diminishing returns if the resolution is chosen too high. 450 DPI seems to be a good compromise.

So returning to the example of a watermark comprising an array of 128×128 waxels, printed at 150 waxels per inch, in the absence of actual printer resolution information, the decoder assumes the mark is printed at 450 DPI. In such resolution, the watermark array would have been printed with 382 dots on a side ((128/150)*450). The reference signal would have been earlier sampled at this resolution, producing 382^2=145,924 samples. The darkest 1500 of these samples would have been identified by their row/column coordinates in the 382×382 array. As before, the very darkest 300 locations would serve as fixed, always-dark locations, while the 1200 others would serve as variable data locations. A listing of these locations is provided as side information to the decoder. After captured imagery has been geometrically registered, decoding proceeds by interpolating among the registered image data to determine the captured signal values at the fixed and variable data locations defined by this stored side information. This side information thus informs the detector which locations to examine, and allows it to ignore all other locations.

Figure 72A:
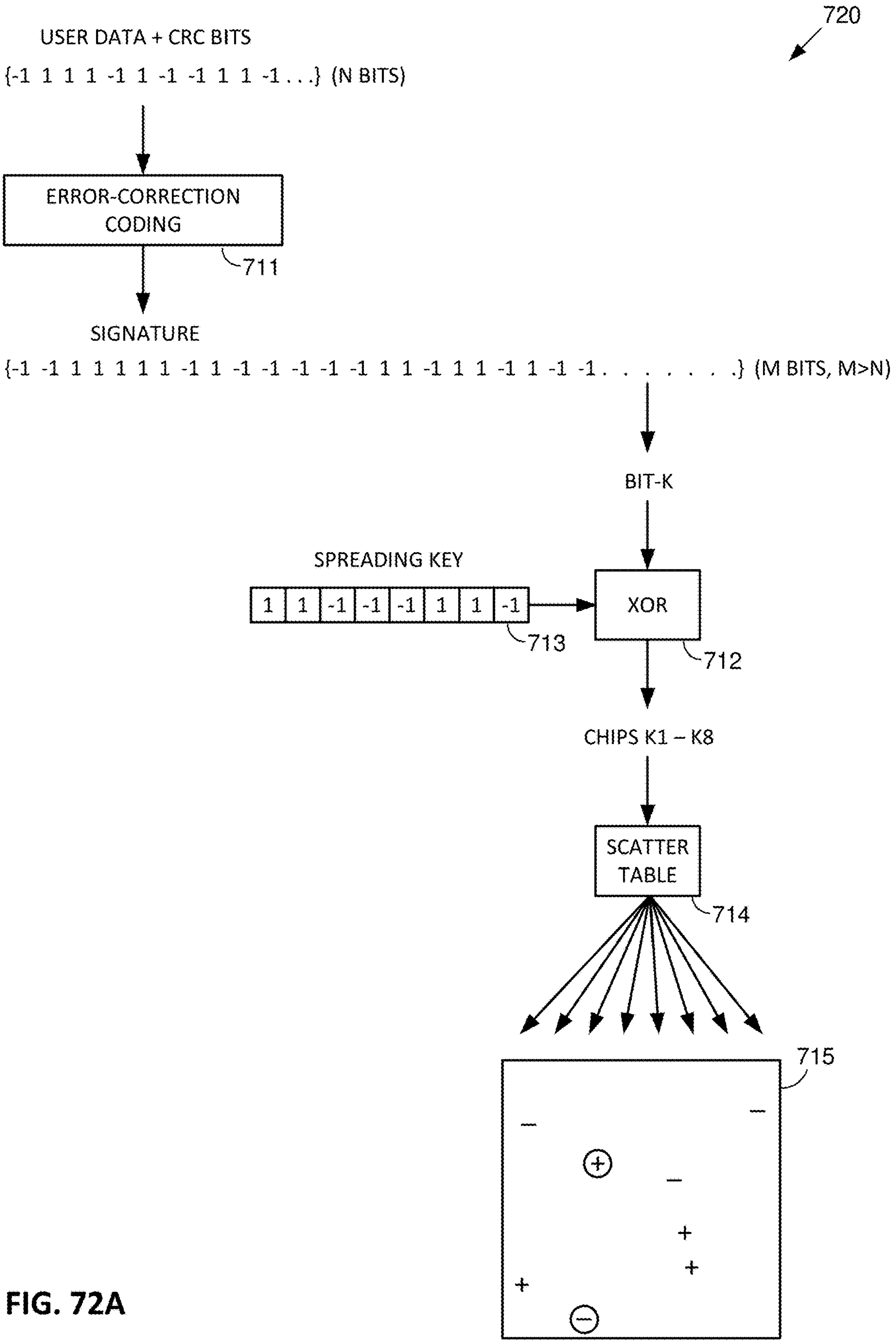
FIGS. 72A and 72B illustrate aspects of an encoder and decoder.

FIG. 72A illustrates aspects of one particular encoder 720. Data to be conveyed by the optical code (e.g., user data and associated CRC bits-N bits in all) are provided to an error-correction coding module 711. This module applies convolutional encoding (e.g., tailbite encoding with rate of 1/13) and, optionally, repetition coding. It produces a longer (M bit) string, or signature, as its output. In a particular embodiment, M=1024.

Each bit of the signature is XORed (712) with each element of a plural-element binary spreading key 713. An eight element key is shown in FIG. 72A, but other length keys can be used (e.g., 4 or 16 elements). This operation transforms a single bit of the signature (e.g., "bit-K") into eight corresponding binary "chips" of −1 or +1 value. A scatter table 714 assigns each of the chips to a different location within a message tile 715, as shown by the "+" and "−" symbols in FIG. 72A.

The tile 715 has 1500 printable locations, and a great many more non-printable locations. Some of the printable locations are always-black, reducing the count of printable locations that are available to express chips. In the depicted FIG. 72A tile, the circles denote printable locations that are available to express chips, and that are mapped to chips associated with bit-K. (It is uncommon for chips for a single signature bit to be assigned to two printable locations.) The scatter table maps one chip, having a "+1" value, to one printable location, and maps another chip, having a "−1" value, to another printable location. As discussed earlier, only one of these two different binary values results in a printed mark-here the −1. The location to which the +1 chip is assigned is left unprinted. Thus, although chips for bit-K are assigned to two locations, only one location is marked. (If chips were assigned to two locations, and both chips had the same value, then either (a) both chip locations would be marked-if the chips' value is −1, or (b) neither chip location would be marked-if the chips' value is +1.)

In this implementation, each of the M bits of the signature is spread by the same spreading key.

(Not shown in FIG. 72A is a scrambling operation applied to the M-bit signature, by XORing each of its bits with a corresponding bit of an M-bit scrambling key. This yields a keyed M-bit signature from which the chips are derived. A reciprocal unscrambling operation is performed during decoding. Such scrambling/descrambling is straightforward and is not further belabored.)

When a particular tile encoded according to the foregoing method was analyzed (but using a 16 bit spreading key, yielding 16 chips per signature bit), it was found that 344 bits of the M=1024 bit signature were not mapped to any of the variable data locations. That is, none of the 16 chips associated with each of these 344 bits was assigned to even one of the 1200 variable data locations.

382 bits of the signature were each mapped to one of the variable data locations. That is, of the 16 chips associated with each of these 382 bits, one chip for each was mapped by the scatter table to a variable data location.

210 bits of the signature were each mapped to two of the variable data locations. That is, two chips expressing each of these 210 bits found a place among the 1200 variable locations. (This is the case with bit-K in FIG. 72A.)

75 bits among the 1024 signature bits were expressed by three chips each.

A smaller number of bits in the signature were expressed by between four and six chips at variable data locations.

Despite the daunting odds (e.g., only 1200 variable data locations among 30,276 tile locations, and with 344 bits of the 1024-bit signature (slightly over one-third) finding no expression whatsoever), the originally-input user data/CRC can be recovered with a robustness comparable to other schemes that result in much more conspicuous markings. As noted, this is due in part to a decoding arrangement that disregards most input image data, and examines only those locations at which data is known to be possibly encoded.

Figure 72B:
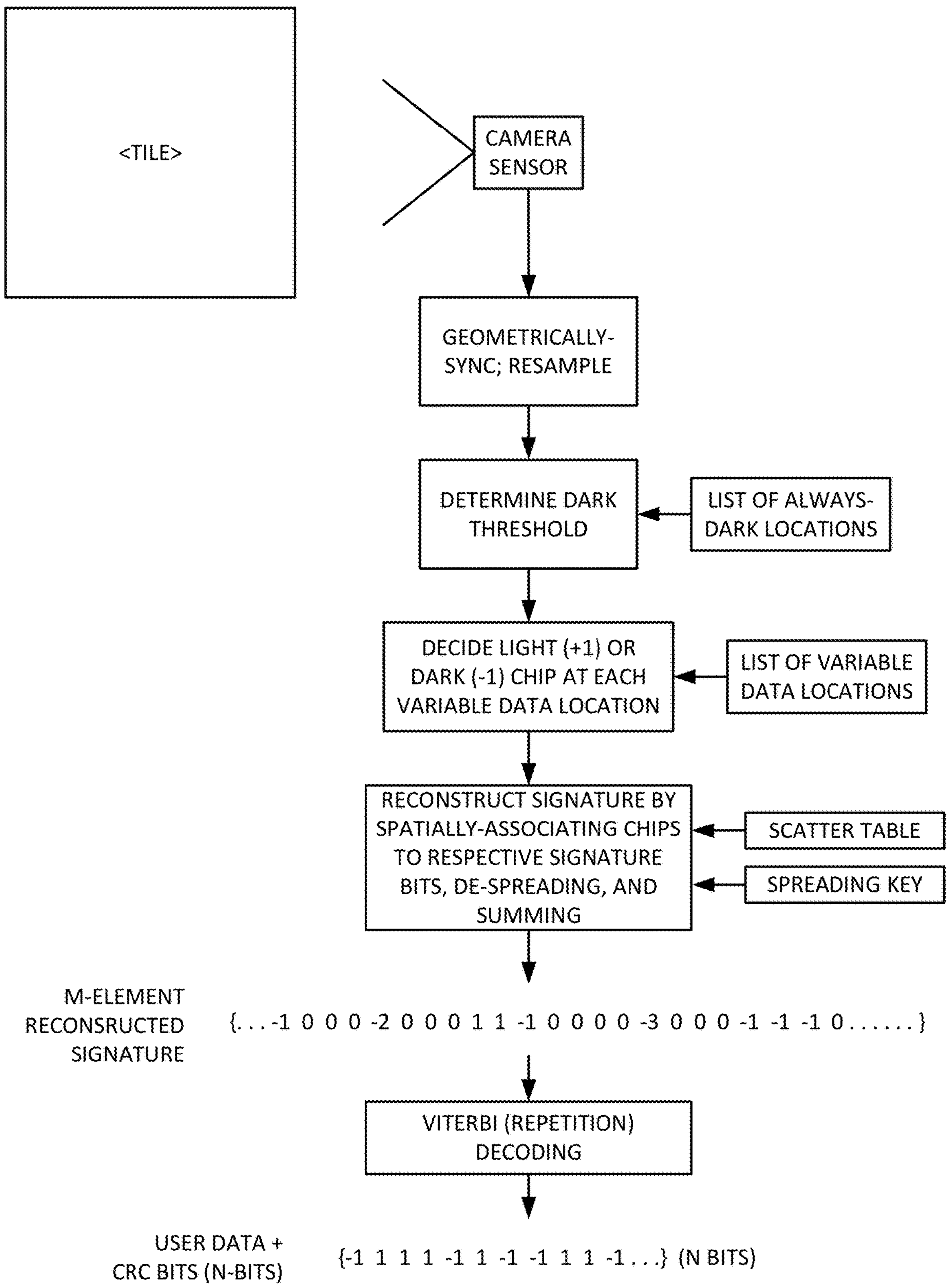

Aspects of a complementary decoder are shown in FIG. 72B. This decoder first performs geometrical synchronization on captured imagery, based on the 300 always-dark marks, and the approximately 600 dark marks that do double-duty representing both reference signal extrema and "−1" chips. Once the code is synchronized, it is resampled, e.g., at a 128×128 WPI spacing, and/or a 174×174 DPI spacing.

The decoder knows (by the stored side information) the locations of the 300 always-dark locations. It determines statistics for the luminances (or chrominances) at some or all of these locations, e.g., finding the average luminance value (in an 8-bit binary scale) and the standard deviation across the always-dark locations. The decoder then examines the remaining 1200 variable data locations (for which it also knows the x- and y-locations from the stored information), and notes the luminance at each. The locations having a luminance within a given threshold of the just-computed average luminance for the always-dark locations (e.g., having a value less than 1.5 standard deviations above the average), are regarded as being dark, and are assigned chip values of "−1." The other locations, of the 1200, not meeting this test, are regarded as being light, and are assigned chip values of "+1."

Each of the chip values discerned from the 1200 printable locations is mapped to an associated bit of the signature, and de-spread (e.g., by XORing with associated elements of the spreading key) to indicate the value of that signature bit. If a bit of the signature is expressed by two or more chips at printable tile locations (as in FIG. 72A), then the signature bit values respectively indicated by these chips are summed. If there are no errors, each such chip consistently indicates the same signature bit value, and the sum over plural chips will total +2 or +3 or −2, or −3, etc. The higher absolute values indicate, to the decoder, successively higher confidences in the value of that particular signature bit. If there are errors, and two such chips indicate conflicting bit values for a signature bit, then the sum over the plural chips equals zero. This indicates, to the decoder, that no information is available about the value of that signature bit.

As noted, many of the originally-encoded 1024 signature bits are not represented in the optical code. None of their chips is mapped to a printable, variable data location. These are treated as missing bits in the signature, and are similarly assigned values of "0" when submitted for decoding.

A reconstructed signature is thereby assembled, and is submitted to a Viterbi decoder. This decoder (in conjunction with an optional repetition decoder) outputs an N-bit string of data, including decoded user data and decoded CRC bits. The CRC bits are used to check the user data and, after correspondence is confirmed, the user data is output to a receiving system.

As noted, more than a third of the 1024 scrambled signature bits find no expression in the optical code (in this particular embodiment). This is because the scatter table (1) maps most of the corresponding chips to locations in the tile that are not among the 1500 printable locations, or (2) maps them to locations that are reserved for always-dark marks. In a variant embodiment, the scatter table is designed to differently map chips representing the 1024 signature bits, so that each finds expression in at least one of the 1200 variable data locations. However, applicant prefers the detailed arrangement because the scatter table can be the same one used with existing continuous-tone watermarks, preserving backwards compatibility. (Another variant involves re-design of the reference signal, so the dark extrema fall at locations where the existing scatter table maps at least one chip for each scrambled signature bit. But this, too, interferes with backwards compatibility.)

It will be understood that the count of 1500 printable locations (and the component counts of 300 always-dark locations and 1200 variable data locations) can be varied as different applications dictate. By increasing the number of always-dark locations, the reference signal becomes more resilient to interference (i.e., more robust). By increasing the number of variable data locations, the message signal becomes more resilient to interference. By reducing the number of printable locations, the code is made more inconspicuous.

A decoder can auto-detect which of various encoding protocols is used. For example, different protocols can have the following always-dark and variable data locations (identified from a ranked list of reference signal extrema):

TABLE 4

| Protocol | Always-Dark Locations | Variable Data Locations |
|---|---|---|
| A | 1-300 | 301-1500 |
| B | 1-400 | 401-1500 |
| C | 1-500 | 501-2000 |

All of the protocols share the same reference signal. Protocol A is as described above. Protocol B has 100 more always-dark locations, and 100 fewer variable data locations, than Protocol A. Protocol C has 200 more always-dark locations, and 300 more variable data locations, than Protocol A. The decoder is provided a ranked list of the 2500 darkest locations, each with its coordinate values.

When an image is captured (and geometrically-registered using the reference signal as expressed by its printed dots), the decoder examines the locations ranked 1-300 (which should be dark in all protocols) to generate luminance (or chrominance) statistics for these always-dark locations, e.g., the average value, and/or the standard deviation. This information is then used to evaluate the image to see if it is encoded with Protocol A, B or C.

In particular, the decoder examines locations 301-400, which should be always-dark in both Protocols B and C. If the statistics for these 100 locations match—to within a specified degree of correspondence—the statistics for locations 1-300, then locations 301-400 are regarded as always-dark too. (The specified degree of correspondence may be, e.g., having an average value within +20%/−20% of the other average, and/or a standard deviation within +30%/−30%.) If no such match is found, the Protocol is known to be Protocol A, and the decoder proceeds as above—examining the extrema locations ranked as 301-1500 to discern the user data.

If locations 301-400 are judged to be always-dark, the decoder examines locations 401-500. If the statistics for these locations match, within the specified degree of correspondence, the statistics for locations 1-300, then locations 401-500 are regarded as always-dark too. In this case, the detector knows the image is marked according to Protocol C. It then examines the extrema locations ranked as 501-2500 to discern the user data. If the statistics don't match, then the detector knows the image is marked according to Protocol B. It then examines the extrema locations ranked as 401-1500 to discern the user data.

This is a simple example. In more complex arrangements there may be additional encoding protocols that are similarly differentiated. Also, the decoder can employ different scatter tables, spreading keys, scrambling keys, etc., depending on the identified protocol (based on a number of locations identified as being always-dark).

Dot Clumping

In some circumstances, dot clumping is desirable. A larger dot (e.g., more ink) persists better through the vagaries of printing and scanning. Small, individual, dots may be lost to noise, while a larger dot survives to be detected.

If dots are to be clumped (e.g., grouped several to a waxel), the largest clumps are best positioned at locations of the very darkest extrema of the reference signal. (The preferred reference signal has a Gaussian-like distribution, so the very darkest extrema are the fewest in number.)

In one arrangement, a desired print density, or tint, is established, which defines a number of individual dots that may be printed within a tile. This serves as a dot budget, which can be distributed among clumps of different sizes. The distribution can take many forms.

Consider a budget of 900 dots. If a waxel corresponds to a 3×3 spatial array of printer dots, there may be anywhere between 1 and 9 dots per clump. In one arrangement (a linearly-distributed arrangement), one-ninth of the dots (i.e., 100) are printed as individual dots. A further one-ninth are printed as clumps of two dots (there are 50 such clumps). A further one-ninth are printed as clumps of three dots (there are 33 such clumps). The distribution continues in this fashion until reaching the end, with clumps of nine dots (of which there are 11 such clumps). The latter clumps are assigned to the 11 darkest reference signal waxels, with successively smaller clumps being mapped to successively lighter reference signal waxels.

Such a distribution may be detailed like this:

TABLE 5

| Darkest Reference Sig. Waxels Nos. | Dots per Clump | Number of Clumps (Marks) | Total Dots Used |
|---|---|---|---|
| 1-11 | 9 | 11 | 99 |
| 12-24 | 8 | 12 | 96 |
| 25-39 | 7 | 14 | 98 |
| 40-57 | 6 | 17 | 102 |
| 58-78 | 5 | 20 | 100 |
| 79-104 | 4 | 25 | 100 |
| 105-138 | 3 | 33 | 99 |
| 139-189 | 2 | 50 | 100 |
| 190-290 | 1 | 100 | 100 |
| | SUM: | 282 | 894 |

In another arrangement, an exponential distribution is employed. An example is shown by the following table:

TABLE 6

| Darkest Reference Sig. Waxels Nos. | Dots per Clump | Number of Clumps (Marks) | Total Dots Used |
|---|---|---|---|
| 1-3 | 9 | 3 | 27 |
| 4-8 | 8 | 4 | 32 |
| 9-16 | 7 | 7 | 49 |
| 17-28 | 6 | 10 | 60 |
| 29-46 | 5 | 16 | 80 |
| 47-75 | 4 | 26 | 104 |
| 76-126 | 3 | 45 | 135 |
| 127-226 | 2 | 89 | 178 |
| 227-491 | 1 | 234 | 234 |
| | SUM: | 434 | 899 |

(For expository convenience, the above tables are simplified by assuming that all locations are printed. In practice, most locations are generally printed about half the time (variable data locations), while others may be printed all the time (always-dark locations). Appropriate adjustments can naturally be made.)

It will be seen that there are many more marks in the tile of the second arrangement than in the tile of the first arrangement (434 vs. 282). The more marks, the greater the number of signature bits that can be expressed in the tile, so the greater the probability of passing the message payload without error. However, the eight darkest reference signal waxels are marked with 72 dots in the first arrangement (8*9) versus only 59 (27+32) in the second arrangement. So the reference signal may be more reliably detected in the first arrangement (since the darkest reference extrema help the most).

The apportionment of dots between clumps of different sizes is thus an exercise in optimization. Different apportionment strategies can be tried to find a balance between message robustness and reference signal robustness that best serves the needs of a particular application.

Many other strategies can naturally be used, including waxel clumping. In one such strategy, if first and second edge- or corner-adjoining waxels are both among the 1000 lowest-valued reference signal values in a tile, and one of them is among the N lowest-valued reference signal values (where N is e.g., 20-200), then they both serve as printable locations, notwithstanding their proximity. If a third waxel edge- or corner-adjoins both the first and second waxels, and it is also among the 1000 lowest-valued extrema, then it may be marked too. Ditto a fourth extrema-valued waxel that adjoins the previous three waxels. In this last instance, a 2×2 region of waxels may be marked. (Such arrangement can result in a few 2×2 marked regions, a few more clumps of 3, and still more clumps of 2, but not more than N such clumps in total, per tile.)

Dot and waxel clumping is most commonly used when the contrast between the dot color and the substrate color is not conspicuous due to human visual system insensitivity. For example, dots of Pantone 9520C ink (a very pale green), on a white substrate, are difficult to discern by humans. However, red light scanners, of the sort used at supermarket point of sale stations, can readily distinguish such markings. (Further information about Pantone 9520C ink, and its use in watermarking, is provided in patent publication 20180047126.)

Local Registration Correction

Affine transformation information, discerned by a detector from a reference signal in captured imagery, ideally enables the imagery to be transformed to a known scale, rotation, and translation. In such case, each dot mark is restored to a location in the center of a corresponding waxel for decoding.

In practice, however, this restoration is never perfect. The object depicted in the imagery may be flexed or otherwise deformed from a planar state. The imagery may be captured with spatial distortion (e.g., perspective or conical distortion). Printing on the object may be spatially-skewed. Etc. As a consequence, dot marks are not all restored to the centers of their corresponding waxels. Extraction of the encoded message bits suffers accordingly.

Figure 73:
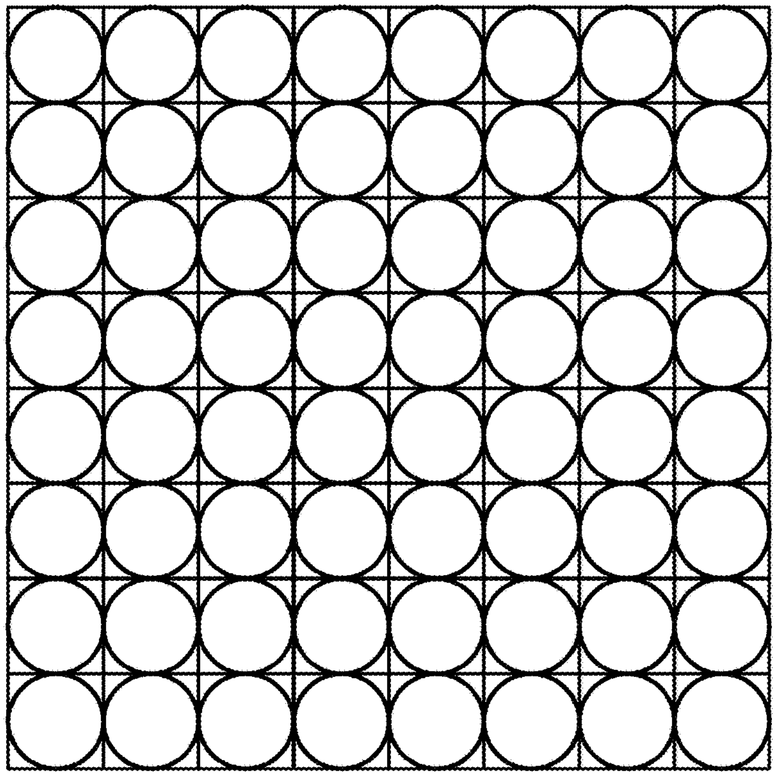
FIG. 73 illustrates how an array of dots ideally coincides with an array of spatial waxel areas.
Figure 74:
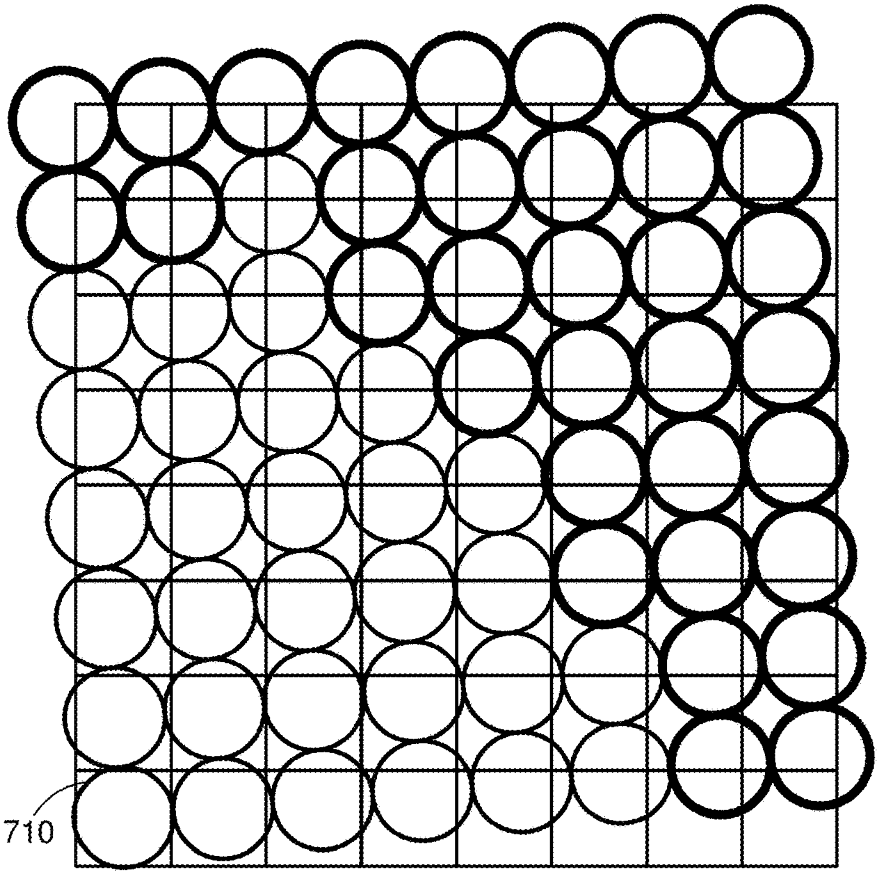
FIG. 74 is similar to FIG. 73, but is an exaggerated view of a more usual case, in which an array of dots is distorted in scale and rotation, so that the dots do not all coincide with an array of spatial waxel areas.

FIG. 73 shows the ideal case, with individual waxels indicated by the square regions, and a full array of dots shown by the circles. FIG. 74 shows an exaggeration of the more typical case, with one dot 710 restored to nearly perfect centering in its correct waxel, and other dots progressively further out of alignment. (The array of dots in FIG. 74 has a rotation error of 5 degrees counter-clockwise, and a scale error of 5%.)

It will be seen that the centers of the bolded dots in FIG. 74 no longer fall within the waxel regions to which they should correspond. Their signal energy will be mis-interpreted by the message detector, leading to erroneous data.

Figure 75:
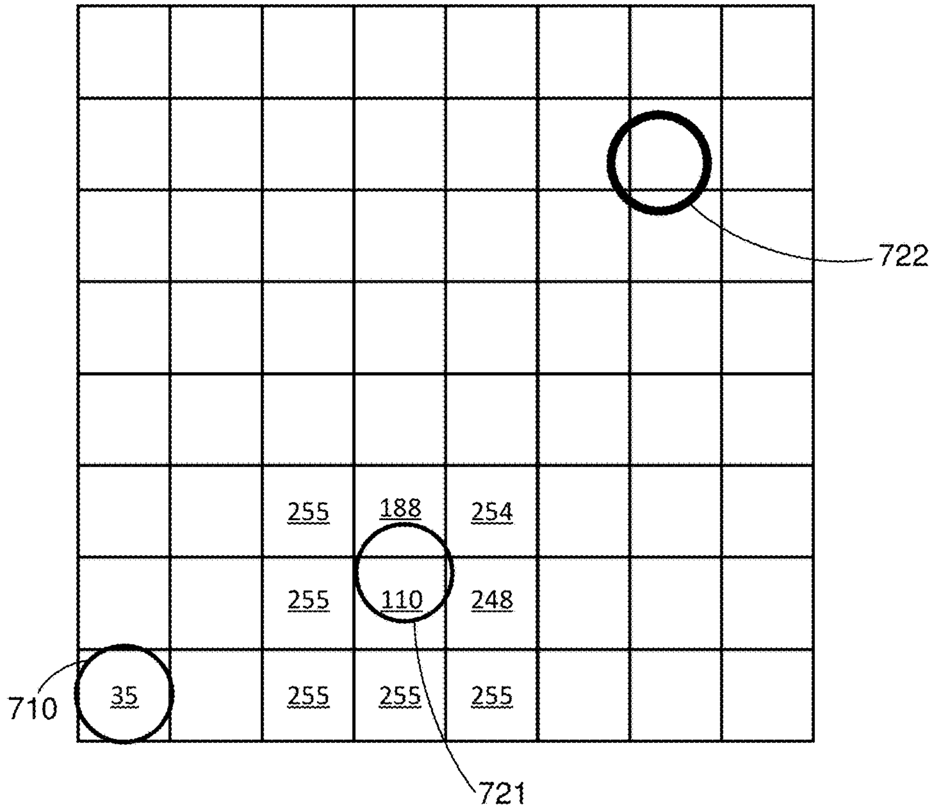
FIGS. 75-81 detail an illustrative process by which an optical code that is distorted in scale and rotation might be compensated for more accurate decoding.

In actual practice, the dots are sparsely placed. FIG. 75 gives an example—excerpting three dots from FIG. 74. (The dots are shown as unfilled for clarity of illustration, but are typically solid black.) One of the dots, 710, is essentially correctly-placed. Its corresponding waxel is nearly-filled with a dark mark, and may have a value of, e.g., 35 (on a 0-255 scale).

Typically, the registration process yields a best-match at the center of a processed patch of imagery. The best-registered dot can generally be identified by identifying the darkest 10-50 waxels in the captured imagery (or the 10-50 waxels closest to the center of the patch), and examining the four edge-adjoining waxels around each. The best-centered dot is characterized by edge-adjoining neighbors of equal values. That is, the best-registered dot is symmetrically-centered amidst its north, south, east and west neighbors (each of which is desirably white or near-white).

A simple filter kernel suitable for identifying a best-centered dot examines the 8-bit values of (a) a subject waxel and (b) its four edge-adjoining waxels. The first value is subtracted from the sum of the latter four values. The center waxel yielding the highest kernel output value can be regarded as the best-centered dot.

To assess registration error, the centering of a second dot 721 near the best-registered dot 720, is checked. Centering can be checked by examining values of a neighborhood of waxels around the second dot. These are shown by the underlined numbers in FIG. 75. The center of mass of dot 721 can be expected to be within its correctly-corresponding waxel, since the typical scale and rotation errors don't manifest themselves significantly within such a close distance. Thus, the waxel with the value of 110 (i.e., the darkest of the neighboring waxels) is the waxel to which dot 721 corresponds.

Figure 76:
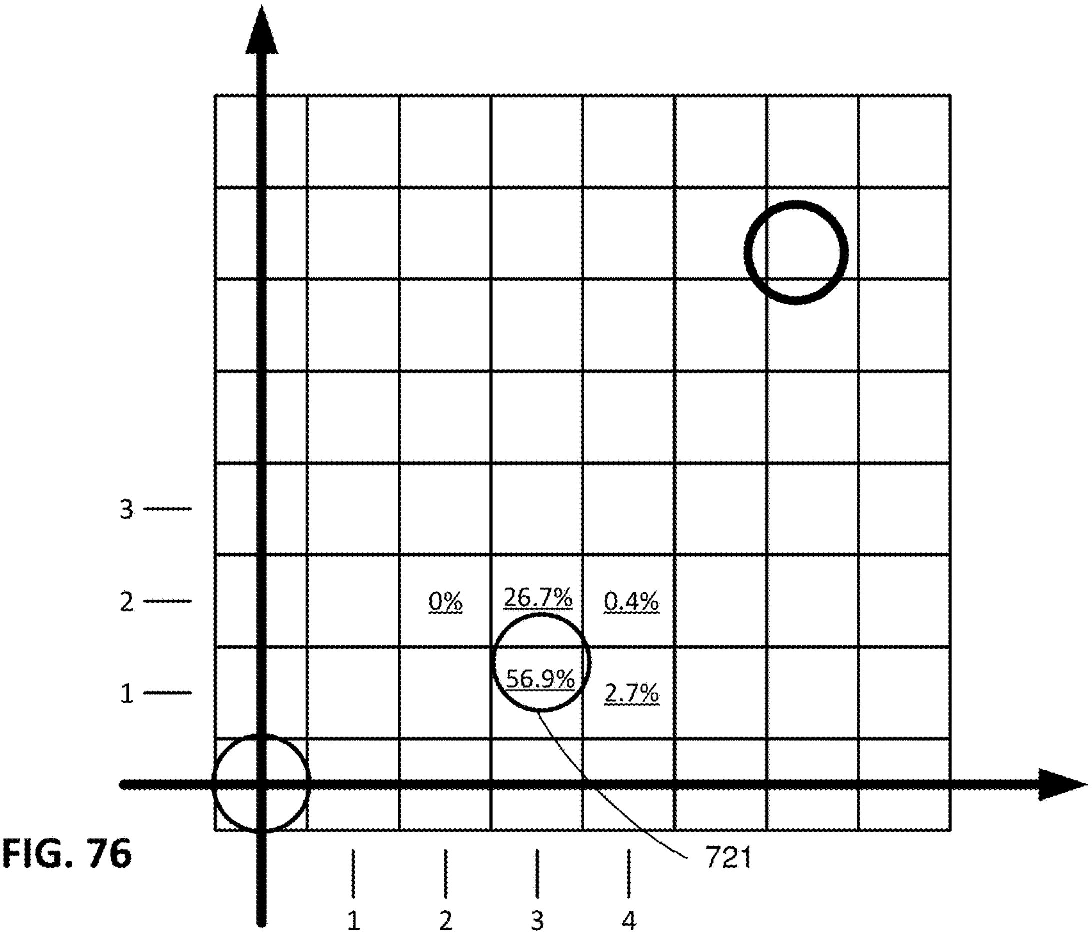

To estimate the rotation error, we can define a waxel coordinate system in which the middle of the correctly-centered dot is at the origin, as shown by the bold axes in FIG. 76. We determine the center of mass of dot 721 in this coordinate system, using the values of the neighborhood of waxels. We first subtract each of the underlined values in FIG. 75 from 255, and divide the difference by 255, to indicate the percentage area of each waxel that is dark. Each such percentage is then applied to the x- and y-coordinates of the corresponding waxel, to form a weighted-average center of the dot, in the waxel space.

In the illustrated example, the darkest waxel involving dot 721 (at 56.9%) is at waxel coordinates {3,1}. A waxel that is 26.7% dark is at {3,2}. A waxel that is 0.4% dark is at {4,2}, and a final waxel that is 2.7% dark is at {4,1}.

The weighted average of the x-coordinate data is:

$$((0.569*3)+(0.267*3)+(0.004*4)+(0.027*4))/(.569+.267+.004+.027)=3.035$$

The weighted average of the y-coordinate data is $$((0.569*1)+(0.267*2)+(0.004*2)+(0.027*1))/(.569+.267+.004+.027)=1.312$$

Figure 77:
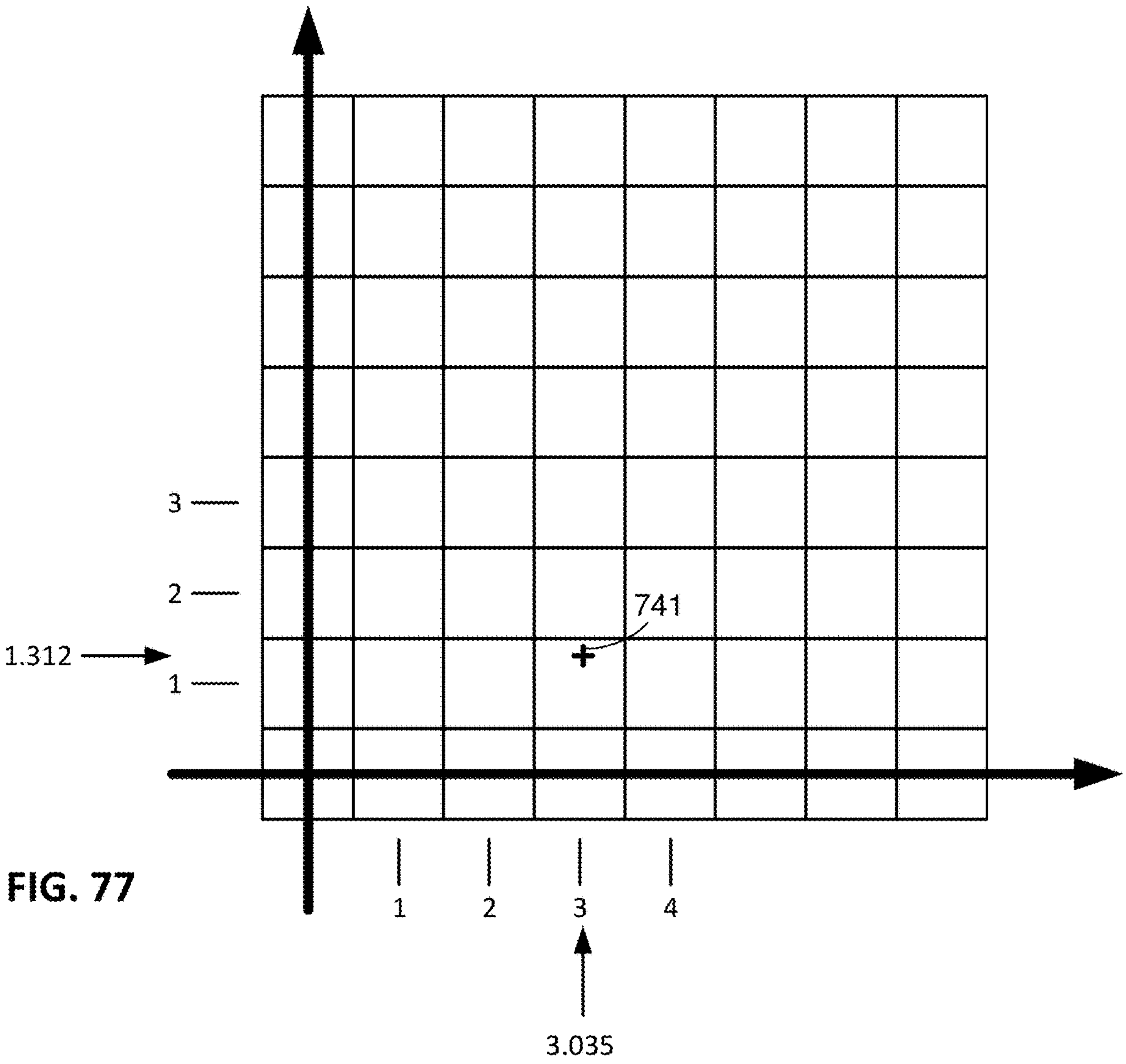
Figure 78:
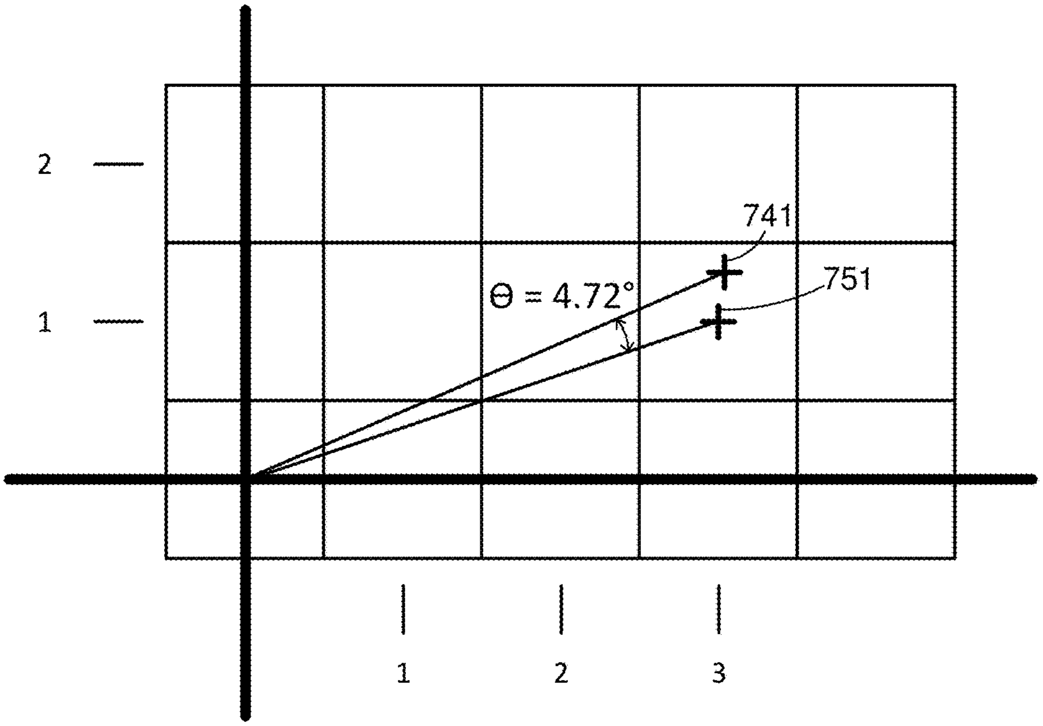

This computed center-of-mass 741 of dot 721 (i.e., {3.035,1.312} in waxel space) is shown in FIG. 77. FIG. 78 shows an enlargement of FIG. 77, and also shows the true center 751 of the waxel at which dot 721 should be placed. The angular error in registration is the difference between vectors from the origin to waxel center 751, and from the origin to computed center-of-mass 741. In the depicted case, trigonometry reveals the error is 4.72 degrees counter-clockwise.

Figure 79:
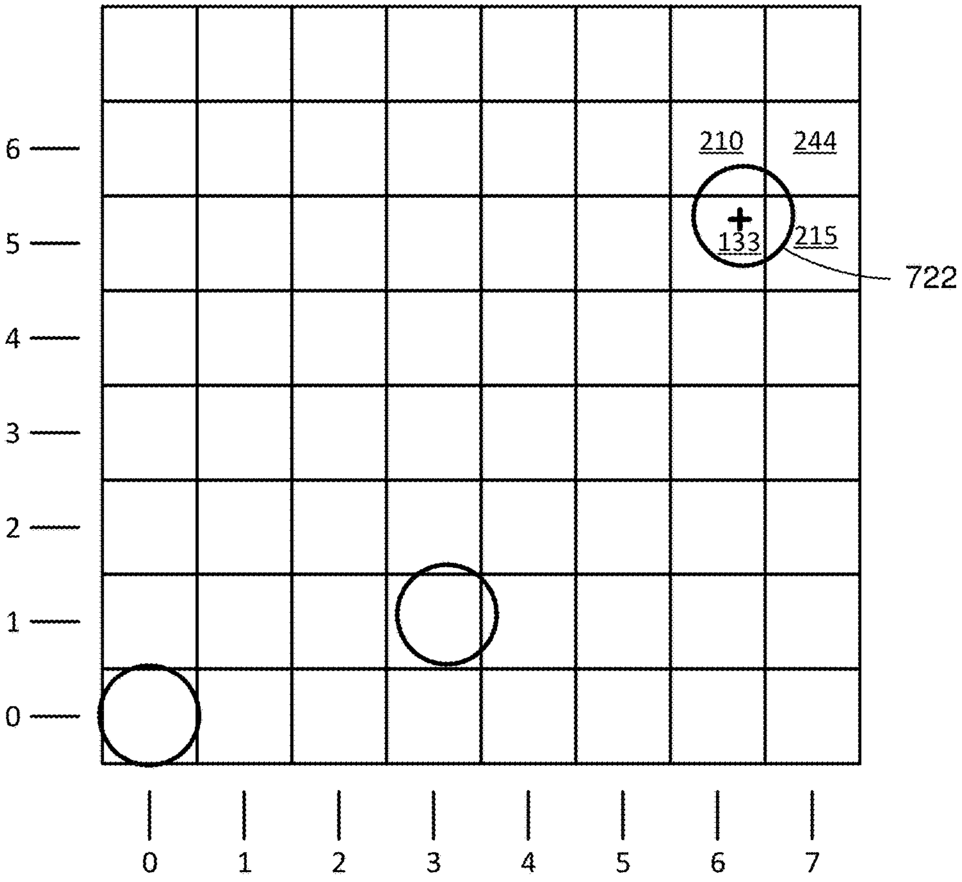

This angular error is corrected by counter-rotating the array of dots, around the best-centered waxel 720 (i.e., the origin of the coordinate axis) by 4.72 degrees clockwise. Dot positions as shown in FIG. 79 results. (Although only a few dots are rotated in this example, typically all the dots in a patch around the best-centered dot are rotated. The patch may have a radius of 20-100 or more waxels.) After such rotation, the remaining error now is predominantly error in scale.

Scale error is mitigated by a similar process, but using a dot more remote from the origin, e.g., dot 722 of FIG. 79.

Comparing the positions of dot 722 in FIGS. 75 and 79, it will be seen that reducing the rotation error brought the center of the dot into the correct square waxel. But its position within the waxel is skewed due to scale error. The amount of scale error is determined by first calculating the center-of-mass of dot 722 in FIG. 79.

As described above in connection with FIG. 76, the percentage-darkness values of the waxel neighborhood around dot 722 are used to form weighted-averages of x- and y-coordinates indicating the center-of-mass of dot 722. (A waxel with a value of greyscale 0 is 100% dark; a waxel with a value of 255 is 0% dark. 210 in greyscale corresponds to 17.5% dark; 244 corresponds to 4.3% dark; 133 corresponds to 47.8% dark; 215 corresponds to 15.7% dark.)

The weighted average of the x-coordinate data is thus:

$$((.175*6)+(0.043*7)+(0.478*6)+(0.157*7))/(.175+.043+.478+.157)=6.234$$

The weighted average of the y-coordinate data is $$((.175*6)+(0.043*6)+(0.478*5)+(0.157*5))/(.175+.043+.478+.157)=5.256$$

This calculated center-of-mass is shown by the plus sign in FIG. 79. Eyeballing indicates it is not perfect, but this is a consequence of the errors inherent in estimating geometry from greyscale values.

Figure 80A:
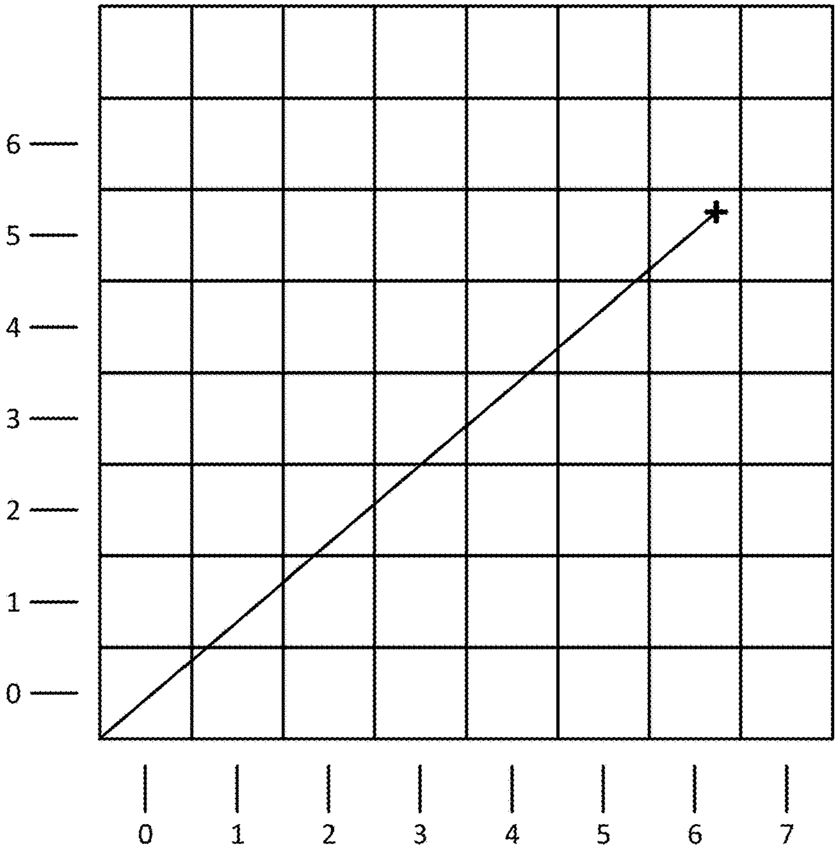
Figure 80B:
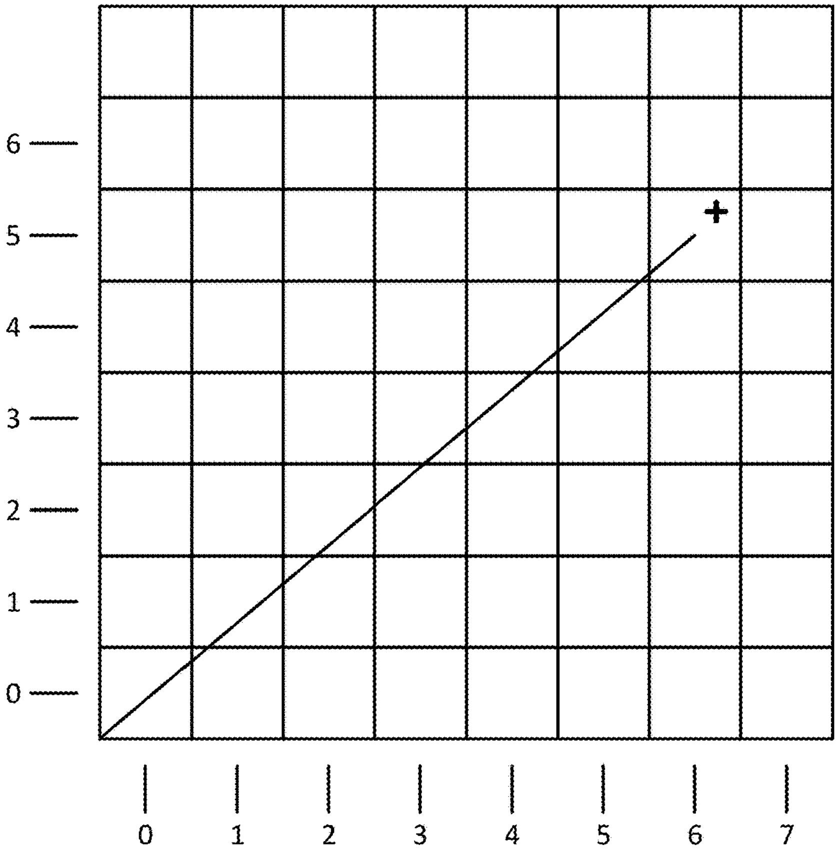
Figure 81:
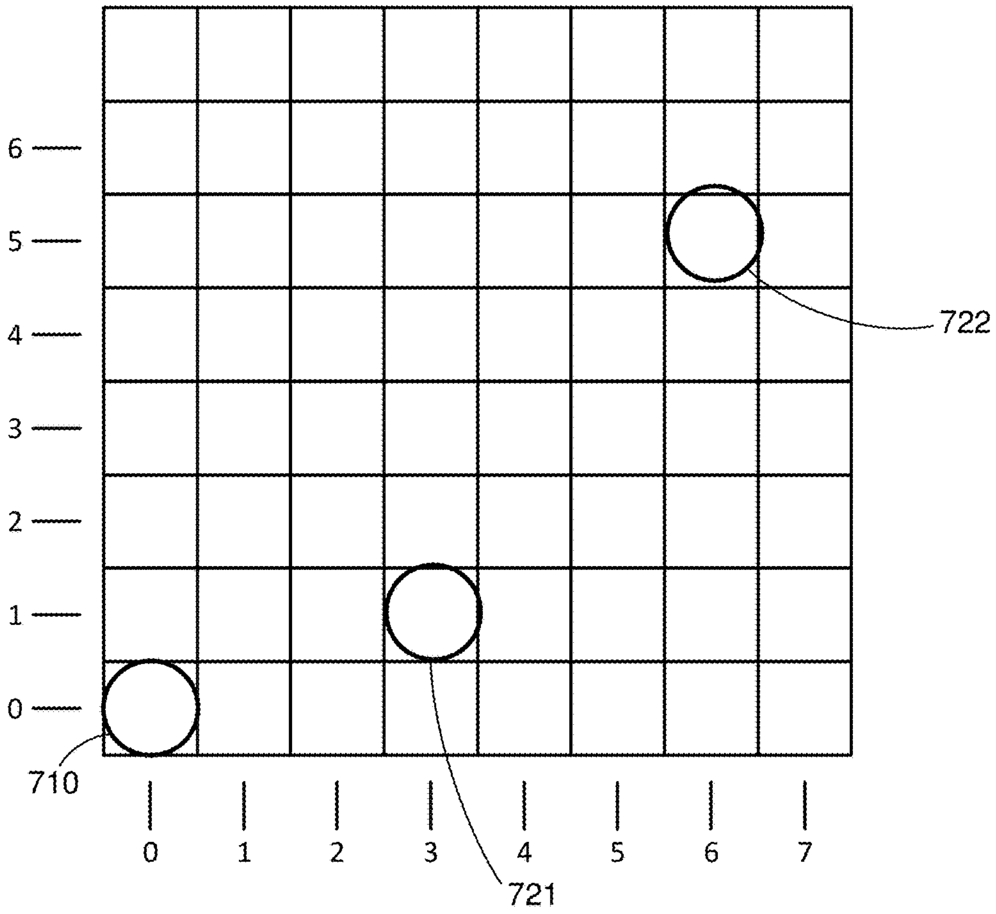

The scale error is the ratio of the vectors from the origin to (a) the computed center-of-mass of waxel 722, and (b) the center of the waxel in which this center falls. The former vector is shown in FIG. 80A; the latter is shown in FIG. 80B. The ratio is 1.04, indicating a +4% scale error. Application of a reciprocal scale factor, 0.9615, again around the origin (dot 710), yields the scale- and rotation-corrected dot pattern shown in FIG. 81. No longer does dot 722 contribute wrong data to decoding of the payload; it is spatially associated with its correct waxel.

The foregoing procedure can be repeated-refining the angular correction after the initial scale correction, and refining the scale correction after the refinement of angular correction, etc.

Although the example just-given had initial registration errors of 5 degrees rotation, and 5% scale, these numbers are unrealistically large. Figures of less than 1 degree, and 1%, are more typical.

Errors are better-assessed by using dots more remote from the best-centered dot. With a 1% angular error, a dot is not rotated mostly into an adjoining waxel until it is about 28 waxels away. Dot 721 is only about 3 waxels away from best-centered dot 710—too close to have much angular error manifested. It is usually better to pick a dot that is on the order of 15-25 waxels away from the best-centered dot to assess, and correct, rotation error.

Similarly, a scale error of 1% doesn't shift a dot mostly into an adjoining waxel until it is about 50 waxels distant from the best-centered dot. Dot 722 is only about 8 waxels away from dot 720—sub-optimal for estimation of scale error. It is usually better to pick a dot that is on the order of 25-40 waxels away, for use in assessing and correcting rotation error.

Rotation error usually causes greater problems than scale error (in terms of skewing dots remote from the best-centered dot, into adjacent waxels), and so is typically corrected first. However, in other embodiments, scale error is assessed and corrected first.

For expository convenience, the above examples illustrate correction by use of waxel domain data. More typically, however, correction employs pixel domain data.

As is familiar, a camera captures an array of pixel data. Typically, a waxel spans the area of more than a single pixel. The reference signal enables the detector to establish a mapping between the pixel space and the waxel space, by the four parameters of rotation, scale, and x- and y-translation.

Figure 82A:
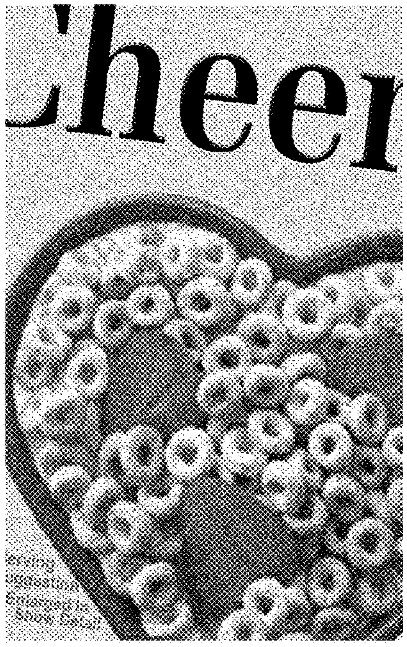
FIG. 82A shows an image of a retail package, skewed in orientation.

FIG. 82A shows an image of a cereal box, as it might be captured by a camera device (e.g., in a smartphone or point of sale scanner).

Figure 82B:
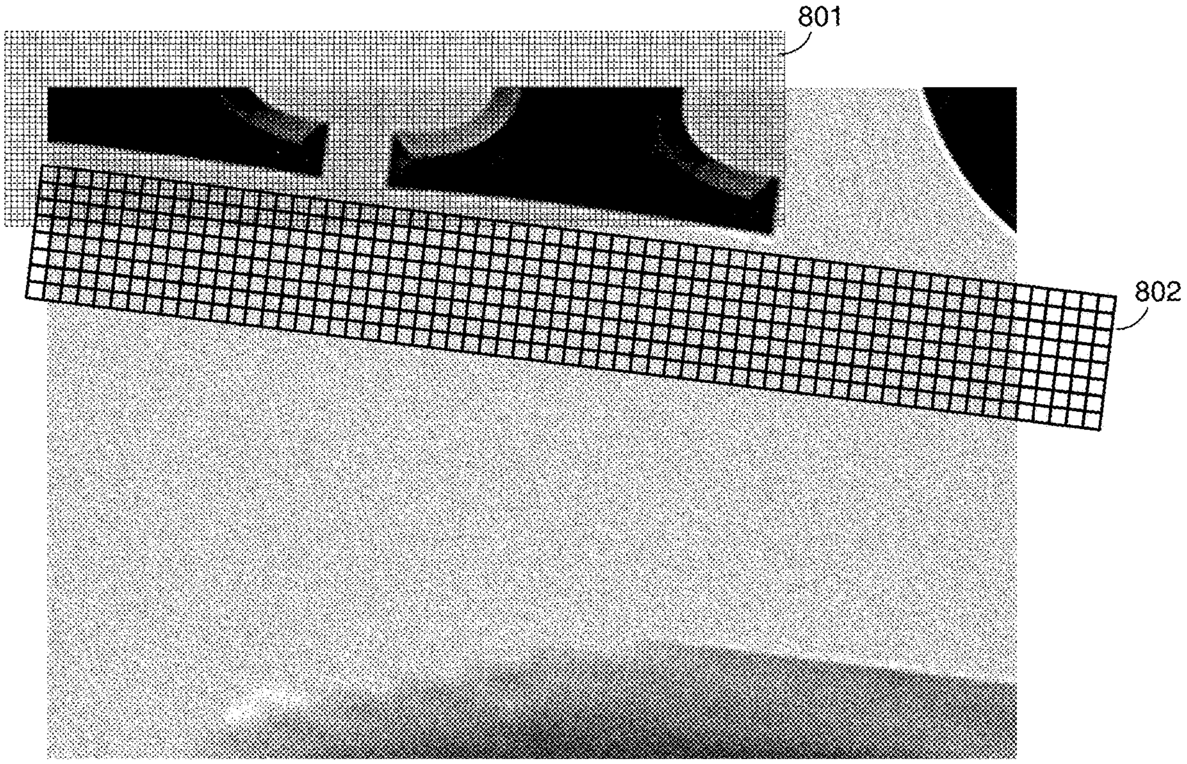
FIG. 82B is an enlargement from FIG. 82A, also showing an array of image pixels aligned with the image frame, and an array of waxels aligned with the package artwork.

FIG. 82B shows an enlargement of the FIG. 82A imagery, depicting the bottom of the letter 'h' and part of the adjoining 'c.' The array of captured pixel outlines is partially shown at 801 in FIG. 82B. The waxels, whose rotation, scale, and translation, were determined by reference to the reference signal, are partially shown in outline at 802.

The center-of-mass calculations detailed above, with reference to FIGS. 75-81, are desirably performed using the greyscale values of the captured pixels-rather than the waxels-because the pixels permit the calculations to be performed with a higher degree of spatial precision.

As noted above, the correction of rotation and scale is usually applied to a patch of waxels. If a larger expanse of waxels is being processed, further patches can be successively processed—each keyed to a dot in a previously-corrected patch. In some applications, the size of the patches may successively grow or shrink. An example is when correcting data sampled from a curved surface, where the projection of the curved surface onto a 2D image plane causes errors that successively increase or decrease in a given direction.

In another embodiment, instead of processing one patch, and then another, etc., a Kalman filter is used to apply a recomputed correction to each successive waxel, dependent on its position. The filter kernel applied to one waxel is a function of the errors sensed at previous waxels. As waxels are processed, the correction progressively evolves-tracking drift and other perturbations of the rotation and scale distortions.

Although this technology is described with reference to adjusting rotation and scale, the same principles can likewise be employed in adjusting translation.

If always-marked locations in a sparse mark are known in advance (e.g., as with the darkest reference signal extrema in the above-detailed fourth embodiment), then such locations can serve as a spatial synchronization signal to which dots in the input imagery can be brought into alignment, by refining the x- and y-translation. An iterative procedure can be employed, based on minimizing an error metric, such as sum of differences, or sum of squared differences. A further iteration can then follow, expanding the error metric to encompass not only the always-marked locations, but also any known variably-marked locations that are marked with a dot.

Toroidal Codes and Registration

In variants of the embodiments detailed herein, geometric registration of an optical code is not performed using a reference signal comprised of an ensemble of spatial domain sine waves. Rather, visible features of the artwork are used.

Figure 83:
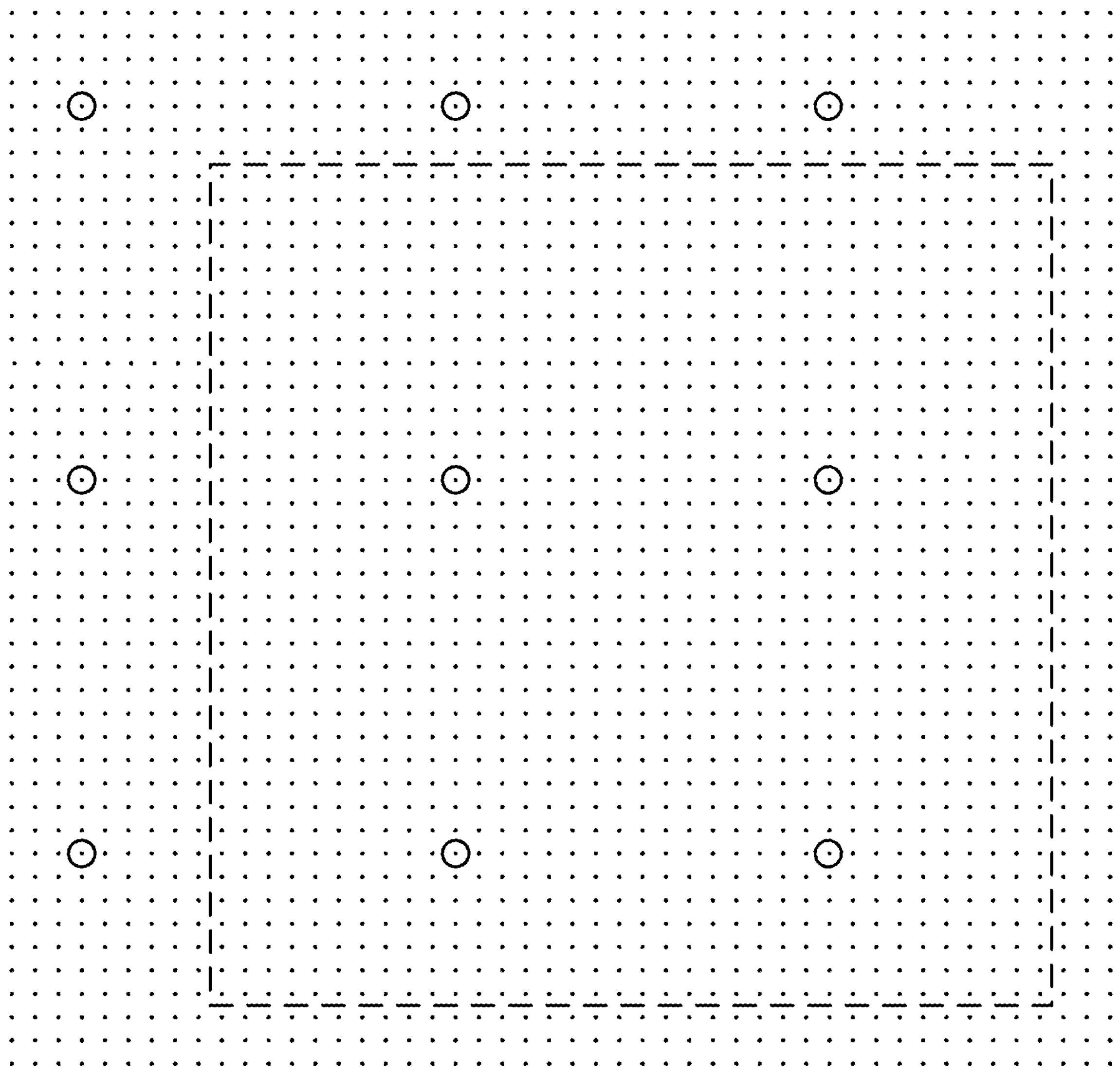
FIG. 83 shows that an optical code can include visual fiducial markers, which define an array of potential dot locations.

In an embodiment shown in FIG. 83, a plurality of distinctive marks (graticules) are regularly arrayed across a product label. The marks can be of any type. FIG. 83 shows circles. Stars, store logos, etc., can all be used.

In a particular implementation, the graticules are positioned within a lattice of dot locations. All of the locations are shown in FIG. 83. However, in a particular implementation, only a subset of the locations are actually marked.

In a reader device, the graticules are detected by a corresponding shape detector. A detector employing the Hough algorithm is a suitable choice. An image that depicts two of the graticules is sufficient to establish the rotation and scale of the depicted region (although three or four graticules are more typically depicted). The rotation is established by the angle of the line between the graticule centers. The scale is established by the pixel distance between the graticule centers.

After the captured imagery is geometrically-registered using the established scale and rotation (e.g., re-sampling or virtually-warping the imagery so that the dot locations fall along vertical columns, at known pixel spacings), each dot location is examined for the presence or absence of a dark dot. (A filter kernel spanning a 3×3 or 5×5 pixel area can be employed, to allow for some error in registration.) As in some previous embodiments, each detected dark dot indicates a "0," and each absent dark dot indicates a "1." A plural-bit message is thereby produced, by reading the registered imagery down successive columns of dot locations.

In this embodiment, the payload is again encoded as a convolutionally-encoded message string. The graticules, and marks representing the message bits, need not be registered in x- or y-translation—only in rotation and scale.

In some implementations, the graticules are pre-printed on adhesive label stock. Marks representing the message bit are applied to the label by a thermal printer at the time a food item is packaged for sale.

The message bits are arranged in repeated, generally-square regions (tiles). The tiles can be of arbitrary size, but typically are not larger than the square area bounded by four graticules. (The aim is to capture at least one complete set of message bit data in any image that depicts at least two graticules.)

The representation of the message bits in the tiles is translation agnostic, due to toroidal embedding. Toroidal embedding is illustrated by FIG. 84, and is characterized in that any excerpt from the data array—of the highlighted shape-contains one instance of each data element. In this case, the data elements are a string of 15 symbols {abc . . . mno}. The tile is a square array of elements, missing one element in the corner. In a sparse code embodiment, the elements are dots—or absences of dots—representing the two symbols of a binary message string.

It will be recognized that, while all data elements are present in each highlighted region in FIG. 84, and are correctly ordered sequentially when read down successive columns, they do not all start with the first string letter, "a." Rather, they are cyclical—starting somewhere in the string, reaching the end, and resuming at the start, until all symbols have been expressed.

In the depicted arrangement, perfect toroidal strings are of length 3, 8, 15, 24, 35, 48, etc. That is, they are of length N^2−1, where N is an integer. However, strings of other lengths can be used, and padded with zeros or random data (or error-coding) to bring them up to one of the perfect lengths. A 1024 bit message, for example, can be represented by a pattern of 1088 elements (i.e., 33 elements on a side, with the corner missing), with 64 elements filled with zeros or random data.

Figure 85:
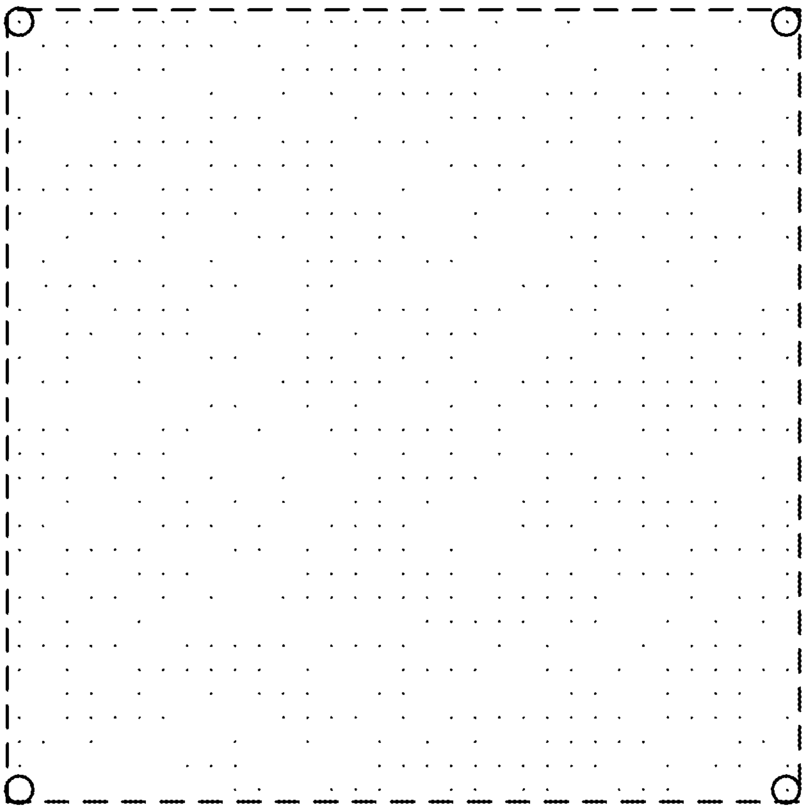
FIG. 85 depicts an optical code in which a 1024 bit message has been expressed.

FIG. 85 shows such a tile, with 33 elements on a side, conveying 1024 bits of message data (and padded with 64 bits of random data). A related embodiment also has 1024 dots, but spread across a 129×129 element tile. In the latter arrangement, most of the dot positions are blank. In one such implementation, the dots are located only in every fourth row and column. (In actual implementation, the printed tile is about a fourth to a fifteenth the size of the FIG. 85 illustration.)

In a preferred embodiment of the technology, tail-biting convolutional encoding of a payload is used to generate a plural-bit message string that is represented in the code as a toroidal dot pattern. A tail-biting code has the property that it can be decoded from any position within the sequence—provided that all elements are present and correctly ordered (cycling, as necessary, at the end). The payload symbols output from such decoding are the correct symbols, and in the correct order, but they—too—do not start at the beginning of the payload sequence (unless the encoded bits happen to be decoded from the beginning of their sequence).

To illustrate, consider a 5 bit payload 11100. If submitted to a tail-biting convolutional encoder, the encoder may produce a corresponding encoded message sequence of 15 binary symbols: {abcdefghijklmno}. If this encoded message sequence is decoded from the start {abc . . . }, the resulting payload will be the originally-input sequence, 11100. However, if the encoded message is decoded from a cyclically-shifted counterpart, e.g., {defg . . . oabc}, then the resulting payload will be a cyclically-shifted version of the originally-input payload sequence, e.g., 11001.

Figure 86:
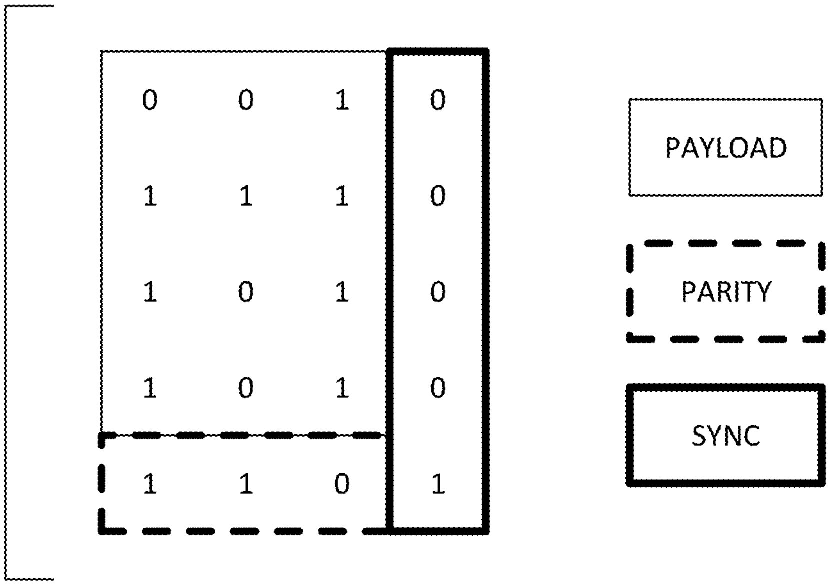
FIG. 86 shows a ring encoder arrangement by which synchronization can be established in cyclically-permuted data.

To deal with cyclical shifting of the decoder output data, some form of synchronization is desirably employed-so the beginning of the payload sequence output from the decoder can be identified. FIG. 86 illustrates one arrangement by which data is added to the payload to permit later syncing. (This arrangement may be termed a ring encoder.)

The payload data is arrayed in a 2D grid of locations, here 3 columns by four rows. (The sequence of data is wrapped in successive rows.) Parity bits are computed for each column. That is, the data bits in each of the 3 columns are summed, and the least significant bit of each sum serves as a parity bit. The 3 parity bits are shown in the dashed rectangle.

Including the parity bits, the three left columns each sum to an even number. The sync data, shown in the bold-boxed right-most column, is a known sequence (e.g., 00001) that sums to an odd number—allowing that column to be distinguished from the others.

FIG. 86 shows a total of 20 bits. This is the payload that is input to the tail-biting convolutional encoder to generate a (much longer) message. This same message (perhaps with some bit errors) is extracted from imagery depicting an excerpt of the dot code, but the recovered message is likely cyclically-shifted from its nominal presentation. This recovered message is input to a corresponding decoder, which outputs a sequence of 20 payload bits. The payload bits are reliably correct, but in an unknown cyclical permutation.

To sync the sequence of 20 recovered payload bits, they are entered into a 4 column by 5 row array, like that of FIG. 86 (wrapping row-wise). Parity is checked for the first 3 columns. If they are all correct (i.e., if the first 3 columns each sums to an even number), the last column is checked for a match with the known sequence. If it matches, the sequence is correctly permuted; it starts with the first payload bit in the upper left of the array.

If these tests aren't met, the method shifts the data in the top row of the array by one position to the right (rippling bits to successive rows, and the lower-right bit to the top-left bit position), and the tests are performed again. This testing and shifting sequence is continued until all parity tests are met, and the last column has the expected 00001 sequence. The payload bits are then correctly-synced, with the upper left bit being the first bit of the 20 bit payload. The sync and parity bits can then be discarded, and the 12 bit payload can then be output (e.g., to a tally system at a supermarket checkout).

In some instances, there can be modulo errors in the decoder output, depending on where—in the message string—decoding starts. For example, if the message bits are encoded with a rate 1/3 convolutional encoder, there are three possible modulo presentations of the message data to the decoder—only one of which yields valid output data. The correct modulo alignment can be determined by correct recovery of the known sync bits, and further checked by CRC bits that may be included in the payload. Additionally, Viterbi decoders commonly produce decoding metrics that can indicate if something is amiss.

Another approach is to position, and extract, the first encoded message bit at a known position relative to the graticules. In FIG. 85, for example, the first encoded message bit can be placed at the location of upper left graticule. When extracting a message string, the first bit can be extracted from the same position. While the first message bit is found at the upper left and lower right graticules in FIG. 85, it is not at the other two depicted graticules. However, reducing the ambiguity to just two alternatives can greatly simplify decoding (especially in cases of highly-redundant codes, such as convolutional codes with rate 1/13.)

It will be recognized that the 12 payload bits are augmented with 8 further bits (sync and parity bits) to make the 20 bit payload. This overhead is minimized by making the FIG. 86 array as square as possible. Padding bits can be inserted as needed so that the payload bits fill a rectangular array (here 3 columns by 4 rows).

There can sometimes be orientational ambiguities in decoding a payload. For example, the user may capture an image that depicts the code at a ninety degree orientation. The decoder can try all four ninety degree rotational states to find one that decodes correctly (e.g., based on CRC bits, and/or successful detection of the sync bits 0001). Alternatively, the graticules may have features that serve to resolve direction. For example, five-pointed stars can be used as graticules, each having a point oriented towards the top of the code.

Relabeling

Grocers sometimes mark-down items that are damaged, or that are approaching their sell-by dates. This can be done by applying a new adhesive label with new pricing (and, sometimes, a new product identifier, so the item is tallied by the point-of-sale system as a marked-down item). Applicant's marking technology, however, introduces a difficulty. Since the embedded identifier can be read from even a small patch of the old (original) label, the new label must essentially wholly cover the old label. If part of the old label is visible, there is a risk that the point of sale scanner will ring the item up based on data decoded from the original sticker-charging the shopper the higher, original price. To prevent the scanner from reading the wrong encoded identifier, the new label should be placed to precisely overlie the boundaries of the old label. This requires a high degree of care by store personnel, ensuring that the new label (e.g., a 2.5×2.25 inch adhesive label) is tacked down with one of its corners properly positioned over the corner of the same-sized old label, and then applied straight-so that it wholly masks the old label.

In addition to the tedium of such relabeling, the new label hides the item's original price (as well as sell-by date, weight, etc.). Having both the old and new prices readable by shoppers has been found to be an important sales incentive.

Figure 87A:
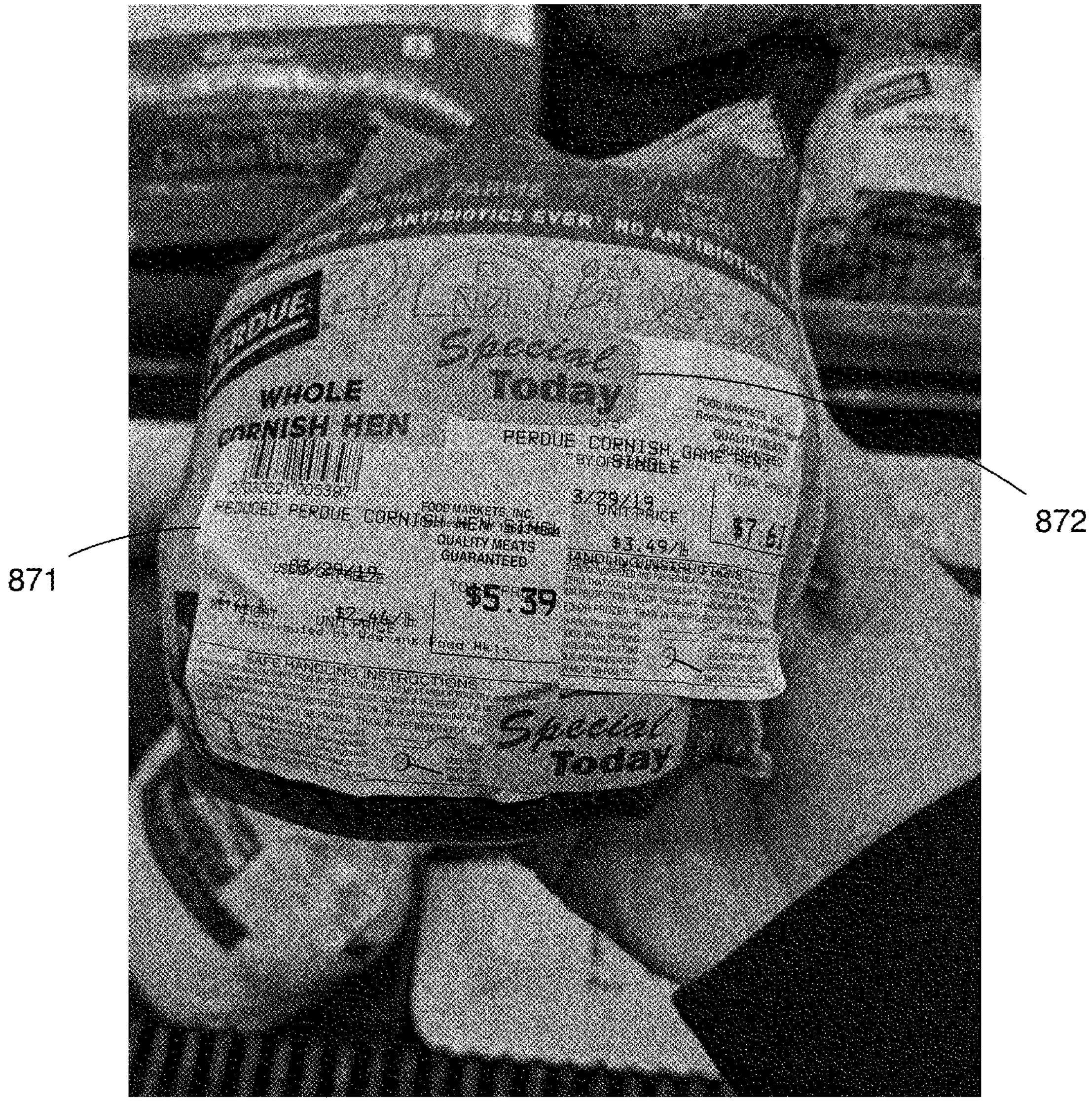

This problem is easily avoided with prior art, conventional, UPC barcode labels. Referring to FIG. 87A, a new label 871 can be positioned anywhere on the package, and an orange "Special Today" sticker 872 can be applied over the original UPC barcode printed on the original label-preventing it from being decoded. This approach is advantageous because it leaves the text-marked original price clearly visible on the package, and the orange sticker helps to draw shoppers' attention to the item.

Alternatively, a new label can simply be applied to the item at any position in which part of the new label obscures the UPC barcode on the original label. FIGS. 87B and 87C show such arrangements, with arrow 873 indicating the location of an obscured UPC barcode. This approach again provides a great deal of freedom in positioning the new label, making repricing much less tedious. And, again, it leaves the old item price plainly visible.

Neither of these approaches works with applicant's technology, since the POS scanner may charge the shopper the higher, old label price, due to parts of the original label still being visible.

In accordance with a further aspect of the present technology, the problem of POS scanner confusion by inconsistent markings visible on an item is solved by obscuring the original label with a transparent cyan (sometimes termed blue) sticker. The cyan film absorbs the red light used by POS scanners, preventing a scanner from "seeing" the coded markings beneath. Yet shoppers can see through the film and can learn the item's original price.

Moreover, the cyan sticker can be made in a size larger than the label (e.g., 3×2.75 inches), allowing it to be applied quickly, without requiring precise corner-matching with the original label. A suitable film is a clear polypropylene printed with cyan ink, with adhesive on the back. Such stickers are available in peel-off, roll form from Sticker Giant of Longmont, CO (which sells such stickers for use as glossy labels).

Figure 88A:
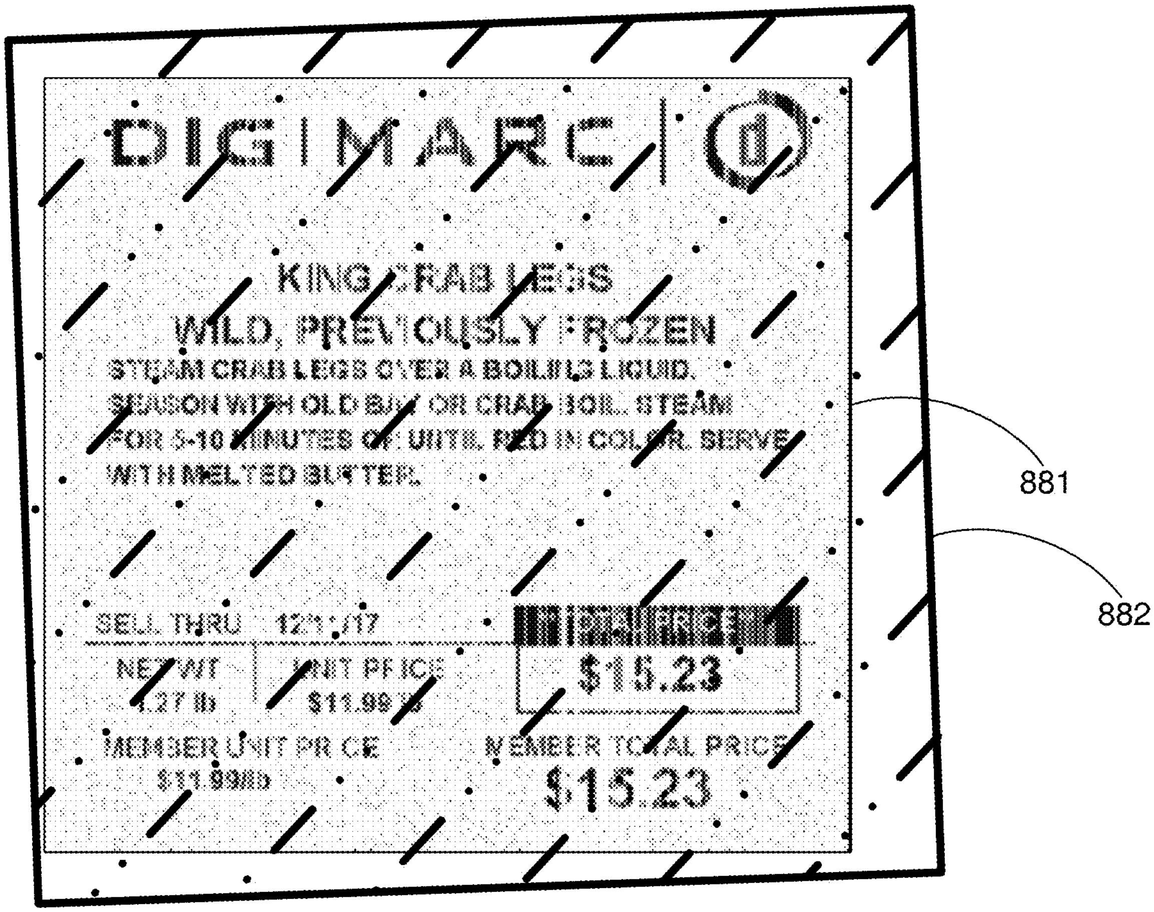
FIG. 88A is a diagram showing an item label, including a sparse code spanning the label, obscured by a larger blue transparent film adhesive overlay.

FIG. 88A illustrates the concept, showing the original label 881 (copied from FIG. 23), and a larger, transparent blue label 882 applied over it—while allowing the price of the original label still to be visible. (Not shown is an adjacent new label, with the marked-down price printed in text and machine-readable forms.)

The blue color serves to attract shoppers' attention to the package—readily distinguishing it from other, full-price items nearby. If desired, the blue film can be overprinted in a different color with a message, such as "Marked Down!" Alternatively, the cyan printing can be patterned so as to leave clear, shaped voids that form text. (Although the sticker is transparent in such regions, the width of the voids may be made narrow enough that any product marking visible through such region is too small to be decoded.)

Figure 88B:
FIG. 88B is a photographic rendering of an item label obscured by a larger blue transparent film overlay, on which a text message is printed.

FIG. 88B is a photographic rendering of a transparent blue label applied over an adhesive price sticker, which includes both a sparse dot code and a UPC barcode. The blue label is printed with a yellow "Special Price!" legend. (Again the nearby new label, with the marked-down price, is not shown.)

While illustrated in the context of obscuring sparse code markings, the same approach can also be used to obscure UPC codes, QR codes, DataBar codes, etc. This approach can likewise be used to obscure continuous-tone watermarks, such as watermarks embedded in color artwork printed on product packaging. For example, if a box of cereal is partially-crushed, a grocery may be willing to sell it for 99 cents, instead of the usual $2.99 price (a price that is database-associated with a product GTIN that is watermark-encoded in the cereal box artwork). In such case, the cereal box can be placed in a cyan-colored plastic bag, which is thermally-sealed, and labeled with an adhesive sticker printed with the discounted price both in text and machine-readable form (e.g., UPC code or sparse digital watermark).

In a particularly preferred embodiment, the blue film label (or bag) is formed from a plant-based plastic, e.g., one comprised of starch, cellulose and sugars, such as may be derived from vegetable fats and oils, corn starch, straw, woodchips, and/or food waste. A particular example is the biopolymer poly-3-hydroxybutyrate.

While cyan is the preferred color (due to its absorption of red light), other colors can suffice, provided that transmission of red light through the colored plastic is impaired sufficiently to prevent reading of the encoded payload. Testing can confirm whether a particular film is adequate to prevent reading in a particular color of illumination.

If scanner illumination of a color other than red is used, then a correspondingly-different color transparent film can be used. Ideally, complementary illumination/film colors should be used, e.g., green/magenta and blue/yellow, but as noted, some variation can be tolerated.

The cyan sticker impairs only reading with red light-based systems. Imaging systems that operate at different light spectra, or in full color (e.g., cell phone cameras) can successfully read the original label marking through the colored film, for instances where such capability is desired.

Operating Environment

The above methods are implemented in software instructions or digital circuitry organized into modules. These modules include an optical code optimizer, generator, inserter and decoder. Notwithstanding any specific discussion of the embodiments set forth herein, the term "module" refers to software instructions, firmware or circuitry configured to perform any of the methods, processes, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in MATLAB, C, C++, Visual Basic, Java, Python, Tcl, Perl, Scheme, Ruby, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hardwired circuitry, programmable circuitry such as computer processors comprising one or more individual instruction processing cores, state machine circuitry, or firmware that stores instructions executed by programmable circuitry.

Implementation can additionally, or alternatively, employ special purpose electronic circuitry that has been custom-designed and manufactured to perform some or all of the component acts, as an application specific integrated circuit (ASIC). To realize such an implementation, the relevant module(s) (e.g., encoding and decoding of optical codes within host image content) are first implemented using a general purpose computer, using software such as MATLAB (from Mathworks, Inc.). A tool such as HDLCoder (also available from MathWorks) is next employed to convert the MATLAB model to VHDL (an IEEE standard) or Verilog.

The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

HDLCoder may also be used to create a Field Programmable Gate Array implementation. The FPGA may be used to prototype the ASIC or as an implementation in a FPGA chip integrated into an electronic device.

Figure 89:
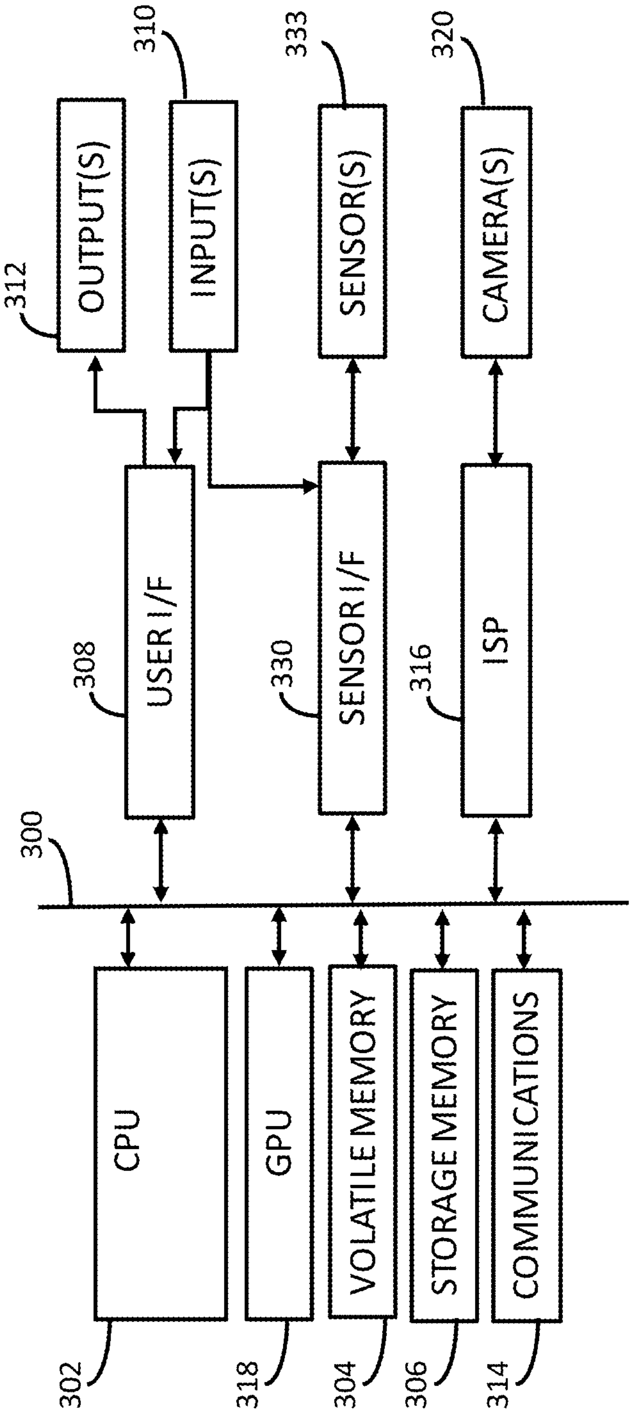
FIG. 89 is a diagram of an electronic device in which the components of an optical code generator, inserter, optimizer and/or decoder, as detailed herein, may be implemented.

For the sake of illustration, FIG. 89 is a diagram of an electronic device in which the components of the above optical code generator, inserter, optimizer and decoder embodiments may be implemented. It is not intended to be limiting, as the embodiments may be implemented in other device architectures or electronic circuitry. For example, it represents a computer in which program instructions for generating, optimizing, inserting and decoding optical codes are stored and executed to carry out methods described in this document. It also represents special purpose computer systems like scales with thermal label printers, label printers, and barcode scanners. It also represents headworn apparatus, such as virtual- and augmented-reality eyewear and headsets. Like more general purpose computers and mobile devices (e.g., smartphones and tablets), these devices also include memory for storing firmware implementations of these methods and processors for executing them. They may also include above-referenced FPGA or ASIC implementations of the optical code optimizer, generator, inserter and/or decoder.

Referring to FIG. 89, a system for an electronic device includes bus 300, to which many devices, modules, etc., (each of which may be generically referred as a "component") are communicatively coupled. The bus 300 may combine the functionality of a direct memory access (DMA) bus and a programmed input/output (PIO) bus. In other words, the bus 300 may facilitate both DMA transfers and direct CPU read and write instructions. In one embodiment, the bus 300 is one of the Advanced Microcontroller Bus Architecture (AMBA) compliant data buses. Although FIG. 89 illustrates an embodiment in which all components are communicatively coupled to the bus 300, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 302. The CPU 302 may be a microprocessor, mobile application processor, etc., known in the art (e.g., a Reduced Instruction Set Computer (RISC) from ARM Limited, the Krait CPU product-family, a X86-based microprocessor available from the Intel Corporation including those in the Pentium, Xeon, Itanium, Celeron, Atom, Core i-series product families, etc.). The CPU 302 runs an operating system of the electronic device, runs application programs and, optionally, manages the various functions of the electronic device. The CPU 302 may include or be coupled to a read-only memory (ROM) (not shown), which may hold an operating system (e.g., a "high-level" operating system, a "real-time" operating system, a mobile operating system, or the like or any combination thereof) or other device firmware that runs on the electronic device.

The electronic device may also include a volatile memory 304 electrically coupled to bus 300. The volatile memory 304 may include, for example, any type of random access memory (RAM). Although not shown, the electronic device may further include a memory controller that controls the flow of data to and from the volatile memory 304.

The electronic device may also include a storage memory 306 connected to the bus. The storage memory 306 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. In embodiments of the invention, the storage memory 306 is used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof.

Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like.

Also connected to the bus 300 is a user interface module 308. The user interface module 308 is configured to facilitate user control of the electronic device. Thus the user interface module 308 may be communicatively coupled to one or more user input devices 310. A user input device 310 can, for example, include a button, knob, touch screen, trackball, mouse, microphone (e.g., an electret microphone, a MEMS microphone, or the like or any combination thereof), an IR or ultrasound-emitting stylus, an ultrasound emitter (e.g., to detect user gestures, etc.), one or more structured light emitters (e.g., to project structured IR light to detect user gestures, etc.), one or more ultrasonic transducers, or the like or any combination thereof.

The user interface module 308 may also be configured to indicate, to the user, the effect of the user's control of the electronic device, or any other information related to an operation being performed by the electronic device or function otherwise supported by the electronic device. Thus the user interface module 308 may also be communicatively coupled to one or more user output devices 312. A user output device 312 can, for example, include a display (e.g., a liquid crystal display (LCD), a light emitting diode (LED) display, an active-matrix organic light-emitting diode (AMOLED) display, an e-ink display, etc.), a printer, a loud speaker, or the like or any combination thereof.

Generally, the user input devices 310 and user output devices 312 are an integral part of the electronic device; however, in alternate embodiments, any user input device 310 (e.g., a microphone, etc.) or user output device 312 (e.g., a speaker, display, or printer) may be a physically separate device that is communicatively coupled to the electronic device (e.g., via a communications module 314). A printer encompasses different devices for applying images carrying digital data to objects, such as 2D and 3D printers (thermal, intaglio, ink jet, offset, flexographic, laser, gravure, etc.), and equipment for etching, engraving, embossing, or laser marking.

Although the user interface module 308 is illustrated as an individual component, it will be appreciated that the user interface module 308 (or portions thereof) may be functionally integrated into one or more other components of the electronic device (e.g., the CPU 302, the sensor interface module 330, etc.).

Also connected to the bus 300 is an image signal processor 316 and a graphics processing unit (GPU) 318. The image signal processor (ISP) 316 is configured to process imagery (including still-frame imagery, video imagery, or the like or any combination thereof) captured by one or more cameras 320, or by any other image sensors, thereby generating image data. General functions typically performed by the ISP 316 can include Bayer transformation, demosaicing, noise reduction, image sharpening, or the like or combinations thereof. The GPU 318 can be configured to process the image data generated by the ISP 316, thereby generating processed image data. General functions performed by the GPU 318 include compressing image data (e.g., into a JPEG format, an MPEG format, or the like or combinations thereof), creating lighting effects, rendering 3D graphics, texture mapping, calculating geometric transformations (e.g., rotation, translation, etc.) into different coordinate systems, etc. and sending the compressed video data to other components of the electronic device (e.g., the volatile memory 304) via bus 300. Image data generated by the ISP 316 or processed image data generated by the GPU 318 may be accessed by the user interface module 308, where it is converted into one or more suitable signals that may be sent to a user output device 312 such as a display, printer or speaker.

The communications module 314 includes circuitry, antennas, sensors, and any other suitable or desired technology that facilitates transmitting or receiving data (e.g., within a network) through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (e.g., for IR- or visible-light communication), sonic or ultrasonic communication, etc.), or the like or any combination thereof. In one embodiment, the communications module 314 may include one or more microprocessors, digital signal processors or other microcontrollers, programmable logic devices, or the like or combination thereof. Optionally, the communications module 314 includes cache or other local memory device (e.g., volatile memory, non-volatile memory or a combination thereof), DMA channels, one or more input buffers, one or more output buffers, or the like or combination thereof. In some embodiments, the communications module 314 includes a baseband processor (e.g., that performs signal processing and implements real-time radio transmission operations for the electronic device).

Also connected to the bus 300 is a sensor interface module 330 communicatively coupled to one or more sensors 333. A sensor 333 can, for example, include a scale for weighing items (such as in a scale used to weigh items and print labels in retail or food manufacturing environment). Although separately illustrated in FIG. 89, any camera 320 can also be considered a sensor 333. Generally, a sensor 333 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 333 coupled to the sensor interface module 330 are an integral part of the electronic device; however, in alternate embodiments, one or more of the sensors may be physically separate devices communicatively coupled to the electronic device (e.g., via the communications module 314). To the extent that any sensor 333 can function to sense user input, then such sensor 333 can also be considered a user input device 310.

The sensor interface module 330 is configured to activate, deactivate or otherwise control an operation (e.g., sampling rate, sampling range, etc.) of one or more sensors 333 (e.g., in accordance with instructions stored internally, or externally in volatile memory 304 or storage memory 306, ROM, etc., in accordance with commands issued by one or more components such as the CPU 302, the user interface module 308). In one embodiment, sensor interface module 330 can encode, decode, sample, filter or otherwise process signals generated by one or more of the sensors 333. In one example, the sensor interface module 330 can integrate signals generated by multiple sensors 333 and optionally process the integrated signal(s). Signals can be routed from the sensor interface module 330 to one or more of the aforementioned components of the electronic device (e.g., via the bus 300). In another embodiment, however, any signal generated by a sensor 333 can be routed (e.g., to the CPU 302), before being processed.

Generally, the sensor interface module 330 may include one or more microprocessors, digital signal processors or other microcontrollers, programmable logic devices, or the like or any combination thereof. The sensor interface module 330 may also optionally include cache or other local memory device (e.g., volatile memory, non-volatile memory or a combination thereof), DMA channels, one or more input buffers, one or more output buffers, and any other component facilitating the functions it supports (e.g., as described above).

Other suitable operating environments are detailed in the incorporated-by-reference documents.

CONCLUDING REMARKS

Having described and illustrated the principles of the technology with reference to specific implementations, it will be recognized that the technology can be implemented in many other, different, forms.

For example, while certain of the detailed techniques for generating sparse marks involve filling a blank output tile with dots until a desired print density is reached, a different approach can be used. For instance, a too-dark output signal tile can be initially generated (e.g., by including too many dark dots), and then certain of the dark dots can be selectively removed based on various criteria.

For example, if a 10% print density is desired, the darkest 15% of pixels in a dense greyscale composite signal 78 can be copied as dark dots in an initial output signal frame. The frame can then be examined for the pair of dots that are most-closely spaced, and one of those two dots can be discarded. This process repeats until dots have been discarded to bring the print density down from 15% to 10%. The remaining array of dark dots has thereby been enhanced to increase the average inter-pixel distance, improving the visual appearance compared to the earlier-described naïve approach. (For example if the above-described naïve approach has an inter-pixel spacing constraint of 6 pixels, then many pixel pairs will have this threshold spacing. But if the output tile is initially over-populated, and is thinned by the detailed procedure, then fewer of the remaining dots will be at this threshold spacing from their nearest neighbor. The tradeoff, here, can be signal strength, but in many applications signal strength is less important than visual aesthetics.)

Similarly, an initially-overpopulated output frame can be thinned based on criteria such as optimizing information efficiency (e.g., enhancing signal due to white pixels), and attaining approximately uniform distribution of signal strength among different bit positions of the payload, as discussed above.

Unless otherwise indicated, the term "sparse" as used herein refers to a bitonal code in which 50% or less of the substrate is marked to produce a contrasting mark (e.g., ink on a white substrate, or a light void surrounded with contrasting ink). More typically, a sparse mark has less than 30% of the substrate so-marked, with a print density of 2-15% being most common.

It should be noted that sparse techniques of the sort detailed in this patent document can be used in conjunction with continuous-tone artwork, e.g., on food and other packaging. For example, a sparse code can overlie CMYK and/or spot color artwork, e.g., depicting photographic imagery. Similarly, a sparse code can be used on flat (e.g., white) areas of packaging, while other areas of the packaging—bearing continuous-tone artwork—can be encoded using prior art watermarking methods.

In the cereal box artwork depicted in FIG. 82A, for example, the continuous-tone illustration of the cereal can be watermarked with the earlier-referenced prior art methods. The black lettering can be encoded with a sparse mark in a first contrasting color. The area between the black lettering and the cereal illustration (a yellowish spot color) can be encoded with a sparse mark in a second contrasting color. Thus, a single package may include two or three (or more) different forms of encoding. All may convey the same payload. Desirably, the reference signals included in all the marks are geometrically-consistent, i.e., indicating common values of scale and rotation to a decoding device, and indicating a common origin to the translation frame of reference.

A sparse code can be applied by a monochrome printing technology, such as thermal or ink jet. Alternatively, it can be applied by the same printing technology employed for CMYK or spot color printing of package artwork, such as offset or flexo printing—in some instances being applied by the same printing plate that prints elements of the host artwork.

Reference was made to continuous-tone watermarking (and watermarks). Such signaling is characterized by complementary tweaks to a host signal to represent "1" and "0" message bits. For example, luminance of the host artwork may be increased in some places (e.g., waxels), and decreased in other places. Or chrominance of the host artwork may be adjusted in one color direction in some places (e.g., more blue), and in a different color direction in other places (e.g., less blue, or more yellow). Such complementarity of adjustments is in contrast to sparse marks, in which all adjustments are made in the same direction (e.g., reducing luminance).

Although the detailed implementations concern tiles comprised of square waxels, arrayed in rows and columns, it should be recognized that this is not essential. For example, a tile can be comprised of elements arrayed in hexagonal cells, etc.

While the specification describes the reference signal component as being comprised of sinusoids of different spatial frequency, the reference signal can alternatively or additionally comprise orthogonal patterns. These, too, can be varied in amplitude, e.g., using the FIG. 34 arrangement, to obtain patterns of different appearances.

The specification makes repeated reference to "image data," "imagery," and the like. It should be understood that such terms refer not just to pixel data and the like, but also derivatives thereof. One example is a counterpart set of data produced by filtering (e.g., oct-axis filtering) pixel data.

Although the detailed technologies have been described in the context of forming codes by printing black dots on a white background (or vice-versa), it will be recognized that the codes can be formed otherwise. For example, a clear varnish or other surface treatment can be applied to locally change the reflectivity of a surface, e.g., between shiny and matte. Similarly, the code can be formed in a 3D fashion, such as by locally-raised or depressed features. Laser engraving or 3D printing are some of the technologies that may be employed. Laser ablation is well suited for producing sparse data markings on the skins of fruits and vegetables, e.g., to convey an identifier, a pick date, a use-by date, and/or a country of origin, etc. (Sparse marks, as detailed herein, cause less damage to fruits/vegetables than linear 1D barcodes, which are more likely to breach the skin due to their elongated elements.)

Still other forms of marks can also be used. Consider plastic and cellophane food wrappers, which may be perforated to prevent condensation from forming and being trapped within the wrapper. The pattern of perforations can convey one of the sparse marks detailed herein. Or the perforations can convey extrema of the reference signal, and a message signal can be marked otherwise-such as by ink. The perforations can be made by a shaped roller pressured against the plastic, puncturing it with holes sized to permit air, but not food particles, out.

While the specification has focused on sparse marks formed by black dots on white substrate, it will recognized that colored marks can be used, on a white background, or on a background of a contrasting color (lighter or darker). Similarly, light marks can be formed on a black or colored background. In some embodiments, the colors of sparse markings can vary over a piece of host artwork, such as a label. For example, dots may be cyan in one region, black in a second region, and Pantone 9520 C in a third region.

In arrangements in which light dots are formed on a dark background, "light" pixels should be substituted for "dark" elements (and high signal values substituted for low signal values) in the algorithmic descriptions herein.

The thermal printers commonly used for label printing have a finite life that is dependent—in large part—on thermal stresses due to the number of times the individual print elements are heated and cooled. While it is preferable, in some embodiments, to avoid clumping of dots, in other embodiments some clumping is advantageous: it can extend the useful life of thermal printheads.

As discussed earlier, e.g., in connection with FIGS. 39 and 40, the configuration of a dot can be altered to improve visual quality or robustness. There are several different configurations that can be used.

Figure 90A:
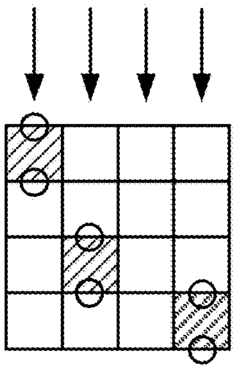
FIGS. 90A, 90B, 90C and 90D illustrate different marking patterns that cause different levels of thermal stress in a thermal printer.

FIG. 90A shows a 4×4 configuration of marking locations, of which three are printed. A single thermal element prints all the locations in a single column—indicated by the arrows. In FIG. 90A, there are six thermal wear events—three when a thermal element is heated to form a mark on a printer row, and three when the thermal element is cooled to not form a mark on a following row. These thermally-stressful events are shown by circles. One printhead element is left unstressed in this example.

Figure 90B:
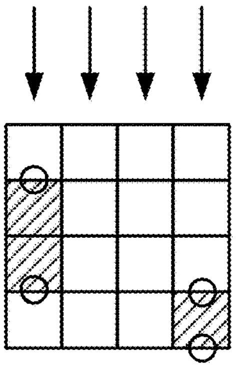

FIG. 90B shows an alternate cell (dot) configuration. Again, three marks are made, but their positions are selected to as to reduce thermal stresses on the printhead elements. Here there are just four thermally-stressful events. Two printheads are left unstressed.

Figure 90C:
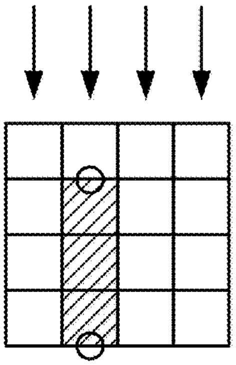

FIG. 90C shows a further example. Again, three marks are made, but their positions are selected so that the cell is printed with just two thermally stressful events. Three printheads are left unused.

Figure 90D:
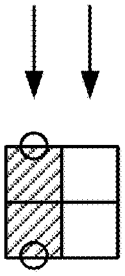

Returning to FIG. 40, in contrast to the right-most 2×2 patterns, a less thermally-stressful 2×2 pattern is to mark two vertically-adjoining locations, and to leave the two horizontally-adjoining locations unmarked. Such arrangement in shown in FIG. 90D. Such a signal block is particularly advantageous with certain thermal printers that print at a resolution higher than 203 dpi (e.g., 300 dpi). At such higher resolution, a single dot may not convey as much signal (in a single-to-noise sense) as is desired, yet a full 2×2 mark (as in the left-most FIG. 40 example) is so dark as to be visually unappealing. In such case, the pattern of FIG. 90D can provide the best balance between signal and unobtrusiveness, while giving priority to printer life.

A thermal stress score for a label can be produced by counting the total number of printhead element heating and cooling events involved in printing the data marking, across the entirety of the label. Software used to design the label can include a slider control to establish a degree to which printhead life should be prioritized in deciding where marks should be placed (versus prioritizing avoidance of clumping). As discussed above in connection with FIG. 34, the user interface can include a preview panel showing the pattern being designed. The label designer can use the slider, in conjunction with the preview panel, to achieve a marking pattern (e.g., cell dither patterns, as in FIGS. 40 and FIGS. 90A-D) that yields the lowest thermal stress score, while still providing visually satisfactory results.

Exemplary thermal printers are detailed in U.S. Pat. Nos. 9,365,055, 7,876,346, 7,502,042, 7,417,656, 7,344,323, and 6,261,009. Direct thermal printers can use cellulosic or polymer media coated with a heat-sensitive dye, as detailed, e.g., in U.S. Pat. Nos. 6,784,906 and 6,759,366.

The specification refers to optimizing parameters related to visual quality and robustness, such as spatial density, dot spacing, dot size and priority of optical code components. It will be recognized that this is an incomplete list, and a variety of other parameters can be optimized using the teachings herein, e.g., the strength with which each payload bit is represented, the number of pixels that convey desired information, visual structure of the resulting mark, etc.

While the specification sometimes refers to pixels, it will be recognized that this is shorthand for “picture elements.” A single such element may be comprised of plural parts, e.g., a region of 2×2 or 3×3 elements. Thus, depending on implementation, a pixel in the specification may be realized by a group of pixels.

The present technology is sometimes implemented in printer-equipped weigh scales, e.g., used by grocery stores in their deli departments. Such weigh scales have modest processors, so various optimizations can be employed to assure that the image processing needed to generate a single-use adhesive label pattern does not slow the workflow.

One such optimization is to pre-compute the reference signal, at the resolution of the print mechanism (e.g., 203 dots per inch). This pattern is then cached and available quickly for combining with the (variable) message payload component.

In some embodiments, the payload component is created as a bitonal pattern at a fixed scale, such as 64×64 or 128×128 elements, and then up-sampled to a grey-scale pattern at the print mechanism resolution (e.g., as shown and described in connection with FIG. 9). This up-sampling can be time-consuming, depending on interpolation algorithm. Bi-cubic interpolation has been found to provide a good tradeoff between computational speed and accuracy, on modest processors.

Some embodiments involve processing pixels, in a composite dense code, in a rank-dependent order, in order to fill an output block with marks. Rather than sort all the pixels by their values, applicant has found it advantageous to apply a threshold-compare operation to identify, e.g., those pixels with a value less than 50 or 100. Such operation is very quick. The subset of pixels that pass the thresholding test are then sorted, and this ranked list is then processed. (The threshold value is determined empirically, based on experience with the values of pixels that are typically required in a particular application.) Alternatively, the pixels can be binned into several coarse value bins, e.g., of uniform spans or binary spans-such as (a) between 0 and 15; between 16 and 31; between 32 and 63; between 64 and 127; and between 128 and 255. Some or all of these bins can be separately sorted, and the resulting pixel lists may be concatenated to yield a ranked list including all pixels.

Figure 91:
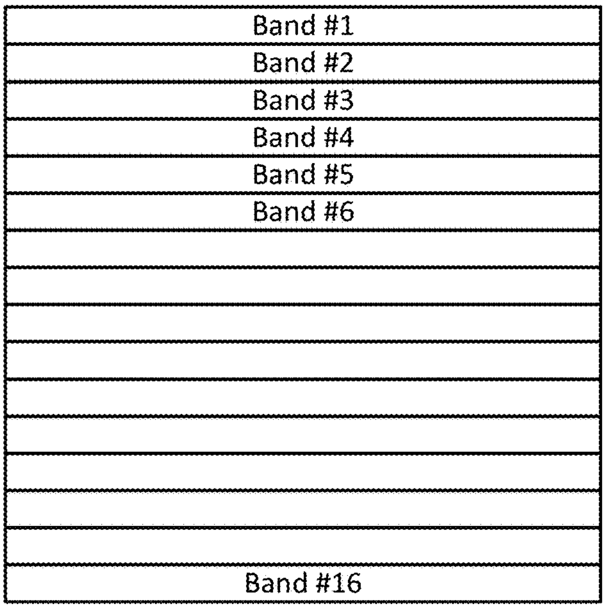
FIG. 91 shows how a block may be divided into regions, each of which can be processed separately in selecting elements for marking.

Sometimes it is preferable is to divide the dense code into parts, e.g., bands having a width of 16, 24 or 32 pixels across the code block, and sort each band separately. For example, if the dense code is 384×384 elements, band #1 can comprise rows 1-24 of elements; band #2 can comprise rows 25-48 of elements, etc., as shown in FIG. 91. Dots can be selected first from one band, and then the adjoining band, and so forth across the block, to achieve the dot desired density. (In an alternate embodiment, dots are selected from the sorted pixels of band #1, and then band #3, and then band #5, etc., until the block has been traversed, and then continuing by selecting dots from the sorted pixels of bands #2, #4, #6, etc., until finished.) Because the statistics of the dense code are generally uniform across space, selecting dots in this fashion yields substantially the same results as would be achieved by sorting the entire block and selecting dots from the resulting data. Yet because the sorting complexity (e.g., using the Quicksort algorithm) is related to $n*\log_2(n)$, there is a substantial computational efficiency that is gained by sorting, for instance, 16 smaller bands, instead of one large block. Moreover, the sorting operation (and dot selection) can be executed on each of multiple bands in parallel, permitting efficient multi-threaded implementation.

Attached to patent application 62/673,738 are Wikipedia articles detailing the Quicksort algorithm, and Bicubic Interpolation.

The dot selection process often involves assessing candidate dot locations to assure that a keep-out region around previously-selected dots is observed. Consider a candidate dot at row 11 and column 223. If the keep-out region is a distance of 4 elements (pixels), then one implementation looks to see if any dot has previously been selected in rows 7-15. This set of previously-selected dots is further examined to determine whether any is found in columns 219-227. If so, then the distance between such previously-selected dot and the candidate dot is determined, by computing the square root of the sum of the row difference, squared, and the column distance, squared. If any such distance is less than 4, then the candidate dot is discarded.

Applicant has found that a substantial computational saving can be achieved by a different algorithm. This different algorithm maintains a look-up data structure (table) having dimensions equal to that of the dense code, plus a border equal to the keep-out distance. The data structure thus has dimensions of 392 rows×392 columns, in the case of a 384×384 element dense code (and a keep out of 4). Each element in the data structure is initialized to a value of 0-signifying that the corresponding position in the sparse block is available for a dot.

Figure 92A:
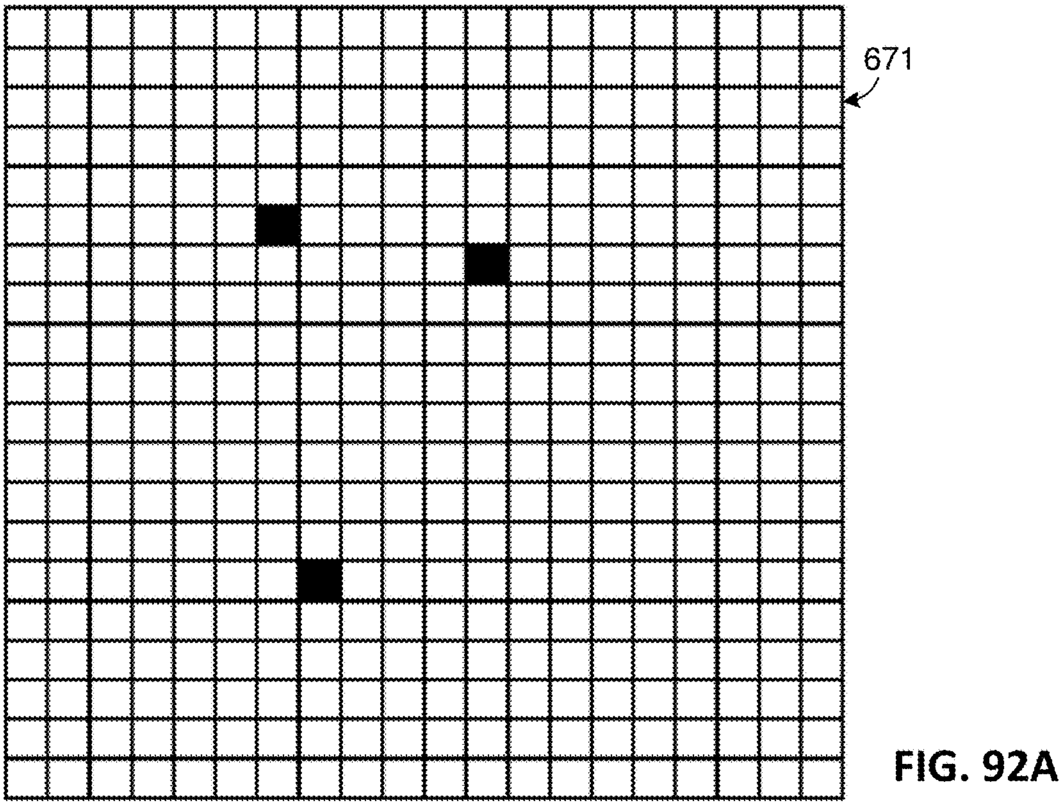
FIG. 92A shows an excerpt of a sparse output block.
Figure 92B:
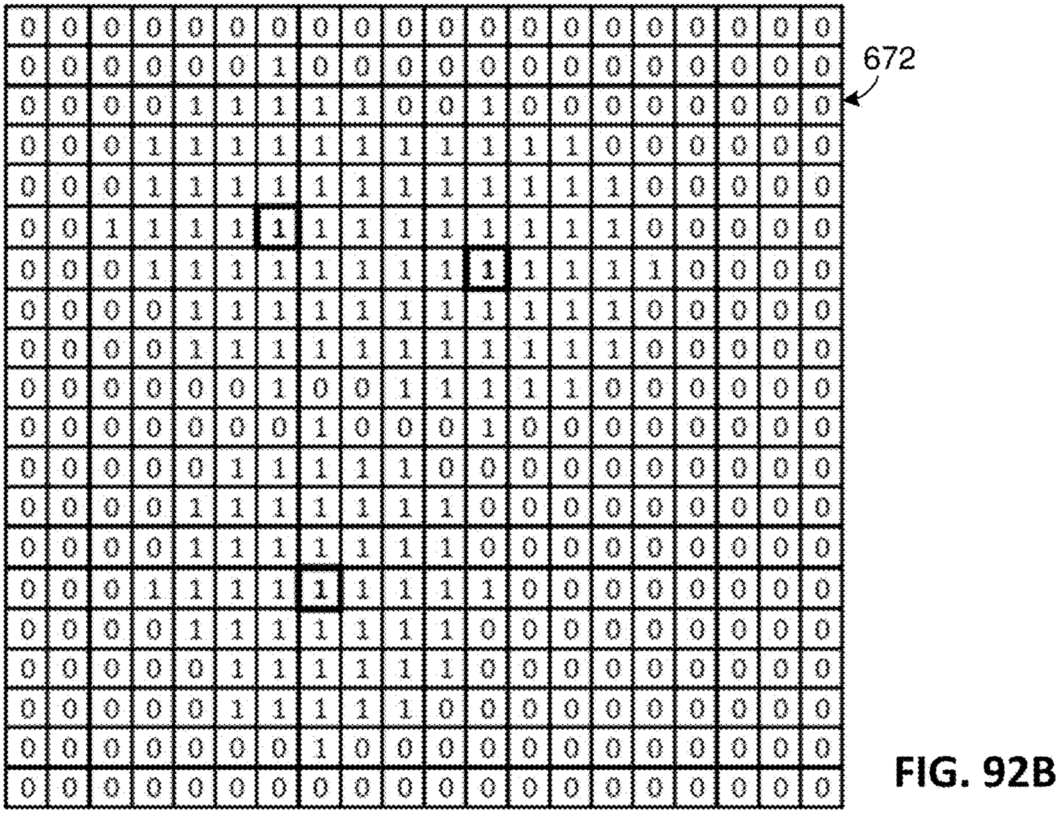
FIG. 92B shows an excerpt of a data structure used to enforce a keep out constraint in the block of FIG. 92A.

When a first dot is selected for inclusion in the sparse block, the corresponding location in the data structure—and neighboring locations within a distance of 4—are changed to a value of 1—signifying that they are no longer available for a dot. When a second candidate dot is considered at a given row/column of the sparse signal block, the corresponding row/column of the data structure is checked to see if its value is 0 or 1. If 0, the dot is written to the sparse output block, and a corresponding neighborhood of locations in the data structure are changed in value to 1—preventing any other dots from violating the keep out constraint. This process continues, with the location of each candidate dot being checked against the corresponding location in the data structure and, if still a 0, the dot is written to the sparse output block and the data structure is updated accordingly. FIG. 92A shows an excerpt of an output sparse block 671 that has been (so-far) populated with three dots. FIG. 92B shows an excerpt of the just-described data structure 672 corresponding to block 671, showing how values are changed from 0 to 1 within neighborhoods of locations surrounding those where dots are located (shown in bold borders), to enforce a keep out distance of 4 elements.

Naturally, this arrangement can likewise be used for non-circular keep-out regions, as detailed earlier.

Figure 92C:
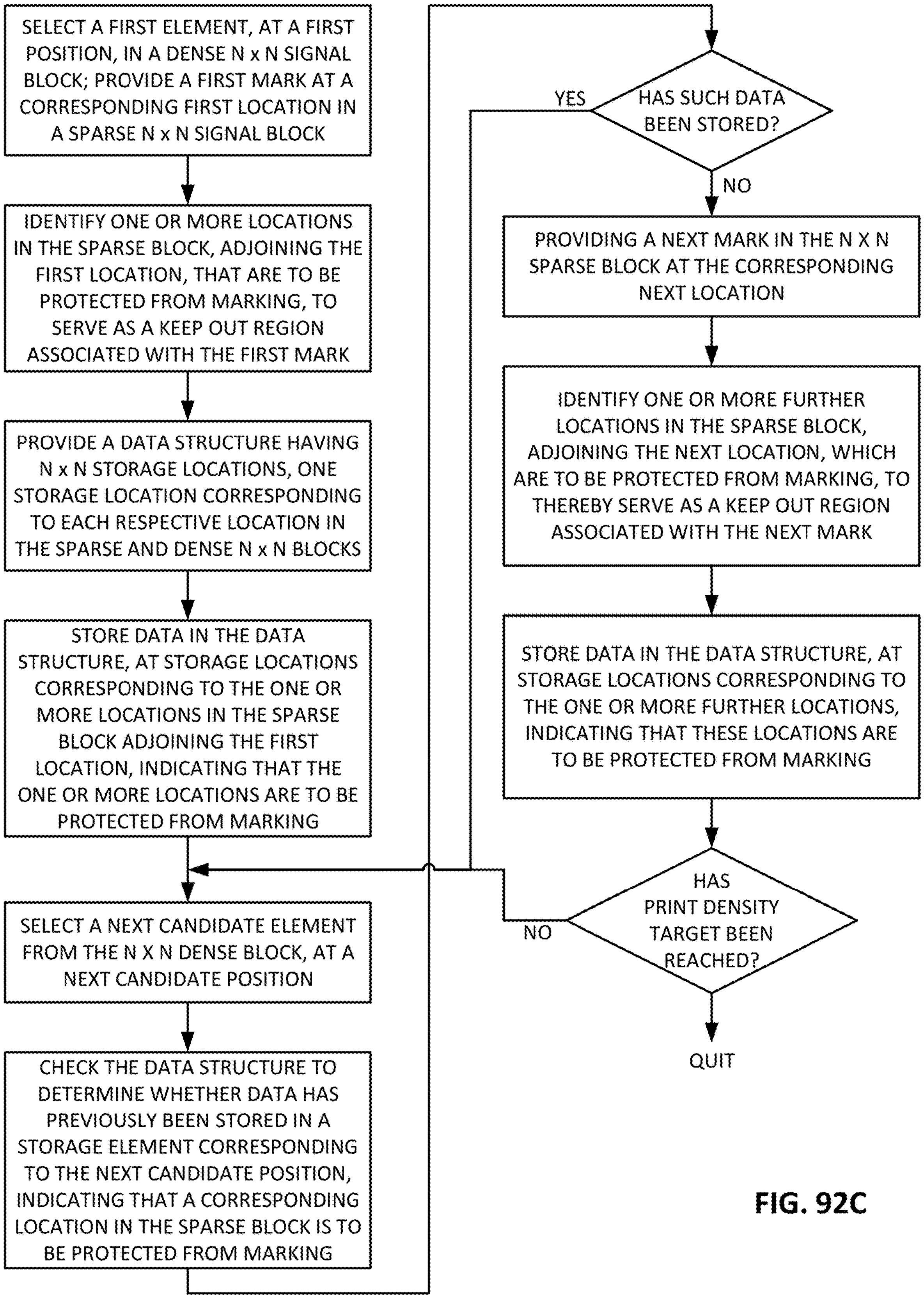
FIG. 92C is a flow chart detailing a method that uses the data structure of FIG. 92B.

FIG. 92C is a flow chart detailing aspects of an embodiment employing the foregoing arrangement.

While reference was frequently made to dot spacing or distance constraints, it will be recognized that this is just one approach to avoiding dot clumping. Other approaches, such as the patterned keep-out regions discussed above, can be substituted.

While the specification has sometimes referred to rolls of adhesive label stock, it will be recognized that label stock can be provided otherwise, such as in a fanfold arrangement, without departing from the other principles of the detailed technologies.

Similarly, while much of the disclosure has focused on labels, it should be recognized that most of the detailed technologies are more broadly applicable. Not just to thermally-printed media (e.g., including receipts and coupons from point of sale terminals), but to media printed otherwise.

One application of the technology assists human workers who frequently consult printed documentation—such as blueprints or manuals. A headworn apparatus, such as a Google Glasses device, can image sparse markings in documentation, and present linked data, such as exploded views of a component, placement diagrams, etc. Gestures of the head can drill-down for additional detail or magnification, or advance an augmentation to a next step in a procedure.

Although the focus of the specification has been on sparse codes in the form of isolated dots, it should be understood that other optical codes can be derived from sparse patterns. An example is Voronoi, Delaunay and stipple patterns, as detailed in patent application 62/682,731, filed Jun. 8, 2018. Other artistic expressions of data carrying patterns, based on simpler patterns, are detailed in application 62/745,219, filed Oct. 12, 2018. (The disclosures of these applications are incorporated herein by reference.) Patterns produced by the arrangements detailed in this specification can be used as the bases for the more complicated patterns detailed in the just-cited specifications. The resulting artwork can be printed (e.g., on product label artwork) and later scanned to convey digital data (e.g., GTIN data). Those specifications provide other teachings suitable for use in connection with features of the technology detailed in this specification, and vice versa.

In like fashion, the style transfer methods detailed in applications 62/841,084, filed Apr. 30, 2019, and Ser. No. 16/212,125, filed Dec. 6, 2018 (published as US20190213705), are suitable for use in connection with the presently-described arrangements.

Patent applications 62/834,260, filed Apr. 15, 2019, 62/820,755, filed Mar. 19, 2019, 62/814,567, filed Mar. 6, 2019, and 62/836,326, filed Apr. 19, 2019, detail other technologies in which the features detailed herein can be advantageously employed, and vice versa.

While some of the detailed implementations gathered statistics characterizing "always-black" pixels based on a set of 100-300 such pixels, sets of differing sizes can naturally be used. (Five pixels is probably near the low end size for such a set.)

Many of the detailed arrangements can achieve patterns of variable, user-configurable darkness (density), by controlling the number of marks that are printed (e.g., by varying the number of darkest reference signal locations to make available for signaling of message information). In other arrangements, density can be increased (and robustness can be similarly increased) in other ways, such as by changing the size of the marks. Marks may be single dots, or clumps of two dots (e.g., in a 2×1 or 1× array), or clumps of three dots, or clumps of four dots (e.g., in a 2×2 array), etc. In an arrangement that employs always-dark marks to help signal the reference signal, the darkest reference signal locations (e.g., ranked as #1-20) are each printed with a clump of four dots. The next-darkest locations (e.g., ranked as #21-40) are each printed with a clump of three dots. The next-darkest locations (e.g., ranked as #41-60) are each printed with a clump of two dots. Further locations in the ranked list are printed as solitary dots.

This specification has detailed many arrangements for generating sparse codes from dense codes. While composite dense codes—including payload and reference signals—are most commonly used, the arrangements can variously be applied to dense codes consisting just of payload or reference signals. Further, as noted elsewhere, payload data can be conveyed by a reference signal (e.g., by the presence or absence of certain spatial frequency components). Similarly, reference information can be conveyed by a payload signal (e.g., by use of fixed bits in the payload data, thereby forming an implicit synchronization signal having known signal characteristics, by which a detector can locate the payload signal for decoding).

One arrangement creates a sparse code by applying a thresholding operation to a dense code, to identify locations of extreme low values (i.e., dark) in the dense code. These locations are then marked in a sparse block. The threshold level establishes the print density of the resulting sparse mark.

Another arrangement identifies the darkest elements of a reference signal, and logically-ANDs these with dark elements of the payload signal, to thereby identify locations in a sparse signal block at which marks should be formed. A threshold value can establish which reference signal elements are dark enough to be considered, and this value can be varied to achieve a desired print density.

Still another arrangement employs a reference signal generated at a relatively higher resolution, and a payload signal generated at a relatively lower resolution. The latter signal has just two values (i.e., it is bitonal); the former signal has more values (i.e., it is multi-level, such as binary greyscale or comprised of floating point values). The payload signal is interpolated to the higher resolution of the reference signal, and in the process is converted from bitonal form to multi-level. The two signals are combined at the higher resolution, and a thresholding operation is applied to the result to identify locations of extreme (e.g., dark) values. Again, these locations are marked in a sparse block. The threshold level again establishes the print density of the resulting sparse mark.

Yet another arrangement again employs a reference signal generated at a relatively higher resolution, and a bitonal payload signal generated at a relatively lower resolution. A mapping is established between the two signals, so that each element of the payload signal is associated with four or more spatially-corresponding elements of the reference signal. For each element of the payload signal that is dark, the location of the darkest of the four-or-more spatially corresponding elements in the reference signal is identified. A mark is made at a corresponding location in the sparse block.

A further arrangement is based on a dense multi-level reference signal block. Elements of this signal are sorted by value, to identify the darkest elements—each with a location. These darkest elements are paired. One element is selected from each pairing in accordance with bits of the payload. Locations in the sparse block, corresponding to locations of the selected dark elements, are marked to form the sparse signal.

Still another arrangement sorts samples in a tile of the reference signal by darkness, yielding a ranked list—each dark sample being associated with a location. Some locations are always-marked, to ensure the reference signal is strongly expressed. Others are marked, or not, based on values of message signal data assigned to such locations (e.g., by a scatter table).

Arrangements that operate on composite codes can further include weighting the reference and payload signals in ratios different than 1:1, to achieve particular visibility or robustness goals.

Each of these arrangements can further include the act of applying a spacing constraint to candidate marks within the sparse block, to prevent clumping of marks. The spacing constraint may take the form of a keep-out zone that is circular, elliptical, or of other (e.g., irregular) shape. The keep-out zone may have two, or more, or less, axes of symmetry (or none). Enforcement of the spacing constraint can employ an associated data structure having one element for each location in the sparse block. As dark marks are added to the sparse block, corresponding data is stored in the data structure identifying locations that—due to the spacing constraint—are no longer available for possible marking.

In each of these arrangements, the reference signal can be tailored to have a non-random appearance, by varying the relative amplitudes of spatial frequency peaks, so that they are not all of equal amplitude. Such variation of the reference signal appearance has consequent effects on the sparse signal appearance.

These arrangements can also include the act of applying a non-linear filter to a multi-level code (e.g., the original dense code) to identify locations at which forming a mark in the sparse block most effectively gives expression to information represented by unprinted sparse elements. These locations are then given priority in selecting locations at which to make marks in the sparse block.

The just-reviewed arrangements are more fully detailed elsewhere in this disclosure.

A means for forming a sparse code from a dense code can employ any of the hardware arrangements detailed herein (i.e., in the discussion entitled Operating Environment), configured to perform any of the detailed algorithms.

This specification has discussed several different embodiments. It should be understood that the methods, elements and concepts detailed in connection with one embodiment can be combined with the methods, elements and concepts detailed in connection with other embodiments. While some such arrangements have been particularly described, some have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc. To give but a single example, in the embodiments described as combining the payload and reference signals in a weighted arrangement other than 1:1, a weighting of 1:1 can alternatively be used.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of Applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

The methods, processes, and systems described above may be implemented in hardware, software or a combination of hardware and software. For example, the signal processing operations for generating and reading optical codes are implemented as instructions stored in a memory and executed in a programmable computer (including both software and firmware instructions). Alternatively the operations are implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device).

To provide a comprehensive disclosure, while complying with the Patent Act's requirement of conciseness, Applicant incorporates-by-reference each of the documents referenced herein. (Such materials are incorporated in their entireties, even if cited above in connection with specific of their teachings.) These references disclose technologies and teachings that Applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the invention. Rather, Applicant claims all such modifications as may come within the scope and spirit of the following claims and equivalents thereof.

The invention claimed is:

1. A method of decoding an M-bit payload represented by an optical code depicted in an image, including the acts:

determining geometric registration of the optical code in the image, by reference to a reference signal represented by dots within the optical code, said dots corresponding to extrema in a summed ensemble of plural spatial domain sine waves;

processing data from N locations in the image to determine whether a dot is present at each of said locations, while not similarly processing data from locations between said N locations, where N>M;

producing a P-bit string by reference to presence or absence of the dot at each of said N locations; and applying said P-bit string to an error-correcting decoder to yield M decoded bits;

wherein by ignoring data from locations between said N locations, misinterpretation of blank areas as data is reduced.

2. The method of claim 1 in which said processing includes processing data from the N locations in the image to determine whether a dot is present at each of said locations, while not similarly processing data from all locations between said N locations.

3. The method of claim 1 in which P equals N.

4. The method of claim 1 in which P equals half of N.

5. The method of claim 1 in which P equals 1024 and N equals 1024 or 2048.

6. The method of claim 1 in which M is less than 200.

7. A non-transitory computer readable medium comprising instructions stored therein that, when executed by one or more processor cores, cause said one or more processor cores to perform the following:

determining geometric registration of an optical code depicted in an image, by reference to a reference signal represented by dots within the optical code, said dots corresponding to extrema in a summed ensemble of plural spatial domain sine waves, in which the optical code represents an M-bit payload, where M is a positive integer;

processing data from N locations in the image to determine whether a dot is present at each of said N locations, while not similarly processing data from locations between said N locations, where N>M and N is a positive integer;

producing a P-bit string by reference to presence or absence of the dot at each of said N locations; and applying the P-bit string to an error-correcting decoder to yield M decoded bits; wherein by ignoring data from locations between said N locations, misinterpretation of blank areas as data is reduced.

8. The non-transitory computer readable medium of claim 7 in which said processing includes processing data from the N locations in the image to determine whether a dot is present at each of the N locations, while not similarly processing data from all locations between the N locations.

9. The non-transitory computer readable medium of claim 7 in which P equals N.

10. The non-transitory computer readable medium of claim 7 in which P equals half of N.

11. The non-transitory computer readable medium of claim 7 in which P equals 1024 and N equals 1024 or 2048.

12. The non-transitory computer readable medium of claim 7 in which M is less than 200.

13. A system comprising:

an input to receive an image depicting an optical code, the optical code representing an M-bit payload, where M is a positive integer;

one or more processor cores configured for:

determining geometric registration of the optical code in the image, by reference to a reference signal represented by dots within the optical code, said dots corresponding to extrema in a summed ensemble of plural spatial domain sine waves;

processing data from N locations in the image to determine whether a dot is present at each of the N locations, while not similarly processing data from locations between the N locations, where N>M and N is a positive integer;

producing a P-bit string by reference to presence or absence of the dot at each of the N locations; and applying the P-bit string to an error-correcting decoder to yield M decoded bits;

wherein by ignoring data from locations between said N locations, misinterpretation of blank areas as data is reduced; and an output for outputting the M decoded bits.

14. The system of claim 13 in which said processing includes processing data from the N locations in the image to determine whether a dot is present at each of the N locations, while not similarly processing data from all locations between the N locations.

15. The system of claim 13 in which P equals N.

16. The system of claim 13 in which P equals half of N.

17. The system of claim 13 in which P equals 1024 and N equals 1024 or 2048.

18. The system of claim 13 in which M is less than 200.

* * * * *